United States Patent
Breed

(10) Patent No.: US 7,284,769 B2
(45) Date of Patent: Oct. 23, 2007

(54) METHOD AND APPARATUS FOR SENSING A VEHICLE CRASH

(75) Inventor: David S. Breed, Boonton Township, Morris County, NJ (US)

(73) Assignee: Automotive Technologies International, Inc., Denville, NJ (US)

( * ) Notice: Subject to any disclaimer, the term of this patent is extended or adjusted under 35 U.S.C. 154(b) by 403 days.

(21) Appl. No.: 10/638,743

(22) Filed: Aug. 11, 2003

(65) Prior Publication Data

US 2004/0036261 A1 Feb. 26, 2004

Related U.S. Application Data

(63) Continuation-in-part of application No. 08/962,827, filed on Nov. 3, 1997, now Pat. No. 6,609,053, which is a continuation-in-part of application No. 08/476,076, filed on Jun. 7, 1995, now Pat. No. 5,684,701, application No. 10/638,743, which is a continuation-in-part of application No. 10/331,060, filed on Dec. 27, 2002, which is a continuation-in-part of application No. 09/862,530, filed on May 22, 2001, now Pat. No. 6,557,889, which is a continuation-in-part of application No. 09/452,735, filed on Dec. 1, 1999, now Pat. No. 6,234,519, which is a continuation-in-part of application No. 08/358,976, filed on Dec. 19, 1994, now Pat. No. 6,009,970, which is a continuation of application No. 08/104,246, filed on Aug. 9, 1993, now abandoned, which is a continuation-in-part of application No. 07/727,756, filed on Jul. 9, 1991, now abandoned, said application No. 09/862,530 is a continuation-in-part of application No. 09/748,489, filed on Dec. 26, 2000, now Pat. No. 6,328,126, which is a continuation of application No. 08/514,986, filed on Aug. 14, 1995, now Pat. No. 6,206,129, which is a continuation-in-part of application No. 08/024,076, filed on Mar. 1, 1993, now Pat. No. 5,441,301, said application No. 10/331,060 is a continuation-in-part of application No. 08/865,525, filed on May 29, 1997, now Pat. No. 6,532,408, application No. 10/638,743, which is a continuation-in-part of application No. 09/435,045, filed on Nov. 8, 1999, now Pat. No. 6,685,218, which is a continuation-in-part of application No. 09/114,962, filed on Jun. 14, 1998, now Pat. No. 6,419,265, which is a continuation-in-part of application No. 08/101,017, filed on Sep. 16, 1993, now Pat. No. 5,842,716, application No. 10/638,743, which is a continuation-in-part of application No. 10/188,673, filed on Jul. 3, 2002, now Pat. No. 6,738,697, which is a continuation-in-part of application No. 09/753,186, filed on Jan. 2, 2001, now Pat. No. 6,484,080, which is a continuation-in-part of application No. 09/137,918, filed on Aug. 20, 1998, now Pat. No. 6,175,787, which is a continuation-in-part of application No. 08/476,077, filed on Jun. 7, 1995, now Pat. No. 5,809,437, application No. 10/638,743, which is a continuation-in-part of application No. 10/330,938, filed on Dec. 27, 2002, now Pat. No. 6,823,244, which is a continuation-in-part of application No. 10/188,673, filed on Jul. 3, 2002, now Pat. No. 6,738,697, which is a continuation-in-part of application No. 09/753,186, filed on Jan. 20, 2001, now Pat. No. 6,484,080, which is a continuation-in-part of application No. 09/137,918, filed on Aug. 20, 1998, now Pat. No. 6,175,787, which is a continuation-in-part of application No. 08/476,077, filed on Jun. 7, 1995, now Pat. No. 5,809,437.

(51) Int. Cl.
*B60R 21/16* (2006.01)
*B60K 28/02* (2006.01)
*B60K 28/14* (2006.01)

(52) U.S. Cl. .................. 280/735; 180/282; 701/45

(58) Field of Classification Search ............ 280/735; 701/45

See application file for complete search history.

(56) References Cited

U.S. PATENT DOCUMENTS

| | | | |
|---|---|---|---|
| 4,257,703 A | 3/1981 | Goodrich | |
| 4,784,237 A * | 11/1988 | Condne et al. | 180/268 |
| 5,014,810 A | 5/1991 | Mattes et al. | |
| 5,157,268 A | 10/1992 | Spies et al. | |
| 5,173,614 A | 12/1992 | Woehrl et al. | |
| 5,202,831 A * | 4/1993 | Blackburn et al. | 701/46 |
| 5,232,243 A | 8/1993 | Blackburn et al. | |
| 5,282,134 A | 1/1994 | Gioutsos et al. | |
| 5,330,226 A * | 7/1994 | Gentry et al. | 280/735 |
| 5,366,241 A | 11/1994 | Kithil | |
| 5,377,108 A | 12/1994 | Nishio | |
| 5,377,201 A | 12/1994 | Chakradhar et al. | |
| 5,398,185 A * | 3/1995 | Omura | 701/45 |
| 5,418,722 A | 5/1995 | Cashler | |
| 5,449,198 A | 9/1995 | Jeenicke et al. | |
| 5,454,591 A | 10/1995 | Mazur et al. | |
| 5,461,566 A | 10/1995 | Musser | |
| 5,461,567 A | 10/1995 | Kelley et al. | |
| 5,468,013 A * | 11/1995 | Gille | 280/735 |
| 5,474,327 A | 12/1995 | Schousek | |
| 5,508,920 A | 4/1996 | Gioutsos et al. | |
| 5,528,698 A | 6/1996 | Kamei et al. | |
| 5,541,590 A | 7/1996 | Nishio | |
| 5,541,842 A | 7/1996 | Gioutsos et al. | |
| 5,559,699 A | 9/1996 | Gioutsos | |
| 5,583,771 A * | 12/1996 | Lynch et al. | 701/45 |
| 5,602,734 A | 2/1997 | Kithil | |
| 5,626,359 A * | 5/1997 | Steffens et al. | 280/735 |
| 5,631,834 A | 5/1997 | Tsurushima et al. | |
| 5,653,462 A | 8/1997 | Breed et al. | |
| 5,684,701 A * | 11/1997 | Breed | 701/45 |
| 5,732,375 A | 3/1998 | Cashier | |
| 5,736,923 A * | 4/1998 | Saab | 340/429 |
| 5,748,477 A * | 5/1998 | Katoh | 280/735 |
| 5,758,301 A | 5/1998 | Saito et al. | |
| 5,767,766 A | 6/1998 | Kwun | |
| 5,770,997 A | 6/1998 | Kleinberg et al. | |
| 5,801,619 A | 9/1998 | Liu et al. | |
| 5,809,437 A | 9/1998 | Breed | |
| 5,829,782 A | 11/1998 | Breed et al. | |
| 5,848,802 A | 12/1998 | Breed et al. | |
| 5,890,084 A * | 3/1999 | Halasz et al. | 701/45 |
| 5,890,085 A | 3/1999 | Corrado et al. | |
| 6,038,503 A * | 3/2000 | Wolf et al. | 701/45 |
| 6,175,787 B1 | 1/2001 | Breed | |
| 6,203,060 B1 * | 3/2001 | Cech et al. | 280/735 |
| 6,212,455 B1 * | 4/2001 | Weaver | 701/45 |
| 6,311,112 B1 * | 10/2001 | Mazur et al. | 701/45 |
| 6,484,080 B2 | 11/2002 | Breed | |

FOREIGN PATENT DOCUMENTS

| | | |
|---|---|---|
| EP | 0568017 | 11/1993 |
| EP | 0695668 | 2/1996 |
| GB | 2289332 | 11/1995 |
| GB | 2289786 | 11/1995 |
| GB | 2301922 | 12/1995 |

OTHER PUBLICATIONS

A Critique of Single Point Sensing, Society of Automotive Engineers, David S. Breed et al., Paper No. 920124, 1992.

"Using Vehicle Deformation to Sense Crashes", David S. Breed et al., Presented at the International Body Engineering Conference, Sep. 21, 1993-Sep. 23, 1993.

Breed, D.S., Sanders, W.T. and Castelli, V. "A Complete Frontal Crash Sensor System—I", Society of Automotive Engineers Paper SAE 930650, 1993.

Breed, D.S., Castelli, V. "Trends in Sensing Frontal Impact", Society of Automotive Engineers Paper SAE 890750, 1989.

Breed, D.S. and Castelli, V. "Problems in Design and Engineering of Air Bag Systems", Society of Automotive Engineers Paper SAE 880724, 1988.

Breed, D.S., Sanders, W.T. and Castelli, V., "A Complete Frontal Crash Sensor System—II", Proceedings Enhanced Safety of Vehicles Conference, Munich, 1994, Published by the US Department of Transportation, National Highway Traffic Safety Administration, Washington, D.C.

"Using a Neural Network to Distinguish Between Deployment Events and Non-Deployment Events in a Supplemental Inflatable Restraint System", Dr. Stephen J. Kiselewich and Douglas D. Turner, Delco Electronics Corporation, "Automotive Electronics 95, A review of technical achievements at Delco Electronics", pp. 5-10, 1995.

* cited by examiner

*Primary Examiner*—Lesley D. Morris
*Assistant Examiner*—Marc A. Scharich
(74) *Attorney, Agent, or Firm*—Brian Roffe

(57) ABSTRACT

Method and apparatus for sensing a crash of a vehicle in which acceleration and angular motion of the vehicle are measured and analyzed by a processor to determine whether a crash is occurring. A deployable occupant protection device is deployed by a processor when deployment criteria are satisfied. The processor may embody a pattern recognition technique for analyzing the measured acceleration and angular motion of the vehicle and determine whether deployment of the occupant protection device is beneficial. For example, the pattern recognition technique may be a neural network trained to determine whether the vehicle is experiencing a crash such as a rollover based on the measured acceleration and angular motion of the vehicle.

42 Claims, 44 Drawing Sheets

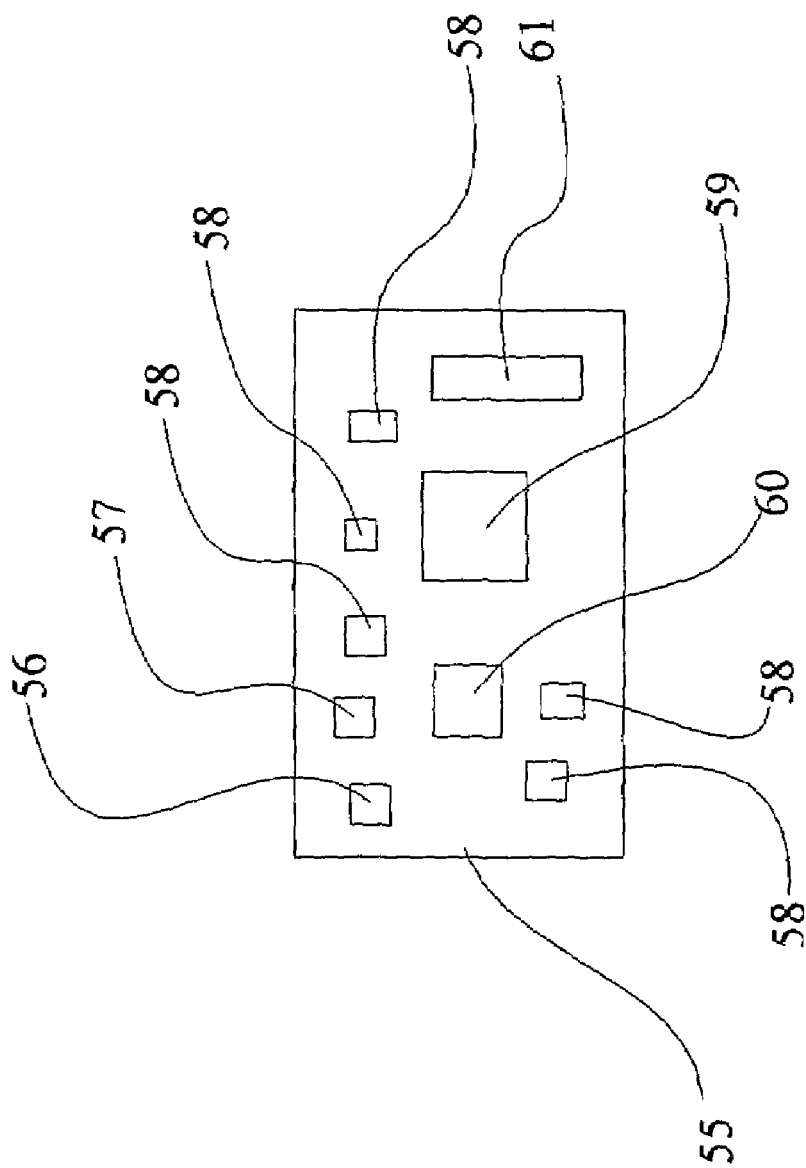

NEURAL NETWORK SINGLE POINT, PASSENGER COMPARTMENT MOUNTED SENSOR PERFORMANCE

| SCALED VELOCITY | BARRIER SCALING FACTOR | | | | | |
|---|---|---|---|---|---|---|
| | 1 | 1.2 | 1.4 | 1.6 | 1.8 | 2 |
| 8 MPH | NT | NT | NT | NT | NT | NT |
| 10 MPH | NT | 0.7/2.9 | 0.9/3.1 | 1.0/3.0 | NT | NT |
| 12 MPH | 0.0/1.1 | 0.8/3.5 | 0.9/3.5 | 1.0/3.4 | 1.4/3.9 | 2.0/4.7 |
| 14 MPH | 0.0/1.2 | 0.9/4.1 | 1.0/3.8 | 1.2/4.0 | 1.3/4.0 | 1.7/4.5 |
| 16 MPH | 0.0/1.4 | 0.9/4.4 | 1.0/4.0 | 1.1/4.0 | 1.4/4.3 | 1.7/4.6 |
| 18 MPH | 0.0/1.6 | 0.8/4.2 | 0.7/3.6 | 1.2/4.5 | 1.6/4.8 | 1.8/4.9 |
| 20 MPH | 0.0/1.8 | 0.7/4.3 | 0.7/4.0 | 1.1/4.3 | 1.3/4.4 | 1.0/3.8 |
| 22 MPH | 0.0/1.9 | 0.5/3.9 | 0.7/4.0 | 0.9/4.1 | 1.2/4.6 | 1.1/4.2 |
| 24 MPH | 0.0/2.1 | 0.1/2.3 | 0.8/4.4 | 0.8/4.2 | 1.3/5.0 | 1.4/4.8 |
| 26 MPH | 0.0/2.3 | 0.1/2.5 | 0.5/4.0 | 0.9/4.5 | 1.0/4.4 | 1.2/4.6 |
| 28 MPH | 0.0/2.5 | 0.0/2.1 | 0.1/2.4 | 0.7/4.2 | 0.8/4.1 | 0.5/3.2 |
| 30 MPH | 0.0/2.7 | 0.0/2.3 | 0.1/2.6 | 0.1/2.3 | 0.8/4.4 | 1.2/5.0 |
| 32 MPH | 0.0/2.8 | 0.0/2.4 | 0.1/2.8 | 0.1/2.5 | 0.9/4.7 | 1.1/4.9 |
| 34 MPH | 0.0/3.0 | 0.0/2.3 | 0.0/2.0 | 0.0/1.8 | 0.6/4.2 | 1.2/5.3 |

Fig. 3

OPTIMIZED SINGLE POINT, PASSENGER COMPARTMENT MOUNTED SENSOR PERFORMANCE

| SCALED VELOCITY | 1 | 1.2 | 1.4 | 1.6 | 1.8 | 2 |
|---|---|---|---|---|---|---|
| 8 MPH | NT | NT | NT | NT | NT | NT |
| 10 MPH | 4.7/10.3* | NT | NT | NT | NT | NT |
| 12 MPH | 2.2/6.7 | 5.8/12.1 | NT | NT | NT | NT |
| 14 MPH | 2.2/7.2 | 2.7/7.5 | 3.9/8.9 | NT | NT | NT |
| 16 MPH | 2.2/7.6 | 2.7/7.9 | 3.4/8.5 | 4.2/9.3 | NT | NT |
| 18 MPH | 2.2/8.0 | 2.8/8.7 | 3.6/9.2 | 4.2/9.7 | 5.0/10.5 | 17.8/27.5 |
| 20 MPH | 2.0/7.9 | 3.1/9.3 | 3.7/9.7 | 4.3/11.2 | 5.0/10.9 | 5.9/11.7 |
| 22 MPH | 1.0/5.3 | 2.7/8.9 | 3.9/10.4 | 4.5/10.9 | 5.2/11.5 | 5.9/12.2 |
| 24 MPH | .5/4.2 | 1.6/6.5 | 3.9/10.8 | 4.8/11.6 | 5.4/12.0 | 6.1/12.8 |
| 26 MPH | .4/4 | 1.2/5.7 | 2.0/6.8 | 4.5/11.5 | 5.8/13 | 6.4/13.5 |
| 28 MPH | .4/4.1 | .6/4.0 | 1.8/6.6 | 2.7/7.8 | 5.9/13.5 | 6.8/14.4 |
| 30 MPH | .4/4.2 | .5/4.0 | .8/4.2 | 2.2/6.9 | 6.4/14.5 | 7.1/15.1 |
| 32 MPH | .3/4.2 | .5/4.1 | .7/7.2 | 2.1/7.0 | 2.6/7.4 | 3.4/8.4 |
| 34 MPH | .3/4.0 | .5/4.2 | .7/4.3 | .9/4.5 | 2.6/7.5 | 4.0/9.6 |

BARRIER SCALING FACTOR

Fig. 4

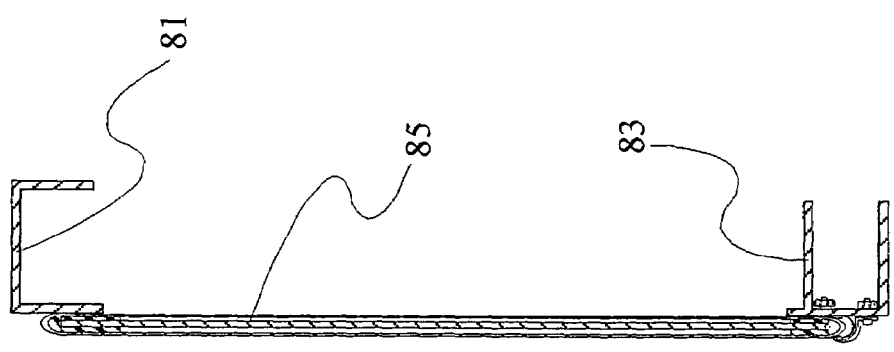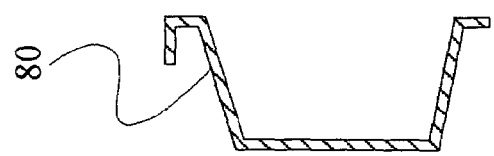
FIG. 7A

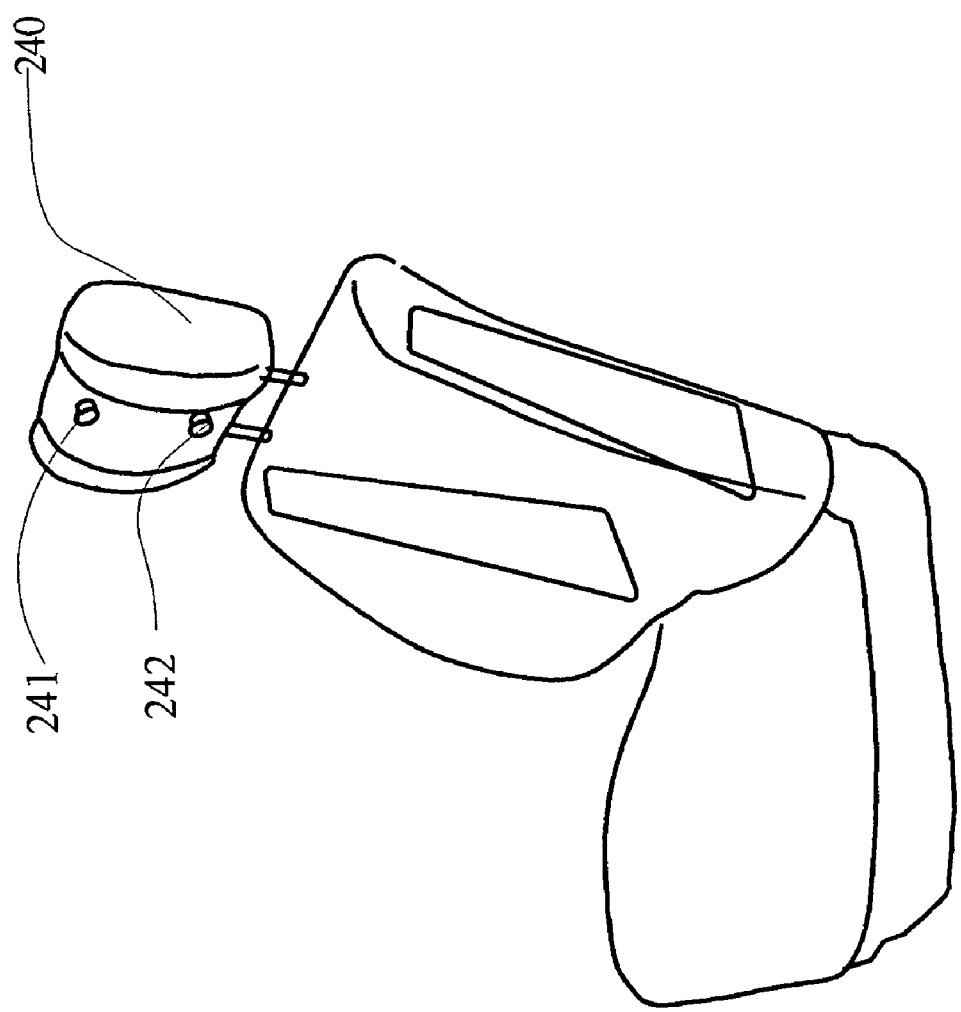

| # | Sensor |
|---|---|
| 1 | CRASH SENSOR |
| 2 | MICROPHONES |
| 3 | COOLANT THERMOMETER |
| 4 | OIL PRESSURE SENSOR |
| 5 | OIL LEVEL SENSOR |
| 6 | AIR FLOW METER |
| 7 | VOLTMETER |
| 8 | AMMETER |
| 9 | HUMIDITY SENSOR |
| 10 | ENGINE KNOCK SENSOR |
| 11 | OIL TURBIDITY SENSOR |
| 12 | THROTTLE POSITION SENSOR |
| 13 | STEERING TORQUE SENSOR |
| 14 | WHEEL SPEED SENSOR |
| 15 | TACHOMETER |
| 16 | SPEEDOMETER |
| 17 | OXYGEN SENSOR |
| 18 | PITCH & ROLL SENSOR |
| 19 | CLOCK |
| 20 | ODOMETER |
| 21 | PWR STR PRESSURE SENSOR |
| 22 | POLUTION SENSOR |
| 23 | FUEL GAGE |
| 24 | CABIN THEROMETER |
| 25 | TRANSMISSION FLD LVL SNSR |
| 26 | YAW SENSOR |
| 27 | COOLANT LEVEL SENSOR |
| 28 | TRANS. FLUID TURBIDITY |
| 29 | BREAK PRESSURE SENSOR |
| 30 | COOLANT PRESSURE SENSOR |
| 31 | ACCELEROMETERS |
| 32 | GPS RECEIVER |
| 33 | IMU KALMAN FILTER |

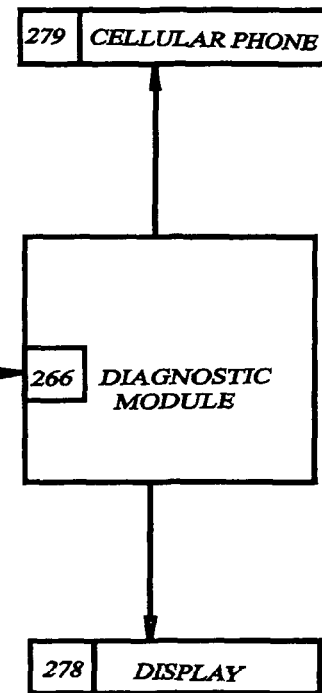

FIG. 31

METHOD AND APPARATUS FOR SENSING A VEHICLE CRASH

CROSS-REFERENCE TO RELATED APPLICATIONS

This application is:

a continuation-in-part of U.S. patent application Ser. No. 08/962,827 filed Nov. 3, 1997, now U.S. Pat. No. 6,609,053, which is a continuation-in-part of U.S. patent application Ser. No. 08/476,076 filed Jun. 7, 1995, now U.S. Pat. No. 5,684,701;

a continuation-in-part of U.S. patent application Ser. No. 10/331,060 filed Dec. 27, 2002 which is:

A) a continuation-in-part of U.S. patent application Ser. No. 09/862,530 filed May 22, 2001, now U.S. Pat. No. 6,557,889, which is:

1) a continuation-in-part of U.S. patent application Ser. No. 09/452,735 filed Dec. 1, 1999, now U.S. Pat. No. 6,234,519, which is a continuation-in-part of U.S. patent application Ser. No. 08/358,976 filed Dec. 19, 1994, now U.S. Pat. No. 6,009,970, which is a continuation of U.S. patent application Ser. No. 08/104,246 filed Aug. 9, 1993, now abandoned, which is a continuation-in-part of U.S. patent application Ser. No. 07/727,756 filed Jul. 9, 1991, now abandoned; and 2) a continuation-in-part of U.S. patent application Ser. No. 09/748,489 filed Dec. 26, 2000, now U.S. Pat. No. 6,328,126, which is a continuation of U.S. patent application Ser. No. 08/514,986 filed Aug. 14, 1995, now U.S. Pat. No. 6,206,129, which is a continuation-in-part of U.S. patent application Ser. No. 08/024,076 filed Mar. 1, 1993, now U.S. Pat. No. 5,441,301; and B) a continuation-in-part of U.S. patent application Ser. No. 08/865,525 filed May 29, 1997, now U.S. Pat. No. 6,532,408;

a continuation-in-part of U.S. patent application Ser. No. 09/435,045 filed Nov. 8, 1999, now U.S. Pat. No. 6,685,218, which is a continuation-in-part of U.S. patent application Ser. No. 09/114,962 filed Jul. 14, 1998, now U.S. Pat. No. 6,419,265, which is a continuation-in-part of U.S. patent application Ser. No. 08/101,017 filed Sep. 16, 1993, now U.S. Pat. No. 5,842,716;

a continuation-in-part of U.S. patent application Ser. No. 10/188,673 filed Jul. 3, 2002, now U.S. Pat. No. 6,738,697, which is a continuation-in-part of U.S. patent application Ser. No. 09/753,186 filed Jan. 2, 2001, now U.S. Pat. No. 6,484,080, which is a continuation-in-part of U.S. patent application Ser. No. 09/137,918 filed Aug. 20, 1998, now U.S. Pat. No. 6,175,787, which is a continuation-in-part of U.S. patent application Ser. No. 08/476,077 filed Jun. 7, 1995, now U.S. Pat. No. 5,809,437; and a continuation-in-part of U.S. patent application Ser. No. 10/330,938 filed Dec. 27, 2002, now U.S. Pat. No. 6,823,244, which is a continuation-in-part of U.S. patent application Ser. No. 10/188,673 filed Jul. 3, 2002, now U.S. Pat. No. 6,738,697, which is a continuation-in-part of U.S. patent application Ser. No. 09/753,186 filed Jan. 20, 2001, now U.S. Pat. No. 6,484,080, which is a continuation-in-part of U.S. patent application Ser. No. 09/137,918 filed Aug. 20, 1998, now U.S. Pat. No. 6,175,787, which is a continuation-in-part of U.S. patent application Ser. No. 08/476,077 filed Jun. 7, 1995, now U.S. Pat. No. 5,809,437.

All of foregoing mentioned applications are incorporated by reference herein.

FIELD OF THE INVENTION

The present invention relates to methods and apparatus for sensing a vehicle crash, such as a frontal crash, a side impact, a rear impact or a rollover, for the purpose of, for example, controlling deployment of an occupant protection device.

BACKGROUND OF THE INVENTION

All of the patents, patent applications, technical papers and other references referenced above and below are incorporated herein by reference in their entirety.

The invention relates to several different areas and a discussion of some particular areas of interest follows.

1. Pattern Recognition

Pattern recognition techniques, such as artificial neural networks are finding increased application in solving a variety of problems such as optical character recognition, face recognition, voice recognition, and military target identification. In the automotive industry in particular, pattern recognition techniques have now been applied to identify various objects within the passenger compartment of the vehicle, such as a rear facing child seat, as well as to identify threatening objects with respect to the vehicle, such as an approaching vehicle about to impact the side of the vehicle. See, for example, U.S. Pat. Nos. 05,829,782, 06,343,810 and U.S. RE 37,260.

Pattern recognition techniques have also been applied to sense automobile crashes for the purpose of determining whether or not to deploy an airbag or other passive restraint, or to tighten the seatbelts, cutoff the fuel system, or unlock the doors after the crash (see, for example, U.S. Pat. No. 05,684,701). In the past, pattern recognition techniques were not applied to forecast the severity of automobile crashes for the purpose of controlling the flow of gas into and/or out of an airbag to tailor the airbag inflation characteristics and/or to control seatbelt retractors, pretensioners and energy dissipaters to match the crash severity. Furthermore, such techniques were also not used to control the flow of gas into and/or out of an airbag to tailor the airbag inflation characteristics to the size, position and/or relative velocity of the occupant or other factors such as seatbelt usage, seat and seat back positions, headrest position, vehicle velocity, etc.

Neural networks are constructed of processing elements known as neurons that are interconnected using information channels often called interconnects organized into different layers. Each neuron can have multiple inputs but only one output. Each output however is usually connected to all other neurons in the next layer in the direction of processing. The neurons in the first layer operate collectively on the input data as described in more detail below. Neural networks learn by extracting relational information from the data and the desired output. Neural networks have been applied to a wide variety of pattern recognition problems including automobile occupant sensing, speech recognition, optical character recognition, and handwriting analysis.

2. Electronic Crash Sensors

Electronic crash sensors currently used in sensing frontal impacts typically include accelerometers mounted in the passenger compartment that detect and measure vehicle accelerations during the crash. The accelerometer produces an analog signal proportional to the acceleration experienced by the accelerometer and hence the vehicle on which it is mounted. An analog to digital converter (ADC) transforms this analog signal into a digital time series. Crash sensor designers study this digital acceleration data and derive therefrom computer algorithms which determine whether the acceleration data from a particular crash event warrants deployment of the airbag. This is usually a trial and error process wherein the engineer or crash sensor designer observes data from crashes where the airbag is desired and when it is not needed, and other events where the airbag is not needed. Finally, the engineer or crash sensor designer settles on the "rules" for controlling deployment of the airbag which are programmed into an algorithm which seem to satisfy the requirements of the crash library, i.e., the crash data accumulated from numerous crashes and other events and the associated desired restraint reaction. The resulting algorithm is not universal and most such engineers or crash sensor designers will answer in the negative when asked whether their algorithm will work for all vehicles. Such an algorithm also merely determines that the airbag should or should not be triggered. Prior to the current assignee's activities, no attempt is believed to have been made to ascertain or forecast the eventual severity of the crash or, more specifically, to forecast the velocity change versus time of the passenger compartment from the previous acceleration data obtained from the accelerometer.

Several papers as listed below have been published pointing out some of the problems and limitations of electronic crash sensors mounted out of the crush zone of the vehicle, usually in a protected location in the passenger compartment of the vehicle. These sensors are frequently called single point crash sensors. Technical papers which discuss the limitations of current single point sensors along with discussions of the theory of crash sensing are listed below. The only use of electronic sensors at the time of the filing of the current assignee's earliest parent patent application to (U.S. Pat. No. 05,842,716 filed Sep. 16, 1993) was for non-crush zone sensing of frontal crashes. Patent U.S. Pat. No. 03,701, 903 shows crash sensors mounted near the front of the vehicle but it also points out that they are used ". . . in response to changes in the vehicle's velocity" as opposed to the velocity change to a portion of the vehicle that undergoes crushing. Engineers involved in crash testing at that time were aware that in a crash test, it was common to lose one or more of the front crush zone mounted accelerometers and thus the prevailing wisdom was that the crush zone was not a place to position electronic sensors.

These papers demonstrate, among other things, that there is no known theory that allows an engineer to develop an algorithm for sensing crashes and selectively deploying the airbag except when the sensor is located in the crush zone of the vehicle. These papers show that, in general, there is insufficient information within the acceleration signal measured in the passenger compartment to sense all crashes. Another conclusion suggested by these technical papers is that if an algorithm can be found which works for one vehicle, it will also work for all vehicles since it is possible to create any crash pulse measured in one vehicle, in any vehicle. In this regard, reference is made in particular to SAE paper 920124 discussed below.

In spite of the problems associated with finding the optimum crash sensor algorithm, many vehicles on the road today have electronic single point crash sensors. Some of the problems associated with single point sensors have the result that an out-of-position occupant who is sufficiently close to the airbag at the time of deployment will likely be injured or killed by the deployment itself. Fortunately, systems are now being developed, and are in limited production, that monitor the location of occupants within the vehicle and can suppress deployment of the airbag if the occupant is more likely to be injured by the deployment than by the accident. However, these systems are not believed to currently provide the information necessary for the control of airbag systems, or the combination of seatbelt and airbag systems, which have the capability of varying the flow of gas into and/or out of the airbag and thus to tailor the airbag to the size and/or weight of the occupant (and/or possibly another morphological characteristic of the occupant), as well as to the position, velocity and/or seatbelt use of the occupant. More particularly, no such system existed, prior to the conception by the current assignee's personnel, which uses pattern recognition techniques to match the airbag deployment and/or gas discharge from the airbag to the severity of the crash and/or the size, weight, position, velocity and/or seatbelt use of an occupant.

Once any crash sensor has determined that an airbag should be deployed, the system can perform other functions such as tightening the seatbelts for those vehicles which have seatbelt retractor systems, cutting off of the fuel system to prevent fuel spillage during or after the crash, and unlocking the doors after the crash to make it easier for the occupant(s) to escape.

3. Crash Severity Prediction

When a crash commences, the vehicle starts decelerating and an accelerometer located in the passenger compartment, and/or one or more satellite or crush zone mounted accelerometers, begins sensing this deceleration and produces one or more electronic signals that vary over time in proportion to the magnitude of the deceleration. These signals contain information as to the type of the crash which can be used to identify the crash. A crash into a pole gives a different signal than a crash into a rigid barrier, for example, even during the early portion of the crash before the airbag triggering decision has been made. A neural network pattern recognition system can be trained to recognize and identify the crash type from the early signal from a passenger compartment mounted sensor, for example, and further to forecast ahead the velocity change versus time of the crash. Naturally, if the neural network also has information from satellite or crush zone mounted sensors, the accuracy of the forecast is significantly improved. Once this forecast is made, the severity and timing of the crash can be predicted. Thus, for a rigid barrier impact, an estimate of the eventual velocity change of the crash can be made and the amount of gas needed in the airbag to cushion an occupant as well as the time available to direct that amount of gas into the airbag can be determined and used to control the airbag inflation.

Another example isa crash into a highway energy absorbing crash cushion. In this case, the neural-network-based sensor determines that this is a very slow crash and causes the airbag to inflate more slowly thereby reducing the incidence of collateral injuries such as broken arms and eye lacerations.

In both of these cases, the entire decision making process takes place before the airbag deployment is initiated. In another situation where a soft crash is preceded by a hard crash, such as might happen if a pole were in front of a barrier, the neural network system would first identify the soft pole crash and begin slowly inflating the airbag. However, once the barrier impact begins, the system would recognize that the crash type has changed and recalculate the amount and timing of the introduction of gas into the airbag and send appropriate commands to the inflation control system of the airbag to possibly vary the introduction of gas into the airbag. Again, if crush zone mounted sensors are present, the accuracy of the crash severity is greatly enhanced.

The use of pattern recognition techniques in crash sensors has another significant advantage in that it can share the same pattern recognition hardware and software with other systems in the vehicle. Pattern recognition techniques have proven to be effective in solving other problems related to airbag passive restraints. In particular, the identification of a rear-facing child seat located on the front passenger seat, so that the deployment of the airbag can be suppressed, has been demonstrated. Also, the use of pattern recognition techniques for the classification of vehicles about to impact the subject vehicle, particularly the side, for use in anticipatory crash sensing shows great promise. Both of these pattern recognition systems, as well as others under development, can use the same computer system as the crash sensor and prediction system of this invention. Moreover, both of these systems preferably will need to interact with, and should be part of, the diagnostic module used for frontal impacts. It would be desirable for cost and reliability considerations, therefore, for all such systems to use the same computer system or at least be located in the same electronic module. This is particularly desirable since computers designed specially for solving pattern recognition problems, such as neural-computers, are now available and can be integrated into a custom application specific integrated circuit (ASIC).

4. Crush Zone Mounted Sensors

In Society of Automotive Engineers (SAE) Paper No. 930650 entitled "A Complete Frontal Crash Sensor System (8), the authors conclude that airbag crash sensors mounted in the crush zone are necessary for the proper sensing of airbag-required frontal crashes. They also conclude that such sensors should sense crashes to all portions of the front of the vehicle and that sensors which sense the crush of the vehicle are preferred. The theory of crush sensing is presented in the above-referenced U.S. patents and patent applications and particularly in reference (6).

The tape switch and rod-in-tube crush sensors described in the above-referenced U.S. patents and patent applications have performed successfully on various staged vehicle frontal crashes into barriers and poles. These sensors are generally not sufficient for sensing side impacts as discussed in reference (11), however, they can be successful when used in conjunction with a passenger compartment mounted electronic sensor or as a safing sensor. Similarly, they are also being considered when a deployable device, such as an airbag, is used for rear impacts. Newer elongate crush zone mounted sensors are being developed that continuously measure the relative displacement, velocity change or acceleration of a particular location in the crush zone and therefore can give much improved information about the locating of an impact and the characteristics of the crash such as its severity.

Sensors have been widely used in the crush zone to sense and initiate deployment of an air bag passive restraint system. These sensors include an air damped ball-in-tube sensor such as disclosed in U.S. Pat. Nos. 03,974,350, 04,198,864, 04,284,863, 04,329,549 and 04,573,706 (all in the name of Breed) and a spring mass sensor such as disclosed in U.S. Pat. Nos. 04,116,132 and 04,167,276 (both in the name of Bell). In addition, a passenger compartment-mounted electronic sensor is now the most common sensor in airbag systems. Each of these sensors has particular advantages and shortcomings that are discussed in detail in U.S. Pat. No. 04,995,639.

The use of tape or ribbon switch technology as a crush switch was also disclosed in the '639 patent. Further research has shown that an improvement of this particular implementation has significant advantages over some of the other implementations since the switch can be easily made long and narrow and it can be made to respond to bending. In the first case, it can be designed to cover a significant distance across the vehicle that increases the probability that it will be struck by crushed material or bent as the crush zone propagates rearward in the vehicle during a crash. In the second case, it can be made small and located to sense the fact that one part of the vehicle has moved relative to some other part or that the structure on which the sensor is mounted has deformed.

Other crush zone mounted crash sensors including crush switch designs where the width and height dimensions are comparable, must either be large and thus heavy, expensive and difficult to mount, or there is a possibility that the randomly shaped crushed material which forms the boundary of the crush zone will bridge the sensor resulting in late triggering. This crushed material frequently contains holes, wrinkles or folds or portions that may even be displaced or torn out during the crash with the result that it is difficult to guarantee that a particular small area where the sensor is mounted will be struck early in the crash.

A significant improvement results, therefore, if the sensor can stretch across more of the vehicle or if it can determine that there has been relative motion or deformation of a portion of the vehicle on which the sensor is mounted. The improved sensors described herein are small in height and thickness but can extend to whatever length is necessary to achieve a high probability of a sensor triggering on time in a crash.

It has been found that conventional designs of tape or ribbon switches have the drawback that the force required to close the switch is very small compared with the forces which are normally present in automobile crashes. During routine maintenance of the vehicle, the normal tape switch may be damaged or otherwise made to close and remain closed, with the result that later, when the vehicle encounters a pot hole or other shock sufficient to cause the arming sensor to close, an inadvertent air bag deployment can result. Similarly, if the tape switch is mounted on the front of the radiator support, which is a preferred mounting locating for crush zone sensors, hail, heavy rain, stones or other debris from the road might impact the tape switch and cause a momentary closure or damage it. If this happens when the vehicle experiences a shock sufficient to cause the arming sensor to close, an inadvertent air bag deployment might also occur. The force typically required to close a tape switch is less than one pound whereas tens of thousands of pounds are required to stop a vehicle in a crash and local forces greatly in excess of 20 pounds are available to actuate a sensor during a crash.

The present invention seeks to eliminate these drawbacks through the use of a tape switch, rod-in-tube or coaxial cable design that requires either a large force to actuate or a bending of the device due to structural deformation as explained below.

In 1992, the current assignee published reference (5) where the authors demonstrate that there is insufficient information in the non-crush zone of the vehicle to permit a decision to be made to deploy an airbag in time for many crashes. The crash sensors described herein and in the patents and patent applications referenced above, provide an apparatus and method for determining that the crush zone of the automobile has undergone a particular velocity change. This information can be used by itself to make the airbag deployment decision. As airbag systems become more sophisticated, however, the fact that the vehicle has undergone a velocity change in the crush zone can be used in conjunction with an electronic sensor mounted in the passenger compartment to not only determine that the airbag should be deployed but an assessment of the severity of the crash can be made. In this case, the front crush zone mounted sensor of the type disclosed herein can be used as an input to an electronic algorithm and thereby permit a deployment strategy based on the estimated severity of the accident. Although the sensors described herein are one preferred approach of providing this capability, the sensors disclosed in the above referenced patents would also be suitable. Alternately, in some cases, sensors of another design can fulfill this function. Such sensors might be based on the electromechanical technologies such as the ball-in-tube sensor described in U.S. Pat. No. 04,900,880 and now electronic sensors can be used as crush zone mounted sensors for this purpose as is the object of the instant invention.

For the purposes herein, the crush zone is defined as that part of the vehicle which crushes or deforms during a particular crash. This is a different definition from that used elsewhere and in particular in the above-referenced technical papers. Also for the purposes herein, the terminology Crush Sensing Zone, or CSZ, will be used to designate that portion of the vehicle which is deformed or crushed during a crash at the sensor-required trigger time. The sensor-required trigger time is considered the latest time that a crash sensor can trigger for there to be sufficient time to deploy the airbag. This is determined by the airbag system designers and is a given parameter to the sensor designer for a particular crash. Naturally, there will be a different sensor-required trigger time for each crash, however, it has been found, as reported in the above references, that the CSZ is remarkably constant for all crashes of the same type.

For example, the CSZ is nearly the same for all frontal barrier crashes regardless of the velocity of the crash. The same is true for 30 degree angle barrier crashes although the CSZ is different here than for frontal barrier crashes. Remarkably, and unexpectedly, it has also been found that when all frontal crashes at all different velocities are taken into account, the CSZ rearmost boundary becomes an approximate three dimensional surface lying mostly within the engine compartment of the vehicle, typically about ten to twelve inches behind the bumper at the center, and extending backward when crashes outside of the rails are considered. Finally, if a sensor is placed on this CSZ surface so that it is higher than the bumper level on the sides of the vehicle and lower in the vehicle center, as shown in FIG. 7 herein, it will do a remarkable job at discriminating between airbag required and non-deployment crashes and still trigger by the sensor-required trigger time and before other sensors of comparable sensitivity. Naturally, this system is not perfect, however, it has been shown to do a better job than any other sensor system now in use.

It was this discovery which provided a basis for the subject matter described in U.S. Pat. No. 04,995,639 and then to the rod-in-tube sensor described in U.S. Pat. No. 05,441,301. During the process of implementing the rod-in-tube sensor, it was found that the same theory applies to rear impacts and that rod-in-tube sensors also have applicability to side impact sensing, although the theory is different.

In U.S. Pat. No. 05,694,320 (Breed), the theory of sensing rear impacts is presented and it is concluded that an anticipatory sensing system is preferred. This is because many people suffer whiplash injuries at rather low velocity impacts and if an inflatable restraint is used, the repair cost may be significant. To protect most people from whiplash injuries in rear impacts, therefore, a resetable system is preferred. The argument on the other side is that if the headrest is properly positioned, it will take care of all of the low velocity impacts and, therefore, an airbag can be used and reserved for the high velocity impacts where a crush sensing crash sensor would be used. The rod-in-tube sensor disclosed herein is, therefore, ideal for use with a deployable headrest mounted airbag for the same reasons that it is a good sensor for sensing frontal impacts. Since the rear of a vehicle typically has about one third of the stiffness of the vehicle front, electronic sensors will have even a tougher time discriminating between trigger and non-trigger cases for rear impacts. As disclosed in references 5 and 9 above, it is the soft crashes that are the most difficult for electronic sensors to sense in time.

Crush sensing crash sensors are not ideal for sensing side impacts alone, although at least one Volvo side impact system uses such a sensing system. This is because the sensing time is so short that there is virtually no crush (about two inches) at the time that the airbag must be deployed. Since there is very little signal out of the crush zone where electronic sensors are mounted, electronic sensors alone are not able to discriminate airbag required crashes from other crashes not requiring airbag deployment. The combination of the two sensors, on the other hand, can be used to provide a reliable determination. The crush sensor determines that there has been two inches of crush and the electronic sensor determines that the acceleration signal at that time is consistent with an airbag-required crash occurring. Thus, although they cannot be reliably used alone as a discriminating sensor for side impacts, the combined system does function properly. Recent advances now permit electronic crash sensors to be mounted in the side as well as the front and rear crush zones.

An alternate use of the crush sensor such as the rod-in-tube sensor in side impacts is as a safing sensor. In this role, it merely determines that a crash is in progress and the main discriminating function is handled by the velocity sensing sensors such as disclosed in U.S. Pat. No. 05,231,253 (assigned to the current assignee). The rod-in-tube or coaxial cable crush velocity sensing crash sensors solve this side impact problem and thus applications include frontal, side and rear impacts, where in each case they enjoy significant advantages over all other crash sensing technologies. With respect to other prior art related to the certain embodiments of the invention, Peachey (U.S. Pat. No. 04,060,705) describes a pressure actuated continuous switch which designed to actuate about its entire circumference, i.e., in all directions. The switch of the embodiment in FIG. 1 of Peachey includes a central, inner conductor 1, an insulating thread 2 helically wound around the conductor 1 and an outer conductor 3, all housed within a sheath of insulating material 4. The switch in the embodiment of FIG. 2 includes a central, inner conductor 1, an insulating thread 2 helically wound around the conductor 1, a sheath of graphite-loaded plastic 5 surrounding the thread 2, an outer conductor 3 surrounding the sheath 5 and a sheath of insulating material 4 surrounding the outer conductor 3. The switch in these embodiments is actuated when pressure is applied to the switch so that the outer conductor (FIG. 1) or sheath 5 (FIG. 2) is deflected to cause it to make contact with the inner conductor 1 and thereby establish electrical contact between the inner and outer conductors 1,3, in the embodiment of FIG. 2 through the sheath 5. In view of the helical winding of the insulating thread 2 around the inner conductor 1, these switches can be actuated by bending at almost all locations (except for an impact into a location where the insulating material 2 is interposed between the conductors 1,3).

U.S. Pat. No. 02,437,969 to Paul describes a deformable switch 10 in the form of a tube that is actuatable at all circumferential points along its length. The tube includes a central coil of electrically conducting wire 12, a braided electrically conducting, metal tube 11 and insulating separators 13 spaced at discrete locations along the length of the switch 10 to support the tube 11 around the wire 12. The switch is actuatable at all circumferential locations along the length of the tube, except for the locations at which the insulating separators 13 are located. In use, when pressure is applied to the tube 11, it deforms at the location at which pressure is applied thereby coming into contact with the wire II and causing a circuit to close.

U.S. Pat. No. 05,322,323 to Ohno et al. describes to a collision sensing system for an airbag including collision sensors and acceleration sensors wherein deployment of the airbag is based on a signal from the collision sensors and an analysis of the output from the acceleration sensors.

U.S. Pat. No. 05,797,623 to Hubbard describes an allegedly unique side impact sensor based on a piezoelectric film. The sensor essentially measures the energy of impact providing the entire force applied to the film, which would not in general be the case. The velocity of the impacting vehicle can be determined again if the sensor absorbs the entire force and if the mass of the impacting object is known. Since neither of these can be assumed, the device will not provide a measurement of the impacting velocity and therefore at best can act as an impact-sensing switch with some discriminating capability.

The prior art crush zone mounted sensors therefore are either force sensing switches (Matsui) or piezoelectric film sensors (Hubbard) mounted in the forwardmost part of the crush zone, are velocity change sensors (ball-in-tube) mounted at the rear most edge of the CSZ or crush sensing switches also mounted at the rear most edge of the CSZ. Sensors mounted at the rear most edge of the CSZ by nature will trigger at the last possible moment when the airbag must deploy based on the seating position of the average male occupant. It is known that currently up to about 70% of vehicle occupants sit closer to the airbag than the average male and therefore such sensors trigger airbag deployment late for such occupants placing them at risk of being injured by the airbag. Heretofore, there are no velocity change sensors that are mounted in the forward part of the crush zone where the velocity change of the crash can be determined early in the crash and the airbag deployed early. There is thus a need for such a crash sensor.

5. Anticipatory Sensing

Although there has been a great deal of discussion on the use of anticipatory sensors for initiating restraint deployment, no practical systems have been developed other than those of the current assignee of this invention. The basic problem has been that an airbag should not be deployed unless the approaching object can be identified as a serious threat. The neural network systems developed by the current assignee is the first system capable of identifying such threatening objects.

6. Sensor Combinations

Up until the time that the first parent application was filed to this invention, the only use of sensor combinations was where a discriminating sensor was in series with a safing or arming sensor and where a crush zone mounted discriminating sensor was in parallel with a passenger compartment discriminating sensor where either one could initiate deployment of the restraint system.

7. Self-Contained Airbag Systems

Self-contained airbag systems contain all of the parts of the airbag system within a single package, in the case of mechanical implementations, and in the case of electrical or electronic systems, all parts except the primary source of electrical power and, in some cases, the diagnostic system. This includes the sensor, inflator and airbag. Potentially, these systems have significant cost and reliability advantages over conventional systems where the sensor(s), diagnostic and backup power supply are mounted separate from the airbag module. In mechanical implementations in particular, all of the wiring, the diagnostic system and backup power supply are eliminated. In spite of these advantages, self-contained airbag systems have only achieved limited acceptance for frontal impacts and have so far not been considered for side impacts.

The "all-mechanical" self-contained systems were the first to appear on the market for frontal impacts but have not been widely adopted partially due to their sensitivity to accelerations in the vertical and lateral directions. These cross-axis accelerations have been shown to seriously degrade the performance of the most common all mechanical design that is disclosed in Thuen, U.S. Pat. No. 04,580,810. Both frontal and side impact crashes frequently have severe cross-axis accelerations.

Additionally, all-mechanical self contained airbag systems, such as disclosed in the Thuen patent, require that the sensor be placed inside of the inflator which increases the strength requirements of the inflator walls and thus increases the size and weight of the system. One solution to this problem appears in Breed, U.S. Pat. No. 04,711,466, but has not been implemented. This patent discloses a method of initiating an inflator through the use of a percussion primer in combination with a stab primer and the placement of the sensor outside of the inflator. One disadvantage of this system is that a hole must still be placed in the inflator wall to accommodate the percussion primer that has its own housing. This hole weakens the wall of the inflator and also provides a potential path for gas to escape.

Another disadvantage in the Thuen system that makes it unusable for side impacts is that the arming system is sealed from the environment by an O-ring. This sealing method may perform satisfactorily when the system is mounted in the protected passenger compartment but it would not be satisfactory for side impact cases where the system would be mounted in the vehicle door where it can be subjected to water, salt, dirt, and other harsh environments.

Self-contained electrical systems have also not been widely used. When airbags are used for both the driver and the passenger, self-contained airbag systems require a separate sensor and diagnostic for each module. In contrast to mechanical systems, the electronic sensor and diagnostic systems used by most vehicle manufacturers are expensive.

This duplication and associated cost required for electrical systems eliminates some of the advantages of the self-contained system.

Sensors located in the passenger compartment of a vehicle can catch most airbag-required crashes for frontal impacts, particularly if the occupants are wearing seatbelts. Also, if the teachings of this invention are practiced where an algorithm based on pattern recognition is used, then almost all frontal crash can be sensed in time in the passenger compartment. Mechanical sensors, however, are not capable of implementing such algorithms and thus researchers now believe that there are a significant number of crashes that cannot be sensed in time in the passenger compartment by mechanical sensors and that this will require the addition of another sensor mounted in the crush zone (see, for example, reference 5 below). If true, this will eventually eliminate the use of mechanical self-contained airbag systems for frontal impacts.

Some of these problems do not apply to side impacts mainly because side impact sensors must trigger in a very few milliseconds when there is no significant signal at any point in the vehicle except where the car is crushing or at locations rigidly attached to this crush zone. Each airbag system must be mounted in the crush zone and generally will have its own sensor. Self-contained airbag systems have heretofore not been used for occupant protection for side impacts, which is largely due to the misconception that side impact sensing requires the use of elongated switches as is discussed in detail in U.S. Pat. No. 05,231,253. These elongated side impact crush-sensing switches are not readily adaptable to the more compact self-contained designs. The realization that a moving mass sensor was the proper method for sensing side impacts has now led to the development of the side impact self-contained airbag system of this invention. The theory of sensing side impacts is included in the '253 patent referenced above.

In electromechanical and electronic self-contained modules, the backup power supply and diagnostic system can be mounted apart from the airbag system. If a wire is severed during a crash but before the airbag deploys, the system may lose its power and fail to deploy. This is more likely to happen in a side impact where the wires must travel inside of the door. For this reason, mechanical self-contained systems have a significant reliability advantage over conventional electrical or electronic systems for side impacts.

Finally, the space available for mounting airbag systems in the doors of vehicles is frequently severely limited making it desirable that the airbag module be as small as possible. Conventional gas generators use sodium azide as the gas generating propellant. This requires that the gas be cooled and extensively filtered to remove the sodium oxide, a toxic product of combustion. This is because the gas is exhausted into the passenger compartment where it can burn an occupant and be inhaled. If the gas is not permitted to enter the passenger compartment, the temperature of the gas can be higher and the products of combustion can contain toxic chemicals, such as carbon dioxide.

These and other problems associated with self-contained airbag systems and side impact sensors are solved by the invention disclosed herein.

8. Occupant Sensing

Automobiles equipped with airbags are well known in the prior art. In such airbag systems, the car crash is sensed and the airbags rapidly inflated thereby insuring the safety of an occupation in a car crash. Many lives have now been saved by such airbag systems. However, depending on the seated state of an occupant, there are cases where his or her life cannot be saved even by present airbag systems. For example, when a passenger is seated on the front passenger seat in a position other than a forward facing, normal state, e.g., when the passenger is out of position and near the deployment door of the airbag, there will be cases when the occupant will be seriously injured or even killed by the deployment of the airbag.

Also, sometimes a child seat is placed on the passenger seat in a rear facing position and there are cases where a child sitting in such a seat has been seriously injured or killed by the deployment of the airbag.

Furthermore, in the case of a vacant seat, there is no need to deploy an airbag, and in such a case, deploying the airbag is undesirable due to a high replacement cost and possible release of toxic gases into the passenger compartment. Nevertheless, most airbag systems will deploy the airbag in a vehicle crash even if the seat is unoccupied.

Thus, whereas thousands of lives have been saved by airbags, a large number of people have also been injured, some seriously, by the deploying airbag, and over 100 people have now been killed. Thus, significant improvements need to be made to airbag systems. As discussed in detail in U.S. Pat. No. 05,653,462, for a variety of reasons vehicle occupants may be too close to the airbag before it deploys and can be seriously injured or killed as a result of the deployment thereof. Also, a child in a rear facing child seat that is placed on the right front passenger seat is in danger of being seriously injured if the passenger airbag deploys. For these reasons and, as first publicly disclosed in Breed, D. S. "How Airbags Work" presented at the International Conference on Seatbelts and Airbags in 1993 in Canada, occupant position sensing and rear facing child seat detection systems are required in order to minimize the damages caused by deploying front and side airbags. It also may be required in order to minimize the damage caused by the deployment of other types of occupant protection and/or restraint devices that might be installed in the vehicle.

For these reasons, there has been proposed an occupant sensor system also known as a seated-state detecting unit such as disclosed in the following U.S. patents assigned to the current assignee of the present application: Breed et al. (U.S. Pat. No. 05,563,462); Breed et al. (U.S. Pat. No. 05,829,782); Breed et al. (U.S. Pat. No. 05,822,707): Breed et al. (U.S. Pat. No. 05,694,320); Breed et al. (U.S. Pat. No. 05,748,473); Varga et al. (U.S. Pat. No. 05,943,295); Breed et al. (U.S. Pat. No. 06,078,854); Breed et al. (U.S. Pat. No. 06,081,757); and Breed et al. (U.S. Pat. No. 06,242,701). Typically, in some of these designs, three or four sensors or sets of sensors are installed at three or four points in a vehicle for transmitting ultrasonic or electromagnetic waves toward the passenger or driver's seat and receiving the reflected waves. Using appropriate hardware and software, the approximate configuration of the occupancy of either the passenger or driver seat can be determined thereby identifying and categorizing the occupancy of the relevant seat.

9. Controlling Airbag Inflation

There are many ways of controlling the inflation of the airbag and several are now under development by the inflator companies, the current assignee and others. One way is to divide the airbag into different charges and to initiate these charges independently as a function of time to control the airbag inflation. An alternative is to always generate the maximum amount of gas but to control the amount going into the airbag, dumping the rest into the atmosphere. A third way is to put all of the gas into the airbag but control the outflow of the gas from the airbag through a variable vent valve. For the purposes herein, all controllable apparatus for varying the gas flow into and/or out of the airbag over time will be considered as a gas control module whether the decision is made at the time of initial airbag deployment, at one or more discrete times later or continuously during the crash event.

10. Diagnostics

Every automobile driver fears that his or her vehicle will breakdown at some unfortunate time, e.g., when he or she is traveling at night, during rush hour, or on a long trip away from home. To help alleviate that fear, certain luxury automobile manufacturers provide roadside service in the event of a breakdown. Nevertheless, unless the vehicle is equipped with OnStar® or an equivalent service, the vehicle driver must still be able to get to a telephone to call for service. It is also a fact that many people purchase a new automobile out of fear of a breakdown with their current vehicle. This invention is also concerned with preventing breakdowns and with minimizing maintenance costs by predicting component failure that would lead to such a breakdown before it occurs.

When a vehicle component begins to fail, the repair cost is frequently minimal if the impending failure of the component is caught early, but increases as the repair is delayed. Sometimes if a component in need of repair is not caught in a timely manner, the component, and particularly the impending failure thereof, can cause other components of the vehicle to deteriorate. One example is where the water pump fails gradually until the vehicle overheats and blows a head gasket. It is desirable, therefore, to determine that a vehicle component is about to fail as early as possible so as to minimize the probability of a breakdown and the resulting repair costs.

There are various gages on an automobile which alert the driver to various vehicle problems. For example, if the oil pressure drops below some predetermined level, the driver is warned to stop his vehicle immediately. Similarly, if the coolant temperature exceeds some predetermined value, the driver is also warned to take immediate corrective action. In these cases, the warning often comes too late as most vehicle gages alert the driver after he or she can conveniently solve the problem. Thus, what is needed is a component failure warning system that alerts the driver to the impending failure of a component sufficiently in advance of the time when the problem gets to a catastrophic point.

Some astute drivers can sense changes in the performance of their vehicle and correctly diagnose that a problem with a component is about to occur. Other drivers can sense that their vehicle is performing differently but they don't know why or when a component will fail or how serious that failure will be, or possibly even what specific component is the cause of the difference in performance. The invention disclosed herein will, in most cases, solve this problem by predicting component failures in time to permit maintenance and thus prevent vehicle breakdowns.

Presently, automobile sensors in use are based on specific predetermined or set levels, such as the coolant temperature or oil pressure, whereby an increase above the set level or a decrease below the set level will activate the sensor, rather than being based on changes in this level over time. The rate at which coolant heats up, for example, can be an important clue that some component in the cooling system is about to fail. There are no systems currently on automobiles to monitor the numerous vehicle components over time and to compare component performance with normal performance.

Nowhere in the vehicle is the vibration signal of a normally operating front wheel stored, for example, or for that matter, any normal signal from any other vehicle component. Additionally, there is no system currently existing on a vehicle to look for erratic behavior of a vehicle component and to warn the driver or the dealer that a component is misbehaving and is therefore likely to fail in the very near future.

Sometimes, when a component fails, a catastrophic accident results. In the Firestone tire case, for example, over 100 people were killed when a tire of a Ford Explorer blew out which caused the Ford Explorer to rollover. Similarly, other component failures can lead to loss of control of the vehicle and a subsequent accident. It is thus very important to accurately forecast that such an event will take place but furthermore, for those cases where the event takes place suddenly without warning, it is also important to diagnose the state of the entire vehicle, which in some cases can lead to automatic corrective action to prevent unstable vehicle motion or rollovers resulting in an accident. Finally, an accurate diagnostic system for the entire vehicle can determine much more accurately the severity of an automobile crash once it has begun by knowing where the accident is taking place on the vehicle (e.g., the part of or location on the vehicle which is being impacted by an object) and what is colliding with the vehicle based on a knowledge of the force deflection characteristics of the vehicle at that location. Therefore, in addition to a component diagnostic, the teachings of this invention also provide a diagnostic system for the entire vehicle prior to and during accidents. In particular, this invention is concerned with the simultaneous monitoring of multiple sensors on the vehicle so that the best possible determination of the state of the vehicle can be determined. Current crash sensors operate independently or at most one sensor may influence the threshold at which another sensor triggers a deployable restraint. In the teachings of this invention, two or more sensors, frequently accelerometers, are monitored simultaneously and the combination of the outputs of these multiple sensors are analyzed continuously in making the crash severity analysis.

11. Smart Airbags

Since there is insufficient information in the acceleration data, as measured in the passenger compartment, to sense all crashes and since some of the failure modes of published single point sensor algorithms can be easily demonstrated using the techniques of crash and velocity scaling described in the above-referenced technical papers, and moreover since the process by which engineers develop algorithms is generally based on trial and error, pattern recognition techniques such as neural network should be able to be used to create an algorithm based on training the system on a large number of crash and non-crash events which, although not perfect, will be superior to all others. This in fact has proved to be true and is the subject the invention disclosed in U.S. Pat. No. 05,684,701. That invention is based on the ability of neural networks to forecast, based on the first part of the crash pulse, that the crash will be of a severity which requires that an airbag be deployed.

As will be discussed in greater detail below, an improvement on that invention, which is a subject of the instant invention, carries this process further by using a neural network pattern recognition system to forecast the velocity change of the crash over time so that the inflation and/or deflation of the airbag, and optionally the tensioning of the seatbelt, can be optimized. This invention further contemplates the addition of the pattern recognition occupant position and velocity determination means disclosed in U.S.

Ser Nos. 05,829,782, 06,343,810 and U.S. RE 37,260. Finally, the addition of the weight of the occupant is contemplated to provide a measure of the occupant's inertia or momentum as an input to the system. The combination of these systems in various forms can be called "smart airbags" or "smart restraints" which will be used as equivalents herein. In a preferred implementation, the crash severity is not explicitly forecasted but rather, the value of a control parameter used to control the flows of inflator gas into and/or out of the airbag is forecasted.

Smart airbags can take several forms which can be roughly categorized into four evolutionary stages, which will hereinafter be referred to as Phase 1 (2, 3 or 4) Smart Airbags, as follows:

1) Occupant sensors such as the disclosed in the U.S. patent applications cross-referenced above use various technologies to turn off the airbag where there is a rear-facing child seat present or if either the driver or passenger is out-of-position, i.e., in a position in which he/she is more likely to be injured by the airbag than from the accident.

2) Occupant sensors will be used along with variable inflation and/or deflation rate airbags to adjust the inflation/deflation rate to match the occupant first as to his/her position and then to his/her morphology. The occupant sensors disclosed in the cross-referenced patents and patent applications will also handle this with the possible addition of an occupant weighing system. One particular weight measuring system which makes use of strain gages mounted onto the seat supporting structure is disclosed in U.S. Pat. No. 05,748,473, another that makes use of a fluid filled bladder is disclosed in U.S. Pat. No. 06,442,504 and still another uses a mat in the seat to measure the pressure distribution of the occupant as disclosed in U.S Ser. No. 06,412,357. At the end of this phase, little more can be done with occupant measurement or characterization systems.

3) The next improvement, and a subject of the instant invention, is to use a pattern recognition system such as neural networks as the basis of a crash sensor system not only to determine if the airbag should be deployed but also to predict the crash severity from the pattern of the initial portion of the crash pulse. Additionally, the crash pulse will continue to be monitored even after the decision has been made to deploy the airbag to see if the initial assumption of the crash type based on the pattern up to the deployment decision was correct. If the pattern changes indicating a different crash type, the flow rate to the airbag can be altered on the fly, i.e., substantially instantaneously. This crash sensor system can consist of a single electronic accelerometer based passenger compartment sensor, a multiple sensor system that also includes either electronic or mechanical crush zone mounted sensors and in the most sophisticated cases, the passenger compartment sensor is replaced by an inertial measurement unit (IMU). Such an IMU can consist of up to three accelerometers and up to three gyroscopes, usually based on MEMS technologies. It can also be coupled to the vehicle navigation system whereby the accuracy of the IMU can be enhanced through a technique such as a Kalman filter and a GPS or DGPS system or other absolute positioning system.

4). Finally, anticipatory sensing, using radar, laser radar, acoustics, or cameras, and also using pattern recognition techniques such as neural networks will be used to identify the crash before it takes place and select the deployment characteristics of the airbag to match the anticipated crash with the occupant size and position. Such an anticipatory sensor is described in U.S. Pat. No. 06,343,810.

Any of these phases can be combined with various methods of controlling the pretensioning, retraction and/or energy dissipation characteristics of the seatbelt. Although a primary focus of this invention is the control of the flows of gas into and out of the airbag, it is to be recognized that control of the seatbelt, or any other restraint, can also benefit from this invention and that the condition of the seatbelt can be valuable input information into the pattern recognition system.

The smart airbag problem is complex and difficult to solve by ordinary mathematical methods. Looking first at the influence of the crash pulse, the variation of crash pulses in the real world is vast and quite different from the typical crashes run by the automobile industry as reported in the technical papers referenced herein. It is one problem to predict that a crash has a severity level requiring the deployment of an airbag. It is quite a different problem to predict exactly what the velocity versus time function will be and then to adjust the airbag inflation/deflation control system to make sure that just the proper amount of gas is in the airbag at all times even without considering the influence of the occupant. To also simultaneously consider the influence of occupant size, weight, position and/or velocity, renders this problem for all practical purposes unsolvable by conventional methods.

On the other hand, if a pattern recognition system such as a neural network is used and trained on a large variety of crash acceleration segments, as described in U.S. Pat. No. 05,684,701, and a setting for the inflation/deflation control system is specified for each segment, then the problem can be solved. Furthermore, inputs from the occupant position and occupant weight sensors can also be included. The result will be a training set for the neural network involving many millions, and perhaps tens of millions, of data sets or vectors as every combination of occupancy characteristics and acceleration segment is considered. Fortunately, the occupancy data can be acquired independently and is currently being done for solving the out-of-position problem of Phase 1 smart airbags. The crash data is available in abundance and more can be created using the crash and velocity scaling techniques described in the above-referenced papers. The training using combinations of the two data sets, which must also take into account occupant motion which is not adequately represented in the occupancy data, can then be done by computer. Even the computer training process is significant to tax current PC capabilities, and in some cases, the use of a super-computer may be warranted.

12. Definitions

An IMU, or Inertial Measurement Unit, is usually a self-contained device that usually has three orthogonal accelerometers and three gyroscopes. In some cases, a smaller number can be used.

"Pattern recognition" as used herein will generally mean any system which processes a signal that is generated by an object (e.g., representative of a pattern of returned or received impulses, waves or other physical property specific to and/or characteristic of and/or representative of that object) or is modified by interacting with an object, in order to determine to which one of a set of classes that the object belongs. Such a system might determine only that the object is or is not a member of one specified class, or it might attempt to assign the object to one of a larger set of specified classes, or find that it is not a member of any of the classes in the set. The object can also be a vehicle with an accelerometer that generates a signal based on the deceleration of the vehicle. Such a system might determine only that the object is or is not a member of one specified class (e.g., airbag-required crashes), or it might attempt to assign the object to one of a larger set of specified classes, or find that it is not a member of any of the classes in the set. One such class might consist of vehicles undergoing a crash of a certain severity into a pole. The signals processed are generally a series of electrical signals coming from transducers that are sensitive to acoustic (ultrasonic) or electromagnetic radiation (e.g., visible light, infrared radiation, capacitance or electric and/or magnetic fields), although other sources of information are frequently included. Pattern recognition systems generally involve the creation of a set of rules that permit the pattern to be recognized. These rules can be created by fuzzy logic systems, statistical correlations, or through sensor fusion methodologies as well as by trained pattern recognition systems such as neural networks, combination neural networks, cellular neural networks or support vector machines.

A trainable or a trained pattern recognition system as used herein generally means a pattern recognition system that is taught to recognize various patterns constituted within the signals by subjecting the system to a variety of examples. The most successful such system is the neural network used either singly or as a combination of neural networks. Thus, to generate the pattern recognition algorithm, test data is first obtained which constitutes a plurality of sets of returned waves, or wave patterns, or other information radiated or obtained from an object (or from the space in which the object will be situated in the passenger compartment, i.e., the space above the seat) and an indication of the identity of that object. A number of different objects, optionally in different positions, are tested to obtain the unique patterns from each object. As such, the algorithm is generated, and stored in a computer processor, and which can later be applied to provide the identity of an object based on the wave pattern being received during use by a receiver connected to the processor and other information. For the purposes here, the identity of an object sometimes applies to not only the object itself but also to its location and/or orientation in the passenger compartment. For example, a rear-facing child seat is a different object than a forward-facing child seat and an out-of-position adult can be a different object than a normally-seated adult. Not all pattern recognition systems are trained systems and not all trained systems are neural networks. Other pattern recognition systems are based on fuzzy logic, sensor fusion, Kalman filters, correlation as well as linear and non-linear regression. Still other pattern recognition systems are hybrids of more than one system such as neural-fuzzy systems.

The use of pattern recognition, or more particularly how it is used, is important to the instant invention. In the above-cited prior art, except in that assigned to the current assignee, pattern recognition which is based on training, as exemplified through the use of neural networks, is not mentioned for use in monitoring the interior passenger compartment or exterior environments of the vehicle in all of the aspects of the invention disclosed herein. Thus, the methods used to adapt such systems to a vehicle are also not mentioned.

A pattern recognition algorithm will thus generally mean an algorithm applying or obtained using any type of pattern recognition system, e.g., a neural network, sensor fusion, fuzzy logic, etc.

To "identify" as used herein will generally mean to determine that the object belongs to a particular set or class. The class may be one containing, for example, all rear facing child seats, one containing all human occupants, or all human occupants not sitting in a rear facing child seat, or all humans in a certain height or weight range depending on the purpose of the system. In the case where a particular person is to be recognized, the set or class will contain only a single element, i.e., the person to be recognized. The class may also be one containing all frontal impact airbag-desired crashes into a pole at 20 mph, one containing all events where the airbag is not required, or one containing all events requiring a triggering of both stages of a dual stage gas generator with a 15 millisecond delay between the triggering of the first and second stages.

To "ascertain the identity of" as used herein with reference to an object will generally mean to determine the type or nature of the object (obtain information as to what the object is), i.e., that the object is an adult, an occupied rear-facing child seat, an occupied front-facing child seat, an unoccupied rear-facing child seat, an unoccupied front-facing child seat, a child, a dog, a bag of groceries, a car, a truck, a tree, a pedestrian, a deer etc.

An "object" in a vehicle or an "occupying item" of a seat may be a living occupant such as a human or a dog, another living organism such as a plant, or an inanimate object such as a box or bag of groceries or an empty child seat.

A "rear seat" of a vehicle as used herein will generally mean any seat behind the front seat on which a driver sits. Thus, in minivans or other large vehicles where there are more than two rows of seats, each row of seats behind the driver is considered a rear seat and thus there may be more than one "rear seat" in such vehicles. The space behind the front seat includes any number of such rear seats as well as any trunk spaces or other rear areas such as are present in station wagons.

An "optical image" will generally mean any type of image obtained using electromagnetic radiation including visual, infrared and radar radiation.

In the description herein on anticipatory sensing, the term "approaching" when used in connection with the mention of an object or vehicle approaching another will usually mean the relative motion of the object toward the vehicle having the anticipatory sensor system. Thus, in a side impact with a tree, the tree will be considered as approaching the side of the vehicle and impacting the vehicle. In other words, the coordinate system used in general will be a coordinate system residing in the target vehicle. The "target" vehicle is the vehicle that is being impacted. This convention permits a general description to cover all of the cases such as where (i) a moving vehicle impacts into the side of a stationary vehicle, (ii) where both vehicles are moving when they impact, or (iii) where a vehicle is moving sideways into a stationary vehicle, tree or wall.

"Out-of-position" as used for an occupant will generally mean that the occupant, either the driver or a passenger, is sufficiently close to an occupant protection apparatus (airbag) prior to deployment that he or she is likely to be more seriously injured by the deployment event itself than by the accident. It may also mean that the occupant is not positioned appropriately in order to attain the beneficial, restraining effects of the deployment of the airbag. As for the occupant being too close to the airbag, this typically occurs when the occupant's head or chest is closer than some distance such as about 5 inches from the deployment door of the airbag module. The actual distance where airbag deployment should be suppressed depends on the design of the airbag module and is typically farther for the passenger airbag than for the driver airbag.

"Transducer" or "transceiver" as used herein will generally mean the combination of a transmitter and a receiver. In come cases, the same device will serve both as the transmitter and receiver while in others two separate devices adjacent to each other will be used. In some cases, a transmitter is not used and in such cases, transducer will mean only a receiver. Transducers include, for example, capacitive, inductive, ultrasonic, electromagnetic (antenna, CCD, CMOS arrays), electric field, weight measuring or sensing devices. In some cases, a transducer may comprise two parts such as the plates of a capacitor or the antennas of an electric field sensor. Sometimes, one antenna or plate will communicate with several other antennas or plates and thus for the purposes herein, a transducer will be broadly defined to refer, in most cases, to any one of the plates of a capacitor or antennas of a field sensor and in some other cases, a pair of such plates or antennas will comprise a transducer as determined by the context in which the term is used.

For the purposes herein, a "neural network" is defined to include all such learning systems including cellular neural networks, support vector machines and other kernel-based learning systems and methods, cellular automata and all other pattern recognition methods and systems that learn. A "combination neural network" as used herein will generally apply to any combination of two or more neural networks as most broadly defined that are either connected together or that analyze all or a portion of the input data. Typically, it is a system wherein the data to be processed is separated into discrete values which are then operated on and combined in at least a two stage process and where the operation performed on the data at each stage is, in general, different for each discrete value and where the operation performed is at least determined through a training process. It includes ensemble, modular, cellular neural networks, among others, and support vector machines and combination Neural Networks.

A "sensor" as used herein is the combination of two transducers (a transmitter and a receiver) or one transducer which can both transmit and receive. The headliner is the trim which provides the interior surface to the roof of the vehicle and the A-pillar is the roof-supporting member which is on either side of the windshield and on which the front doors are hinged.

A "sensor system" includes any of the sensors listed above in the definition of "sensor" as well as any type of component or assembly of components that detect, sense or measure something.

An "occupant protection apparatus" is any device, apparatus, system or component which is actuatable or deployable or includes a component which is actuatable or deployable for the purpose of attempting to reduce injury to the occupant in the event of a crash, rollover or other potential injurious event involving a vehicle An "occupant restraint device" includes any type of device that is deployable in the event of a crash involving the vehicle for the purpose of protecting an occupant from the effects of the crash and/or minimizing the potential injury to the occupant. Occupant restraint devices thus include frontal airbags, side airbags, seatbelt tensioners, nets, knee bolsters, side curtain airbags, externally deployable airbags and the like.

A diagnosis of the "state of the vehicle" means a diagnosis of the condition of the vehicle with respect to its stability and proper running and operating condition. Thus, the state of the vehicle could be normal when the vehicle is operating properly on a highway or abnormal when, for example, the vehicle is experiencing excessive angular inclination (e.g., two wheels are off the ground and the vehicle is about to rollover), the vehicle is experiencing a crash, the vehicle is skidding, and other similar situations. A diagnosis of the state of the vehicle could also be an indication that one of the parts of the vehicle, e.g., a component, system or subsystem, is operating abnormally.

A "part" of the vehicle includes any component, sensor, system or subsystem of the vehicle such as the steering system, braking system, throttle system, navigation system, airbag system, seatbelt retractor, air bag inflation valve, air bag inflation controller and airbag vent valve, as well as those listed below in the definitions of "component" and "sensor".

The crush zone is that portion of the vehicle that has crushed at the time that the crash sensor must trigger deployment of the restraint system.

The term "airbag" has been used to mean all deployable passive passenger protective devices including airbags, seatbelts with pretensioners and deployable nets.

13. REFERENCES

1. Breed, D. S., Castelli, V. "Problems in Design and Engineering of Air Bag Systems", Society of Automotive Engineers paper No. 880724, 1988.

2. Breed, D. S., Castelli, V. "Trends in Sensing Frontal Impacts", Society of Automotive Engineers paper No. 890750, 1989.

3. Castelli, V., Breed, D. S. "Trends in Sensing Side Impacts", Society of Automotive Engineers paper No. 890603, 1989.

4. Breed, D. S., Castelli, V. and Shokoohi, F. "Are Barrier Crashes Sufficient for Evaluating Air Bag Sensor Performance?", Society of Automotive Engineers paper No. 900548, 1990.

5. Breed, D. S., Sanders, W. T. and Castelli, V. "A Critique of Single Point Crash Sensing", Society of Automotive Engineers paper No. 920124, 1992.

6. Breed, D. S., Sanders, W. T. and Castelli, V. "Performance of a Crush Sensor for Use with Automobile airbag Systems", Society of Automotive Engineers paper No. 920122, 1992.

7. Shokoohi, F., Sanders, W. T., Castelli, V., and Breed, D. S. "Cross Axis Specifications For Crash Sensors", Automotive Technologies International Report, ATI 12004, 1991. Society of Automotive Engineers paper No. 930651, 1993.

8. Breed, D. S., Sanders, W. T. and Castelli, V. "A complete Frontal Crash Sensor System-I", Society of Automotive Engineers paper No. 930650, 1993.

9. Breed, D. S. and Sanders, W. T. "Using Vehicle Deformation to Sense Crashes", Presented at the International Body and Engineering Conference, Detroit Mich., 1993.

10. Breed, D. S., Sanders, W. T. and Castelli, V., "A complete Frontal Crash Sensor System-II", Proceedings Enhanced Safety of Vehicles Conference, Munich, 1994, Published by the U.S. Department of Transportation, National Highway Traffic Safety Administration, Washington, D.C.

11. Breed, D. S., Sanders, W. T. and Castelli, V., "Sensing Side Impacts", Society of Automotive Engineers paper No. 940561, 1994.

12. Breed, D. S., "Side Impact Airbag System Technology", Presented at the International Body and Engineering Conference, Detroit Mich., 1994.

13. Breed, D. S., "A Smart Airbag System", Presented at the 16$^{th}$ International Technical Conference on the Enhanced Safety of vehicles, Windsor, Canada, Paper Number 98 S5 O 13, 1998.

OBJECTS AND SUMMARY OF THE INVENTION

This invention relates to the use of crush zone mounted sensors, sometimes called satellite sensors, in a smart airbag system. These sensors may comprise one or more micromachined or piezo-electric accelerometers, one or more gyroscopes, associated electronic circuitry, and/or one or more electromechanical sensors. One focus of this invention is the part of smart airbag systems that makes use of distributed sensors mounted on the periphery of the vehicle to sense impacts to the front, side or rear of the vehicle and to use information from such sensors to permit a more precise assessment of the crash injury potential and to permit the tailoring of the deployment of one or more airbags to optimize occupant protection.

Principle objects of this invention, and other disclosed inventions, include:

1) To provide a sensor system that will sense all airbag-desired crashes involving the either the front, rear or a side of the vehicle wherein the sensors are mounted in the crush zones of the vehicle.
2) To provide an electronic sensor for mounting in the vehicle crush zone for frontal, side or rear impacts.
3) To improve crash sensing and crash severity forecasting by combining electronic crush zone-mounted sensors with electronic non-crush zone (or passenger compartment) mounted electronic sensors.
4) To improve the determination of the state of the vehicle by using distributed electronic crush zone-mounted sensors.
5) To provide a sensor which is much longer than it is wide or thick thus permitting it to sense crashes over a large area while occupying a relatively small space.
6) To provide a sensor that can be easily shaped so to be properly placed in the crush zone across the entire front, side or rear of the vehicle
7) To provide a crush sensor where the rate of deformation required to trigger the sensor can be measured along the length of the sensor.
8) To provide a sensor to be used in conjunction with an electronic passenger compartment-mounted sensor which will trigger on all of the airbag desired crashes which are missed by the electronic passenger compartment-mounted sensor alone for either frontal, side or rear impacts.
9) To provide a simple and convenient sensor system consisting of a single discriminating sensor mounted in crush zones and one or more arming sensors mounted in the passenger compartment for frontal, side and/or rear impacts.
10) To provide a crush velocity change crash sensor which functions when a portion of the vehicle where the sensor is mounted is displaced, deformed or otherwise bends or buckles.
11) To provide a hermetically sealed crush velocity sensing crash sensor.
12) To provide a small, inexpensive, yet highly reliable crash velocity change sensor.
13) To provide an arrangement for a vehicle including a crush zone-mounted discriminating sensor (which provides information about the reaction of the crush zone to a crash, such as the crush of the crush zone, the velocity change of the crush zone resulting from the crash and the acceleration of the crush zone resulting from the crash) used in conjunction with a passenger compartment-mounted discriminating sensor to permit a better discrimination between air bag desired and not desired crashes such as animal impacts.
14) To provide an arrangement for a vehicle including a crush zone-mounted discriminating sensor as input to an electronic passenger-compartment discriminating sensor module to permit a change in the sensor algorithm, or triggering parameters, based of the output of the crush zone discriminating sensor to improve the performance of the sensor system.
15) To control the deployment of occupant restraint systems by monitoring the patterns of signals emitted from the vehicle sensors and, through the use of pattern recognition technology, forecasting the existence and severity of a vehicle crash.
16) To provide a new and improved on-board vehicle diagnostic module utilizing pattern recognition technologies which are trained to differentiate normal from abnormal component behavior.
17) To provide a diagnostic module that determines whether a vehicle is experiencing a crash based on a time series of data from a single sensor or from multiple sensors that contain a pattern indicative of the operating status of the sensors.
18) To simultaneously monitor several sensors, primarily accelerometers, gyroscopes and strain gages, to determine the state of the vehicle and optionally its occupants and to determine that a vehicle is having an accident, for example. If this is so, then the same system of sensors can monitor the early stages of a crash to make an assessment of the severity of the crash and what occupant protection systems should be deployed and how such occupant protection systems should be deployed.
19) To apply trained pattern recognition techniques using multiple sensors to provide an early prediction of the existence and severity of an accident.
20) To utilize pattern recognition techniques and the output from multiple sensors to determine at an early stage that a vehicle rollover might occur to deploy side head protection airbags to reduce the injuries.

In order to achieve these objects and others, a vehicle with an occupant safety system for use in a crash involving the vehicle in accordance with the invention comprises a deployable occupant protection device, acceleration sensing means for measuring acceleration of the vehicle (such as a tri-axial accelerometer), at least one gyroscope for measuring angular motion of the vehicle and a processor coupled to the acceleration sensing means and the gyroscope(s) for receiving the measured acceleration of the vehicle and the measured angular motion of the vehicle. The processor determines whether deployment of the occupant protection device is beneficial, and if so, generates a signal to initiate deployment of the occupant protection device. The processor may embody a pattern recognition technique for analyzing the measured acceleration and angular motion of the vehicle and determine whether deployment of the occupant protection device is beneficial. For example, the pattern recognition technique may be a neural network trained to determine whether the vehicle is experiencing a crash based on the measured acceleration of the vehicle and the measured angular motion of the vehicle.

Additional enhancements to the occupant safety system include an occupant position sensor for monitoring position of an occupant to be protected by the occupant protection device. In this case, the processor is coupled to the occupant position sensor and determines whether deployment of the occupant protection device is beneficial based on the measured acceleration of the vehicle, the measured angular motion of the vehicle and the position of the occupant. An occupant weight sensor for measuring weight of an occupant to be protected by the occupant protection device, a wheel speed sensor arranged to measure the speed of a wheel of the vehicle and/or an engine speed sensor arranged to measure the speed of an engine of the vehicle may be provided instead of or in addition to the occupant position sensor. In each case, the processor is coupled to the additional sensor(s) and determines whether deployment of the occupant protection device is beneficial based on the parameter measured by the additional sensor(s).

The occupant protection device may be an airbag inflatable with a gas, in which case, a control module is arranged to control how much gas is to be generated for inflation of the airbag, how fast the gas is to be generated, how much gas should be directed into the airbag, how much gas should be directed to an atmosphere and/or how much gas should be permitted to exhaust from the airbag. The control module is coupled to the processor and the processor determines settings for the control module based on the measured acceleration of the vehicle and the measured angular motion of the vehicle.

A method for controlling deployment of an occupant protection device in a vehicle in accordance with the invention entails measuring acceleration of the vehicle, measuring angular motion of the vehicle by means of at least one gyroscope, determining whether deployment of the occupant protection device is beneficial based on the measured acceleration and angular motion of the vehicle and when deployment of the occupant protection device is determined to be beneficial, generating a signal to initiate deployment of the occupant protection device. The same enhancements described above for the safety system can be used in the method as well.

Another embodiment of a vehicle with an occupant safety system for use in a rollover crash involving the vehicle includes a deployable occupant protection device, a sensor for measuring angular motion of the vehicle and a processor coupled to the sensor and the occupant protection device for receiving the measured angular motion and determining whether the angular motion is indicative of rollover of the vehicle. If so, the processor generates a signal to initiate deployment of the occupant protection device. The sensor may comprise an inertial measurement unit (IMU). The same enhancements described above for the first embodiment of the safety system can be used in this embodiment as well.

A related method for controlling deployment of an occupant protection device in a vehicle experiencing a rollover entails measuring angular motion of the vehicle, determining whether the measured angular motion is indicative of a rollover, if so, determining whether deployment of the occupant protection device is beneficial based on the measured angular motion of the vehicle, and when deployment of the occupant protection device is determined to be beneficial, generating a signal to initiate deployment of the occupant protection device. The same enhancements described above for the first embodiment of the safety system can be used in this method as well.

Also, to achieve one or more of the above objects, a crash sensor arrangement for determining whether the crash involving the vehicle requires deployment of the occupant restraint device includes a first electronic crash sensor mounted in the crush zone of the vehicle and structured and arranged to measure a reaction of the crush zone to the crash and to output a signal representative of the measurements and a processor coupled to the first sensor and arranged to process the signal from the first electronic sensor and determine whether the occupant restraint device should be deployed based in part thereon. The reaction of the crush zone to the crash is displacement of the crush zone during the crash relative to a non-crushed part of the vehicle, a velocity change of the crush zone during the crash and/or acceleration of the crush zone during the crash. The first electronic sensor may include an accelerometer, a gyroscope or an elongate member arranged to sense the reaction of the crush zone over a substantial part of the front, side or rear of the vehicle.

Optionally, a second electronic crash sensor is mounted outside of the crush zone of the vehicle and structured and arranged to measure a reaction of the vehicle by means other than crush of the crush zone of the vehicle. In this case, both electronic sensors input signals to the processor which is programmed to determine whether the occupant restraint device should be deployed using an algorithm and data from the first and/or second electronic sensors. The reaction of the vehicle to the crash is relative displacement of the vehicle during the crash relative to a coordinate system moving at a pre-crash velocity, a velocity change of the vehicle during the crash and/or acceleration of the vehicle during the crash.

The second electronic sensor may be mounted in association with the passenger compartment of the vehicle. The first and second electronic sensors may have different sensitivities to crashes and optionally, the second electronic sensor is more sensitive to crashes than the first sensor.

In another embodiment, a crash sensor arrangement in accordance with the invention comprises a processor, a first electronic discriminating crash sensor mounted outside of the crush zone of the vehicle and structured and arranged to measure the reaction of the vehicle to the crash by means other than crush of the crush zone of the vehicle and to provide information about the measured reaction to the processor, and a second electronic crash sensor mounted in the crush zone of the vehicle. The second electronic sensor provides information about a reaction of the crush zone to the crash to the processor. The processor receives the information about the reaction of the vehicle to the crash from the first electronic sensor and the reaction of crush zone of the vehicle from the second electronic sensor and determines based on the information whether the occupant restraint device should be deployed.

Some typical reactions of the crush zone which are measured by the second electronic discriminating crash sensor are the crush of the vehicle crush zone, displacement of the vehicle crush zone, acceleration of the vehicle crush zone, or velocity change of the vehicle crush zone. The processor may embody a pattern recognition algorithm to determine whether to deploy the occupant restraint device.

The first electronic sensor may be arranged to measure the reaction of the entire vehicle or a part of the vehicle other than the crush zone of the vehicle to the crash such as acceleration of the vehicle and/or a change in velocity of the vehicle.

The sensors may be coupled to one another in series such that the signal to deploy the occupant restraint device is generated only when the first and second sensors are both triggered. In another embodiment, the first sensor receives a signal indicative of triggering of the second sensor, considers whether to modify its triggering algorithm, triggering criteria and/or sensitivity based on the triggering or velocity change of the second sensor and if so, modifies the triggering algorithm, criteria or sensitivity. If the first sensor is an electronic sensor arranged to trigger based on a change in velocity and/or acceleration of the vehicle (or functions thereof), the velocity change and/or acceleration (or functions thereof) required for triggering may be modified based on the triggering of the second sensor. It should be noted though that such modification is not required in the event the velocity change is already appropriate.

The second discriminating sensor mounted in the crush zone may be a tape crush sensor including a tape switch comprising a pair of electrically conductive members spaced apart from one another prior to crush of the vehicle and which are designed to come into contact with one another upon crush of the vehicle of a specific magnitude. The tape crush sensor can include means for reducing the sensitivity of the tape crush sensor, such as an encapsulating member around the sensor. The first discriminating sensor may also be a ball-in-tube sensor or an electronic sensor.

A method for determining whether the crash involving the vehicle requires deployment of an occupant restraint device, comprises the steps of mounting an electronic crash sensor in the crush zone of the vehicle, the electronic sensor measuring the reaction of the crush zone of the vehicle to the crash, and enabling deployment of the occupant restraint device based of an analysis of the measurements of the electronic sensor.

Optionally, a second electronic crash sensor is mounted outside of the crush zone of the vehicle to measure a reaction of the vehicle to the crash by means other than crush of the crush zone of the vehicle, and deployment of the occupant restraint device enabled based of an analysis of the measurements of the first and second electronic sensors. In this case, a signal indicative of the measurements of the first electronic sensor and a signal indicative of the measurements of the second electronic sensor are directed to a processor, it is considered therein whether the conditions for deploying the occupant restraint device are met by the measurements from the first electronic sensor or the measurements from the second electronic sensor or a combination of the measurements from both electronic sensors, and the occupant restraint device is deployed when the conditions are met.

The second electronic sensor may measure a change in velocity of the vehicle and/or acceleration of the vehicle. In this case, it is possible to direct a signal indicative of triggering of the first electronic sensor to the processor, direct a signal indicative of triggering of the second electronic sensor to the processor, consider whether the measured velocity change and/or acceleration of the second electronic sensor in conjunction with the measurements of the first electronic sensor are sufficient to require deploying the occupant restraint device, and if so, deploy the occupant restraint device.

Another method for determining whether a crash involving a vehicle requires deployment of an occupant restraint device comprises mounting a first electronic crash sensor outside of the crush zone of the vehicle to measure the reaction of the vehicle to a crash by means other than crush of the crush zone of the vehicle, mounting a second electronic crash sensor in the crush zone of the vehicle to generate information about a reaction of the crush zone of the vehicle to a crash, providing the information about the reaction of the crush zone of the vehicle to the crash from the second sensor and the first sensor to a processor, and controlling deployment of the occupant restraint device via the first electronic sensor based on the information about the reaction of the crush zone of the vehicle to the crash provided by the second electronic sensor.

Control of the deployment of the occupant restraint device via the first electronic sensor may entail considering whether an algorithm or parameters which determine deploying of the occupant restraint device by the first electronic sensor should be modified based on the information about crush of the vehicle provided by the second electronic sensor, and if so modifying the algorithm or parameters.

Control of the deployment of the occupant restraint device may also entail considering whether the acceleration and/or velocity change required for deployment of the occupant restraint device by the first electronic sensor should be modified based on the information about crush of the vehicle provided by the second sensor, and if so, modifying the requirements.

Note, in some cases, when the non-crush zone sensor is not present or malfunctioning, or when there is insufficient signal at the non crush zone sensor mounting location, the processor may initiate triggering based on the acceleration signal of the crush zone mounted accelerometer alone.

Other objects of this invention and of the broader invention of smart airbags include:

1) The use of pattern recognition techniques such as a neural network, or neural-network-derived algorithm, to analyze the digitized accelerometer data (also referred to as acceleration data herein) created during a crash and, in some cases, occupant size, position, seatbelt use, weight and velocity data, and, in other cases, data from an anticipatory crash sensor, to determine not only if and when a passive restraint such as an airbag should be deployed but also to control the flow of gas into or out of the airbag.

2) To provide a single point sensor including an accelerometer that makes maximum use of the information in the acceleration data to determine not only whether an airbag should be deployed but also the rate of deployment as required for Phase 3 Smart Airbags.

3) To provide a single point sensor including an accelerometer which makes maximum use of the information in the acceleration data to determine not only whether an airbag should be deployed but the total amount of gas which should be used to inflate the airbag as required for Phase 3 Smart Airbags.

4) To provide a single point sensor including an accelerometer which makes maximum use of the information in the acceleration data to determines the gas flow control parameter value for use by a gas control module to control the flow of gas into or out of an airbag as required for Phase 3 Smart Airbags.

5) To provide a single computer system which can perform several different pattern recognition functions within an automobile or other vehicle including, for example, crash sensing and severity prediction, anticipatory sensing, identification of an occupant located within the vehicle passenger compartment and determination of the position and velocity of the occupant.

6) To provide a crash sensor and crash severity prediction algorithm which is derived by training using a set of data derived from staged automobile crashes and non-crash events as well as other analytically derived data, as required for Phase 3 Smart Airbags.

7) To provide a crash sensor and/or crash severity prediction algorithm based on pattern recognition techniques.
8) To provide a crash sensor and crash severity prediction algorithm which uses other data in addition to acceleration data derived from the crash wherein this data is combined with acceleration data and, using pattern recognition techniques, the need for deployment and the rate of deployment of a passive restraint is determined.
9) To provide a crash sensor and crash severity prediction algorithm using data from an anticipatory sensor and an occupant position and velocity sensing system to optimize the deployment of a passive restraint system taking into account the crash severity and occupant dynamics to minimize injuries to the occupant as required for Phase 4 Smart Airbags.
10) To provide an electronic module which combines the functions of crash sensing and crash severity prediction, occupant position and velocity sensing, anticipatory sensing (as required for Phase 4 Smart Airbags) and airbag system diagnostics.
11) To provide a Phase 1, Phase 2, Phase 3 or Phase 4 Smart Airbag system which uses a neural computer.
12) To provide a smart airbag system that optimizes the deployment of an occupant protection apparatus in a motor vehicle, such as an airbag, to protect an occupant of the vehicle in a crash by controlling the flow of inflator gas into or out of the airbag.
13) To provide a self contained side impact occupant protection airbag system incorporating the advantages of a movable mass sensor resulting in a low cost, compact airbag system.
14) To provide a more compact self contained side impact airbag system by providing for the exhausting of the airbag gas into the vehicle door or side, therefore permitting the use of higher temperature gas and propellants which would otherwise not be viable due to their toxic products.
15) To provide a highly reliable side impact occupant protection electronic self contained airbag system.
16) To provide an electronic, electromechanical or mechanical sensor for use with either a self-contained airbag system or conventional airbag system wherein the sensor system senses the acceleration of the vehicle member on which it is mounted and where in the sensed acceleration is the crush zone acceleration and is used to control the deployment of the side airbag.
17) To provide a universal single point crash sensor and diagnostic module which can be used on most automobiles without any modification required specific to each automobile.
18) To provide a single computer system which can perform several different pattern recognition functions within an automobile including, for example, crash sensing, identification of an object located within the vehicle passenger compartment, and the categorization of objects exterior to the vehicle.
19) To provide a sensor and diagnostic module comprising a crash sensor algorithm which is derived by training using a set of data derived from staged automobile crashes and non-crash events as well as other analytically derived data.
20) To provide a sensor and diagnostic module comprising a crash sensor based on pattern recognition techniques.
21) To provide a sensor and diagnostic module comprising a crash sensor which uses other data in addition to acceleration data derived from the crash wherein this data is combined with acceleration data and, using pattern recognition techniques, the need for deployment of a passive restraint is determined.
22) To provide a sensor and diagnostic module comprising a crash sensor which can be used for sensing both frontal, side, and rear impacts.
23) To provide a sensor and diagnostic module comprising a crash sensor which automatically retains the crash acceleration data from a period of time prior to the airbag deployment for later analysis.
24) To provide a sensor and diagnostic module comprising a crash sensor which uses a neural computer.

To achieve one or more of these objects, a sensor and diagnostic module in accordance with the invention comprises a sensor system for initiating deployment of an occupant protection apparatus in a motor vehicle, such as an airbag, to protect an occupant of the vehicle in a crash. The system includes a sensor mounted to the vehicle for sensing accelerations of the vehicle and producing an analog signal representative thereof, an electronic converter for receiving the analog signal from the sensor and for converting the analog signal into a digital signal, a processor which receives the digital signal, a diagnostic system which determines that the sensor and its various components are functioning correctly and storage means for storing the state of the system at the time of a crash plus, in some cases, a time history of the data, including digitized accelerometer data, used by the system to determine whether or not the passive restraint should be deployed. The processor includes a pattern recognition system and produces a deployment signal when the pattern recognition system determines that the digital signal contains a pattern characteristic of a vehicle crash requiring occupant protection.

One embodiment of the method for initiating deployment of an occupant protection apparatus in accordance with the invention comprises the steps of sensing accelerations of the vehicle and producing an analog signal representative thereof, converting the analog signal into a digital signal, determining if the digital signal contains a pattern characteristic of a vehicle crash requiring occupant protection by means of pattern recognition means, or a single neural computer comprising pattern recognition means, producing a deployment signal upon a determination by the pattern recognition means that the digital signal contains the pattern characteristic of a vehicle crash requiring occupant protection, and initiating deployment of the occupant protection apparatus in response to the deployment signal. The pattern recognition means comprise a single trained neural network such that the deployment signal is produced solely by the utilization of the single trained neural network. The digital signal may be derived from the integral of the analog signal. One or more sensors may be arranged to sense the accelerations of the vehicle and which are mounted in a position on the vehicle so as to sense frontal impacts and/or rear impacts. Additionally, data from other sensors such as gyroscopes or angular rate sensors, velocity and position sensors, may be used when available by the trained neural network. In certain advantageous embodiments, the method detects when the occupant to be protected by the deployable occupant protection apparatus is out-of-position and suppresses deployment of the occupant protection apparatus if the occupant is detected as being out-of-position. Similarly, the presence of a rear-facing child seat positioned on a passenger seat, i.e., and which would be affected by the occupant protection apparatus, can be detected and deployment of the occupant protection apparatus suppressed if a rear-facing child seat is detected.

Accelerations of the vehicle may be measured in two or more directions. In the embodiment wherein a neural computer is used, data from an anticipatory sensor and/or a collision avoidance sensor may be input into the single neural computer for consideration during the pattern recognition analysis.

Preferred embodiments of the invention are described herein and unless specifically noted, it is the applicant's intention that the words and phrases in the specification and claims be given the ordinary and accustomed meaning to those of ordinary skill in the applicable art(s). If applicant intends any other meaning, he will specifically state he is applying a special meaning to a word or phrase.

Likewise, applicant's use of the word "function" here is not intended to indicate that the applicant seek to invoke the special provisions of 35 U.S.C. §112, sixth paragraph, to define his invention. To the contrary, if applicant wishes to invoke the provisions of 35 U.S.C. §112, sixth paragraph, to define his invention, he will specifically set forth in the claims the phrases "means for" or "step for" and a function, without also reciting in that phrase any structure, material or act in support of the function. Moreover, even if applicant invokes the provisions of 35 U.S.C. §112, sixth paragraph, to define his invention, it is the applicant's intention that his inventions not be limited to the specific structure, material or acts that are described in the preferred embodiments herein. Rather, if applicant claims their inventions by specifically invoking the provisions of 35 U.S.C. §112, sixth paragraph, it is nonetheless his intention to cover and include any and all structure, materials or acts that perform the claimed function, along with any and all known or later developed equivalent structures, materials or acts for performing the claimed function.

Other objects and advantages of the present invention will become apparent from the following description of the preferred embodiments taken in conjunction with the accompanying drawings.

BRIEF DESCRIPTION OF THE DRAWINGS

The following drawings are illustrative of embodiments of the invention and are not meant to limit the scope of the invention as encompassed by the claims.

FIG. 1A is an enlarged view of the sensor and diagnostic module shown in FIG. 1.

FIG. 3 contains the results of a neural network algorithm on a crash matrix created using the techniques of velocity and crash scaling.

FIG. 4 contains the results of a standard single point crash sensor on a crash matrix created using the techniques of velocity and crash scaling.

FIG. 7A is a view of a vertical segment of the sensor shown in FIG. 7 taken along line 7A-7A in a condition before being impacted by the vehicle bumper during a crash.

FIG. 27 is a perspective view of a vehicle seat and headrest containing ultrasonic head location sensors consisting of one transmitter and one receiver.

FIG. 31 is a flow diagram of information flowing from various sensors onto the vehicle data bus and thereby into the diagnostic module in accordance with the invention with outputs to a display for notifying the driver, and to the vehicle cellular phone for notifying another person, of a potential component failure.

DETAILED DESCRIPTION OF THE PREFERRED EMBODIMENTS

1. Pattern Recognition

Figure 1:
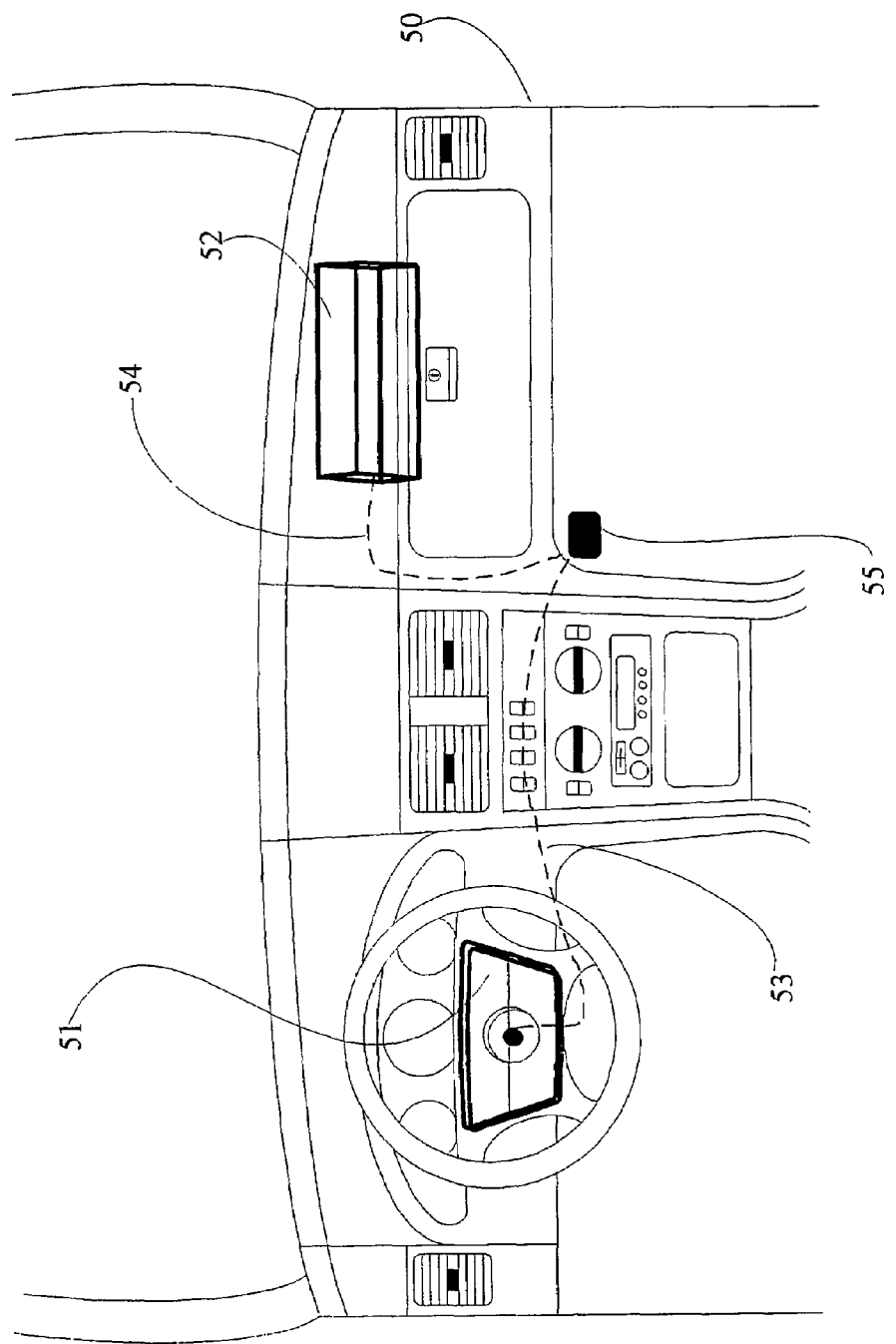
FIG. 1 is a view of the front of the passenger compartment of a motor vehicle, with portions cut away and removed, having dual airbags and a single point crash sensor and crash severity forecaster including an accelerometer and using a pattern recognition technique.

Throughout much of the discussion herein, the neural network will be used as an example of a pattern recognition technique or algorithm since the neural network is the most developed of such techniques. However, it has limitations that are now being addressed with the development of newer pattern recognition techniques as well as better neural network techniques such as combination or modular neural networks. These limitations involve the difficulty in describing the process that is used in classifying patterns with the result that there is a fear that a pattern that was not part of the training set might be missed. Also, the training process of the neural network does not guarantee that convergence to the best solution will result. One such example is the local minimum problem wherein the training algorithm converges on a result that is not the best overall or global solution. These problems are being solved with the development of newer pattern recognition techniques such as disclosed in various U.S. patents and technical papers. One invention disclosed herein is the use of pattern recognition techniques including neural networks, regardless of the particular technique, to provide a superior smart airbag system. In particular, genetic algorithms are being applied to aid in selecting the best of many possible choices for the neural network architecture. The use of genetic algorithms helps avoid the local minimum situation mentioned above since several different architectures are tried and the best retained.

The pattern recognition algorithm, which forms an integral part of the crash sensor described herein, can be implemented either as an algorithm using a conventional microprocessor, FPGA or ASIC or through a neural computer. In the first case, the training is accomplished using a neural pattern recognition program and the result is a computer algorithm frequently written in the C computer language, although many other computer languages such as FORTRAN, assembly, Basic, etc. could be used. In the last case, the same neural computer can be used for the training as used on the vehicle. Neural network software for use on a conventional microcomputer is available from several sources such as International Scientific Research, Denville, N.J. An example of a neural network-based crash sensor algorithm produced by the ISR software after being trained on a crash library created by using data supplied by an automobile manufacturer for a particular model vehicle plus additional data created by using the techniques of crash and velocity scaling is:

Neural net for crash sensor. 23 Aug. 1994. 50 input nodes,
  6 hidden nodes (sigmoid transfer function), 1 output node
    (value 0 or 1).
Network was trained using back propagation with Logi-
  con Projection.
Yin(1-50) are raw input values. Xin(1-50) are scaled input
  values.

Yin(50) is the sum of the latest 25 accelerations, in tenths of a g,

Yin(49) is the sum of the previous 25, etc. The time step is 80 microsec.

```
logical function nnmtlpn3( Yin, firesum, Yout )
real*4 firesum, Yin(50), Yout
integer i, j
real*4 biashid(6), biasout, fire_criterion, hiddenout(6), NormV, NV(4),
&      offset_in(50), offset_out, scale_in(50), scale_out, wgthid(51,6),
&      wgtout(6), Xin(51), Xsum
parameter( fire_criterion = 0.0 )
data scale_in/ (omitted) /
data offset_in/ (omitted) /
data scale_out, offset_out / 0.625, 0.5 /
data NV/ 2.0, 7.0, 7.0711002, 50.000458 /
data biashid/ –49.110764, –69.856407, –48.670643,
&             –48.36599, –52.745285, –49.013027 /
data biasout/ 0.99345559 /
data wgthid/ (omitted) /
data wgtout/ (omitted) /
NormV = 0.0
do i=1,50
    Xin(i) = scale_in(i) * Yin(i) – offset_in(i)
    NormV = NormV + Xin(i) * Xin(i)
enddo
NormV = NV(1) * NV(2) * NV(3)/(NV(4) + NormV)
do i=1,50
    Xin(i) = NormV * Xin(i)
enddo
Xin(51) = NV(2) – NV(3) * NormV
do i=1,6
    Xsum = biashid(i)
    do j=1,51
        Xsum = Xsum + wgthid(j,i) * Xin(j)
    enddo
    hiddenout(i) = 1.0 / ( 1.0 + exp( –Xsum ) )
enddo
firesum biasout
do i=1,6
    firesum = firesum + wgtout(i) * hiddenout(i)
enddo
Yout = offset_out + scale_out * tanh(firesum)
if( firesum .GE. fire_criterion ) then
        nnmtlpn3 = .TRUE.
    else
        nnmtlpn3 = .FALSE.
    endif
    return
end
```

Neural computers on a chip are now becoming available from various chip suppliers. These chips make use of massively parallel architecture and allow all of the input data to be processed simultaneously. The result is that the computation time required for a pattern to be tested changes from the order of milliseconds for the case of the microprocessor implemented system to the order of microseconds for the neural computer. With this computational speed, one neural computer can easily be used for several pattern recognition implementations simultaneously even during the crash event including dynamic out-of-position and crash sensing. A discussion of the structure of such a neural computer can be found on page 382 of *Digital Neural Networks*, by Kung, S. Y., PTR Prentice Hall, Englewood Cliffs, N.J., 1993.

An example of an algorithm produced by such software after being trained on a crash library created by using data supplied by an automobile manufacturer for a particular model vehicle plus additional data created by using the techniques of crash and velocity scaling is illustrated above. In this case, the network was trained to give a value of 1 for triggering the airbag and 0 for not triggering. In the instant case, this value would depend on the type of gas control module that is used and in general would vary continuously from 0 to 1 with the particular value indicative of the action to be taken by the gas control module, such as adding more gas to the airbag.

Examples of neural networks in several forms will be discussed in more detail below in several sections of this disclosure.

2. Electronic Crash Sensors

Referring to the accompanying drawings wherein like reference numerals refer to the same or similar elements, the airbag electronic sensor and diagnostic module (SDM) is typically mounted at a convenient location in the passenger compartment such as the transmission tunnel or firewall. FIG. 1 is a view of the front of a passenger compartment 100 of an automobile with portions cut away and removed, having dual airbags 51, 52 and an SDM 55 containing a non crush zone electronic crash sensor and crash forecasting algorithm, (hereinafter this combination will be referred to as a crash sensor) comprising one to three accelerometers and zero to three gyroscopes 56, one or more analog to digital converters (ADC) 57 and a pattern recognition algorithm contained within a microprocessor 59, all of which may be mounted on a single circuit board and electrically coupled to one another (see FIG. 1A). Alternately, the microprocessor 59 can be a neural computer.

A tri-axial accelerometer is a device that includes three accelerometers and measures accelerations in three orthogonal directions that are typically the longitudinal, lateral and vertical directions, although there are sometimes reasons to use a different orientation. Such a different orientation can be useful to remove some of the bias errors in the accelerometers by, for example, allowing each accelerometer to be partially influenced by gravity. Also, in some applications, the tri-axial accelerometer is intentionally rotated relative to the vehicle to expose different accelerometers to gravity again for accuracy calibration purposes. An alternate method is to electronically test the acceleration sensing elements by exposing them to an electric field and measure their response. Such an accelerometer is called a "testable" accelerometer.

The circuit board of the SDM 55 also optionally contains a capacitor 61 as a backup power supply, other electronic components 58 and various circuitry. The SDM is connected to the airbags 51,52 with wires 53 and 54 (shown in dotted lines in FIG. 1), although a wireless electrical connection is also a possibility as wireless data transfer become more reliable. In this embodiment, the pattern recognition technique used is a neural network that analyzes data from one, two or three accelerometers, and optionally up to three gyroscopes, to determine whether the vehicle is experiencing a crash from any direction. If the neural network determines, e.g., by analysis of a pattern in the signals emanating from the accelerometer(s) and gyroscope(s), that the accident merits deployment of one or more protection or restraint systems, such as a seatbelt retractor, frontal or side airbag, or a movable headrest, it initiates such deployment and thus constitutes in this regard airbag deployment initiation means. It also may determine the settings for an airbag inflation/deflation control module which determines how much gas is to be generated, how fast it is to be generated, how much should be fed into the airbag, how much should be dumped to the atmosphere and/or how much should be permitted to exhaust from the airbag. The particular method and apparatus for controlling the flows of gas into and out of the airbag will depend on the particular system design. The controller for any such system will hereinafter be referred to as the gas control module and is illustrated in FIG. 1A schematically as 60.

For frontal impacts, for example, a signal is sent through wires 53 and 54 to initiate deployment of airbags 51 and 52 and to control the gas flow into and/or out of each airbag through the gas control modules (not shown) for each airbag. The analog to digital converter (ADC) 57 is connected to the acceleration sensor, in this case the tri-axial accelerometer, and converts an analog signal generated by one or more of the accelerometers representative of the acceleration thereof, and thus the vehicle, into a digital signal. In one embodiment, the analog-to-digital converter 57 may derive the digital signal from the integral of the analog signal. Naturally, many of the components of the printed circuit board can be incorporated into an Application Specific Integrated Circuit (ASIC) as is obvious to those skilled in the art.

The tri-axial accelerometer and/or gyroscopes 56 are mounted by suitable mounting means to the vehicle and can be mounted in a variety of positions to sense, e.g., frontal impacts, side impacts, rear impacts or rollovers. In another embodiment described below, the microprocessor 59 may include detection means for detecting when the occupant to be protected by the deployable occupant protection apparatus 51,52 in accordance with the invention is out-of-position and thereupon to suppress deployment thereof. Also, the detection means may be applied to detect the presence of a rear-facing child seat positioned on a passenger seat and thereupon to suppress deployment of the airbag. In each case, the microprocessor or neural computer 59 performs an analysis on signals received from appropriate sensors and corresponding ADCs (analog to digital converters). Recent advances in computational theory suggest that a form of computation using analog data rather than digital data may become viable. One example is the use of optical correlators for object detection and identification in the military where the optical signal from a video scene is converted to its Fourier transform using diffraction techniques.

The pattern recognition crash sensor described and illustrated in FIGS. 1 and 1A is capable of using information from three accelerometers, for example, each measuring acceleration from an orthogonal direction. As will be described in more detail below, other information can also be considered by the pattern recognition algorithm such as the position of the occupants (also to be discussed below), noise, data from anticipatory acoustic, radar, infrared or other electromagnetic sensors, seat position sensors, seatbelt sensors, speed sensors, gyroscopes or any other information present in the vehicle which is relevant. Since the pattern recognition algorithm is trained on data from real crashes and non-crash events, it can handle data from many different information sources and sort out what patterns correspond to airbag-required events in a way that is nearly impossible for an engineer to do. For this reason, a crash sensor based on neural networks, for example, will invariably perform better than one devised by engineers. The theory of neural networks including many examples can be found in several books on the subject including: *Techniques And Application Of Neural Networks*, edited by Taylor, M. and Lisboa, P., Ellis Horwood, West Sussex, England, 1993; *Naturally Intelligent Systems*, by Caudill, M. and Butler, C., MIT Press, Cambridge Mass., 1990; and, *Digital Neural Networks*, by Kung, S. Y., PTR Prentice Hall, Englewood Cliffs, N.J., 1993.

Figure 2:
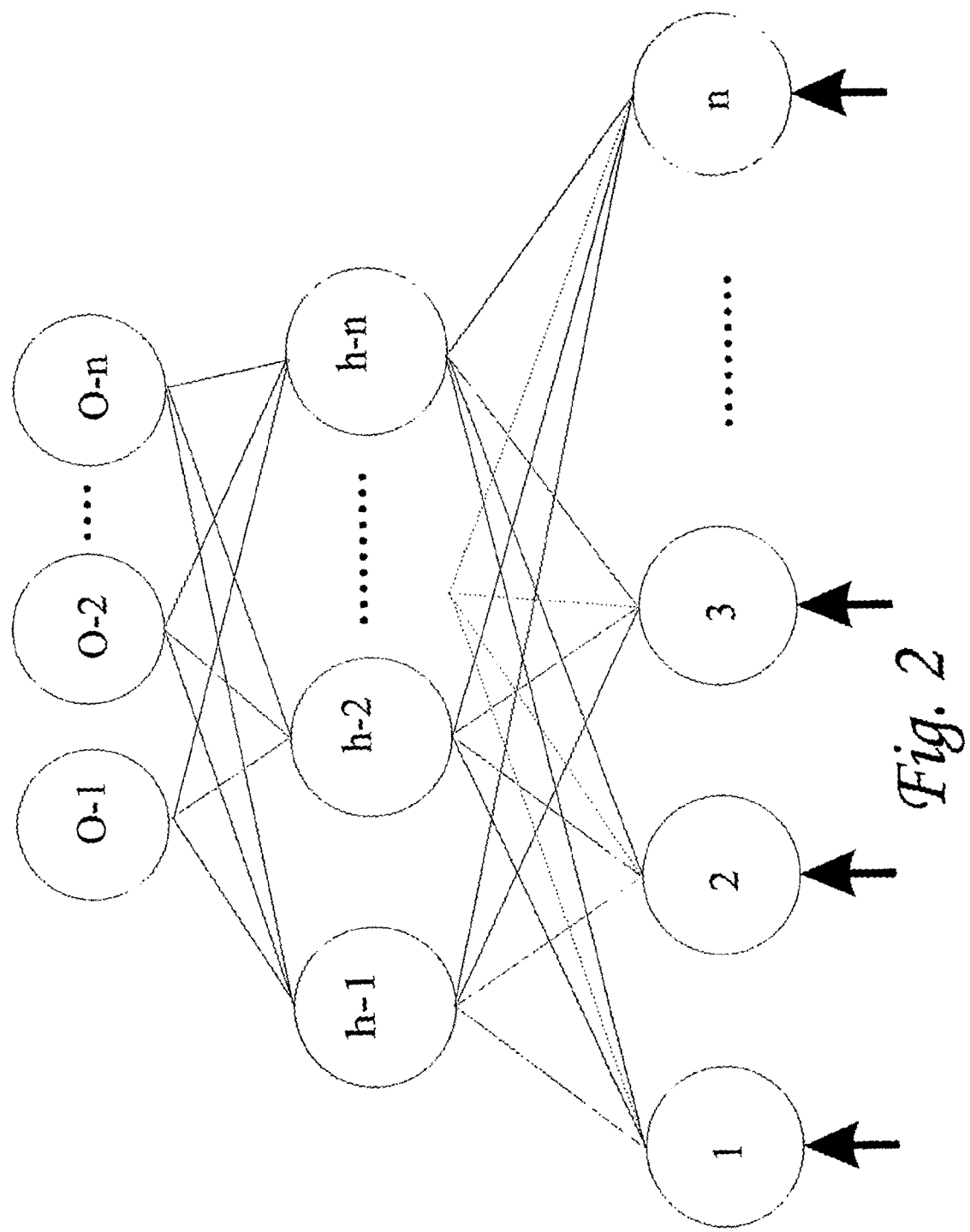
FIG. 2 is a diagram of a neural network used for a crash sensor and crash severity forecaster designed based on the teachings of invention and having more than one output node.

A diagram of one example of a neural network used for a crash sensor designed based on the teachings of this invention is shown in FIG. 2. The process can be programmed to begin when an event occurs which indicates an abnormal situation such as the acceleration in the longitudinal direction, for example, exceeding the acceleration of gravity, or it can take place continuously depending on the demands on the computer system. The digital acceleration values from the ADC 57 may be pre-processed, as for example by filtering, and then entered successively into nodes 1, 2, 3, . . . , N (this entry represented by the arrows) and the neural network algorithm compares the pattern of values on nodes 1 through N with patterns for which it has been trained. Each of the input nodes is connected to each of the second layer nodes h-1, . . . ,h-n, called the hidden layer, either electrically as in the case of a neural computer, to be described below, or through mathematical functions containing multiplying coefficients called weights, also described in more detail below. The weights are determined during the training phase while creating the neural network as described in detail in the above text references. At each hidden layer node, a summation occurs of the values from each of the input layer nodes, which have been operated on by functions containing the weights, to create a node value. Similarly, the hidden layer nodes are connected to the output layer nodes O-1, O-2, . . . , O-n, which can be only a single node representing the control parameter to be sent to the gas control module, for example. If this value exceeds a certain threshold, the gas control module initiates deployment of the airbag.

During the training phase, an output node value is assigned for every setting of the gas control module corresponding to the desired gas flow for that particular crash as it has occurred at a particular point in time. As the crash progresses and more acceleration values appear on the input nodes, the value of the output node may change. In this manner, as long as the crash is approximately represented in the training set, the gas flow can be varied at each one or two milliseconds depending on the system design to optimally match the quantity of gas in the airbag to the crash as it is occurring. Similarly, if an occupant sensor and a weight sensor are present, that information can additionally be fed into a set on input nodes so that the gas module can optimize the quantity of gas in the airbag taking into account both the crash deceleration and also the position, velocity, size and weight of the occupant to optimally deploy the airbag to minimize airbag induced injuries and maximize the protection to the occupant. Details of the manner in which a neural network process operates and is trained are described in above-referenced texts and will not be presented in detail here.

A time step such as two milliseconds is selected as the period in which the ADC pre-processes the output from the accelerometers and feeds data to input node 1. Thus, using this time step, at time equal to 2 milliseconds from the start of the process, node 1 contains a value obtained from the ADC and the remaining input nodes have a random value or a value of 0. At time equal 4 milliseconds, the value that was on node 1 is transferred to node 2 and a new value from the ADC is fed into node 1. In a similar manner, data continues to be fed from the ADC to node 1 and the data on node 1 is transferred to node 2 whose previous value was transferred to node 3 etc. Naturally, the actual transfer of data to different memory locations need not take place but only a redefinition of the location that the neural network should find the data for node 1. For one preferred embodiment of this invention, a total of one hundred input nodes were used representing two hundred milliseconds of acceleration data. At each step, the neural network is evaluated and if the value at the output node exceeds some value such as 0.5, then the airbags are deployed by the remainder of the electronic circuit. In this manner, the system does not need to know when the crash begins, that is, there is no need for a separate sensor to determine the start of the crash or of a particular algorithm operating on the acceleration data to make that determination.

In the example above, one hundred input nodes were used, twelve hidden layer nodes and one output layer node. In this example, accelerations from only the longitudinal direction were considered. If other data such as accelerations from the vertical or lateral directions or the output from a number of gyroscopes were also used, then the number of input layer nodes would increase. If the neural network is to be used for sensing rear impacts, or side impacts, 2 or 3 output nodes might be used, one for each gas control module, headrest control module etc. Alternately, combination, modular or even separate neural networks can be used. The theory for determining the complexity of a neural network for a particular application is the subject of many technical papers and will not be presented in detail here. Determining the requisite complexity for the example presented herein can be accomplished by those skilled in the art of neural network design and is discussed briefly below. In another implementation, the integral of the acceleration data is used and it has been found that the number of input nodes can be significantly reduced in this manner.

The neural network described above defines a method of sensing a crash and determining whether to begin inflating a deployable occupant protection device, and at what rate, and comprises the steps of:

(a) obtaining one or more acceleration signals from one or more accelerometers mounted on a vehicle;

(b) converting the acceleration signal(s) into a digital time series which may include pre-processing of the data;

(c) entering the digital time series data into the input nodes of a neural network;

(d) performing a mathematical operation on the data from each of the input nodes and inputting the operated-on data into a second series of nodes wherein the operation performed on each of the input node data prior to inputting the operated on value to a second series node is different from that operation performed on some other input node data;

(e) combining the operated-on data from all of the input nodes into each second series node to form a value at each second series node;

(f) performing a mathematical operation on each of the values on the second series of nodes and inputting the operated-on data into an output series of nodes wherein the operation performed on each of the second series node data prior to inputting the operated on value to an output series node is different from that operation performed on some other second series node data;

(g) combining the operated on data from all of the second series nodes into each output series node to form a value at each output series node; and, (h) initiating gas flow into an airbag if the value on one output series node is within a selected range signifying that a crash requiring the deployment of an airbag is underway; and (i) causing the amount of gas flow into or out of the airbag to depend on the value on that one output series node.

The particular neural network described and illustrated above contains a single series of hidden layer nodes. In some network designs, more than one hidden layer is used although only rarely will more than two such layers appear.

There are of course many other variations of the neural network architecture illustrated above which appear in the literature.

The implementation of neural networks can take on at least two forms, an algorithm programmed on a digital microprocessor or in a neural computer. Neural computer chips are now available and neural computers can be incorporated into ASIC designs. As more advanced pattern recognition techniques are developed, especially designed chips can be expected to be developed for these techniques as well.

FIG. 3 provides the results of a neural network pattern recognition algorithm, as presented in U.S. Pat. No. 05,684, 701 referenced above, for use as a single point crash sensor. The results are presented for a matrix of crashes created according to the velocity and crash scaling techniques presented in the above-referenced papers. The table contains the results for different impact velocities (vertical column) and different crash durations (horizontal row). The results presented for each combination of impact velocity and crash duration consist of the displacement of an unrestrained occupant at the time that airbag deployment is initiated and 30 milliseconds later. This is presented here as an example of the superb results obtained from the use of a neural network crash sensor that forms a basis of the instant invention. In FIG. 3, the success of the sensor in predicting that the velocity change of the accident will exceed a threshold value is demonstrated. In the instant invention, this capability is extended to where the particular severity of the accident is (indirectly) determined and then used to set the flow of gas into and/or out of the airbag to optimize the airbag system for the occupant and the crash severity.

Airbags have traditionally been designed based on the assumption that 30 milliseconds of deployment time is available before the occupant, as represented by an unbelted dummy corresponding to the average male, has moved five inches. An occupant can be seriously injured or even killed by the deployment of the airbag if he or she is too close to the airbag when it deploys and in fact many people, particularly children and small adults, have now been killed in this manner. It is known that this is particularly serious when the occupant is leaning against the airbag when it deploys which corresponds to about 12 inches of motion for the average male occupant, and it is also known that he will be uninjured by the deploying airbag when he has moved less than 5 inches when the airbag is completely deployed. These dimensions are based on the dummy that represents the average male, the so-called 50% male dummy, sitting in the mid-seating position.

The threshold for significant injury is thus somewhere in between these two points and thus for the purposes of this table, two benchmarks have been selected as being approximations of the threshold of significant injury. These benchmarks are, based on the motion of an unrestrained occupant, (i) if the occupant has already moved 5 inches at the time that deployment in initiated, and (ii) if the occupant has moved 12 inches by the time that the airbag is fully deployed. Both benchmarks really mean that the occupant will be significantly interacting with the airbag as it is deploying. Other benchmarks could of course be used; however, it is believed that these two benchmarks are reasonable lacking a significant number of test results to demonstrate otherwise, at least for the 50% male dummy.

The tables shown in FIGS. 3 and 4, therefore, provide data as to the displacement of the occupant relative to the airbag at the time that deployment is initiated and 30 milliseconds later. If the first number is greater than 5 inches or the second number greater than 12 inches, it is assumed that there is a risk of significant injury and thus the sensor has failed to trigger the airbag in time. For these cases, the cell in the table has been shaded. As can be seen in FIG. 3, which represents the neural network crash sensor designed according to the teachings of this invention, none of the cells are shaded so the performance of the sensor is considered excellent.

The table shown in FIG. 4 represents a model of a single point crash sensor used on several production vehicle models in use today. In fact, it was designed to be optimized for the crashes shown in the table. As shown in FIG. 4, the sensor fails to provide timely airbag deployment in a significant percentage of the crashes represented in the table. Since that sensor was developed, several manufacturers have developed crash sensor algorithms by trial and error that probably perform better than that which would provide the results shown in FIG. 4. It is not possible to ascertain the success of these improved sensors since the algorithms are considered proprietary. Note, the figures used including the 50% male, 30 milliseconds and travel distances of 5 and 12 inches are assumptions and simplifications that are not necessary once occupant sensors are installed in vehicles.

One additional feature, which results from the use of the neural network crash sensor of this invention, is that at the time the decision is made to deploy the airbag and even for as long afterward as the sensor is allowed to run, in the above example, 200 milliseconds of crash data is stored in the network input nodes. This provides a sort of "black box" which can be used later to accurately determine the severity of the crash as well as the position of the occupant at the time of the crash. Naturally, if some intermediate occupant positions are desired, they could be stored on a separate non-volatile memory.

Above the sensing of frontal impacts has been discussed using a neural network derived algorithm. A similar system can be derived for rear and side impacts especially if an anticipatory sensor is available as will be discussed below. An IMU located at a single location in a vehicle can do an excellent job of monitoring the motions of the vehicle that could lead to accidents including pre-crash braking, excessive yaw or pitching or roll which could lead to a rollover event. If the vehicle also has a GPS system, then the differential motion of the vehicle over a period of one second as measured by the GPS can be used to calibrate the IMU eliminating all significant errors. This is done using a Kalman filter. If a DGPS system is also available along with an accurate map, then the vehicle will also know its precise position within centimeters. This however is not necessary for calibrating and thereby significantly improving the accuracy of the IMU and thus the vehicle motion can be known approximately 100 times better than systems that do not use such a GPS-calibrated IMU. This greatly enhances the ability of vehicle systems to avoid skidding, rollover and other out-of-control situations that frequently lead to accidents, injuries and death. This combination of an inexpensive MEMS-based IMU with GPS and a Kalman filter has heretofore not been applied to a vehicle for safety and vehicle control purposes although the concept has been used with a DGPS system for farm tractors for precision farming.

With an accurate IMU, as mentioned above, the weight of a variably loaded vehicle can be determined and sent by telematics to a weigh station thereby eliminating the need for the vehicle to stop and be weighed.

Such an accurate IMU can also be used to determine the inertial properties of a variably loaded vehicle such as a truck or trailer. In this case, the IMU output can be analyzed by appropriate equations of a neural network and with assumed statistical road properties plus perhaps some calibration for a particular vehicle to give the center of mass of the vehicle as well as its load and moments of inertia. With this knowledge plus even a crude digital map, a driver can be forewarned that he might wish to slow down due to an upcoming curve. If telematics is added, then the road properties can be automatically accumulated at an appropriate off vehicle location and the nature of the road under all weather conditions can be made available to trucks traveling the road to minimize the chance of accidents. This information plus the output of the IMU can significantly reduce truck accidents. The information can also be made available to passing automobiles to warn them of impending potential problems. Similarly, if a vehicle is not behaving appropriately based on the known road geometry, for example if the driver is wandering off the road, traveling at an excessive speed for conditions or generally driving in an unsafe manner, the off vehicle site can be made aware of the fact and remedial action taken.

There are many ways to utilize one or more IMUs to improve truck safety and in particular to prevent rollovers, out-of-control skidding, jack-knifing etc. In the simplest implementation as discussed above, a single IMU is placed at an appropriate location such as the roof of the truck or trailer and used to monitor the motion over time of the truck or trailer. Based on the assumption that the road introduces certain statistically determinable disturbances into the vehicle, a monitoring over time can give a good idea of the mass of the vehicle, the load distribution and its moments of inertia. It can also give some idea as to the coefficient of friction on the tires against the roadway. If there is also one or more IMUs located on the vehicle axle or other appropriate location that moves with the wheels then driving function can also be known leading to a very accurate determination of the parameters listed above especially if both a front and rear axle is so equipped. This need not be prohibitively expensive as IMUs are expected to break the $100 per unit level in the next few years.

As mentioned above, if accurate maps of information from other vehicles are available, the IMUs on the axles may not be necessary as the driving function would be available from such sources. Over the life of the vehicle it would undoubtedly be driven empty and full to capacity so that if an adaptive neural network is available, the system can gradually be trained to quickly determine the vehicles inertial properties when the load or load distribution is changed. It can also be trained to recognize some potentially dangerous situations such as loads that have become lose resulting in cargo that shifts during travel.

If GPS is not available, then a terrain map can also be used to provide some corrections to the IMU. By following the motion of the vehicle compared with the known geometry of the road, a crude deviation can be determined and used to correct IMU errors. For example, if the beginning and end of a stretch of a road is known and if this is compared with the integrated output of the IMU, then corrections to the IMU can be made.

The MEMS gyroscopes used in a typical IMU are usually vibrating tuning forks or similar objects. Another technologies developed by the Sciras Company of Anaheim, Calif., (The μSCIRAS multisensor, a Coriolis Vibratory Gyro and Accelerometer IMU) makes use of a vibrating accelerometer and shows promise of making a low cost gyroscope with improved accuracy.

One disclosed embodiment of a side impact crash sensor for a vehicle in accordance with the invention comprises a housing, a mass within the housing movable relative to the housing in response to accelerations of the housing, and means responsive to the motion of the mass upon acceleration of the housing in excess of a predetermined threshold value for controlling an occupant protection apparatus. The housing is mounted by an appropriate mechanism in such a position and a direction as to sense an impact into a side of the vehicle. The sensor may be an electronic sensor arranged to generate a signal representative of the movement of the mass and optionally comprise a microprocessor and an algorithm for determining whether the movement over time of the mass as processed by the algorithm results in a calculated value that is in excess of the threshold value based on the signal. In the alternative, the mass may constitute part of an accelerometer, i.e., a micro-machined acceleration sensing mass. The accelerometer could include a piezo-electric element for generating a signal representative of the movement of the mass.

One embodiment of a side impact airbag system for a vehicle in accordance with the invention comprises an airbag housing defining an interior space, one or more inflatable airbags arranged in the interior space of the system housing such that when inflating, the airbag(s) is/are expelled from the airbag housing into the passenger compartment (along the side of the passenger compartment), and an inflator mechanism for inflating the airbag(s). The inflator mechanism may comprise an inflator housing containing propellant. The airbag system also includes a crash sensor as described above for controlling inflation of the airbag(s) via the inflator mechanism upon a determination of a crash requiring inflation thereof, e.g., a crash into the side of the vehicle along which the airbag(s) is/are situated. The crash sensor may thus comprise a sensor housing arranged within the airbag housing, external of the airbag housing, proximate to the airbag housing and/or mounted on the airbag housing, and a sensing mass arranged in the sensor housing to move relative to the sensor housing in response to accelerations of the sensor housing resulting from, e.g., the crash into the side of the vehicle. Upon movement of the sensing mass in excess of a threshold value, the crash sensor controls the inflator means to inflate the airbag(s). The threshold value may be the maximum motion of the sensing mass required to determine that a crash requiring deployment of the airbag(s) is taking place.

The crash sensor of this embodiment, or as a separate sensor of another embodiment, may be an electronic sensor and the movement of the sensing mass is monitored. The electronic sensor generates a signal representative of the movement of the sensing mass that may be monitored and recorded over time. The electronic sensor may also include a microprocessor and an algorithm for determining whether the movement over time of the sensing mass as processed by the algorithm results in a calculated value that is in excess of the threshold value based on the signal.

In some embodiments, the crash sensor also includes an accelerometer, the sensing mass constituting part of the accelerometer. For example, the sensing mass may be a micro-machined acceleration sensing mass in which case, the electronic sensor includes a micro-processor for determining whether the movement of the sensing mass over time results in an algorithmic determined value which is in excess of the threshold value based on the signal. In the alternative, the accelerometer includes a piezo-electric element for generating a signal representative of the movement of the sensing mass, in which case, the electronic sensor includes a micro-processor for determining whether the movement of the sensing mass over time results in an algorithmic determined value which is in excess of the threshold value based on the signal.

3. Crash Severity Prediction

In the particular implementation described above, the neural network was trained using crash data from approximately 25 crash and non-crash events. In addition, the techniques of velocity and crash scaling, as described in the above-referenced technical papers, were used to create a large library of crashes representing many events not staged by the automobile manufacturer. The resulting library, it is believed, represents the vast majority of crash events that occur in real world accidents for the majority of automobiles. Thus, the neural network algorithm comes close to the goal of a universal electronic sensor usable on most if not all automobiles as further described in U.S. Pat. No. 05,684,701. The results of this algorithm as reported in the '701 patent for a matrix of crashes created by the above-mentioned velocity and crash scaling technique appears in FIGS. 7 and 8 of that patent (FIGS. 3 and 4 herein). An explanation of the meaning of the numbers in the table can be found in reference 2 above.

The '701 patent describes the dramatic improvement achievable through the use of pattern recognition techniques for determining whether the airbag should be deployed. Such a determination is really a forecasting that the eventual velocity change of the vehicle will be above an amount, such as about 12 mph, which requires airbag deployment. The instant invention extends this concept to indirectly predict what the eventual velocity change will in fact be when the occupant, represented by an unrestrained mass, impacts the airbag. Furthermore, it does so not just at the time that the deployment decision is required but also, in the preferred implementation, at all later times until adding or removing additional gas from the airbag will have no significant injury reducing effect. The neural network could be trained to predict or extrapolate this velocity but even that is not entirely sufficient. What is needed is to determine the flow rate of gas into or out of the airbag to optimize injury reduction which depends not only on the prediction or extrapolation of the velocity change at a particular point in time but must take into account the prediction that was made at an earlier point when the decision was made to inject a given amount of gas into the airbag. Also, the timing of when the velocity change will occur is a necessary parameter since gas is usually not only flowing into but out of the airbag and both flows must be taken into account. It is thus unlikely that an algorithm, which will perform well in all real world crashes, can be mathematically derived.

The neural network solves the problem by considering all of the acceleration up to the current point in the crash and therefore knows how much gas has been put into the airbag and how much has flowed out. It can be seen that even if this problem could be solved mathematically for all crashes, the mathematical approach becomes hopeless as soon as the occupant properties are added.

Once a pattern recognition computer system is implemented in a vehicle, the same system can be used for many other pattern recognition functions such as the airbag system diagnostic. Testing that the pattern of the airbag system during the diagnostic test on vehicle startup, as represented by the proper resistances appearing across the wires to the various system components, for example, is an easy task for a pattern recognition system. The system can thus do all of the functions of the conventional SDM, sensing and diagnostics, as well as many others.

4. Crush Zone Mounted Sensors

So far electronic sensors mounted in the passenger compartment for sensing crashes have been considered. It has also been pointed out that there is insufficient information in the passenger compartment to sense all crashes in time. The best place to sense a crash is where it is happening, that is, where the vehicle is crushing and in this section, crush zone sensing will be introduced.

Figure 5:
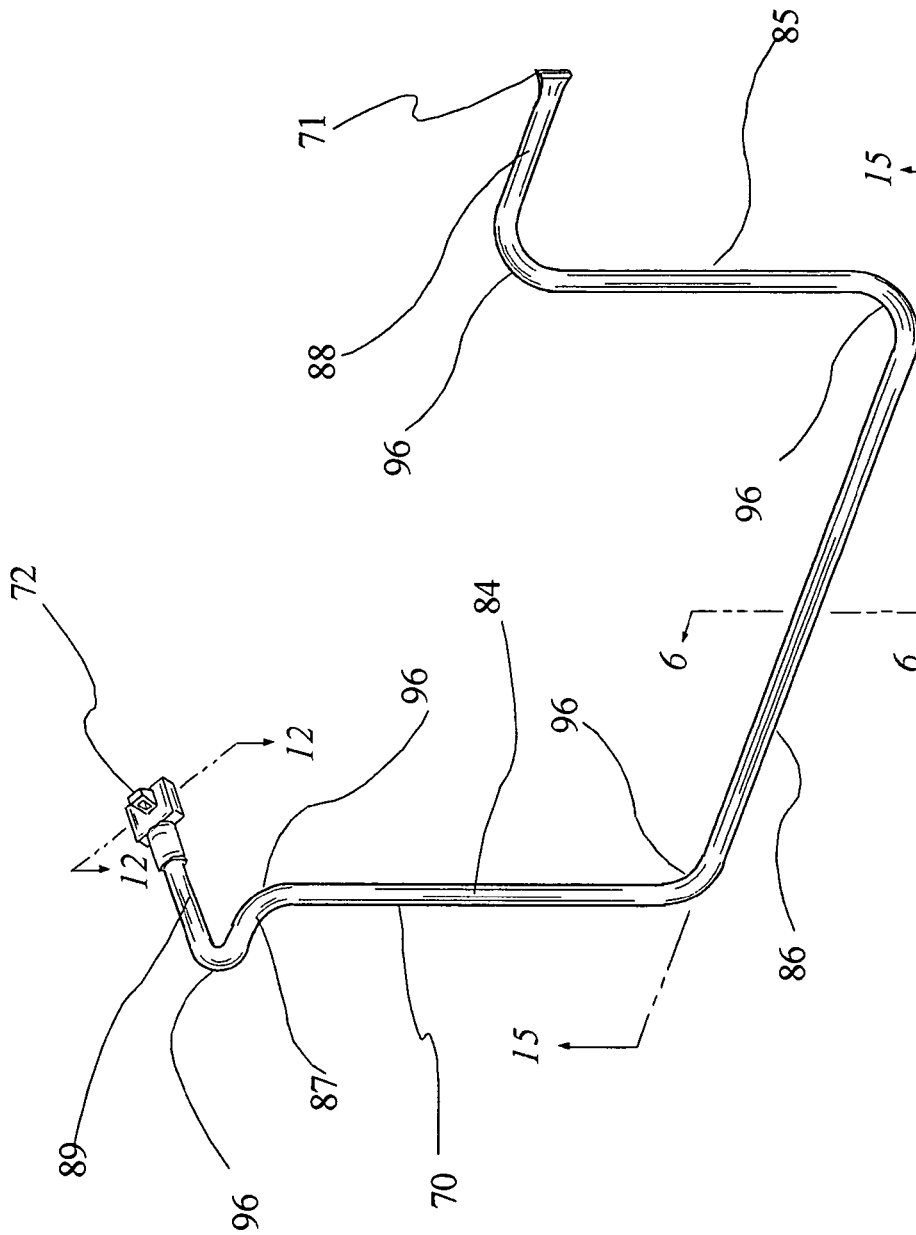
FIG. 5 is a perspective view of a preferred embodiment of the sensor of this invention for use in frontal impacts shown removed from the vehicle.

Referring now to FIGS. 5-17, a crush zone mounted sensor constructed in accordance with the teachings of this invention for use in sensing frontal impacts is shown generally at 70 in FIG. 5. The sensor 70 comprises a unitary, tubular member having two vertical portions 84 and 85, a lower horizontal portion 86, two upper horizontal portions 87 and 88 and a rearward projecting portion 89. The sensor 70 is closed at an end 71 of horizontal porti 88, e.g., by welding, as described below and a header/connector 72 is attached to the sensor 70 at the end of portion 89.

Figure 6:
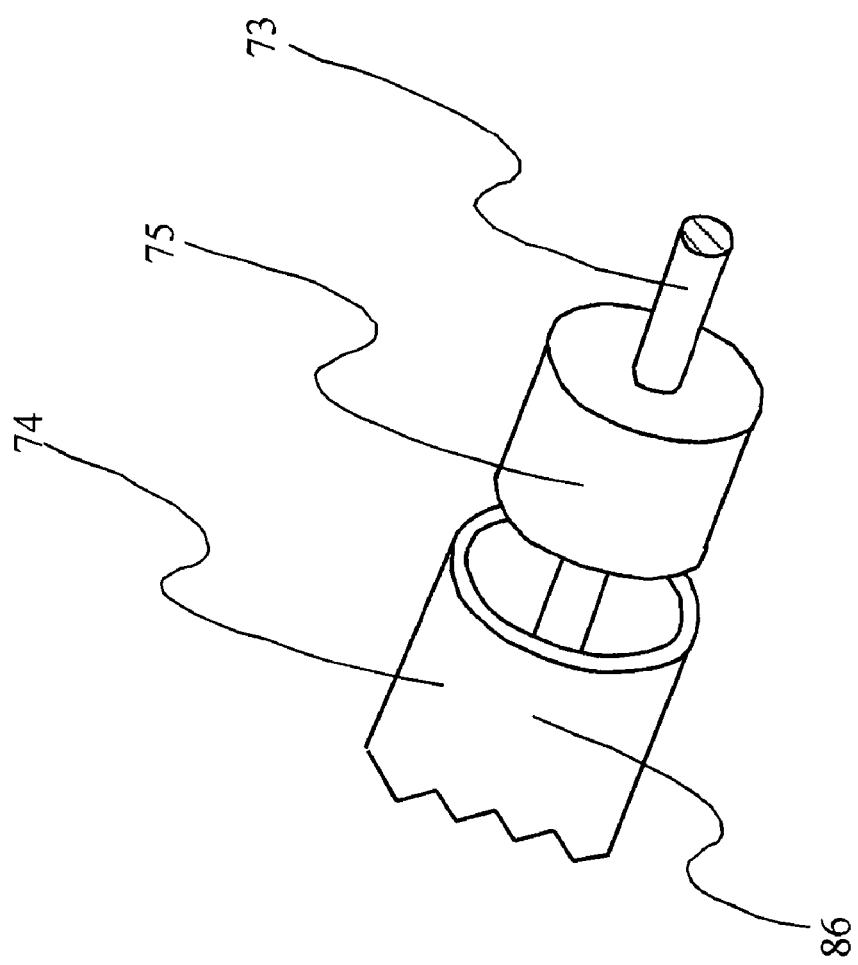
FIG. 6 is a perspective view taken along line 6-6 of the sensor shown in FIG. 5 with the interior parts pulled apart to illustrate the interior structure.
Figure 7:
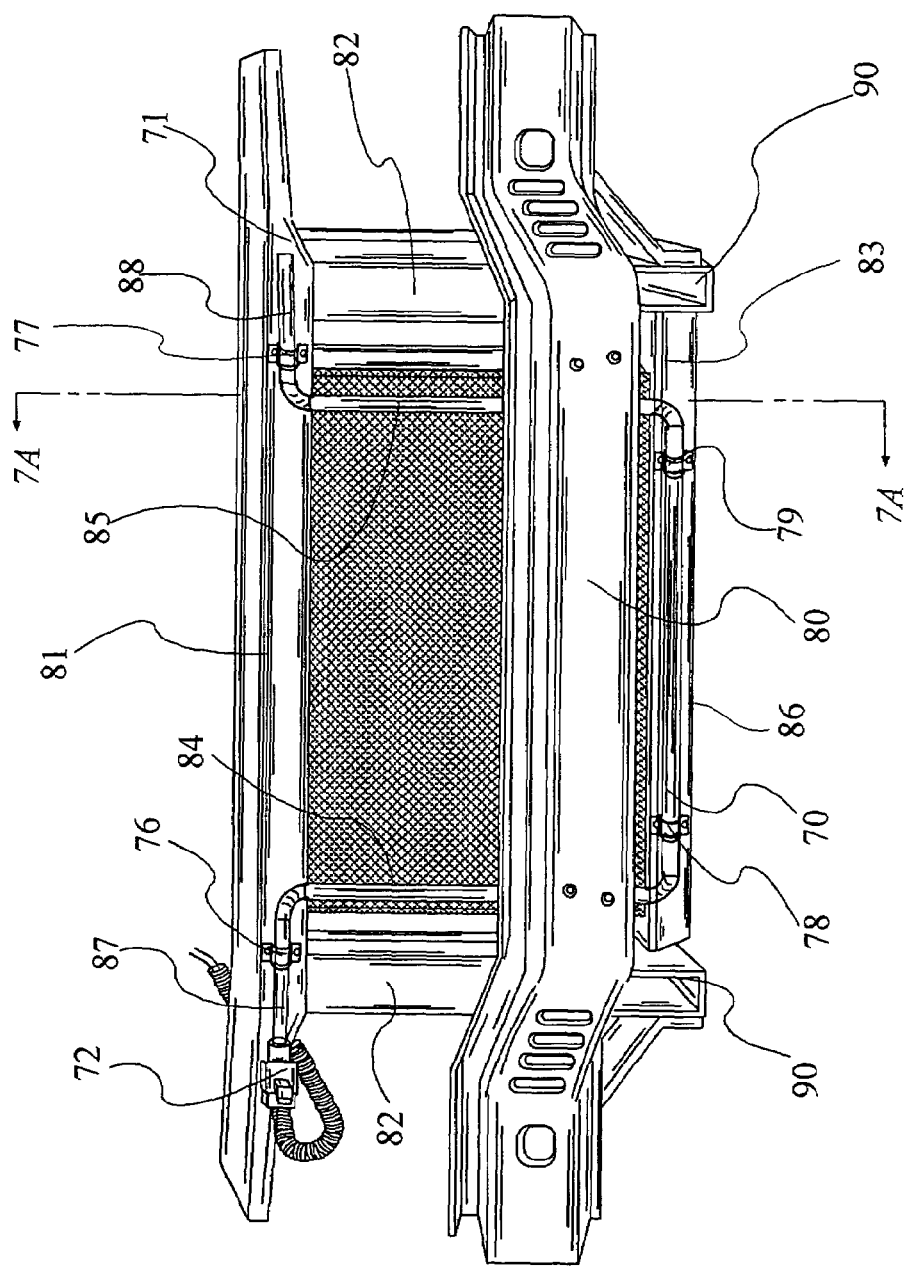
FIG. 7 is a frontal view of another preferred embodiment of the sensor of shown mounted on a vehicle to sense frontal impacts with portions of the vehicle removed to permit viewing of the sensor.

The sensor 70 is mounted to the front of the vehicle as shown in FIG. 7 and is constructed of a tube 74 and a centrally located rod 73 as shown in FIG. 6, which is substantially coextensive with the tube 74 but normally not in contact therewith. The sensor 70 functions when it is bent at any position along the tube 74 with the exception of bent sections or bends 96 which join the vertical portions 84, 85 to the upper horizontal portions 87, 88, respectively, described above and where plastic spacers 75 prevent the rod 73 from contacting the tube 74.

When the sensor 70 is bent during a crash, the rod 73, which is made of an electrically conductive material and thus electrically conducting, approaches the tube 74, which is also made of an electrically conductive material and thus electrically conducting. Appropriate circuitry induces an electromagnetic wave in the tube 74 relative to the rod 73 with a wavelength what is approximately equivalent to the length of the tube 74. The wave reflects off of the end of the tube 74, which is connected to the rod 73 though an impedance device, typically a resistor.

If the impedance between the tube 74 and rod 73 changes along its length such as would happen if the tube 74 were bent or crushed, a reflection from the lower impedance point also occurs and by comparing the phase with the wave reflected off of the end of the tube 74, the location of the lower impedance point can be determined. By comparing the magnitudes of the intermediate reflected waves over time, the rate of change in the impedance can be determined and an estimate of the crush velocity obtained. Alternately, the time that the initial intermediate reflection first occurred can be noted and the time when the tube 74 contacts the rod 73 can also be noted and the difference divided into the deflection required to cause rod to tube contact at that particular location providing a measure of the crush velocity.

If this crush velocity is above the threshold for airbag deployment as determined by a processor (not shown) which is coupled to the header/connector 72, the airbag coupled to the processor can be deployed. If the sensor 70 is mounted far forward in the crush zone, then it will provide an early measurement of the crash velocity providing an earlier deployment decision than prior art velocity change sensors that are located on the crush zone boundary.

The shape of the sensor 70 shown in FIG. 5 or its rod-in-tube construction is not limiting and is shown for illustration purposes only. For the same vehicle shown in FIG. 7, other shapes of sensors may be used and for a vehicle with a difference front end, the sensor may take any form sufficient to enable it to perform the desired functions, as described herein.

The rod 73 is maintained in a central location within the tube 74 as illustrated in FIG. 6 by means of the substantially cylindrical spacers 75 that are placed at each of the bends 96 in the tube 74 and, in one preferred embodiment, in the center of the lower horizontal portion 86 as shown in FIG. 6. The spacers 75 are made from an electrically non-conductive material, such as plastic or other suitable flexible material such as rubber, thus preventing the completion of the electric circuit through the spacers 75.

Although in the preferred embodiment shown in FIG. 5, spacers 75 are only placed in the bends 296 and at the center of the horizontal portion 86, in other embodiments, spacers 75 can be placed arbitrarily along the length of the sensor 70 in order to adjust the sensitivity of the sensor 70 to particular crash events. The effect of the spacers 75 is dramatic. The deflection required to cause electrical contact in the sensor at the center of the lower horizontal portion 86 is approximately 0.1 inches if the spacer 75 is not present, and greater than 1 inch if the spacer 75 present.

Also, the tubular form of the sensor 70 is only a preferred embodiment, it may have other cross-sectional forms, e.g., rectangular, oval or polygonal, depending on the particular need while the spacers 75 similarly are constructed to substantially conform to the interior shape of the sensor 70. The variable positioning of the spacers 75 provides the advantage of the selective sensitivity of the sensor 70 to crashes in specific areas along the length of the sensor 70. As shown, the spacers 75 extend circumferentially about the rod 73 only at discrete locations in the tube 74 so that entire circumferential portions of the rod 73 are spaced from the tube 74. When a coaxial cable is used as described below, spacers are not required as the entire space between the center and outer conductors is filled with dielectric material.

Although spacers 75 are shown to prevent electrical engagement of the rod 73 and the tube 74, other spacing mechanism may also be provided to achieve the same function.

The crush velocity sensor of this invention is shown mounted on a vehicle in FIG. 7 where a substantial portion of the vehicle has been removed to better illustrate how the sensor 70 is mounted. In the configuration in FIG. 7, the rearward portion 89 of the sensor 70 has been eliminated and the sensor 70 extends only toward the outside of the vehicle. The vehicle structure shown consists of an upper radiator support 81, two vertical radiator supports 222 and a lower radiator support 83. The two vertical radiator supports 82 and the lower radiator support 83 are attached to rails 90 which are the structures of the vehicle that support the front end.

A bumper structure 80 (of a particular vehicle) but not the bumper plastic cover is also illustrated in FIG. 7. The crush velocity sensor 70 in accordance with the invention is attached to the upper radiator support 81 by attachment means, e.g., conventional hardware 76 and 77, and to the lower radiator support 83 by attachment means, e.g., conventional hardware 78 and 79. Hardware elements 76, 77, 78, 79 are clamps having two holes for enabling a screw or nail to connect the clamps to the radiator supports. Obviously, any attachment means are suitable for these purposes. Note that this arrangement is the furthermost to the rear of the vehicle that such a frontal impact sensor can be located. Generally it will be located more forward in the crush zone.

Figure 7B:
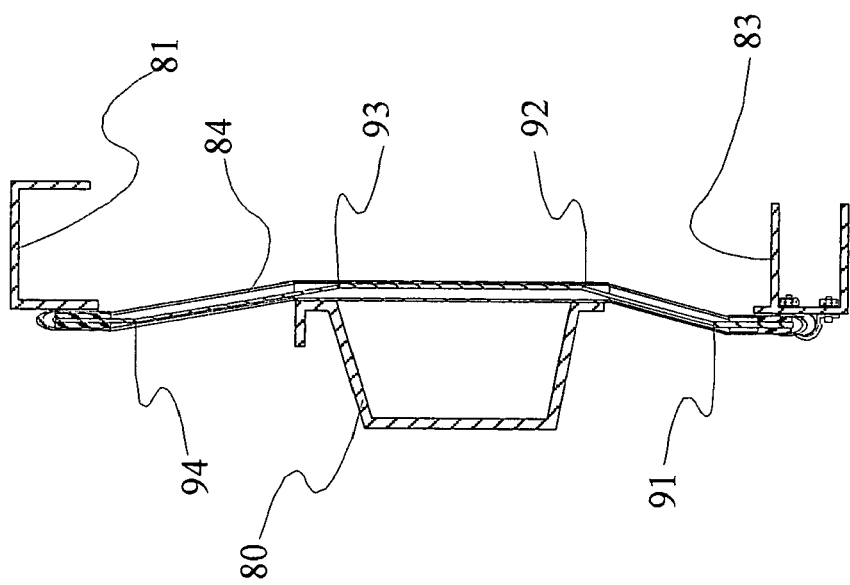
FIG. 7B is the same view of the sensor shown in FIG. 7A after being impacted by the vehicle bumper during a crash.

During a frontal impact with either a barrier or another vehicle, for example, bumper structure 80 is displaced toward the rear of the vehicle relative to the radiator supports of the vehicle to a position where it impacts the vertical portions 84 and 85, of the crush sensor 70, which are mounted so as to be spaced away by attachments 76-79 and thereby not in contact with the vehicle. This sequence is illustrated in FIGS. 7A and 7B which are views taken along lines 7A-7A of FIG. 7. Upon impact with sensor vertical portion 85, bumper structure 80 causes the rod and tube assembly of sensor 70, and at least vertical portions 84, 85, to bend which in turn causes the rod 73 to move relatively closer to the inside of the tube 74, at locations 91, 92, 93, and 94, which can be measured by the change in impedance as is known to those skilled in the art.

By measuring this change in impedance over time, an estimate of the crash velocity can be made. Alternately by timing the interval from the first change in impedance until contact between the rod and tube, the velocity can be determined and if above a threshold the airbag can be deployed. Although in this case four contacts are made between the rod and the tube, they will not occur simultaneously and thus the crush velocity can be determined based on the first occurrence. In this manner, any crash that causes the bumper structure 80 to be displaced toward the rear of the vehicle will permit the crash velocity to be determined.

A key advantage of the sensor in accordance with this invention is that it operates on bending. During a crash, the impact to a particular point in or on the vehicle cannot be guaranteed but the fact that a line across the front, side or rear of the vehicle will not remain straight can almost assuredly be guaranteed. Therefore, a sensor that is long and narrow and responds to bending will be highly reliable in permitting the crash velocity to be determined even in the most unusual crashes.

The sensor in accordance with the invention can be designed to cover a significant distance across the vehicle as well as along both sides back almost to the B-pillar that increases the probability that it will be struck by crushed material and bent as the crush zone propagates in the vehicle during a crash. At the same time, the sensor 70 is small so that it can be located in a position to sense the fact that one part of the vehicle has moved relative to some other part or that the structure on which the sensor 70 is mounted has deformed. In this regard, sensor 70 may be positioned at the rear of the crush zone of the vehicle but is most appropriately positioned as far forward in the vehicle as practical.

The particular implementation of the rod-in-tube is for illustration purposes only and many other technologies exist that permit the velocity change of a portion of an elongate sensor due to a crash to be determined and thereby the local velocity change of a part of a vehicle. Such alternate technologies include the use of distributed piezoelectric materials to measure local crush, and distributed accelerometers that are attached by rigid structures or arms that transfer the acceleration to the accelerometers.

Not all crashes involve the bumper and in a survey of crashed vehicles (see SAE Paper No. 930650), as many as about 30% of the surveyed vehicles were involved in crashes where the bumper was not primarily involved. A typical crash of this type involves a vehicle that is braking and therefore pitching forward which lowers the front bumper and raises the rear bumper. If this first vehicle is struck in the rear by another, second vehicle which is similarly pitching, the second striking vehicle can impact the first struck vehicle with the front bumper of the second striking vehicle riding underneath the rear bumper of the first struck vehicle. In this case, the bumper of the first struck vehicle will impact the grill and radiator of the second striking vehicle and displace the vertical portions 84 and 85 of the crush switch sensor in accordance with this invention. As such, the crash velocity can be determined and the airbag deployed. The under-ride problem is compounded by the recent increase in the number of SUVs and pickup trucks which tend to have higher bumpers.

When the bumper structure 80 is involved in an accident, it generally maintains its structural shape until it begins impacting the radiator and other vehicular structures behind the radiator. This is after it has impacted the sensor 70. Since the bumper structure 80 has not yet deformed when it strikes the sensor 70, the sensor 70 senses the crush of the vehicle equivalent to the distance between the rear of the bumper structure 80 and the sensor 70, plus the amount of sensor deflection required to deform the sensor 70 and change its properties such as its impedance.

If the bumper structure 80 is not primarily involved in the accident, the amount of penetration into the vehicle required to activate the sensor 70, measured from the front of the bumper structure 80, will be greater by the amount of the thickness of the bumper structure 80. In this manner, the sensor system requires greater penetration into the vehicle in bumper underride crashes. This results in a longer sensing time which is desired when the sensor 70 is acting as a switch since such crashes are softer than those crashes which involve the bumper and therefore there is more time available before deployment of the airbag is required. On the other hand, for crash velocity sensors, it is desirable that the sensor be as far forward as practical since the sensor functions by measuring the velocity of the crash and not the crush. Naturally, the sensor 70 can be designed to act in both capacities, as a velocity measuring device and as a crush measuring device, at the expense of somewhat later triggering.

In some cases, it is necessary to further desensitize the sensor to bumper underride type crashes to make the sensor less sensitive to deer impacts, for example. Every year in the United States there are more than 300,000 impacts with deer and in most cases, airbag deployment is not needed. Some currently used sensor systems, however, can cause the airbag to deploy on deer impacts. When impacted at high speeds, the crash pulse in the non-cruch zone can be similar to the crach pulse from a barrier crach pu to the time that the decision must be made to deploy the airbag. In such cases, electronic sensors operating on the non-crush zone crash pulse will determine that the airbag deployment is required. Currently used crush zone sensors may be mounted above the bumper and project outward from brackets attached to the upper radiator support. These sensors are impacted by a deer even at lower speeds and experience a velocity change sufficient to cause deployment of the airbag.

Figure 8:
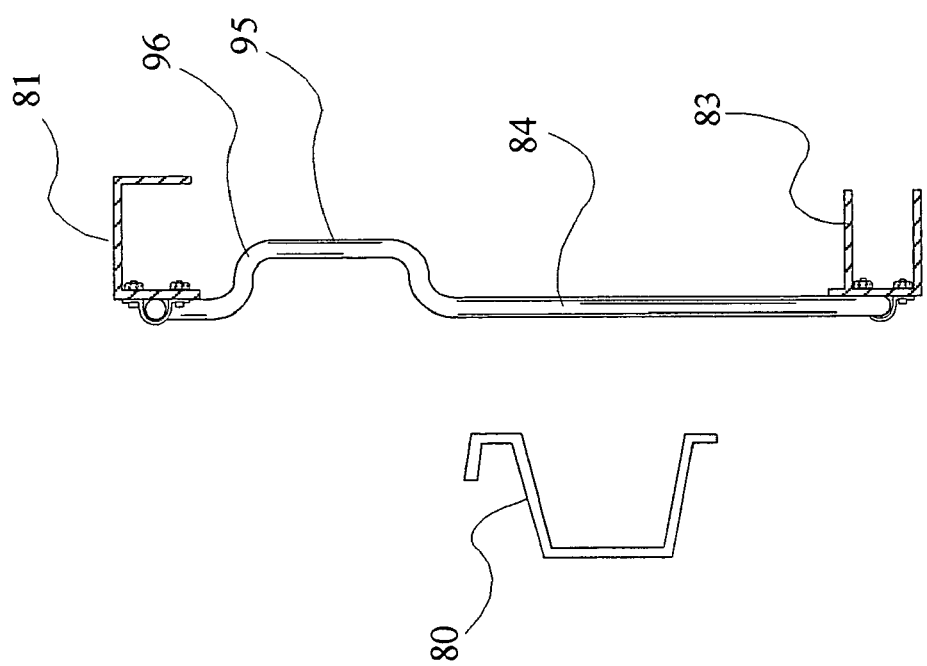
FIG. 8 is a partial view of an alternate configuration of a vertical portion of the sensor of FIG. 7 showing it displaced rearward to reduce its sensitivity to impacts above the bumper.

The crush velocity sensor in accordance with this invention, however, can be desensitized in a manner such as shown in FIG. 8 so as to render it insensitive to deer impacts (or impacts with other large animals). In this case, a section designated at 95, of at least the vertical portion 84, of the sensor 70 has been displaced rearward to render it less sensitive to deer impacts. Section 95 is substantially U-shaped. Vertical portion 84 and horizontal portion 86 can also be constructed with a rearward displaced portion to thereby enable adjustment in the degree of sensitivity of the sensor 70.

Figure 9:
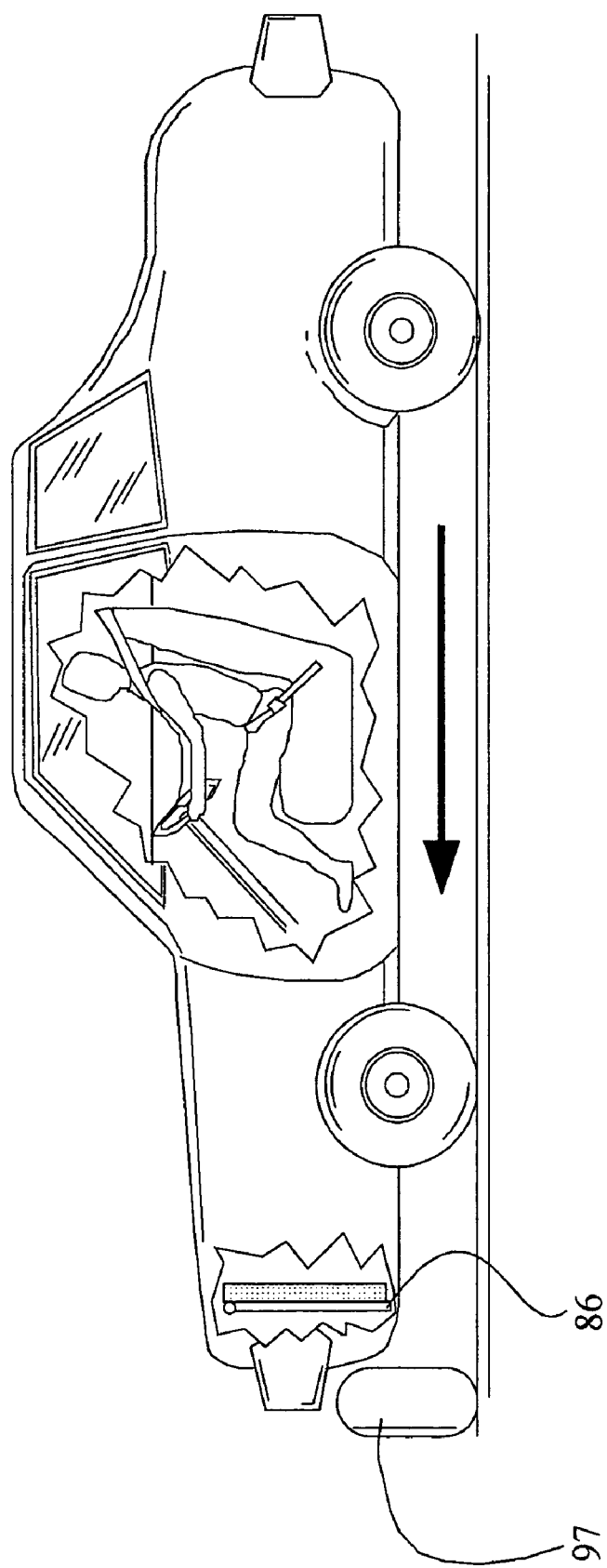
FIG. 9 is a view of a vehicle taken from the side, with certain portions removed, which is about to impact a low pole which misses the bumper, illustrating the ability of the sensor to respond to this type of crash.

Approximately 2% of frontal crashes involve impacts to the vehicle below the bumper. In a typical case, a vehicle impacts with a large stone, tree stump or short or low pole that miss the bumper. This type of accident is expected to become more common since in order to make vehicles more aerodynamic, vehicle hoods have been made lower and the radiators have also been lowered until as much as one-third of the radiator now projects below the lower edge of the bumper. An impact with a short pole or curb 97 such as shown in FIG. 9 where the pole 97 interacts with the lower portion of the radiator, can result in an airbag-required crash which will not be properly sensed by some sensor technologies, e.g., ball-in-tube based crush zone sensors. These crush zone sensors are typically mounted above the bumper and therefore would not be in the crush zone for this kind of a crash causing them to trigger on the non-crush zone crash pulse resulting in a late deployment of the airbag.

The preferred embodiment of the crush switch sensor of this invention shown in FIG. 9, on the other hand, stretches across the front of the vehicle and will trigger thereby causing the airbag to deploy in time for these crashes.

About the most common of all real-world airbag crashes involve impacts with poles. Pole impacts are some of the most difficult crashes to sense properly with current airbag sensor technology. Poles that can require airbag deployment vary in diameter from as little as about 4 inches to greater than about 24 inches. They involve such objects as fence posts, light poles, trees and telephone poles that are the most common obstacles found along the sides of roads. An impact into a pole at any position along the front of the vehicle can result in a serious accident requiring deployment of the airbag. The stiffness of the vehicle, however, varies significantly from one part of the front to the other. For most vehicles, the center front is the softest part of the vehicle, and the rails are the stiffest. In a typical accident, the bumper will buckle around a pole resulting in a soft crash pulse until the pole penetrates sufficiently into the vehicle that it begins to engage major structural members or the engine at which time, the pulse becomes very stiff. This type of crash pulse is particularly difficult for non-crush zone sensors to sense properly.

Pole crashes are typically staged by automobile manufacturers during their airbag development programs, but they are limited in scope. They typically involve large poles that are one foot or more in diameter and are usually run at high speeds. It has been found, however, that thin poles at low speeds are much more difficult to enable proper sensing for airbag deployment than thick poles at high speeds. They are also much more common in the real world. Non-crush zone sensors have a particularly difficult time in sensing pole crashes especially those involving thin poles at low velocities, since the crash pulse is very soft until it is too late to initiate airbag deployment. Conventional crush zone sensors, such as the ball-in-tube sensors, function properly as long as the sensor is located in-line with the impact point of the pole. When this is not the case, and especially when the impact speed is low, these sensors can fail.

A particular case, for example, involved a vehicle that has three ball-in-tube sensors mounted in the crush zone, one center-mounted and one on each side approximately in line with the rails. This vehicle impacted a pole at approximately 15 miles per hour at a point midway between the front center and side sensors. An examination of the vehicle showed that there was no crush at either of the sensor locations. In this case, the sensors triggered the airbag late based on the non-crush zone crash pulse as described in U.S. Pat. No. 04,900,880 (Breed) referenced above. Before the airbag deployed, the occupant had already impacted with the steering wheel and although conscious after the accident, later died from internal injuries.

The crush velocity disclosed here, in the embodiment illustrated in FIG. 7, would have measured the crash velocity and caused the airbag to deploy in time for this and all other pole impacts since it stretches substantially across the entire front of the vehicle, i.e., from one side of the vehicle to the opposite side of the vehicle. Of course, the sensor 70 may be designed to stretch across only a portion of the front of the vehicle in which case, it would be beneficial but not required to use multiple sensors. The sensor 70 could also be designed to stretch across a portion of or all of the rear of the vehicle or along a portion of or the entire side of the vehicle (as discussed below).

In a small but significant percentage of automobile crashes (less than about 2%), the point of impact is outside of the main vehicle supporting structure, that is typically the rails. In a common accident, a vehicle impacts a pole at approximately the location of the headlights at a slight angle and the pole penetrates into the vehicle with little resistance until it encounters the front wheel structure at which point the vehicle rapidly stops. This crash cannot be properly sensed by most, if not all, conventional airbag sensor system in use today. Electronic non-crush zone mounted sensors will either trigger late or not at all due to the very soft nature of this crash up to the point where the pole impacts the wheel structure, which is too late.

Since conventional crush zone sensors are usually mounted inside of the rail structure, they are not in the crush zone for this crash, which is usually exterior of the rail structure. They also, therefore, would either not trigger or trigger late. The crush sensor as shown FIG. 7 projects only slightly beyond the rail structure and therefore could also miss this type of crash. The extension of the upper horizontal portions 87 and 88, however, will permit the crush sensing sensor to sense this type of crash. These extensions would trigger the deployment of the airbag in this pole crash and other airbag desired crashes outside of the rail structure. This crash is, as mentioned, a soft crash and therefore there will be substantial penetration before the sensor must trigger. The upper horizontal portions 87 and 88 therefore could be angled toward the rear in the vehicle to adjust the penetration required for the sensor to trigger. Alternately, the crush velocity sensor of this embodiment of the invention can extend along the entire side on the vehicle almost to the B-pillar and thus can catch this crash. A crush switch sensor, on the other hand, would be too sensitive if placed adjacent the side of the vehicle. By measuring the crash velocity, as is done in the sensor of this embodiment of the invention, this is not a problem and the sensor can be placed as close as practical to the exterior surfaces of the vehicle.

In order for current technology crush zone sensors to sense crashes outside of the rails in time, additional sensors would have to be placed outboard of the rails. As mentioned above, even three sensors are insufficient to catch all pole crashes to the front of the vehicle, such as the low pole crash described above, and when bumper override crashes are considered, additional sensors are required. A primary advantage of the crush velocity sensor of this embodiment of the invention is that a single sensor can be used to sense crashes to all portions of the front and most portions of the sides of the vehicle. To achieve the equivalent coverage using conventional sensors would require at least five and probably more sensors. The manufacturing cost of a sensor described in this embodiment of the invention is about equivalent to the manufacturing cost of a single ball-in-tube crush zone sensor. Therefore, in addition to the substantial performance advantage, there is also a substantial cost advantage in using the sensor described herein.

In addition, a significant cost in a sensor system is the cost of the wires to connect each sensor to the remainder of the airbag system. It is typical for a wire and connector assembly plus the cost of insulation to be as much as half of the cost of the sensor itself. In the sensor described herein, a single wire assembly is all that is required to connect the sensor to the airbag system. It would also be possible to wirelessly connect the sensor assembly to the airbag system. With conventional crush zone sensors, a separate wire assembly is needed for each sensor. Finally, in order to minimize the possibility of the conventional crush zone sensor from rotating during angle crashes, for example, the mounting structure, typically the upper radiator support, is frequently strengthened to provide a more rigid mounting structure for the sensor. This modification to the vehicle structure is not required for the sensor described herein and therefore additional cost savings result. Naturally, to be able to measure the velocity change of the crash, additional electronics are required that will increase the cost of the sensor of this embodiment of the invention compared to a pure crush switch crash sensor.

Figure 10:
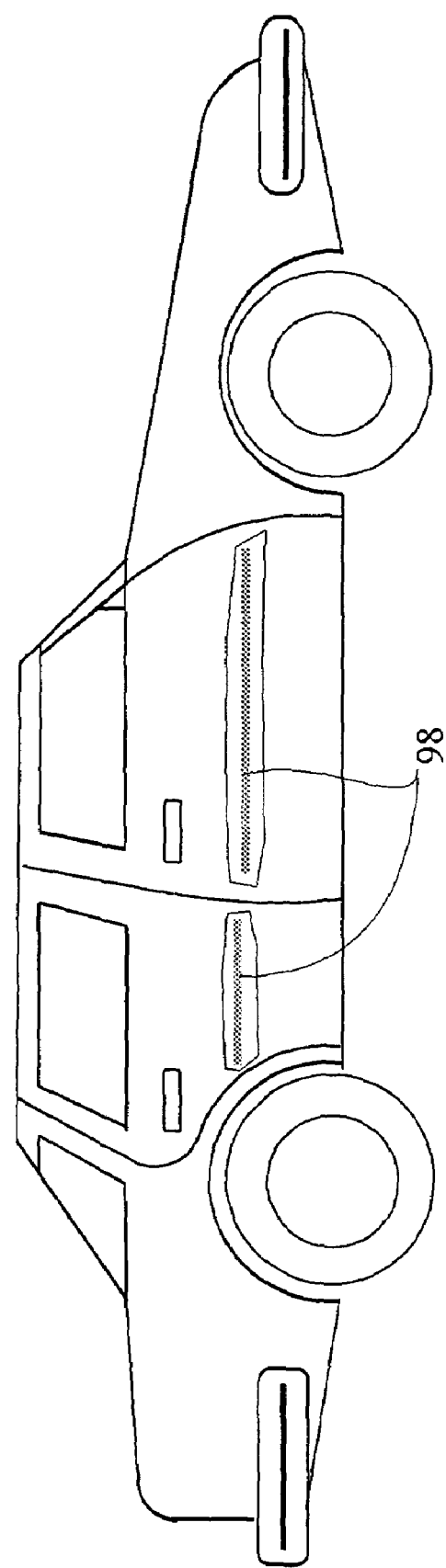
FIG. 10 is a side view of another preferred embodiment of the sensor in accordance with the invention shown mounted on a vehicle in a position to sense side impacts, with portions of the vehicle removed to permit viewing of the sensor.

As discussed above, and in several of the cited references on sensing side impacts, crush sensing alone is not the best technical solution for sensing side impacts. In spite of this fact, Volvo is now marketing a side impact airbag protection system where the sensor is a crush sensing sensor, although it is a point sensor and not a rod-in-tube geometry. In the event that other automobile manufacturers choose this approach, the rod-in-tube crush sensor described herein can be used as shown in FIG. 10 which is a side view of the sensor of this invention shown mounted on a vehicle to sense side impacts. One advantage of the rod-in-tube sensor is that it can cover a large area of potential crash sites at little additional cost. Thus, a single sensor can stretch along the entire door in whatever shape desired, e.g., linearly as shown at 98 in a position substantially parallel to the door panel. Thus, the sensor 98 would measure the crush velocity upon impact at any location along the door. This solves a potential problem with the Volvo system that requires that the crash take place at a particular location for the airbag to be deployed.

In addition, sensors could extend across the side panels of the vehicle and not only across the doors. Naturally, such a sensor can also be used for rear impacts.

The use of a rod-in-tube sensor for side impacts as well as one for frontal impacts is particularly attractive since it can be easily attached to the same diagnostic module. Thus, the same Diagnostic and Energy Reserve Module (DERM) can be used for frontal, side and even rear impacts. A particularly economic system results if these sensors are used for the entire vehicle permitting a simple electronic diagnostic system to be used, in contrast to the complicated microprocessor-based systems now in use. Thus, superior protection for the entire vehicle for crashes from any direction can be obtained at a substantial cost reduction over the currently used electronic systems.

Some of the objections for the use of a crush sensing sensor for side impact are overcome by the use of the sensor to measure the crash velocity rather than pure crush. A pure crush sensor is prone to inadvertent triggering since the amount of crush in side impacts cannot be used as a measure of impact velocity due to the short triggering time requirement. The use of the sensor of this embodiment of the invention in conjunction with an electronic sensor for side impacts will be discussed in more detail below.

The application of the sensor of this embodiment of the invention for rear impacts is in theory and practice similar to that for frontal impacts. In contrast to frontal impact, there is not yet universal agreement as to the velocity change at which the deployment of a headrest-mounted airbag is needed. Many whiplash injuries occur at very low velocity changes, as low as about 5 mph. The replacement cost for such an airbag will be substantially less than for frontal impact airbags, consequently the deployment velocity could be made lower. On the other hand, if the headrest is properly positioned, only high velocity impacts would require airbag deployment. It is important to keep in mind that whiplash injuries are the most expensive group of automobile injuries even though they are usually not life threatening. Any airbag in the headrest can cause more injury than help due to the proximity of the occupant's head to the headrest.

Thus, it is conceivable that the threshold velocity can be determined as a function of the position of the headrest. The position of the headrest may be determined by a sensor system and then a processor coupled to the sensor system and to the rear impact sensor would factor in the position of the headrest when determining an appropriate threshold velocity above which the airbag should be deployed.

The choice of the marginal deployment velocity significantly impacts the location of the rod-in-tube crush switch sensor but has much less effect of the crush velocity sensor of this invention. Also, the rear end sections of automobiles differ substantially in their structure, stiffness, and suitable sensor mounting locations. In some vehicles, the optimal sensor mounting location will be in the trunk lid. In others, especially if low velocity impacts are to be sensed, a location behind the bumper is appropriate. In many vehicles, the proper location for a crush switch sensor is in the middle of the trunk volume, an impractical place to mount any sensor. For the crush velocity sensor of this embodiment of the invention, on the other hand, this is not a problem and the sensor can be mounted at a more convenient rearward location.

Figure 11:
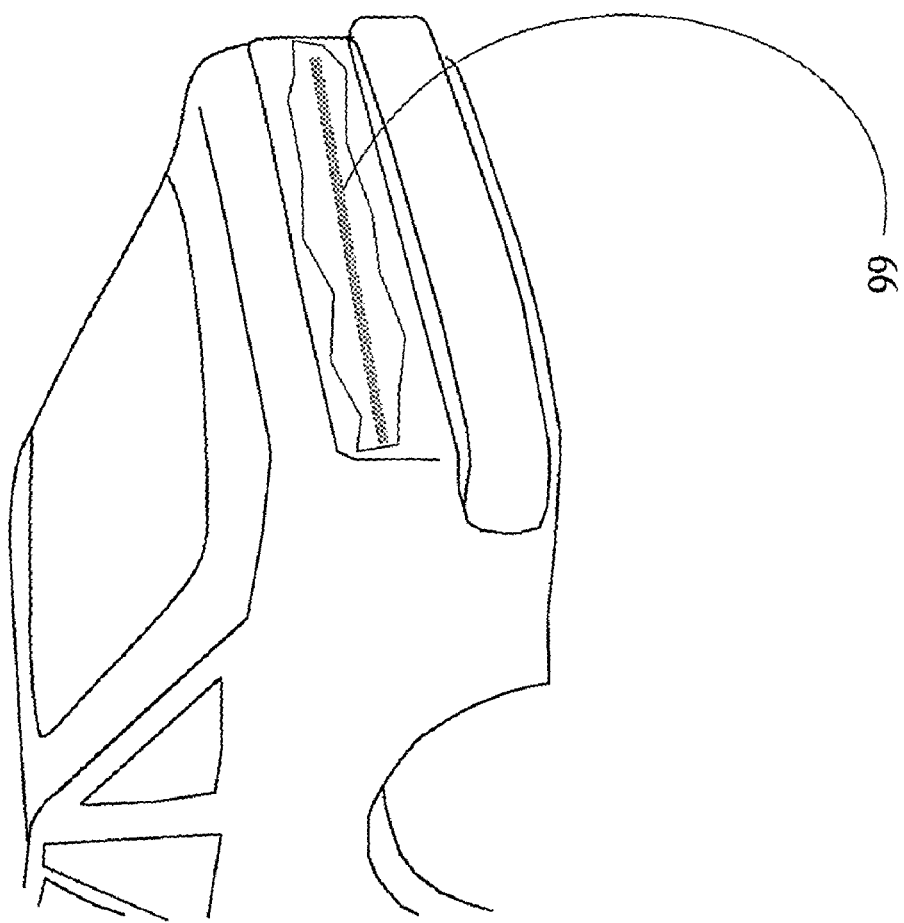
FIG. 11 is a rear view of another preferred embodiment of the sensor in accordance with the invention shown mounted on a vehicle in a position to sense rear impacts with portions of the vehicle removed to permit viewing of the sensor.

Due to this wide variability in sensor strategies and resulting sensor locations and geometries, FIG. 11 illustrates a general sensor 99 arbitrarily mounted to the rear of the vehicle to sense rear impacts, and as shown, in a position extending across substantially the entire width of the rear of the vehicle. Portions of the vehicle are removed to permit viewing of the sensor 99. The determination of the proper mounting position and sensor design follows the same strategy illustrated above and in the cited references.

The environment experienced by a sensor mounted in the front of the radiator on a vehicle is one of the most severe in the automobile. In addition to the extremes of temperature encountered between winter in Alaska and summer in the Arizona desert, this location is impacted by hail, stones, dust, dirt, salt water, radiator coolant, steam cleaner and occasionally even battery acid. This sensor must be capable of surviving any combination of these environments for the useful life of the car that is typically considered to be in excess of ten years. It is important, therefore, that this sensor be hermetically sealed. A great deal of effort has been put into the ball-in-tube crush zone sensors to seal them from these environmental influences. Nevertheless, sensors that have been on vehicles have been dissembled and found to contain moisture. Although moisture would not have as detrimental effect to the rod-in-tube sensor described here as it does to ball-in-tube sensors, the sensor has nevertheless been designed to be truly hermetically sealed as described below.

Figure 12:
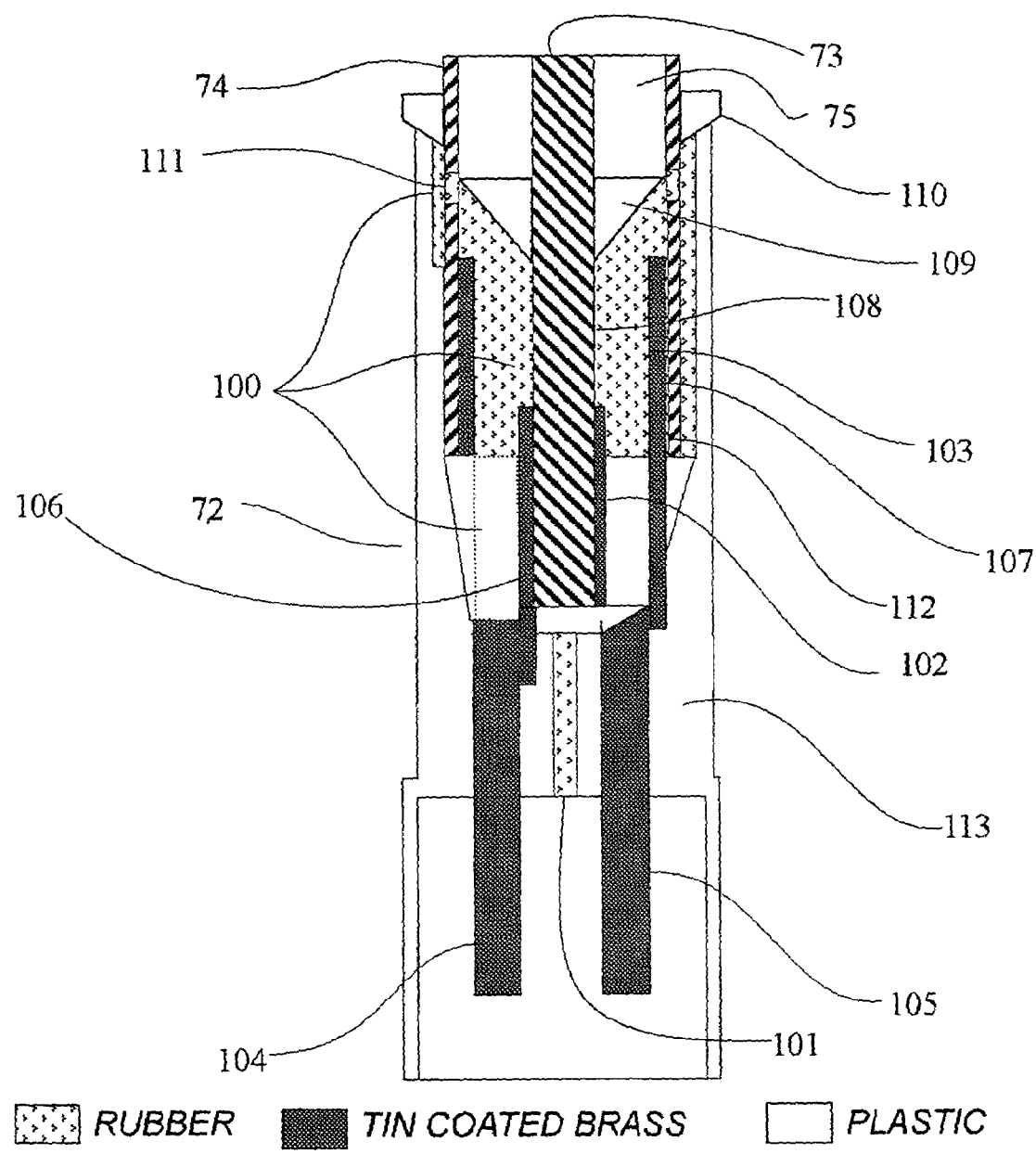
FIG. 12 is a cutaway view of the header/connector assembly of FIG. 5 taken along line 12-12 illustrating the construction details and in particular the method of sealing the sensor.

FIG. 12 is a cross section view of the header/connector assembly 72 shown mounted on the tube 74 and rod 73. One of the spacers 75 is used to position the rod 73 inside the tube 74 as described above. The primary seal for this sensor 70 is injected and cured in place and is urethane or a silicone rubber compound 100.

Current ball-in-tube crush zone sensors are attached to the vehicle wire harness and, thus to the remainder of the airbag system, by means of a pigtail which is a wire assembly emanating from the sensor at one end and having a connector at the other end. It is believed that the environment in front of the radiator is too severe for connectors, therefore connectors integral with the sensor have not been considered. This pigtail is one of the most expensive parts of the standard ball-in-tube crush zone sensor. Substantial cost savings result if the connector could be made integral with the sensor. This has been accomplished in the crush switch sensor of the current design as shown in FIGS. 5, 7 and 12.

The sealing technique used for the header/connector is to form a rubber mold within the housing and to pump a rubbery material such as urethane or silicone rubber, or similar compound, 100 into the cavity. This is accomplished in such a manner that the air is displaced and forced to flow through various clearances between the parts in much the same manner as air is forced out of a plastic injection mold when the liquid plastic is forced in under pressure. The rubber compound 100 is injected through hole 101 in the bottom of the connector portion of the assembly and flows upward as the air flows out through holes or slots 111 in tube 74 and finally out of the assembly through the clearance between the tube 74 and a plastic dam 110. The plastic dam 110 is a part that fits snugly to the tube and also against a plastic header body 113 of the header/connector assembly 72. These snug fits permit the air to flow while offering a substantial resistance to the flow of the rubber 100. In this manner and through the proper geometric shaping of the various parts, all but a few minute air bubbles are effectively removed and the rubber thereby attaches and seals to all of the relevant surfaces.

A second dam 109 is also used to limit the passage of the rubber into the main body of the sensor 70. The spacers 75 typically contain a groove to permit the passage of grease, as will be explained below, and the dam 109 effectively seals this area and prevents passage of the rubber. Since the grease is typically pumped into the sensor 70 after the header/connector assembly 72 is assembled, this last spacer 75 adjacent to the header/connector assembly 72 need not have the groove and thus the dam 109 and spacer 75 can be made as one part if desired.

The seal is thus made by the steps of:

a) assembling the header/connector assembly 72 to the rod-in-tube assembly 73/74 creating at least one enclosed cavity therein having at least one inlet port 101 for injecting a rubber compound and at least one narrow passage for air to escape (the clearance between tube 74 and dam 110), this passage being sufficiently narrow as to permit only a small amount of rubber compound to flow out of the assembly during the filling process, but large enough to permit air to easily flow out of the assembly;

b) injecting an uncured rubber compound through the inlet port(s) in such a manner that the at least one narrow passage remains open during the injection process until the cavity is substantially filled permitting air within the cavity to be displaced by the rubber compound; and c) curing the rubber compound.

Usually a room-temperature curing rubber compound is used and thus the curing process comprises storing the assembly until the curing is complete. In many cases, the temperature of the assembly is elevated to accelerate the curing process and in others, the rubber is exposed to ultra violet light to affect the cure.

Tests were run on this system whereby the assembly was held at about −40 degrees Celsius for more than twelve hours and then immersed into boiling water and then into near freezing water containing a penetrating die. After tens of cycles, the test units were cut open to search for the penetration of the die that would indicate a failure of the seal. None was found. In contrast, a commercially available ball-in-tube sensor failed on the first cycle. This test is more severe than any sensor is likely to experience in the field and therefore proves the viability of the sealing system.

A preferred plastic material used for the header/connector is 30% glass-filled polyester although other plastic materials would work as well. Standard crush zone sensor connectors are frequently made from unfilled Nylon and this would also be suitable for the header/connector design used in the sensor of this invention. Although unfilled Nylon has a high coefficient of thermal expansion, the urethane or silicone rubber has even a higher one and therefore the seals between the nylon and metal parts will remain intact.

The lower portion of the header body 310 of header/connector assembly 72 shown in FIG. 12, is in the form of a mating connector which attaches to the wire harness connector provided by the automobile manufacturer. Connector pins 104 and 105 are extensions of the header pins 102 and 103, which are connected to the rod 73 and tube 74, respectively, and are designed to mate with the appropriate connector, although not shown in detail here. Connector pins 104 and 105 are made of an electrically conductive material. Upon completion of the circuit via contact between the rod 73 and the tube 74 upon a crash, current flows through the connector pins 104, 105, header pins 102, 103 and rod 73 and tube 74. The header pins 102, 103 are formed from, e.g., sheet brass, in such a manner that they surround the rod 73 and tube 74 and are electrically connected thereto. This is accomplished in the case of the tube 74, for example, by solder coating the end 112 of the tube 74. A mating portion 107 of the header pin 103 fits snugly inside the tube 74 and, through induction heating, is soldered to the tube 74. Similarly, mating portion 106 of header pin 102 surrounds the rod 73 that has been soldered coated at its end 108.

The header pins 102 and 103 are first formed from, e.g., tin-plated brass material, to the proper shape and then placed in a mold in an insert molding operation to form the header/connector assembly 72. Note that a reflection will come from the different impedance in the connector but it will be at a known position and can be ignored. This is believed to be a ground-breaking use of an integral connector for a crush zone mounted sensor.

Figure 13:
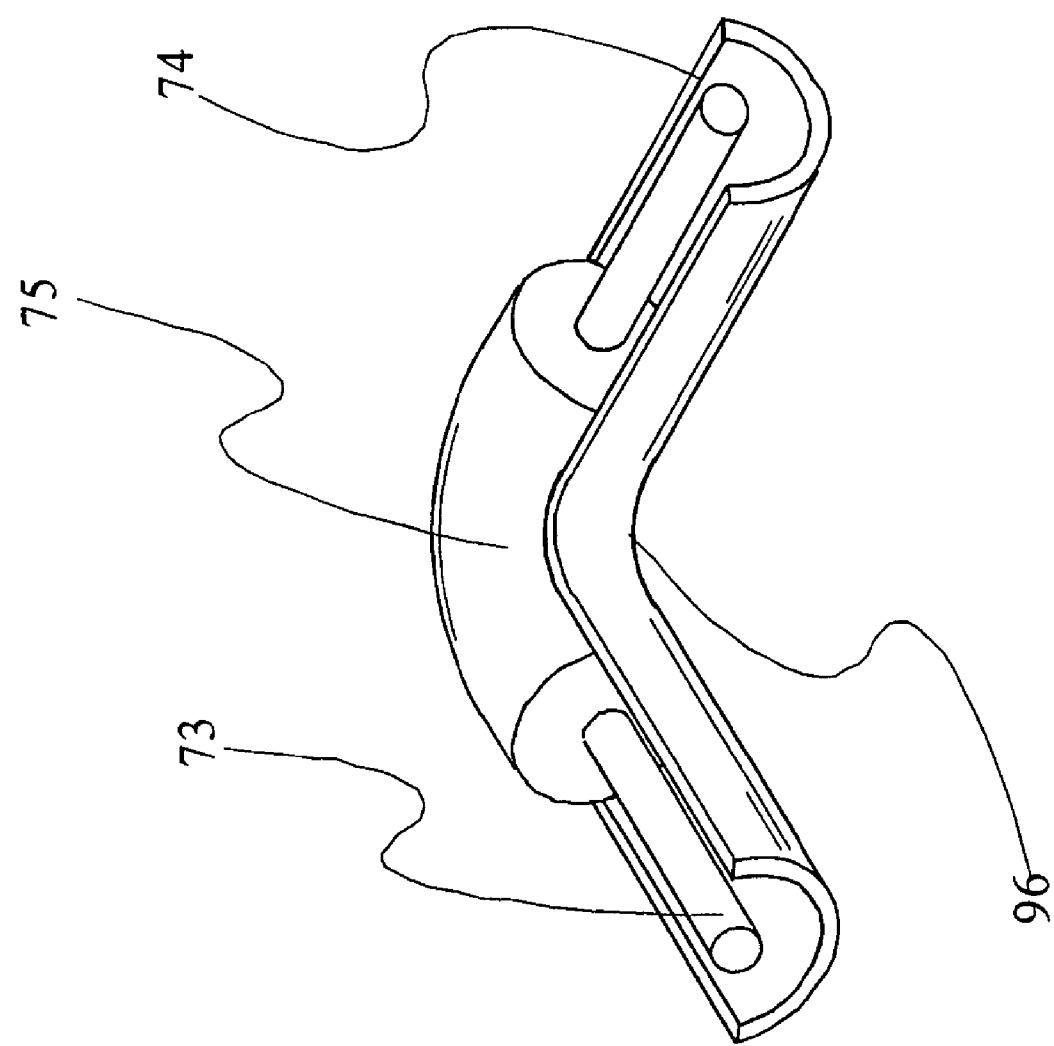
FIG. 13 is a partial cutaway view of a portion of the sensor illustrating a bend in the sensor.

Spacers 75, in addition to their use in a straight portion of the rod and tube assembly as shown in FIG. 6, are also placed in each of the bends 96. A partial cutaway view of a typical bend 96 is shown in FIG. 13. During assembly the spacers 75 are placed on the rod 73 and the rod 73 is inserted into a straight tube 74 with the spacers located at each position where the tube 74 will be bent. The tube 74 is then bent at spacer locations using conventional tubing benders and the rod 73 is also forced to bend by virtue of the spacer 75. The spacers 75 are formed from extruded plastic tubing and are slightly smaller in diameter than the tube 74. The internal diameter of the spacer 75, however, is such as to require a press fit onto the rod 73. Thus, the spacers 75 are held firmly on the rod 73 as the rod 73 is inserted into the tube 74. Spacers 75 used in the bends are typically about 3 inches long used with a 0.5 inch tube and a one inch bend radius. Note, typically a substantially thinner tube is used sometimes as small as ⅛ inch in diameter.

In a typical large tube assembly, the tube outside diameter is approximately 0.5 inch and the wall thickness approximately 0.035 inches and in a small tube assembly, the outside diameter is approximately 0.25 inches and the wall thickness is about 0.02 inches. The large tube design is used when there is no convenient structure to mount the sensor against and it is vulnerable to abuse, while the thin or small tube design is used when it can be mounted nearly flush against the radiator support, for example, or in a protected location such as inside of the vehicle door.

Figure 14:
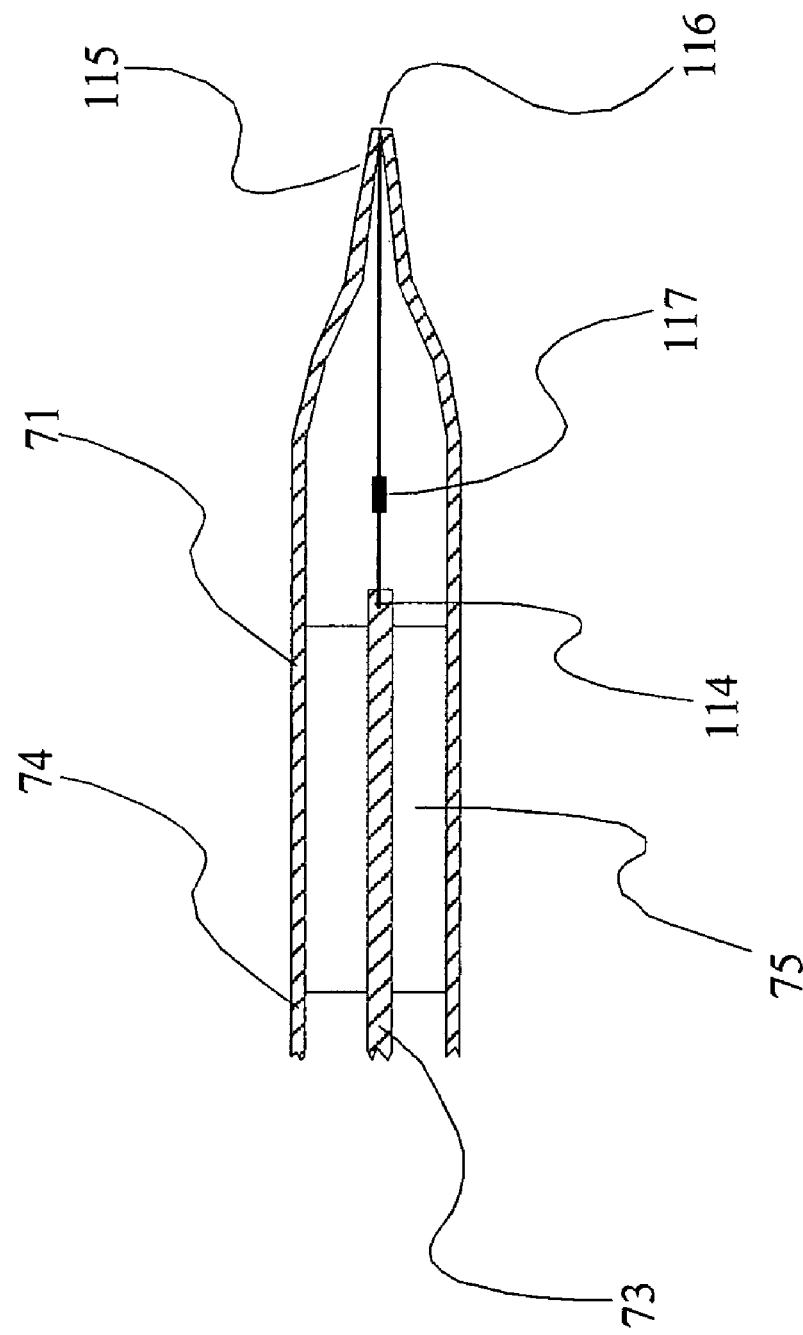
FIG. 14 is a cutaway of the sensor end showing the welded seal.
Figure 15:
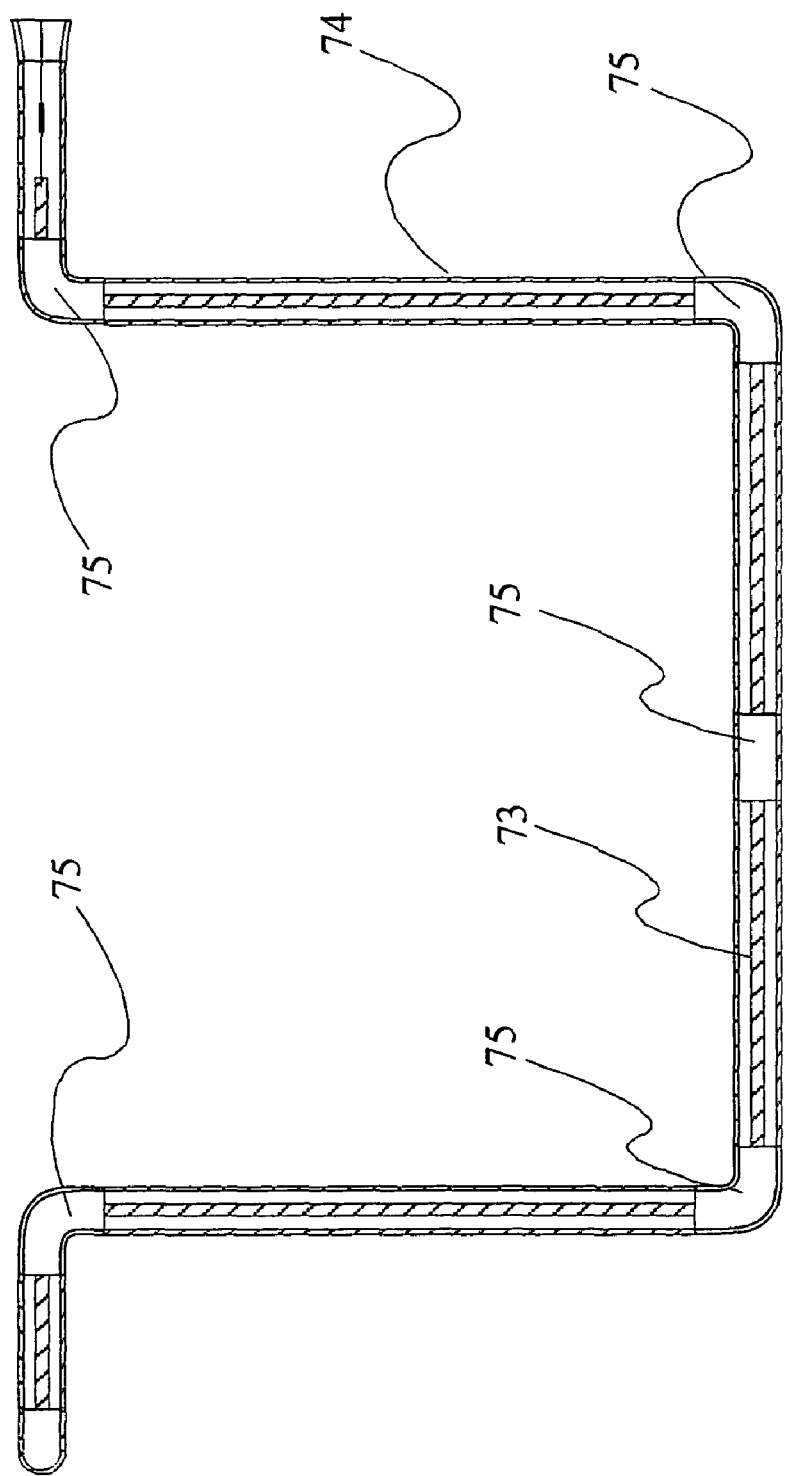
FIG. 15 is a view of the sensor of FIG. 5 with part of the tube and rod cut away illustrating the positioning of spacers within the sensor and their use to change the sensitivity of the sensor to deformation.

The end 71 of the sensor 70, which does not have the header/connector 72, is welded closed as shown in FIG. 14. An impedance such as a resistor 117 is placed across the contacts in the sensor 70 to create the reflection at the end on the sensor 70. This is accomplished as shown in FIG. 15 by attaching a resistor 117 to an end 114 of rod 73 and to an end 115 of the tube 74. The end 115 is formed by squeezing the tube 74 in the appropriate set of die which gradually taper and flatten the tube 74, squeezing the end of resistor 117 and closing off the tube 74 with a straight line seal. The end of this seal, 116, is then TIG welded using conventional equipment to assure a hermetic seal.

FIG. 15 is a view of the sensor of FIG. 5, with half of the tube 74 and rod 73 removed but showing complete spacers 75, taken along lines 12-12 and showing the location of all of the spacers 75 and the rod 73 and tube 74.

A typical length of the span between spacers 75 for the vertical portions 84 and 85 of FIG. 5 is approximately 10-15 inches. In this configuration, the rod 73 will actually deflect and contact the tube 74 during minor accidents and therefore in a preferred embodiment of the design, the tube 74 is filled with a damping material which is typically a viscous liquid or grease which has been formulated to operate over the required temperature range of from about −40° C. to about 125° C. This grease should have approximately the same dielectric constant as the plastic spacers 75 to minimize extraneous echoes. For the purposes of this disclosure, the term grease will be used to include all flowable materials having a viscosity between about 100 and about 100 million centipoise. This would include, therefore, all silicone and petroleum and other natural and synthetic oils and greases in this viscosity range.

Figure 16:
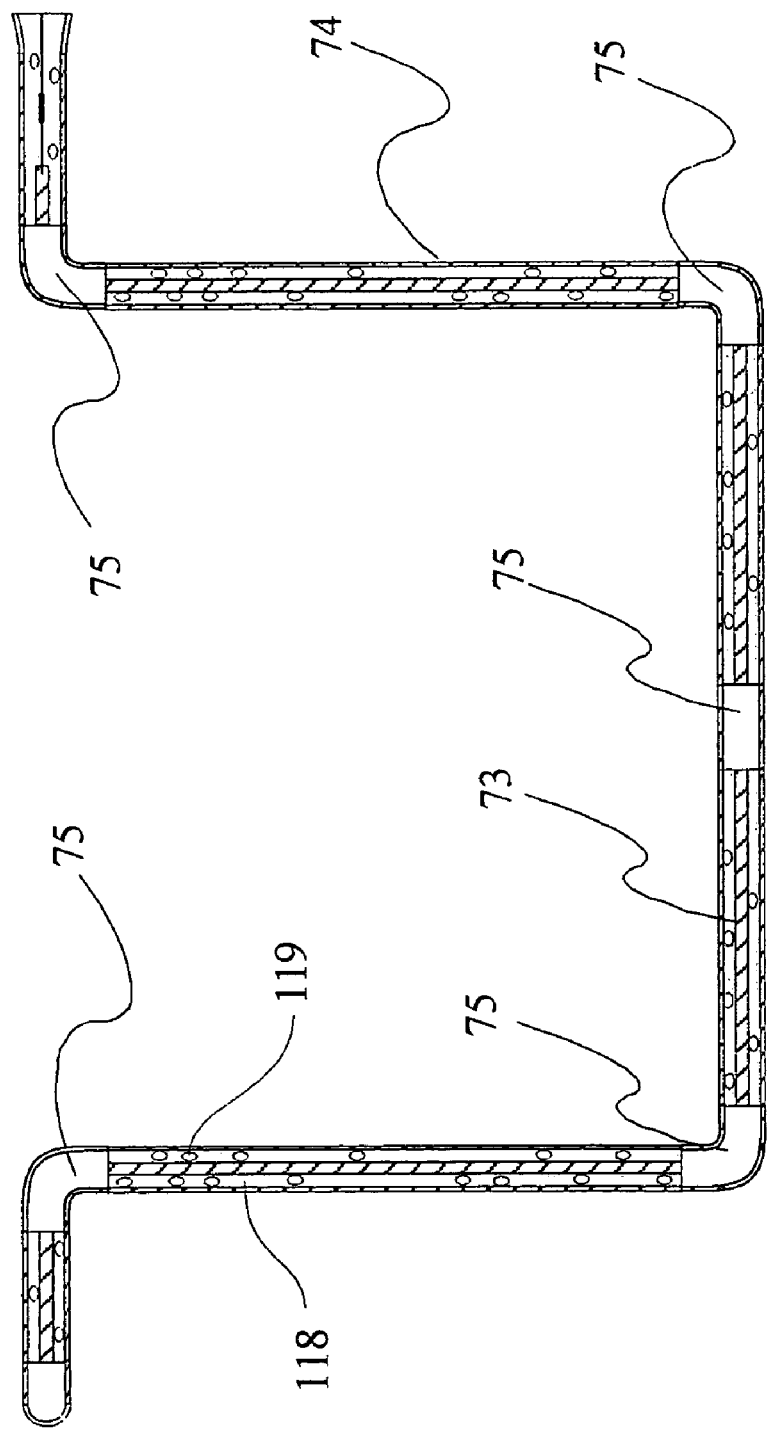
FIG. 16 is a view of the sensor of FIG. 5 with portions of the tube and rod cut away illustrating the use of a grease to fill the cavity between the rod and tube to minimize the effects of vibration and to protect the surfaces of the conductors from corrosion.
Figure 17:
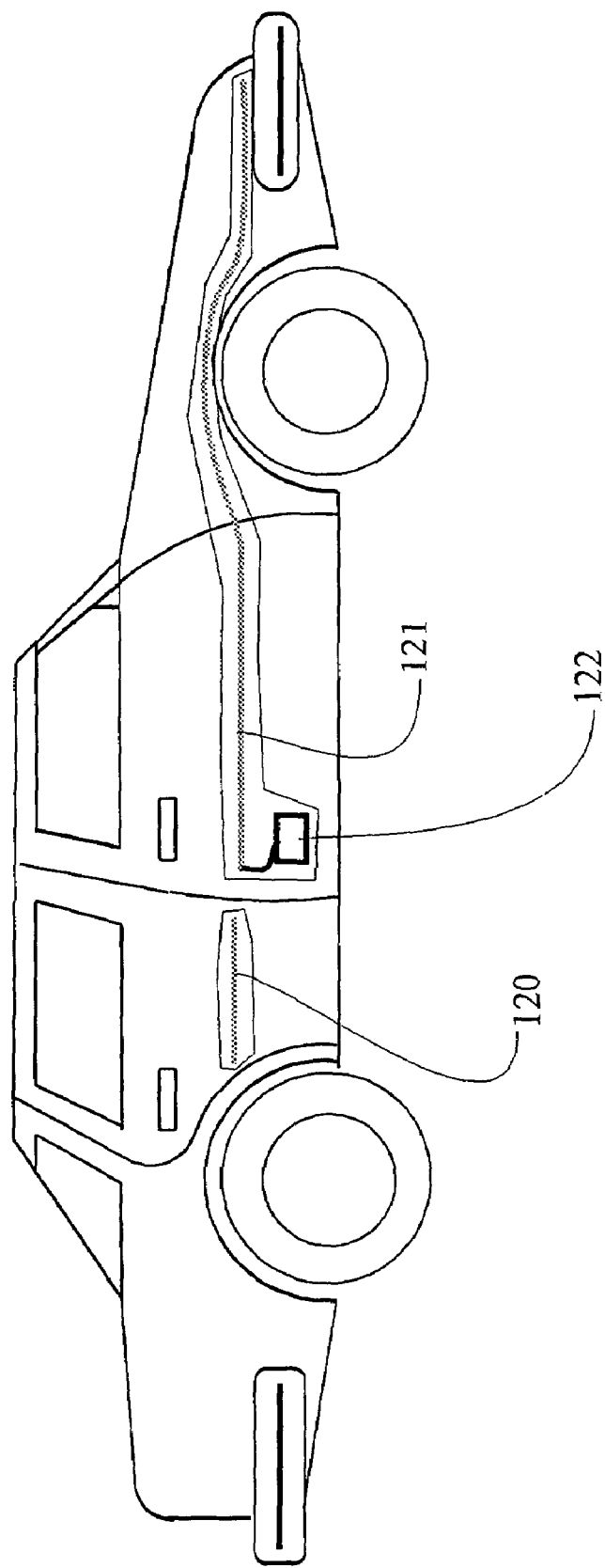
FIG. 17 is a side view of another preferred embodiment of a sensor in accordance with the invention shown mounted on a vehicle in a position to sense both frontal and side impacts, with portions of the vehicle removed to permit viewing of the sensor.

This grease 118 is shown in FIG. 16 where half of the tube 74 has been removed to show the grease 118 filling substantially the entire tube 74. Small voids 119 are intentionally placed in the grease 118 to allow for differential expansion between the grease 118 and the tube 74 due to variations in temperature. When grease 118 is used, small channels, not shown, are provided in the spacers 75 to permit the grease to flow past the spacers as the sensor is pumped full of the grease.

The sensor described and illustrated above is designed to catch all impacts to the vehicle regardless of where they occur providing the sensors are properly located. For frontal and rear impacts, the severity of the crash required to cause sensor triggering is determined by the amount of crush of the vehicle at each location which is necessary to cause the sensor to experience a measurable and timely velocity change. The amount of crush necessary to transmit this velocity change to relative motion of the rod in the tube at any location can be varied arbitrarily by the distance the sensor is located from the front or rear of the vehicle, by the location and characteristics of spacers in the sensor and/or by the location and characteristics of the supports that are used as discussed above.

Steel has been used for the materials for the rod and tube for a preferred embodiment described herein. The tube 74 is in an annealed state to promote easy forming to the required shape and to promote deformation during the crash. The rod 73, on the other hand, is typically hardened so as to maintain its spring temper and promote good positioning with the tube 74 when the combination is bent. The outside of the sensor 70 is coated with a protective coating to prevent it from rusting during the estimated 10 year life of the vehicle. The interior surfaces are coated with grease to prevent corrosion in those cases where the entire sensor in not filled with grease. Naturally, other materials such as aluminum, brass or even plastic with an electrically conductive surface coating could be used for the rod and tube.

The rod and tube described above, for the large tube design, have been designed to require approximately fifty to one hundred pounds of force in order to cause the sensor to significantly bend. This is to minimize the chance of inadvertent deployment during routine vehicle maintenance. For cases where the sensor is in a protected location, the small tube design typically uses about a 0.25 inch diameter tube with about a 0.0625 inch diameter rod.

Once the crush velocity sensor of the present design bends significantly to where the rod 73 contacts the tube 74, it remains latched in the conductive state for the duration of the crash. This important feature as discussed in detail in the above-referenced patent applications, guarantees overlap between the triggering of the crush zone sensor and the passenger compartment mounted arming sensor when used for frontal and rear impacts.

The sensor described and illustrated herein can use an impedance such as a resistor. In contrast to many sensor designs, monitoring of the entire functioning of the sensor continuously occurs with the crush velocity sensor of this invention. The driving and control electronics can continuously transmit waves into the sensor and monitor the reflections that are returned. Thus, if there is a broken connection for example, the system will not get the expected return and can signal to the airbag system to display a fault.

The tube of the sensor described herein can be electrically grounded to the vehicle. In some applications, it may be desirable not to ground the outside of the tube in which case, the tube might be surrounded by an insulating plastic tube. The use of a grounded outer tube has the advantage of providing shielding from electromagnetic radiation for the rod and thus minimizing the chance of an inadvertent signal reaching the electronic sensor, for example, as the vehicle passes through strong electromagnetic fields.

A primary advantage of the sensor described herein is its coaxial design that permits arbitrarily shaping of the sensor to adapt the sensor to a particular vehicle and to a particular place on that vehicle. There are, of course, other designs that could also be arbitrarily shaped including, but not limited to, tubes having a square, elliptical or triangular cross-section. All of these and similar geometries are considered tubes for the purpose of this invention. Similarly, the rod can take on a variety of shapes without departing from the teachings of this invention. In particular, the rod can also be a tube which has advantages in minimizing the effects of vibration. The rod need not be round and can be triangular, elliptical, square or even ribbon-shaped. All of these geometries are considered rods for the purposes of this invention.

Another key feature of this invention is that, when the sensor is properly mounted on the vehicle, plastic deformation of the tube generally occurs prior to triggering of the sensor and always occurs in a crash where the deployment of the airbag is required. As discussed above, this results in the sensor latching closed during the crash but it also prevents it from being reused on the same or another vehicle. In an alternate configuration, the dimensions of the rod and tube and the material properties are chosen so that the sensor can be caused to trigger with sufficient force without causing plastic deformation. This usually permits a more accurate estimation of the crash velocity.

The use of grease to dampen the motion of one or more of the parts of a crash sensor has been disclosed herein. Other crash sensor designs, and particularly crush switch sensor designs, could also make use of a grease to surround and dampen the motion of one or more of the internal parts of the sensor.

The hermetic sealing system disclosed herein has permitted use of an integral header/connector thus eliminating the need for the pigtail and substantially reducing the cost of airbag sensors for frontal mounting in the "splash zone". Naturally, now that this system has been disclosed other applications of this system to other types of crash sensors will become obvious to those skilled in the art.

In another implementation, the crash velocity can be determined through the use of two crush switch crash sensors. If two sensors of the type disclosed above are mounted on a vehicle with one closer to the front than the other, then, during a crash, the forwardmost sensor will trigger first followed by the second, more rearward sensor. If the spacing between the sensors is known, an estimate of the crash velocity can be obtained by measuring the time between switch closures. In this manner, the use of two switches can be used to determine the crash velocity.

This concept can be further improved if the phase measurement system of this invention is added. In this case, therefore, the location of the contact will be determined in each crush switch and then the velocity determined as discussed above. This is another method of obtaining both the velocity change and the location of the impact and is perhaps more accurate that the single sensor system. Naturally, this concept can be applied using other technologies where the impact with a sensor can be determined. If the sensor contains distributed piezoelectric material, for example, an impact will send a voltage spike to the evaluation circuitry.

For cases where actuation by bending of the sensor is not required and the sensor can be configured to reliably be impacted during the crash, a coaxial cable design is appropriate. In this case, a cable is selected which will deform under a 10 to 500 pound load in a manner such that the impedance change that occurs during the deformation can be measured. Since in most cases, the resisting deformation force is small compared with the crush forces of an accident, an appropriately mounted cable should provide an accurate measurement of the crash velocity. Such a sensor can be configured such that a single sensor will sense crashes from near the B-pillar on the driver side, across the entire front of the vehicle to near the B-pillar on the passenger side as shown as 121 in FIG. 17. The sensor would thus have a substantially U-shaped portion and would extend substantially completely across the front doors between longitudinal edges of the doors.

In one embodiment, an electronic control module 122 including a processor is mounted in the passenger door and feeds electromagnetic waves, generated by an electromagnetic wave generator, having a wavelength on the same order as the length of the coaxial cable into cable 121. A similar sensor can also be used for the rear doors as shown at 120, and would thus extend substantially completely across the rear doors between longitudinal edges of the doors. This device acts like a time domain reflectometer. That is, the magnitude and location of any changes in impedance are measured. A change in impedance can be related to the magnitude of the crush of the cable and thus by successive measurements of the change in impedance, the crush velocity can be determined by a processor, possibly embodied in the control module 122. In this case, the outside conductor of the coaxial cable is grounded and the interior conductor acts as an antenna. The cable is terminated in the driver door with an impedance-matching resistor to complete the assembly.

The use of a coaxial cable and time domain reflectometry was discussed above. Another possible method is to use light and a fiber optic cable. In a simple implementation, Abacus Optical Mechanics of Oxnard, Calif., has demonstrated how a fiber optic cable is it is distorted can restrict the passage of light and that this effect can be used to measure acceleration, pressure etc. If this device is fed with modulated light, then perhaps the location of the disturbance along the fiber can be determined.

Another embodiment of the invention uses parallel strips of conductive material and is sometimes referred to as a tape switch sensor and is described in detail in the above-referenced patents and therefore will not be repeated herein.

Knowledge of the location of the impact, e.g., as detected using the coaxial cable sensor described above, can be used to enhance and improve the effectiveness of an occupant restraint system. For example, if an algorithm is used to control the deployment and operation of occupant restraint devices, the algorithm can be designed to consider the location of the impact, e.g., by factoring in the location of the impact when determining which airbags to deploy and the inflation of those airbags. In some crashes, it might be the case that only the side airbags are deployed if the crash location is along the side of the vehicle. On the other hand, it might be the case that only the front airbags are deployed if the crash location is in the front of the vehicle. Of course, both the front and side airbags could be deployed if such deployment is warranted by the impact location.

In order to prevent seismic sensors, such as the ball-in-tube or accelerometer-based sensors, from rotating in a crash, it has become common to increase the strength of the radiator support or other structure on which the sensor is mounted. The sensor mounting bracket, however, must then permit the sensor to move relative to this structure, complicating the bracket design, or this structure must be weakly attached to the remainder of the vehicle so that the whole assembly will move in the crash. This added structural strength adds weight to the vehicle and is not needed for the sensor of this invention. It is even desirable for the sensor of this invention to be mounted on weaker structural members in order to enhance the chance for the structure to deform especially in soft crashes. The use of the rod-in-tube, coaxial cable, tape switch or other elongate sensor of this invention, therefore, results in a weight saving for the vehicle that is very important with the increasingly stringent fuel economy standards mandated by the U.S. Government.

Operation of the crush zone crash sensor of this invention, as well as all others, can be critically affected by the material which is located between the sensor and the front of the vehicle and the geometry of this material as it crushes and comes back to strike the sensor. The sensors of the present invention are considerably more tolerant to variations in the geometry of this material for two reasons. Considering the compression mode, the length of the sensor can be increased so that the probability of it being impacted is very high.

Alternately, in the bending mode, the sensor can be attached to two portions of the vehicle that are likely to experience relative motion during the crash. In this latter case, the two portions of the vehicle effectively become extensions of the sensor. In some cases, the radiator support structure is designed so that it will always deform at a particular location with the result that the sensor can be quite short since the entire radiator structure becomes an extension of the sensor. In other cases, such a location is not readily available and the sensor must be made longer to guarantee that it will be bent or compressed in a crash by crushed material coming from areas further forward in the vehicle.

The use of crush initiators is becoming increasingly common in vehicle design. These usually take the form of a hole, wrinkle, notch or bend intentionally placed in a structural member to cause the member to bend in a particular manner during a crash. As the sensor of the present invention is adapted to a particular vehicle, the use of crush initiators to control the manner in which the member, on which the sensor is mounted, bends will result in a shorter and more reliable sensor. Additional, usually minor, design modifications can also be used to permit the sensor to be mounted in protected locations so as to minimize the chance of sensor damage during vehicle maintenance.

The force required to cause sensor closure is an important design parameter of the sensor of this invention. In one typical design configuration, a 20 pound force on the sensor is required to move the front contact strip toward the rear member sufficiently to permit a velocity to be measured. This force is sufficient so that it is unlikely for the sensor to inadvertently provide a velocity indication sufficient to cause airbag deployment during vehicle maintenance, stone and some animal impacts and yet, this force is quite low compared to the forces typically experienced during even marginal crashes.

The angle required to cause sensor closure is also an important parameter of the sensor of this invention. In one typical design configuration, a 15 degree bend angle of the sensor is required to move the front contact strip toward the rear member sufficiently to cause a false velocity reading indicative of a crash in the bending mode. This angle is sufficient so that it is unlikely for the sensor to inadvertently close during vehicle maintenance, stone and some animal impacts and yet, this angle is quite low compared to the relative displacements and the angles that will occur in a sensor mounted on two locations which typically move relative to each other in even marginal crashes.

Also disclosed above is a vehicle crush detecting device in combination with a vehicle which comprises a sensor assembly consisting of a first elongated electrical conductor, a second elongated electrical conductor, and a coupling mechanism for coupling the second electrical conductor to the first electrical conductor so that the first and second electrical conductors are parallel and substantially co-extensive to each other and thereby form the sensor assembly. The coupling mechanism insulates the second electrical conductor from the first electrical conductor. An attachment mechanism attaches the sensor assembly to the vehicle at at least two spaced apart positions. In use, when a portion of the vehicle crushes to contact the sensor assembly in the span between the at least two spaced apart locations, the sensor assembly crushes at the contact location causing the first electrical conductor to approach the second electrical conductor and the impedance therebetween changes as described above. The coupling mechanism may comprise a header/connector assembly at one end of the sensor assembly.

The first conductor may be a tube, which is preferably deformable, and the second conductor may be a rod arranged in the tube. An insulating mechanism, e.g., round spacers, are positioned at at least two points between the first and second conductors for insulating the first conductor from the second conductor. The spacers extend only at discrete locations circumferentially between the first and second conductors. The first conductor may also be the outer conductor of a coax cable and the second conductor may be the inner conductor. The sensor assembly may be attached to the vehicle in a front region of the vehicle so as to detect crush velocity of the front region of the vehicle or at a rear of the vehicle so as to detect crush velocity of the rear of the vehicle. Also, the sensor assembly may be attached to the vehicle on a side of the vehicle so as to detect crush of the side of the vehicle. In this case, the sensor assembly can have an elongate portion attached in a position substantially parallel to a door panel in a door on the side of the vehicle.

The header/connector assembly hermetically seals a space between the first and second conductors at one end thereof while the space between the conductors at the opposite end is closed. The header/connector assembly includes electrical connector pins electrically coupled to the first and second conductors and which have an exposed portion. The header/connector assembly also has a housing having an inlet port, a dam in the space between the first and second conductors and urethane or a silicone rubber compound around the ends of the first and second conductors. Header pins are connected to the first and second conductors and to the connector pins.

Moreover, disclosed above is a method for sealing a rod-in-tube device for mounting on a vehicle which comprises the steps of providing the device with a cavity having at least one inlet port and at least one narrow outflow passage, injecting a curable compound through the inlet port(s) such that each narrow passage remains open during the injection process until the cavity is substantially full permitting air within the cavity to be displaced by the curable compound and curing the compound. Each passage is sufficiently narrow as to permit only a small amount of rubber compound to flow out of the cavity during the injection process, but large enough to permit air to easily flow out of the assembly.

When the device is a crush velocity detecting sensor in accordance with the invention comprising an electrically conductive tube and an electrically conductive rod arranged within the tube and spaced therefrom, the cavity is formed at least partially between the tube and the rod. Also, a plurality of cavities can be formed between discrete regions of the tube and the rod, separated by means of spacers, and connected through an aperture in the spacers to enable the injected curable compound to flow into each of the cavities.

The crush sensing crash sensor of this invention is ideally adapted for installation in the forward part of the crush zone for frontal, side and rear impacts of automobiles equipped with one or more inflatable passenger protective airbags. When the vehicle is subjected to a crash of sufficient magnitude as to require the deployment of the passive protective device, a portion of the vehicle is crushed until it contacts the sensor. At least a portion of the sensor deforms by bending or crushing due to the forces exerted on it by the material contacting it. In a preferred embodiment, the sensor is constructed from a long rod and a tube with the rod positioned in the center of the tube by means of insulating spacers or as a coaxial cable. When the tube bends, the spacing of the rod between the spacers approached the tube at a velocity that is representative of the crush velocity, which can be measured by the change in impedance between the rod and tube.

The rod and tube assembly can be formed in any convenient geometry, as discussed above, during manufacture so as to conform to the possible mounting locations in the crush zone of the vehicle. In this manner, the sensor is placed in the proper position to catch all crashes to the vehicle for which it was designed regardless of where on the vehicle the impact takes place.

Other embodiments of the vehicle crush velocity detecting device in accordance with the invention include an electrically conducting, deformable tube, an electrically conducting rod positioned within the electrically conducting tube; and insulating means positioned at at least two points between the rod and the tube to insulate the rod from the tube. When the tube is deformed or bent by a force greater than a predetermined magnitude, e.g., by the crush of the vehicle proximate to or at the location at which the device is placed, it is forced to move closer to the rod. In a similar manner, the outer conductor of a coaxial cable is forced to move closer to the inner conductor.

In use as a side impact crush velocity measuring system in order to deploy an occupant protection apparatus for protecting an occupant in a side impact, the device is mounted in a position at the side of the vehicle so as to detect crush velocity of the side of the vehicle and includes means for coupling the crush velocity detecting device and the occupant protection apparatus such that upon a threshold crush velocity the occupant protection device is deployed. To this end, the crush velocity detecting device has an elongate portion mounted in a position substantially parallel to a door panel in a door on the side of the vehicle.

In another embodiment, the vehicle crash velocity sensor system comprises a crush velocity detecting device changeable from a higher impedance position indicative of a non-crush situation and a lower impedance position. indicative of crush of a portion of the vehicle proximate to the device; and an electronic sensor coupled to the crush velocity detecting device and comprising an accelerometer, and means coupled to the accelerometer, e.g., a microprocessor having an algorithm, for initiating deployment of the occupant protection device based on a velocity change of the crush detecting device and an analysis of output from the accelerometer indicative of a situation in which deployment of the occupant protection device is desired.

The crush velocity detecting sensor may comprise an electrically conducting, deformable tube; an electrically conducting rod positioned within the electrically conducting tube and insulating means positioned at at least two points between the rod and the tube to insulate the rod from the tube. It may also comprise a coaxial cable having an outer and an inner conductor.

Furthermore, disclosed above is a method for sealing a device for mounting on a vehicle, e.g., the crush velocity detecting device, comprising the steps of: assembling the device creating an enclosed cavity therein, injecting an uncured rubber compound through at least one inlet port of the cavity in such a manner that at least one narrow passage leading from the cavity to an exterior thereof remains open during the injection process until the cavity is substantially full permitting air within the cavity to be displaced by the rubber compound and curing the rubber compound The passage is sufficiently narrow as to permit only a small amount of rubber compound to flow out of the assembly during the filling process, but large enough to permit air to easily flow out of the assembly. When the device is a crush velocity detecting sensor, it may comprise an electrically conductive tube and an electrically conductive rod arranged within the tube and spaced therefrom in which case, the cavity is formed between the tube and the rod. Also, it is possible to form a plurality of cavities between discrete regions of the tube and the rod, separating the cavities by means of spacers, and connecting the cavities through an aperture in the spacers to enable the injected uncured rubber compound to flow into each cavity.

More particularly, disclosed above is a vehicle crush detecting device in combination with a vehicle comprising an electrically conducting, deformable tube, an electrically conducting rod positioned within the tube, insulating means positioned at at least two points between the rod and the tube for insulating the rod from the tube and an attachment mechanism for attaching the tube to the vehicle at at least two spaced apart locations to provide at least one free, unrestrained span of the tube between the at least two spaced apart locations which is spaced away and not in contact with any portion of the vehicle. When the tube is deformed by a force greater than a predetermined magnitude during crush of the vehicle, the tube approaches the rod in response to the crush of the vehicle thereby, through monitoring electronics, the velocity of the crash can be determined.

The rod and tube in the sensor may be unitary and the rod may substantially solid. The insulating means may comprise spacers extending circumferentially about the rod only at discrete locations in the tube.

A mounting mechanism may be provided for mounting the crush detecting device in a front, side and/or rear regions of the vehicle so as to detect crush of the vehicle in any of these regions. If the vehicle includes a deployable occupant protection apparatus for protecting an occupant in a side impact, a mounting mechanism may be provided for mounting the crush detecting device in a side of the vehicle so as to detect the crush velocity of the side of the vehicle. Also, the crush detecting device is coupled to the occupant protection apparatus such that upon completion of the electronic circuit, the occupant protection device is deployed. An electromechanical sensor having a moving mass or an electronic sensor can be coupled to the crush velocity sensor. The crush velocity detecting device may have an elongate portion mounted by the mounting mechanism in a position substantially parallel to a door panel in a door on the side of the vehicle.

In another embodiment of the invention disclosed above, the vehicle crush detecting device in combination with a vehicle comprises an electrically conducting, deformable tube containing grease, an electrically conducting rod positioned within the tube and an insulating mechanism positioned at at least two points between the rod and the tube for insulating the rod from the tube. When the tube is deformed by a force greater than a predetermined magnitude during crush of the vehicle, it moves toward the rod during which time the crash velocity can be determined. Later, it can contact the rod and thereby completing an electric circuit indicative of crushing of the vehicle. The tube is not completely filled with grease such that a few small voids are present in the tube to allow for differential expansion between the grease and the tube.

In another embodiment of the invention disclosed above, a vehicle crush velocity detecting device in combination with a vehicle comprises an elongate, electrically conducting, deformable tube, the tube having an inner circumferential surface and an outer circumferential surface, an elongate, electrically conducting rod positioned within the tube and having an outer circumferential surface, an attachment mechanism for attaching the tube to the vehicle at at least two spaced apart locations to provide at least one free, unrestrained span of the tube between the spaced apart locations which is spaced away and not in contact with any portion of the vehicle and an insulating mechanism positioned at at least two longitudinal points between the rod and the tube for insulating the rod from the tube. The insulating mechanism is arranged to separate the entire outer circumferential surface of the rod from the entire inner circumferential surface of the tube around the entire outer circumference of the rod. As such, the tube is deformable by the crush of the vehicle about its entire circumference into contact with the rod.

When the tube is deformed by a force greater than a predetermined magnitude during crush of the vehicle, it approaches the rod at a velocity indicative of the crash velocity which is measured by appropriate electronic circuitry and then contacts the rod thereby completing an electric circuit indicative of crushing of the vehicle.

In one preferred embodiment of the invention, an elongate sensor such as a coaxial cable stretches from the driver side door near the B-pillar through the A-pillar, across the front of the vehicle and into the passenger side door. A signal having a frequency on the order of about 10 megahertz is imposed on the cable, which frequency is selected so that approximately the cable is approximately one wavelength long (thus the frequency could vary depending on the length of the cable). The cable is terminated at the far end with a known resistance. Under normal operation, the wave travels down the cable and reflects off of the end and returns in phase with the transmitted pulse. If, however, the cable is compressed along its length a reflected wave will be returned that is out of phase with the transmitted wave.

By comparing the phase of the reflected wave with the transmitted wave, the location of the compression can be determined and by comparing the magnitude of the reflection, the amount of compression can be determined. By measuring the amount of compression over time, the velocity of compression can be found. Thus, the location of the impact and the crush velocity (which can be considered a function of the velocity of compression) can both be determined by this sensor for both side and frontal impacts. A similar sensor could be designed for use in sensing side and rear impacts.

More generally, a crash sensor arrangement for determining whether the crash involving the vehicle requires deployment of the occupant restraint device comprises an elongate sensor arranged in the crush zone to provide a variable impedance as a function of a change in velocity of the crush zone and a processor for measuring the impedance of the sensor or a part thereof at a plurality of times to determine changes in the impedance of the sensor or part thereof. The processor provides a crash signal for consideration in the deployment of the occupant restraint device based on the determined changes in impedance of the sensor or part thereof. The sensor can have a U-shaped portion extending along both sides of the vehicle and across a front of the vehicle, and thus substantially completely between opposed longitudinal edges of a door of the vehicle.

In the embodiment wherein the sensor comprises a coaxial cable, an electromagnetic wave generator generates electromagnetic waves and feeds the waves into the cable and the processor is preferably embodied in an electronic control module coupled to the electromagnetic wave generator. The electromagnetic wave generator preferably feeds electromagnetic waves into the cable having a wavelength on the same order as a length of the cable. In the alternative, the sensor can comprise parallel strips of conductive material spaced apart from one another in the absence of deformation of the crush zone and arranged to contact one another during deformation of the crush zone. The contact strips are positioned so as to be compressed during deformation of the crush zone whereby such compression causes changes in impedance of the sensor.

5. Anticipatory Sensing

Figure 18:
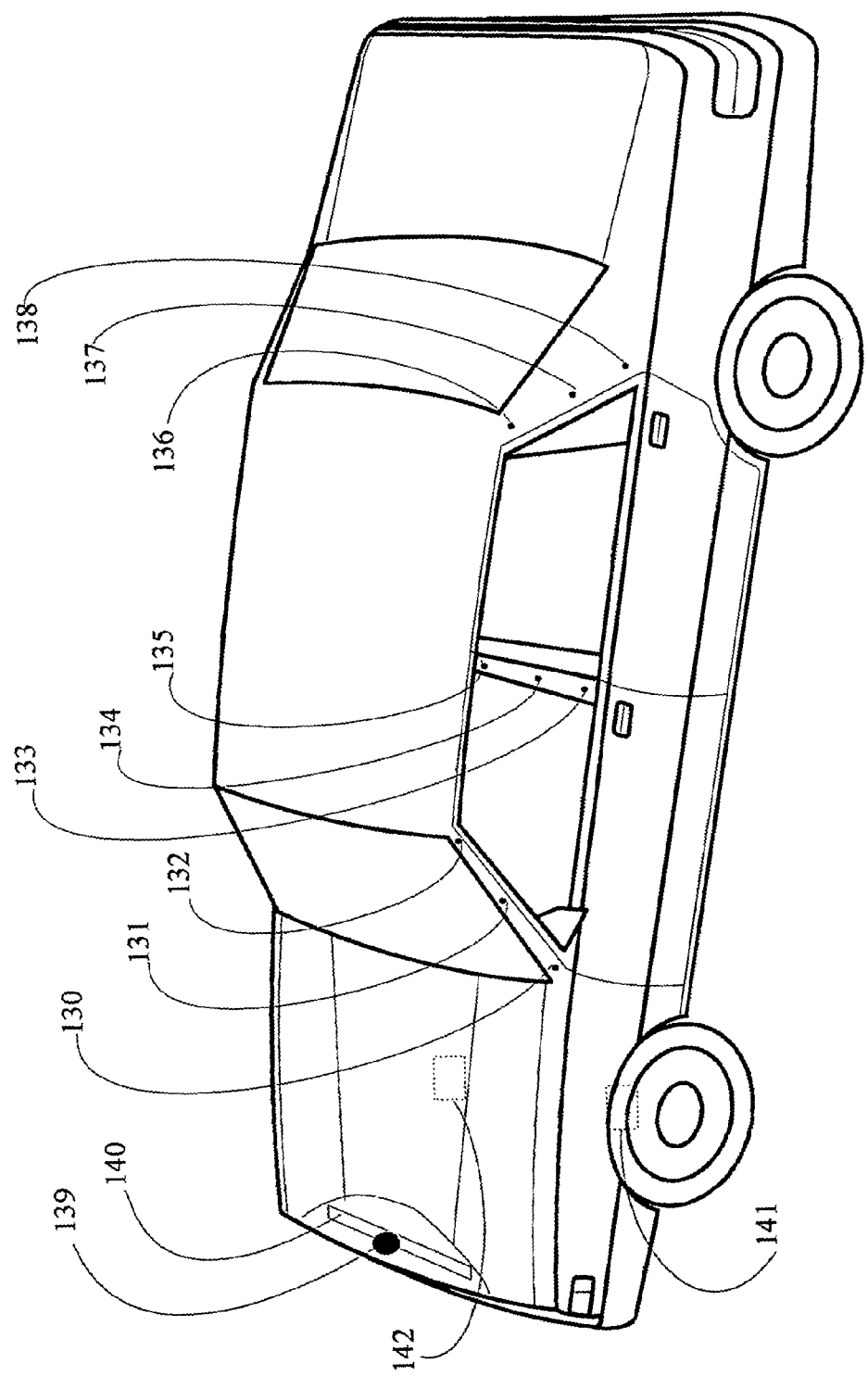
FIG. 18 is a perspective view of an automobile, as viewed partially from above, of a side impact anticipatory sensor system using the same computer as the single point crash sensor and also showing inputs from a front mounted crush zone sensor, an engine speed sensor, and an antilock braking system sensor.

FIG. 18 illustrates a side impact anticipatory sensor system, shown here including transducers 130-138 which are situated in different locations on one side of the vehicle, using the same or a different computer system or processor as discussed above, and coupled thereto by suitable means (the other side of the vehicle can be provided with the same arrangement as discussed herein). These transducers can provide the data to permit the identification of an object that is about to impact the vehicle at that side as well as its velocity. An estimate can then be made of the object's weight and therefore the severity of the pending accident. This provides the information for the initial inflation of the side airbag before the accident begins. If additional information is provided from the occupant sensors, the deployment of the side airbag can be tailored to the occupant and the crash in a similar manner as described above.

FIG. 18 also illustrates additional inputs that, in some applications, provide useful information in determining whether a side airbag should be deployed, for example. These include inputs from a front-mounted crash sensor 139 mounted on the vehicle radiator 140, an engine speed sensor 166, and a wheel speed sensor 141 as used in an antilock braking system sensor.

The use of anticipatory sensing, as described above and in U.S. Pat. No. 06,343,810 can be used in a Phase 4 Smart Airbag system. This can be done with the anticipatory sensor acting in concert with or in place of the accelerometer-based neural network crash sensor described above. In a preferred embodiment, both sensors are used with the anticipatory sensor forecasting the crash severity before the collision occurs and one or more accelerometer based sensors confirming that forecast. The mass of the impacting object, for example, can be anticipated and confirmed.

Collision avoidance systems currently under development use radar or laser radar to locate objects such as other vehicles that are in a potential path of the subject vehicle. In some systems, a symbol can be projected onto the windshield in a heads-up display signifying that some object is within a possible collision space with the subject vehicle. No attempt at present is made to determine what that object is and to display an image of the object. Neural network pattern recognition systems, as well as other pattern recognition systems, have that capability and future collision avoidance systems may need this capability. Naturally, as above, the same pattern recognition computer system that is proposed here for sensing crashes can also the used for collision avoidance pattern recognition as well as anticipatory sensing.

If a camera-based system is used for anticipatory sensing, an accurate image can be obtained of the bullet object and a neural network based classifier can identify what the object is. Unless stereo or other 3D camera systems are used, it is difficult to obtain the velocity and range on the bullet object from the camera image alone. On the other hand, if a scanning laser ranging system is used, the image quality is poor if a single scan line is used and improves with more scan lines but at the expense of increasing cost and complexity. A 6 sided polygon based rotating mirror scanner can provide 6 lines of scan and cover 60 degrees which is sufficient for frontal or rear impacts but probably not for side impacts where at least a 90 degree or 120 degree scan is preferred. Fortunately, a neural network can usually accurately identify an object from a few scan lines especially considering that the relative motion of the vehicles permits the system of really obtain more lines that the scanner produces in a single revolution. An alternate system is to use a modulated laser or other light source in a diverging beam mode and to either modulate the light and determine the nearest object and assume that it is a reflection from the bullet object or to use a Kerr or Pokel cell or equivalent as a range gating light valve to permit an image of the bullet object to be acquired along with its range. In the latter case, the Doppler shift can be used to determine the velocity of the bullet object.

Figure 19:
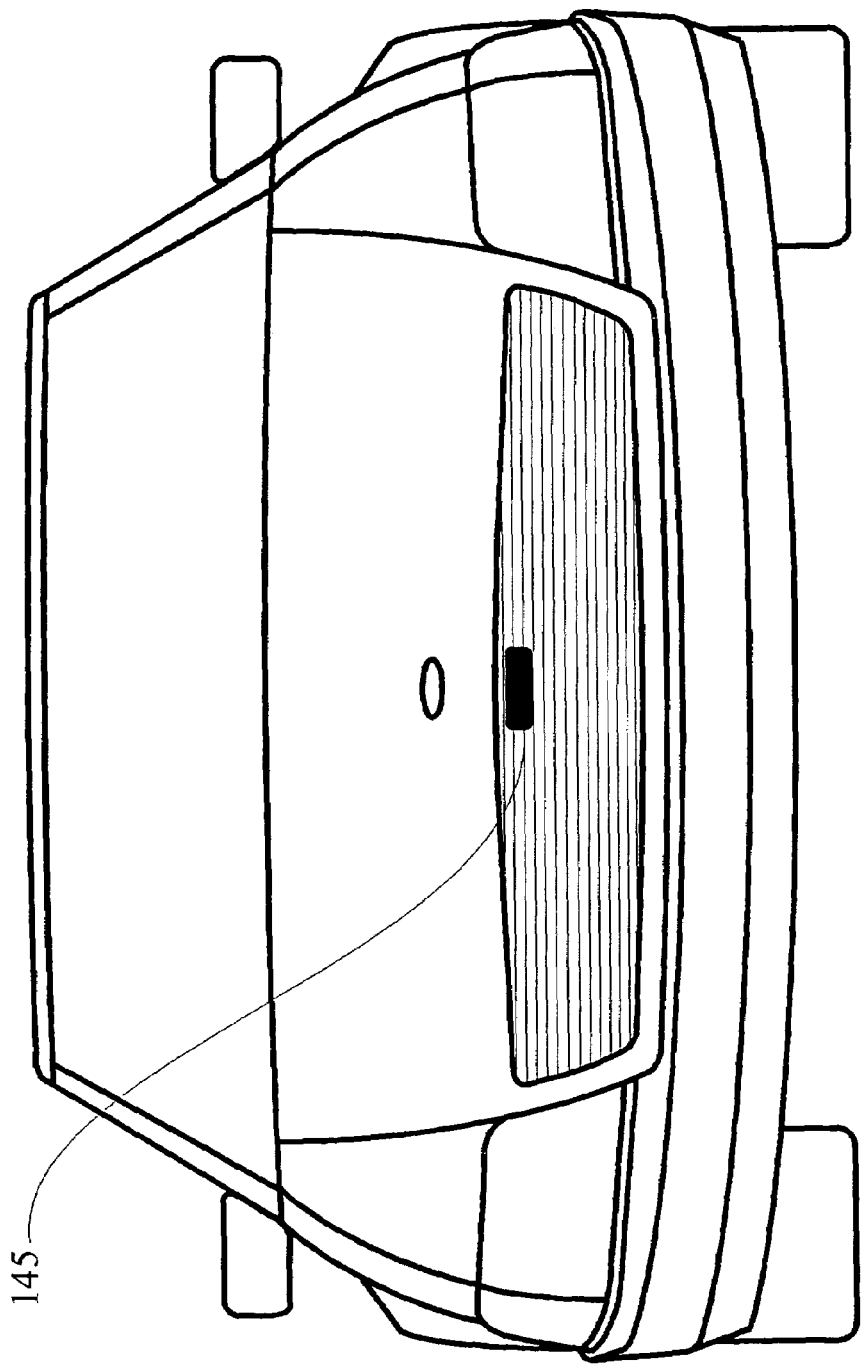
FIG. 19 is a frontal view of an automobile showing the location of an electromagnetic wave crash anticipatory or avoidance sensor which uses the same pattern recognition computer system as the crash sensor.

FIG. 19 is a frontal view of an automobile showing the location of an electromagnetic wave anticipatory or collision avoidance sensor 145 which can use the same neural computer system as the crash sensor discussed above and thus is coupled thereto. Previously, radar and laser radar systems have been developed for collision avoidance systems. It is noteworthy that no such systems have been fielded on a production vehicle due to the significant problems that remain to be solved. An alternate technology uses infrared electromagnetic waves and a receiver and processing system which both analyzes the image prior to illumination from the vehicle and after illumination to achieve more information. The image is then digitized and fed into a neural network for analysis.

Once an anticipatory sensor is in place, the data can also be combined with data from acceleration sensors and occupant sensors fed into the neural network system for the smart airbag. Even prior to the smart airbag system, pre-crash data can be combined with acceleration data and the acceleration data used to confirm the conclusions of the pre-crash sensor(s) with regard to mass of the striking object and the location of the impact. Thus, the data from the anticipatory sensor can be incorporated as soon as it is available to improve the airbag system.

As mentioned elsewhere here and in other patents of the current assignee, anticipatory sensors can also be used to identify the object that may be involved in a rear impact. In this manner, the driver would know if he or she is about to run over something as the vehicle is being operated in reverse and also what the object is. Thus, an image of that object can be made available on any convenient display, such as a heads-up display to the vehicle operator. This provides a clear view of objects in the rear of the vehicle that may sometimes be difficult to see in a video image. Naturally, anticipators sensors are useful when a vehicle is about to be impacted from the rear by another vehicle. Both the identity and the velocity can be determined and the seatbelts pretensioned, seats and headrests adjusted etc. to prepare the occupants for the impact.

Anticipatory sensors are most applicable for side impacts as discussed above. Another feature that becomes available is the possibility of using the seatbelt or another small, positioning airbag that would be inflated prior to the curtain airbag to prevent the head of the occupant from being trapped between the window frame and the curtain airbag. If an IMU, or equivalent sensor system, is available then the motion of an occupant's head can be projected and again action taken to prevent head entrapment. Naturally, if occupant sensors are also present that can visually or ultrasonically, for example, track the occupant's head then, coupled with appropriate acceleration sensors, the curtain airbag deployment timing can be made such that the occupant's head is not trapped. As mentioned above, a seatbelt pretensioner can also be designed to provide a force on the occupant to again prevent entrapment.

6. Sensor Combinations

If the passenger compartment discriminating sensor is of the electronic type, the triggering threshold can be changed based on the crush velocity as measured by the sensor of this invention in the crush zone. Passenger compartment sensors sometimes trigger late on soft long duration frontal crashes even though the velocity change is significantly higher than the desired deployment threshold (see, for example, Breed, D. S., Castelli, V. and Shokoohi, F. "Are Barrier Crashes Sufficient for Evaluating Air Bag Sensor Performance?", Society of Automotive Engineers Paper No. 900548, 1990). In such a case, the fact that the crush velocity sensor has determined that a crash velocity requiring an airbag is occurring can be used to modify the velocity change required for the electronic passenger compartment-mounted sensor to trigger. Thus, in one case, the passenger compartment sensor can prevent the deployment of the air bag when the velocity change is too low as in the animal impact situation discussed above and in the second case, the crush zone sensor can cause the discriminating sensor to trigger faster in a soft crash and minimize the chance of a late triggering condition where the occupant is out-of-position and in danger of being injured by the deploying air bag.

Figure 20:
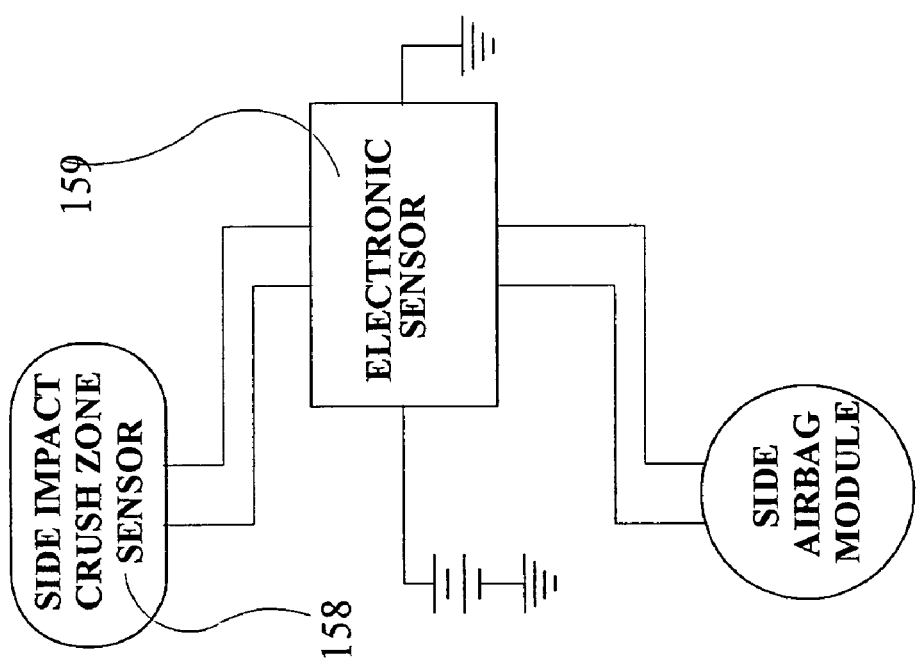
FIG. 20 is a circuit schematic showing a side mounted velocity sensor used with a non-crush zone mounted sensor.

FIG. 20 shows schematically such a circuit applied to side impacts where an electronic sensor 159 triggers deployment of the side airbag resident in a side airbag module and crush velocity sensor 158 is used as input to the electronic sensor 159. The electronic sensor could be mounted in the passenger compartment but designed with a very low threshold. Its purpose is to verify that a crash is in progress to guard against a hammer blow to the sensor setting off the airbag. In this case, the current carrying capacity of the crush sensor 158 can be much less and thinner wires can be used to connect it to the electronic sensor 159.

In one scenario, the electronic sensor may be monitoring an event in progress when suddenly the crush sensor 158 signals that the vehicle has crushed with a high velocity where the sensor is mounted. The electronic sensor 159 now uses this information along with the acceleration signal that it has been monitoring to determine the severity of the crash. The crush velocity sensor 158 informs the electronic sensor 159 that a crash of a certain velocity is in progress and the electronic sensor 159, which comprises an accelerometer and a microprocessor with a crash analysis algorithm, determines the severity of the crash based on the acceleration signal and the crush velocity.

If the acceleration signal is present but the crush sensor 158 fails to record that a crash is in progress, then the electronic sensor 159 knows that the acceleration signal is from either a non-crash event or from a crash to some part of the vehicle, such as in front of the A-pillar or behind the C-pillar where deployment of the airbag is not warranted. The A-pillar is the forwardmost roof support member on which the front doors are hinged and the C-pillar is the rearmost roof support pillar usually at or behind the rear seat.

Knowledge of the impact location, as detected using the coaxial cable sensor described above, can be used to alter the interpretation of the acceleration signal provided by the passenger compartment sensor, if such is deemed beneficial. This may provide an advantage in that a decision to deploy an occupant restraint device is made earlier than normally would be the case if the location of the impact location were not considered in the control of the occupant restraint devices.

If the passenger compartment discriminating sensor is of the electronic type, the triggering threshold can be changed based on the condition of the sensor in the crush zone. Passenger compartment sensors sometimes trigger late on soft long duration crashes even though the velocity change is significantly higher than the desired deployment threshold. See for example, SAE Paper No. 900548. In such a case, the fact that the crush velocity change sensor in the crush zone indicates that deployment of an airbag is required can be used to modify the velocity change, or other parameters, required for the electronic sensor in the passenger compartment to trigger. Thus, in one case, the passenger compartment sensor can prevent the deployment of the air bag when the velocity change is too low as in the animal impact and in the second case, the crush zone sensor can cause the passenger compartment sensor to trigger faster in a soft crash and minimize the chance of a late triggering condition where the occupant is out-of-position and in danger of being injured by the deploying air bag.

Figure 21:
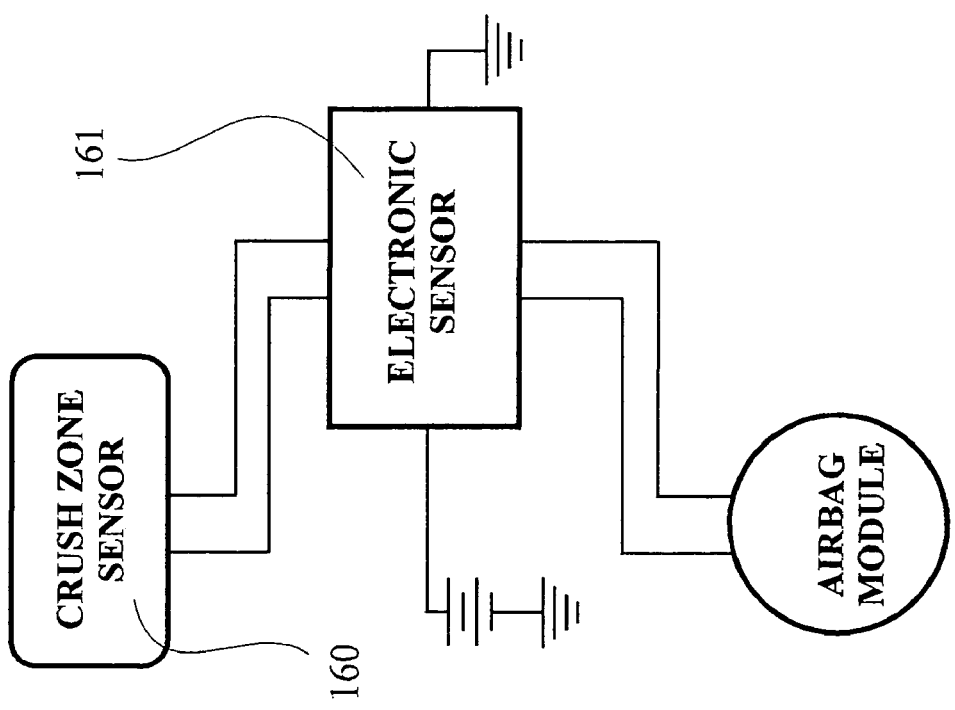
FIG. 21 is a circuit schematic showing a forward mounted sensor used as an input to an electronic sensor.

FIG. 21 shows schematically such a circuit where an electronic sensor 161 triggers deployment of the air bag and crush zone velocity sensor 160 is used as input to the electronic sensor 161. In this case, the current carrying capacity of the crush zone sensor 160 can be much less and thinner wires can be used to connect it to the electronic sensor 161. In one scenario, the electronic sensor 161 may be monitoring a crash in progress when suddenly the front crush zone sensor 160 signals that the vehicle crush zone is experiencing a high velocity change. The electronic sensor 161 now realizes that this is a soft, deep penetration crash that requires an air bag according to a modified algorithm. The conditions for deploying the airbag can be modified based on this crush velocity information. In this manner, the combined system can be much smarter than either sensor acting alone. A low speed offset pole or car-to-car underride crash are common real world examples where the electronic sensor 161 in the passenger compartment might trigger late without the information provided by the forward mounted crush zone sensor 160.

The crush zone sensor 160 can detect a reaction of the crush zone to the crash, e.g., crush of the crush zone, a velocity change of the crush zone or acceleration of the crush zone. That is, sensor 160 does not necessarily have to be one of the crush sensors disclosed above (or another sensor which triggers based on crush of the crush zone of the vehicle) but rather, can be designed to trigger based on other reactions of the crush zone to a crash, including the velocity change of the crush zone and the acceleration of the crush zone, as well as functions thereof (and combinations of any such reactions).

Figure 21A:
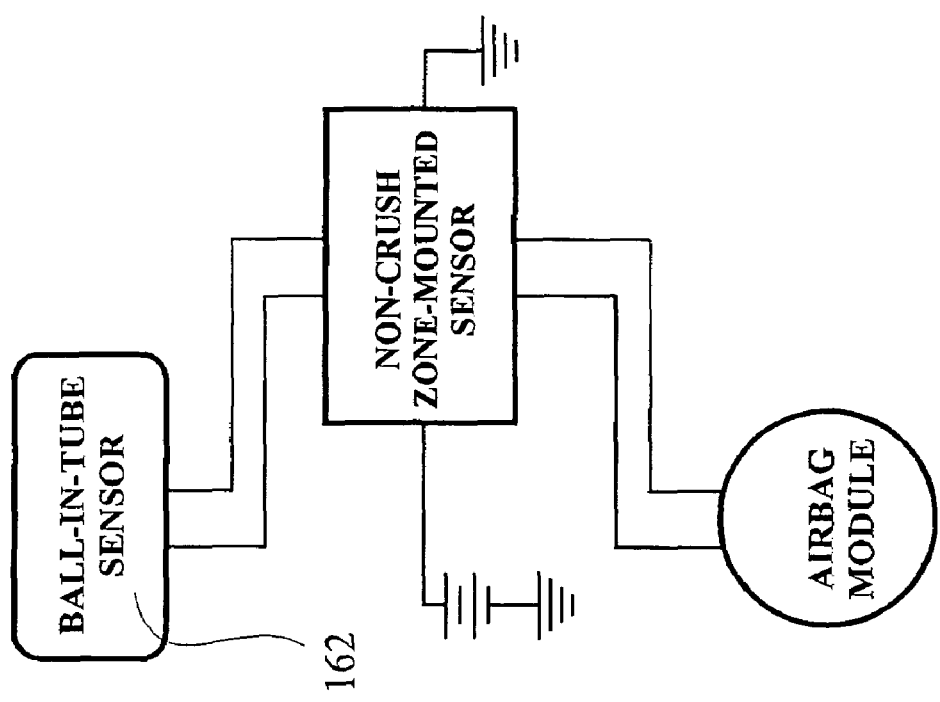
FIG. 21A is a circuit schematic showing a forward mounted ball-in-tube sensor used as an input to a crash sensor mounted outside of the crush zone.
Figure 21B:
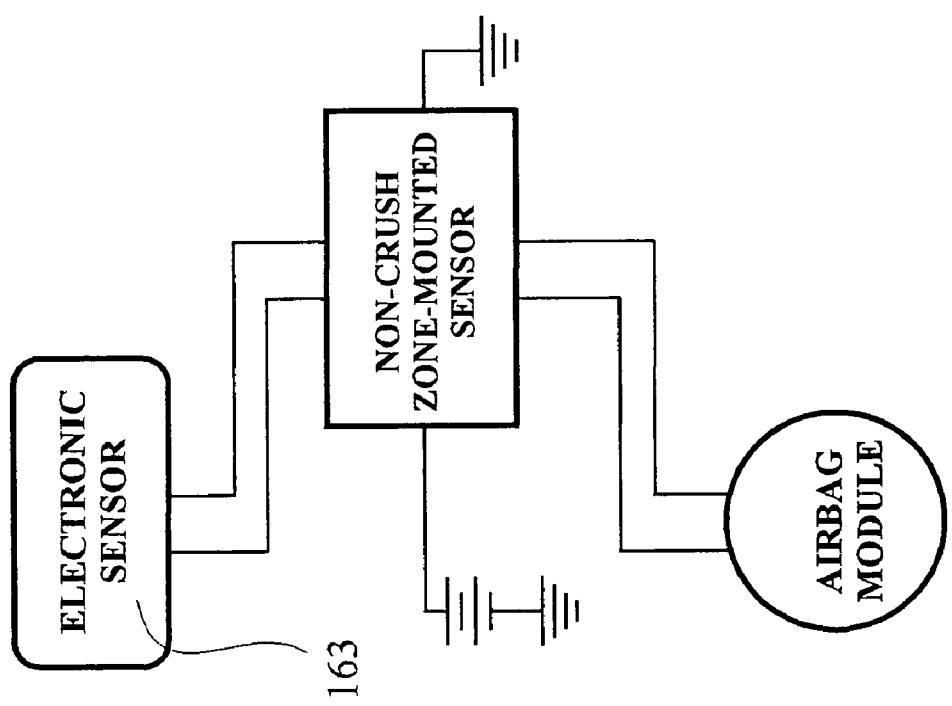
FIG. 21B is a circuit schematic showing a forward mounted electronic sensor used as an input to a crash sensor mounted outside of the crush zone.
Figure 21C:
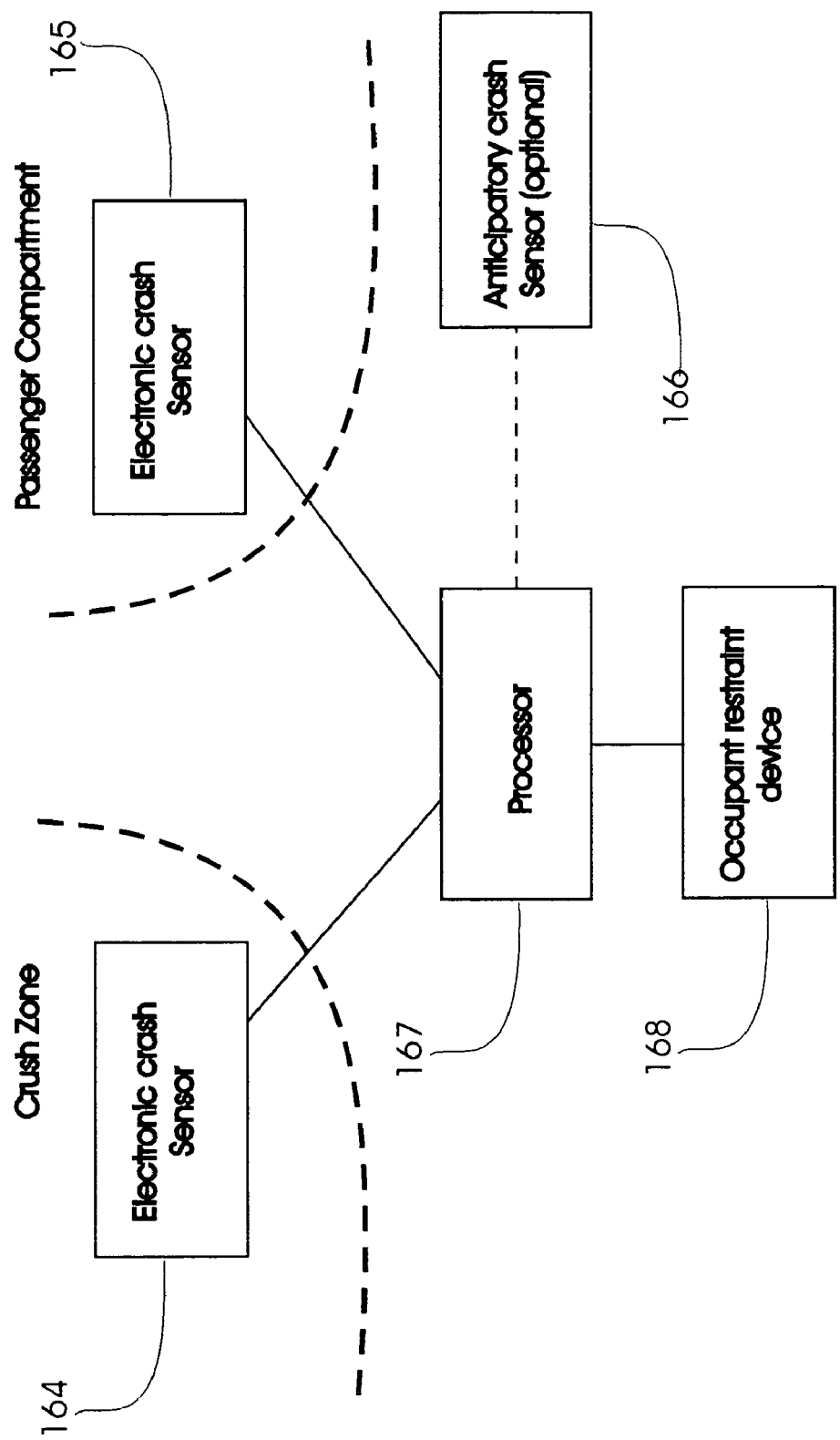
FIG. 21C is a schematic of an electronic crash sensor arrangement including a crush-zone mounted crash sensor and a non-crush-zone mounted crash sensor.
Figure 21D:
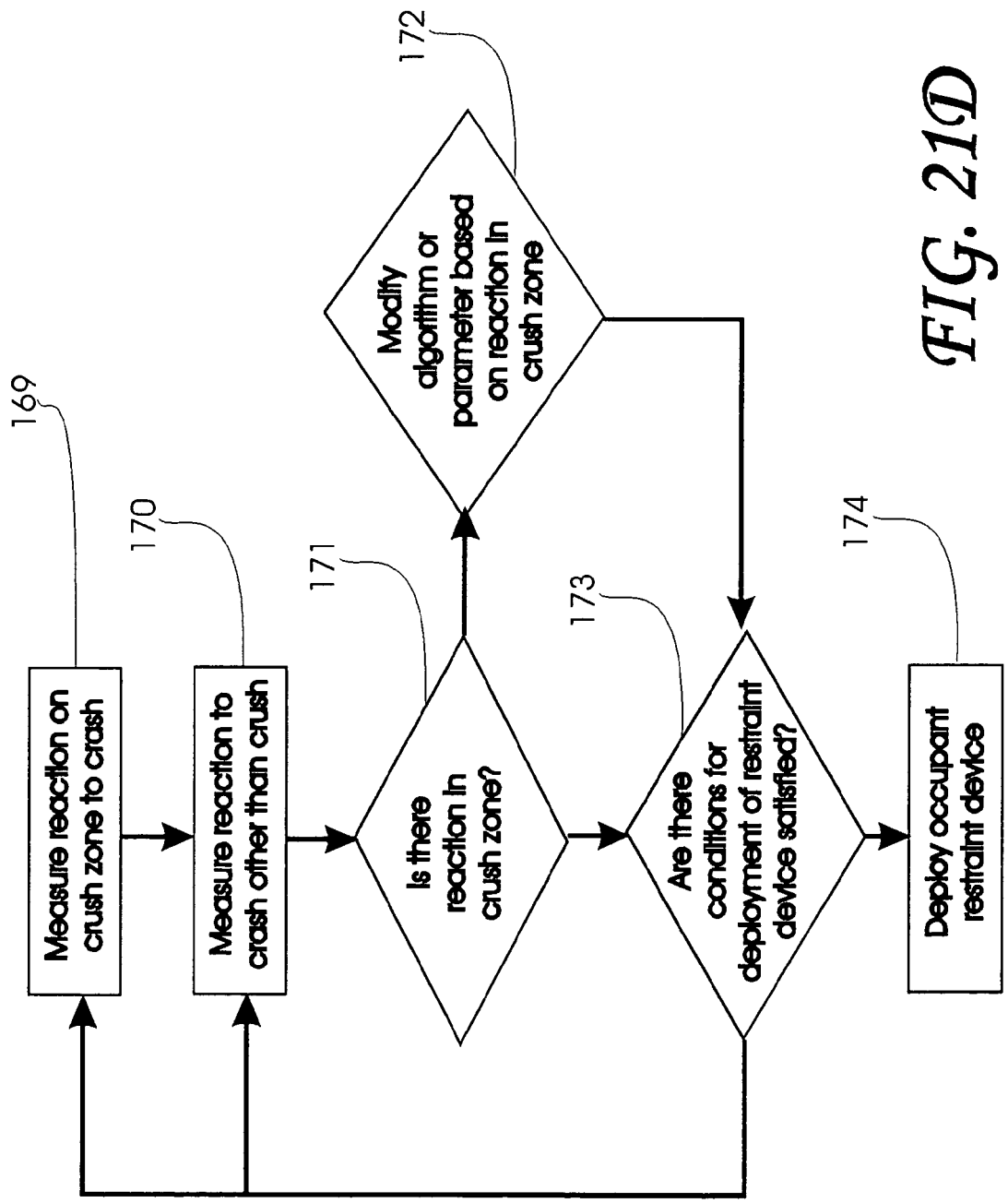
FIG. 21D is a flow chart showing the manner in which an occupant restraint device may be deployed using the crash sensor arrangement of FIG. 21C.

FIG. 21A shows a schematic circuit of an arrangement in accordance with the invention with a ball-in-tube sensor 162 as the crush zone sensor and FIG. 21B shows a schematic circuit of an arrangement in accordance with the invention with an electronic sensor 163 as the crush zone sensor Referring now to FIGS. 21C and 21D, in keeping with the same theme discussed with reference to FIGS. 21, 21A and 21B, an electronic crash sensor arrangement in accordance with the invention may include a first electronic crash sensor 164 mounted in the crush zone and a second electronic crash sensor 165 mounted outside of the crush zone, for example in or around the passenger compartment. It may optionally include one or more anticipatory sensors 166. A processor 167 is coupled to the crash sensors 164, 165 to receive signals therefrom indicative of measurements obtained by the crash sensors 164, 165. One or more occupant restraint devices 168 is coupled to the processor 167 and controlled thereby. The crash sensors 164, 165 are thus coupled together indirectly via the processor 167 or may be coupled together directly, i.e., via a common bus.

Each crash sensor 164, 165 provides measurements or data readings to the processor 167 which then determines whether the conditions for deploying any of the occupant restraint devices 168 are satisfied and if so, initiates deployment of one or more of the occupant restraint devices 168. The conditions for deployment may be satisfied by the measurements from only one crash sensor, e.g., a high velocity crash with only minimal crush of the vehicle or a low velocity crash with significant crush of the vehicle, or from both crash sensors (or all three crash sensors when an anticipatory crash sensor 166 is provided or two of the three crash sensors when an anticipatory crash sensor 166 is provided).

In addition, it is possible to relate the deployment conditions of the non-crush-zone mounted sensor 165 to the measurements from the crush zone. In such an embodiment, the reaction of the crush zone to a crash is measured via the electronic crash sensor 164 (step 169 in FIG. 21D) and another reaction of the vehicle to a crash, other than crush, is measured by the second electronic crash sensor 165 (step 170). The measurements may be spaced in time or simultaneous. Thereafter, at step 171, a determination is made, e.g., by processor 167, whether there is a reaction in the crush zone, i.e., crush of the vehicle or a portion thereof. If so, an algorithm or parameters of the deployment may be modified at step 172. Thereafter, a determination is made by the processor 167 whether any of the conditions for deployment of the occupant restraint device 168 are satisfied (step 173), either the predetermined conditions or modified conditions.

If so, a control signal is generated and sent to deploy one or more of the occupant restraint devices to initiate deployment of the same (step 174). If not, then the crash sensors 164, 165 would continue to measure the reaction of the vehicle or portions thereof, i.e., a feedback loop to steps 169 and 170.

Thus, disclosed above is a crash sensor arrangement for determining whether the crash involving the vehicle requires deployment of the occupant restraint device which comprises a first discriminating crash sensor mounted in a crush zone of the vehicle and structured and arranged to measure a reaction of the crush zone to the crash and a second discriminating crash sensor mounted outside of the crush zone of the vehicle and structured and arranged to trigger by means other than crush of the crush zone of the vehicle, e.g., based on acceleration or a change in velocity of the entire vehicle or a part thereof. Some typical reactions of the crush zone which are measured by the first discriminating crash sensor are the crush of the vehicle crush zone, acceleration of the vehicle crush zone, or velocity change of the vehicle crush zone. The first and second discriminating sensors are coupled to one another such that a signal to deploy the occupant restraint device may be generated in consideration of the first sensor measurements and whether the second sensor has triggered. Thus, in certain crashes, the occupant restraint device will not deploy unless both sensors have been triggered, i.e., the conditions imposed on each crash sensor for deploying the occupant restraint device have been satisfied.

In one embodiment, the sensors are coupled to one another in series such that the signal to deploy the occupant restraint device is generated only when the first and second sensors are both triggered. In another embodiment, the second sensor receives a signal indicative of triggering of the first sensor, considers whether to modify its triggering algorithm, triggering criteria and/or sensitivity based on the triggering or velocity change of the first sensor and if so, modifies the triggering algorithm, criteria or sensitivity. If the second sensor is an electronic sensor arranged to trigger based on a change in velocity and/or acceleration of the vehicle (or functions thereof), the velocity change and/or acceleration (or functions thereof) required for triggering may be modified based on the triggering of the first sensor. It should be noted though that such modification is not required in the event the velocity change is already appropriate.

The first discriminating sensor mounted in the crush zone may be a tape crush sensor including a tape switch comprising a pair of electrically conductive members spaced apart from one another prior to crush of the vehicle and which are designed to come into contact with one another upon crush of the vehicle of a specific magnitude. The tape crush sensor can include a mechanism for reducing the sensitivity of the tape crush sensor, such as an encapsulating member around the sensor. The first discriminating sensor may also be a ball-in-tube sensor or an electronic sensor.

Another embodiment disclosed above of a crash sensor arrangement for determining whether the crash involving the vehicle requires deployment of the occupant restraint device comprises a first discriminating crash sensor mounted outside of the crush zone of the vehicle and structured and arranged to trigger by means other than crush of the crush zone of the vehicle, and a second discriminating crash sensor coupled to the first sensor and mounted in the crush zone of the vehicle, e.g., a tape crush sensor or an electronic sensor. The second sensor provides information about a reaction of the crush zone of the vehicle to the crash, e.g., information about crush, velocity or acceleration of the vehicle crush zone, to the first sensor such that the first sensor may affect and modify its triggering and/or sensitivity based on the information about crush, velocity or acceleration of the vehicle crush zone provided by the second sensor, if such modification is necessary.

The method for determining whether the crash involving the vehicle requires deployment of an occupant restraint device comprises the steps of mounting a first crash sensor in the crush zone of the vehicle, e.g., a tape crush or coaxial cable sensor or an electronic crash sensor, and which is triggered based on a reaction of the crush zone to the crash (e.g., crush, velocity change or acceleration, or a function thereof, of the vehicle crush zone), mounting a second crash sensor outside of the crush zone of the vehicle and which is triggered by means other than crush of the crush zone of the vehicle, and deploying the occupant restraint device in consideration of whether the first sensor has triggered and whether the second sensor has triggered. If the first and second sensors are coupled to one another in series, the occupant restraint device may be deployed only when the first and second sensors are both triggered (for certain types of crashes). In the alternative, a signal indicative of measurements made by the first sensor is directed to the second sensor and consideration is made as to whether the conditions for triggering of the second sensor should be affected and modified based on the measurements of the first sensor. If so, the triggering conditions are modified.

In another method disclosed above for determining whether a crash involving a vehicle requires deployment of an occupant restraint device, a first discriminating crash sensor is mounted outside of the crush zone of the vehicle and is triggered to deploy the occupant restraint device by means other than crush of the crush zone of the vehicle, and a second discriminating crash sensor is mounted in the crush zone of the vehicle such that the second sensor generates information about a reaction of the crush zone to the crash. As above, such reactions may be typically the crush, velocity change or acceleration of the vehicle crush zone. The second sensor may be a tape, rod-in-tube or coaxial cable crush sensor which provides information about the velocity change the crush of the vehicle at the mounting location of the sensor or it may be an electronic sensor that uses the acceleration in the crush zone to determine sensor triggering or transmits the acceleration signal to the processor which then considers both acceleration signals from the crush zone and the non-crush zone mounted sensors.

The information about the reaction of the crush zone of the vehicle to the crash is provided by the second sensor to the first sensor and deployment of the occupant restraint device is controlled via the first sensor based on the information about the reaction of the crush zone of the vehicle to the crash provided by the second sensor.

Note, in some cases, when the non-crush zone sensor is not present or malfunctioning, or when there is an insufficient signal at the non crush zone sensor mounting location, the processor may initiate triggering based on the acceleration signal of the crush zone mounted accelerometer alone.

In another embodiment of the invention disclosed above, a vehicle crash sensor system comprises a crush velocity detecting sensor changeable from an open position indicative of a non-crush situation toward a closed position indicative of crush of a portion of the vehicle proximate to the sensor, an electronic sensor coupled to the crush velocity detecting sensor and comprising an accelerometer, and means coupled to the accelerometer for initiating deployment of the occupant protection device based on velocity of the crush velocity detecting sensor and an analysis of output from the accelerometer indicative of a situation in which deployment of the occupant protection device is desired. A mechanism is provided for retaining the crush velocity detecting sensor in the closed position upon contact of the conducting members of the crush velocity detecting sensor from the open position to the closed position. The crush detecting switch may be mounted on a side of the vehicle so as to detect crush of the side of the vehicle.

7. Self-Contained Airbag Systems

Self-contained airbag systems contain all of the parts of the airbag system within a single package, in the case of mechanical implementations, and in the case of electrical or electronic systems, all parts except the primary source of electrical power and, in some cases, the diagnostic system. This includes the sensor, inflator and airbag. Potentially, these systems have significant cost and reliability advantages over conventional systems where the sensor(s), diagnostic and backup power supply are mounted separate from the airbag module. In mechanical implementations in particular, all of the wiring, the diagnostic system and backup power supply are eliminated.

Figure 22:
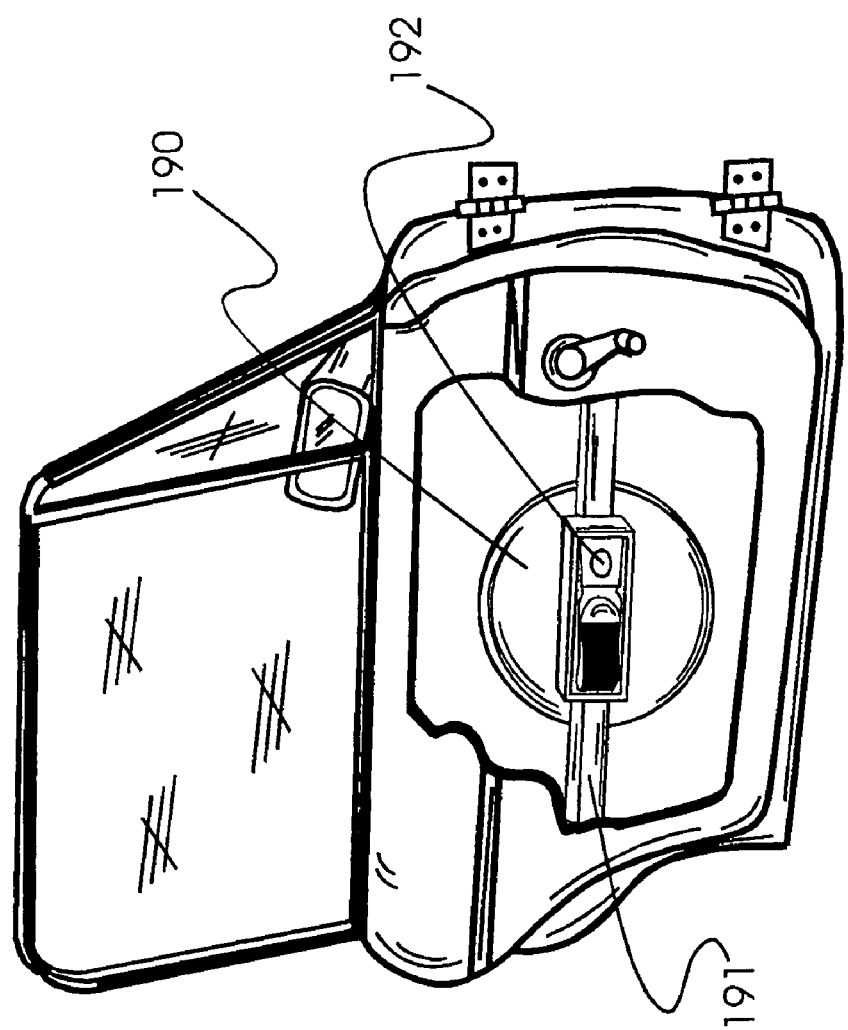
FIG. 22 is a perspective view of a side impact airbag system illustrating the placement of the airbag vents in the door panel and the exhausting of the inflator gases into the vehicle door and also showing the use of a pusher plate to adjust for the mismatch between the point of impact of an intruding vehicle and the sensor of a self contained side impact airbag system.

FIG. 22 is a perspective view of a side impact airbag system illustrating the placement of the airbag vents in the door panel and the exhausting of the inflator gases into the vehicle door and also showing the use of a pusher plate 190 to adjust for the mismatch between the point of impact of an intruding vehicle and the sensor of a self-contained side impact airbag system. The pusher plate 190 is shown attached to the main structural door beam 191 in this illustration but other mounting systems are also possible. The pusher plate 190 is dimensioned and installed in the door so that during a side impact to any portion of the side of the vehicle which is likely to cause intrusion into the passenger compartment and contact an occupant, the pusher plate will remain in a substantially undistorted form until it has impacted with the sensor causing the sensor to begin deployment of the airbag. In this implementation, a non-sodium azide propellant, such as nitro-cellulose, is used and the gas is exhausted into the door though a pair of orifices 192 (only one of which is shown). The airbag system may be any of those disclosed herein.

Figure 23:
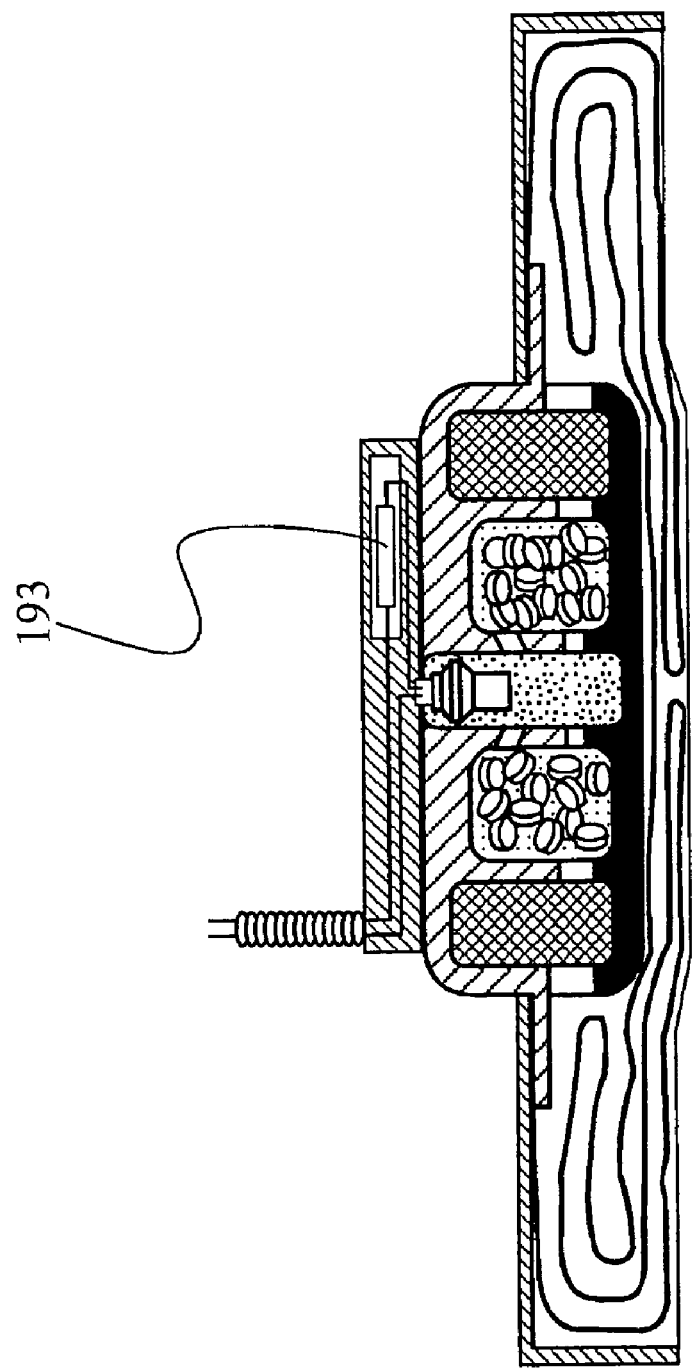
FIG. 23 is a cross section view of a self-contained side impact airbag system using an electronic sensor.

FIG. 23 is a cross-sectional view of a self-contained side impact airbag system using an electronic sensor that generates a signal representative of the movement of a sensing mass. Unless otherwise stated or inconsistent with the following description of an airbag system with an electronic sensor, the airbag system with an electronic sensor may include the features of the airbag system described above and below. An electronic sensor is one in which the motion of the sensing mass is typically continuously monitored with the signal electronically amplified with the output fed into an electronic circuit which is usually a micro-processor. Electronic sensors typically use accelerometers that usually make use of micromachined, SAW, strain gage or piezo-electric elements shown here as 193. The accelerometer element 193 generates a signal representative of the movement of the sensing mass.

Modern accelerometers are sometimes micro-machined silicon and combined with other elements on an electronic chip. In electromechanical sensors, the motion of the sensing mass is typically measured in millimeters and is much larger than the motion of the sensing mass in electronic sensors where the motion is frequently measured in microns or portions of a micron. The signal representative of the motion of the sensing mass is recorded over time and an algorithm in the microprocessor may be designed to determine whether the movement over time of the sensing mass results in a calculated value that is in excess of the threshold value based on the signal. The sensing mass may constitute part of the accelerometer, e.g., the sensing mass is a micro-machined acceleration sensing mass. In this case, the microprocessor determines whether the movement of the sensing mass over time results in an algorithmic determined value that is in excess of the threshold value based on the signal.

For side impact electronic sensors, the acceleration of the sensing mass is acceleration in a lateral direction or lateral acceleration since the passenger compartment is inward relative to the side of the vehicle.

In embodiments using an electronic sensor, the inflator may include a primer that is part of an electronic circuit including the accelerometer such that upon movement over time of the sensing mass which results in a calculated value in excess of the threshold value, the electronic circuit is completed thereby causing ignition of the primer. In this case, the primer may be initiated electronically through a bridge or similar device that is initiated electronically.

Figure 24:
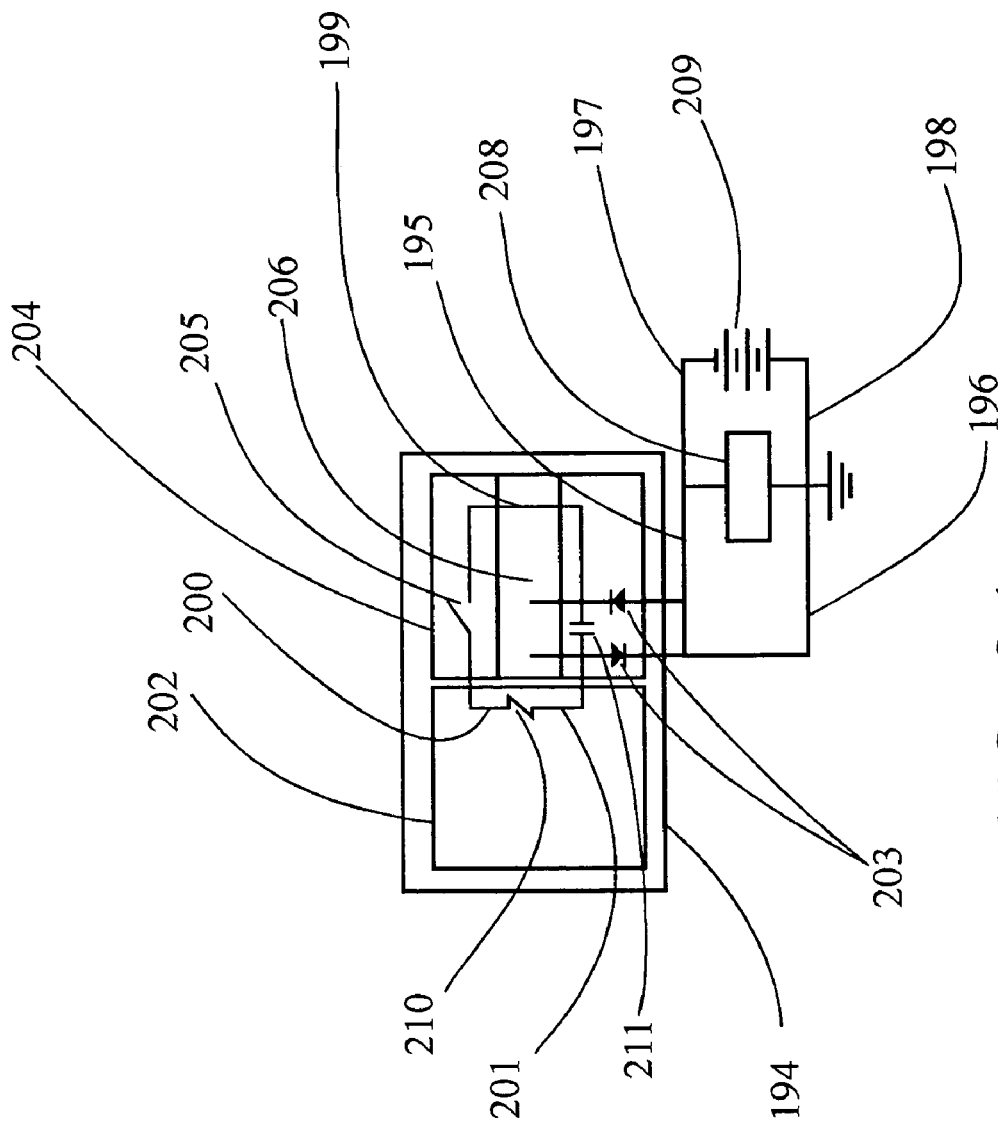
FIG. 24 is a schematic of the electric circuit of an electromechanical or electronic self contained side impact airbag system.

When the term electrical is used herein, it is meant to include both electromechanical and electronic systems. FIG. 24 is a schematic of an exemplifying embodiment of an electric circuit of an electromechanical or electronic side impact airbag system in accordance with the invention. The self-contained module implementation shown generally at 194 contains a sensor assembly 204 and an airbag and inflator assembly 202. The sensor assembly 204 contains a sensor 205, a diagnostic module 206, an energy storage capacitor 207, and a pair of diodes 203 to prevent accidental discharge of the capacitor 207 if a wire becomes shorted. The module 206 is electrically connected to a diagnostic monitoring circuit 208 by a wire 195 and to the vehicle battery 209 by a wire 197. The module 206 is also connected to the vehicle ground by a wire 196. The sensor, diagnostic and capacitor power supplies are connected to the squib by wires 199-201.

In a basic configuration, the diagnostic monitoring circuit 208 checks that there is sufficient voltage on the capacitor 207 to initiate the inflator assembly 202 in the event of an accident, for example, and either of wires 195, 196, 197 or 198 are severed. In this case, the diagnostic internal to the self-contained module would not be necessary. In more sophisticated cases, the diagnostic module 206 could check that the squib resistance is within tolerance, that the sensor calibration is correct (through self testing) and that the arming sensor has not inadvertently closed. It could also be used to record that the arming sensor, discriminating sensor and airbag deployment all occurred in the proper sequence and record this and other information for future investigative purposes. In the event of a malfunction, the diagnostic unit could send a signal to the monitoring circuitry that may be no more than an indication that the capacitor 207 was not at full charge. Other related circuit components include capacitor 211 and resistor 210.

A substantial improvement in the reliability of the system is achieved by placing the diagnostic module and backup power supply within the self-contained airbag system particularly in the case of side impacts where the impact can take place at any location over a wide area. An impact into a narrow pole at the hinge pillar, for example, might be sufficient to sever the wire from the airbag module to the vehicle power source before the sensor has detected the accident. The placement of an electronic self-contained airbag module in the steering wheel also provides for significant economic and reliability improvements especially since the energy needed to trigger the airbag can be stored on the capacitor and does not need to be transmitted to the module through the "clock spring" coiled ribbon cable that connects the steering wheel horn, switches etc. to vehicle power. Thus, the current-carrying capability of the clock spring can be substantially reduced.

Most of the advantages of placing the sensor, diagnostic and backup power supply within the self-contained module can of course be obtained if one or more of these components are placed in a second module in close proximity to the self-contained module. For the purposes of electromechanical or electronic self-contained modules, therefore, as used herein, the terms "self-contained module" or "self-contained airbag system" will include those cases where one or more of the components including the sensor, diagnostic and backup power supply are separate from the airbag module but in close proximity to it. For example, in the case of steering wheel mounted systems, the sensor and backup power supply would be mounted on the steering wheel and in the case of side impact door mounted systems, they would be mounted within the door or seat. In conventional electrical or electronic systems, on the other hand, the sensor, diagnostic module and backup power supply are mounted remote from the airbag module in a convenient location typically centrally in the passenger compartment such as on the tunnel, under the seat or in the instrument panel.

With the placement of the backup power supply in the self-contained module, greater wiring freedom is permitted. For example, in some cases for steering wheel-mounted systems, the power can be obtained through the standard horn slip ring system eliminating the requirement of the ribbon coil now used on all conventional driver airbag systems. For side impact installations, the power to charge the backup power supply could come from any convenient source such as the power window or door lock circuits. The very low resistance and thus high quality circuits and connectors now used in airbag systems are not required since even an intermittent or high resistance power source would be sufficient to charge the capacitor and the existence of the charge is diagnosed as described above.

Herein, the terms capacitor, power supply and backup power supply have been used interchangeably. Also, other energy storage devices such as a rechargeable battery could be used instead of a capacitor. For the purposes of this disclosure and the appended claims, therefore, the word capacitor will be used to mean any device capable of storing electrical energy for the purposes of supplying energy to initiate an inflator. Initiation of an inflator will mean any process by which the filling of an airbag with gas is started. The inflator may be either pure pyrotechnic, stored gas or hybrid or any other device which provides gas to inflate an airbag.

Figure 25:
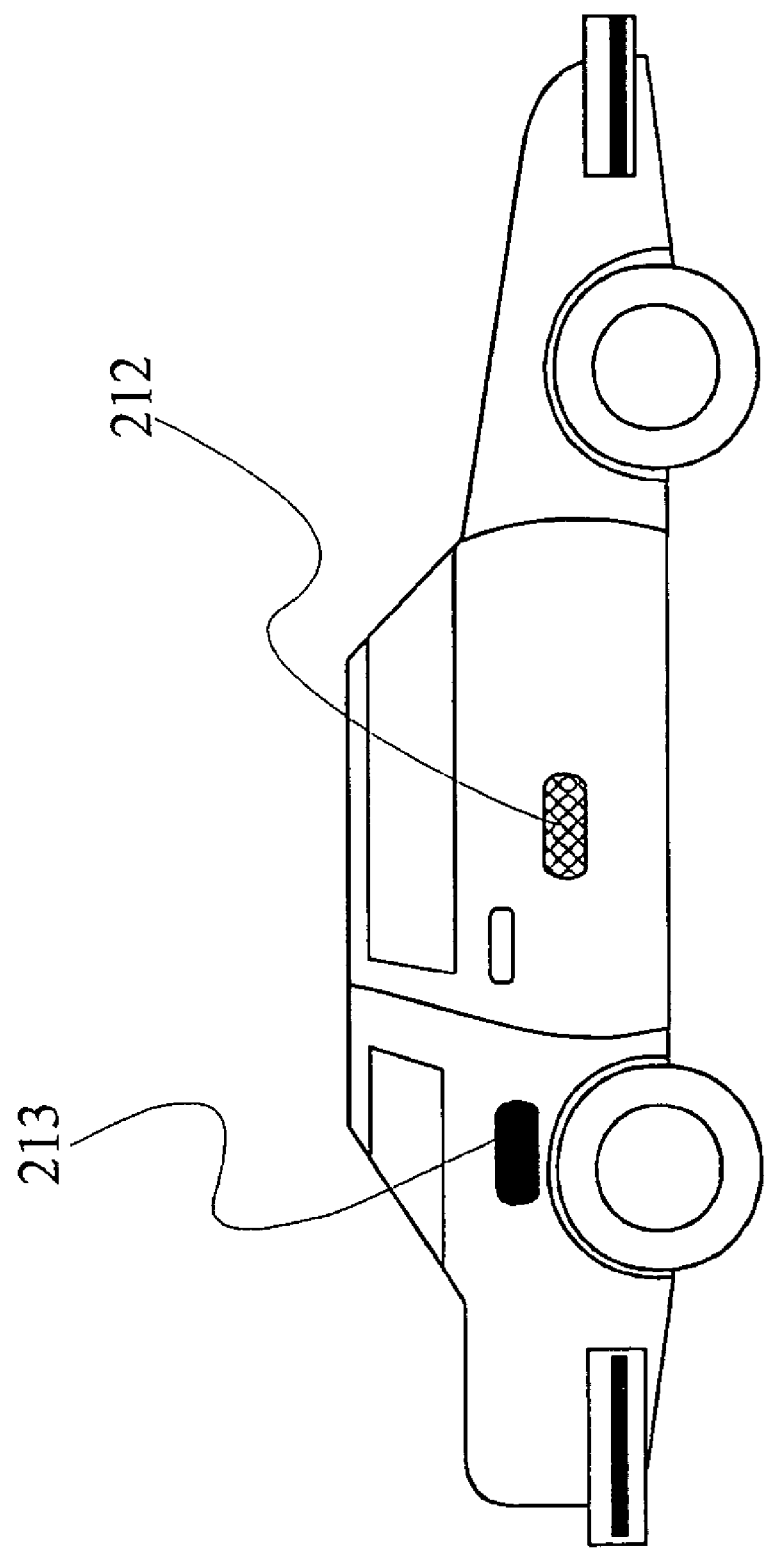
FIG. 25 is a side view of a vehicle showing the preferred mounting of two self contained airbag modules into the side of a coupe vehicle, one inside of the door for the driver and the other between the inner and outer side panels for the rear seat passenger.

FIG. 25 is a side view showing the preferred mounting of two self-contained airbag modules 212 and 213 on the side on a two door vehicle. Module 212 is mounted inside of a door, whereby the sensor housing of module 212 is most proximate the exterior of the vehicle, while module 213 is mounted between the inner and outer side panels at a location other than the door, in this case, to protect a rear seated occupant. Each of the modules has its own sensor and, in the case of electrical self-contained systems, its own capacitor power supply and diagnostic circuit. Any of the airbag systems disclosed herein may be mounted either inside a door or between inner and outer side panels of the vehicle at a location other than the door and for non-self-contained systems, the sensor can be mounted anywhere provided there is a sufficiently strong link to the vehicle side so that the sensor is accelerated at a magnitude similar to the vehicle side crush zone during the first few milliseconds of the crash. In view of the mounting of module 213 between inner and outer panels of the vehicle at a location other than the door, the inner and outer panels are thus fixed to the vehicle frame and the module 213 is also thus fixed to the frame. By contrast, the module 212 mounted inside the door is moved whenever the door is opened or closed.

This invention is also concerned with a novel self-contained airbag system for protecting occupants in side impacts and in particular with the sensors used either with self-contained modules or apart from the airbag module. This is accomplished by using the sensors described in U.S. Pat. No. 05,231,253 referenced above, along with other improvements described in detail below. This invention is also concerned with applying some of the features of the novel side impact system to solving some of the problems of prior art mechanical airbag systems discussed above.

The inflator mechanism may be any component or combination of components which is designed to inflate an airbag, preferably by directing gas into an interior of the airbag. One embodiment of the inflator mechanism may comprise a primer. In this case, the crash sensor includes an electronic circuit including the accelerometer and the primer such that upon movement over time of the sensing mass results in a calculated value in excess of the threshold value, the electronic circuit is completed thereby causing ignition of the primer.

8. Occupant Sensors

In U.S. Pat. Nos. 05,829,782 and 05,563,462, the use of neural networks as a preferred pattern recognition technology is disclosed for use in identifying a rear facing child seat located on the front passenger seat of an automobile. These same patents also disclose many other applications of pattern recognition technologies for use in conjunction with monitoring the interior of an automobile passenger compartment and more generally, monitoring any interior space in a moving vehicle which might be occupied by an object.

Figure 26:
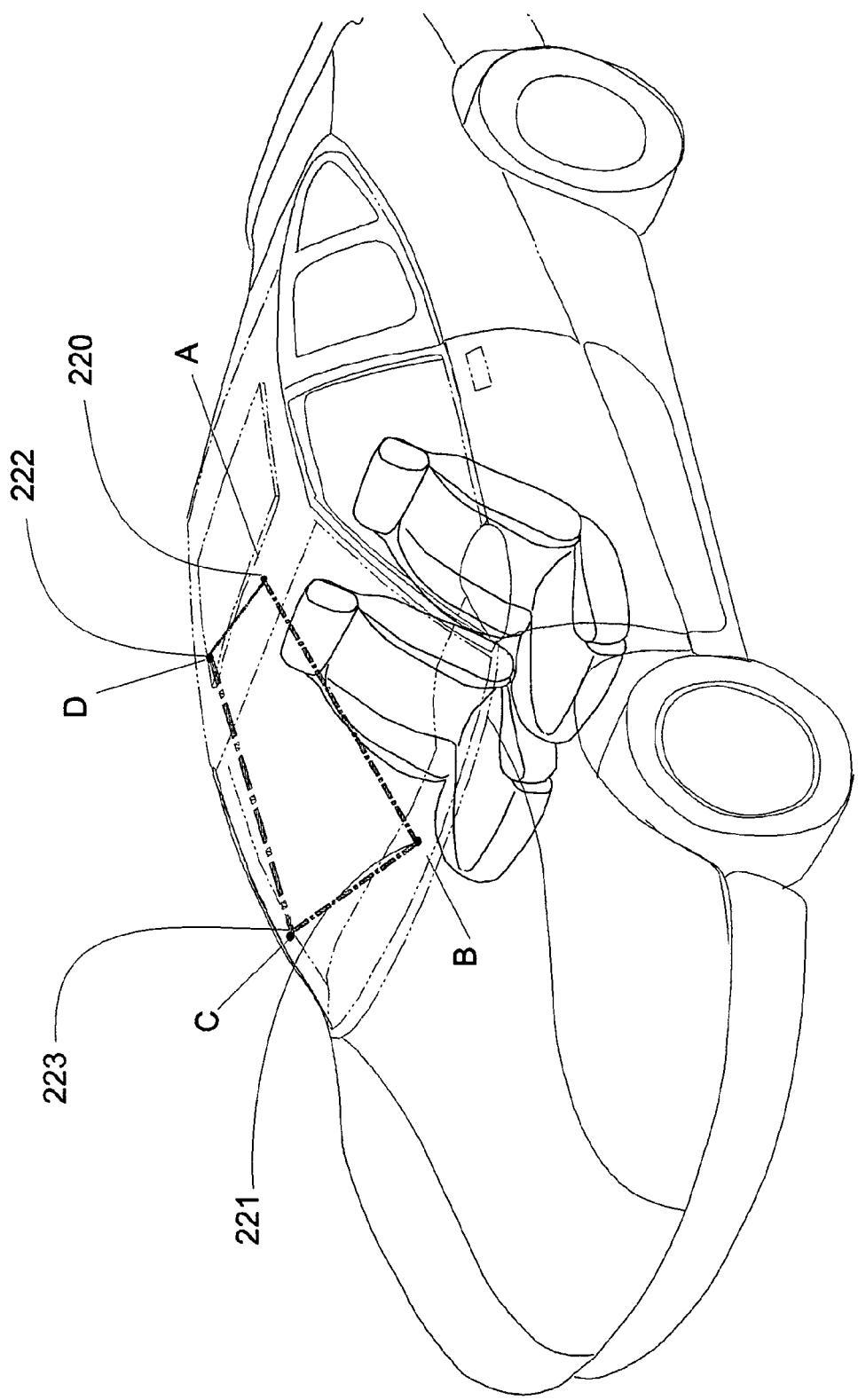
FIG. 26 is a perspective view of a vehicle with the vehicle shown in phantom illustrating one preferred location of the occupant transducers placed according to the methods taught in U.S. patent application Ser. No. 08/798,029.

FIG. 26 illustrates an occupant monitoring system that is capable of identifying the occupancy of a vehicle and measuring the location and velocity of human occupants. This system is disclosed in detail in U.S. RE 37,260. In this preferred implementation, four transducers 220, 221, 222 and 223 are used to provide accurate identification and position monitoring of the passenger of the vehicle. Naturally, a similar system can be implemented on the driver side or rear seat. In FIG. 26, lines connecting the transducers C and D and the transducers A and B are substantially parallel permitting an accurate determination of asymmetry and thereby object rotation as described in detail in U.S. RE 37,260.

The system is capable of determining the pre-crash location of the critical parts of the occupant, such as his/her head and chest, and then to track their motion toward the airbag with readings as fast as once every 10 milliseconds. This is sufficient to determine the position and velocity of the occupant during a crash event. The implementation described in U.S. RE 37,260 can therefore determine at what point the occupant will get sufficiently out-of-position so that deployment of the airbag should be suppressed. In the instant invention, the same data is used but instead of only making a trigger/no-trigger decision, the information is also used to determine how fast to deploy the airbag, and if the weight of the occupant is also determined in a manner such as disclosed in U.S. Pat. No. 05,748,473, the amount of gas which should be injected into the airbag and perhaps the out flow resistance can be controlled to optimize the airbag system not only based on the crash pulse but also the occupant properties. This provides the design for Phase 3 Smart Airbags.

In U.S. Pat. No. 05,684,701, concern was expressed about a possible contention for processor resources when multiple systems were using the same microprocessor. This is no longer a problem with the availability of neural computer designs that can be incorporated into an ASIC for this system. Such designs utilize a parallel computing architecture to calculate all of the node calculations simultaneously. Furthermore, the neural computer can be made with as many input nodes as desired with little penalty in ASIC cost. Thus, both the calculation of the position of the occupant and the crash pulse analysis can occur at the same time.

In the neural network ASIC design, it is anticipated that, for most applications, the node weights will be read in at execution time. Therefore, a single neural network hardware design can perform many pattern recognition functions as long as the functions that share the neural computer do not need to be done at the same time. To the extent that this sharing can be done, each of these non-critical features can be added at very little additional cost once one system is implemented.

Figure 26A:
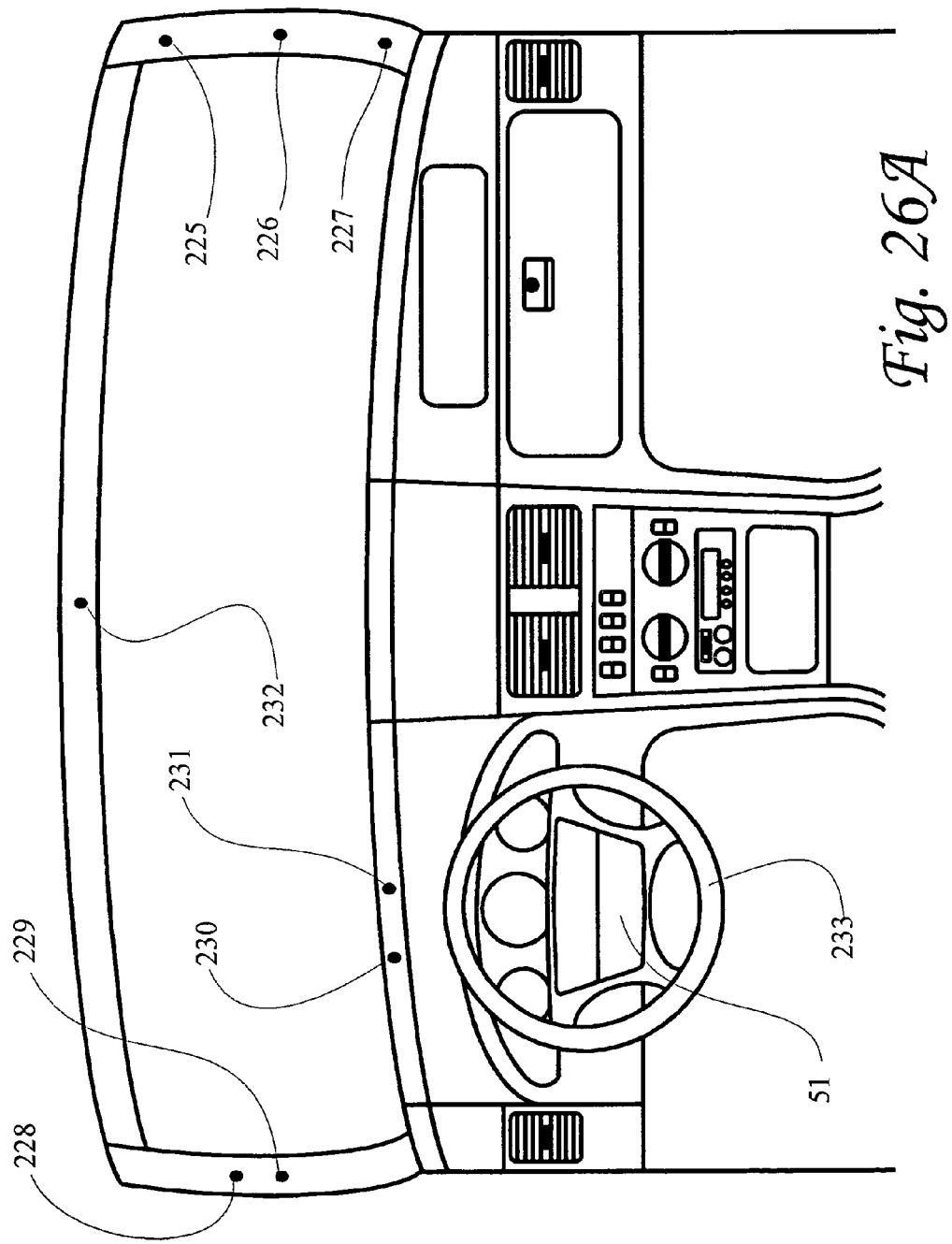
FIG. 26A is a view of the passenger compartment of a motor vehicle, with portions cut away and removed, illustrating an occupant out-of-position sensor and a rear facing child seat detector, both located on the A-pillar and both using the same computer as the pattern recognition based crash sensor.

In FIG. 26A, an alternate view of the passenger compartment of a motor vehicle is presented which illustrates an occupant out-of-position sensor and a rear facing child seat detector, both located on the A-pillar of the vehicle and both using the same neural computer as the neural network crash sensor. In other applications, these transducers are mounted on other locations such as the B-pillar and headliner. Thus, once one neural network application for an automobile is implemented, the same neural network computer system can be used for several pattern recognition applications.

The use of the neural network to identify or detect a rear facing child seat occurs when the vehicle is first put in motion. In contrast, the use of the neural network for crash pattern recognition occurs continuously but need only take place when an abnormal event is taking place. Since it is highly unlikely that both events will take place simultaneously, the same system can easily accomplish both tasks. Naturally, in event of a conflict, one of the functions takes priority. A strong motivation for the use of a neural network crash sensor, therefore, in addition to its superior performance, is that substantial economies result. The use of neural networks for interior vehicle monitoring or for crash sensing is not believed to have been discovered prior to its discovery by the current assignee, let alone the greater advantage of combining both functions with the same neural network system. When the added requirement of determining the position of an occupant dynamically is considered, the chance of a conflict between the occupant sensing and the crash sensing systems increases since both must be done continuously. Both systems can still use the same neural network system providing the processor is fast enough. One method of assuring that this is true is to use a parallel processor, such as a neural computer.

An interesting point is that each of these features can be added at very little additional cost once one system is implemented. The distance measurement to determine an out-of-position occupant is a minor software change and the addition of the driver system once a passenger system is in place, or vice versa, requires only additional transducers which are inexpensive in large quantities. Since both the driver and passenger systems can share the same electronics, there will be virtually no additional cost for electronic components.

In FIG. 26A, four ultrasonic transducers 224, 225, 226, and 227, are used to identify an object occupying the front passenger seat as described in U.S. Ser Nos. 05,563,462 and 05,829,782. In this particular implementation, an additional transducer 224 is provided to improve the identification accuracy of the system. Ultrasonic transducers 228 and 229 are used to determine the distance from the transducers to the vehicle driver and ultrasonic transducers 230, 231 and 232 are used to measure the distance to the steering wheel mounted airbag module 51 and also to the driver. The second measurement of the driver's position is used to confirm the measurements obtained from transducers 228 and 229. The distance from the airbag can be calculated knowing the distance to the driver and the distance to the steering wheel 233. Naturally, other types of transducers or measurement means could be used without deviating from the teachings of this invention. What is illustrated and taught here is that there are many applications requiring pattern recognition technologies which can be achieved very economically through shared pattern recognition computer facilities.

Since the cost of optical or camera systems have recently plummeted, this is now the technology of choice for occupant sensing. Such systems are described in detail in the U.S. patents referenced under this subject above. A single camera is, naturally, the least expensive solution but suffers from the problem that there is no easy method of obtaining three-dimensional information about people or objects that are occupying the passenger compartment. A second camera can be added but to locate the same objects or features in the two images by conventional methods is computationally intensive unless the two cameras are close together. If they are close together, however, then the accuracy of the three dimensional information is compromised. Also, if they are not close together, then the tendency is to add separate illumination for each camera. An alternate solution is to use two cameras located at different positions in the passenger compartment but to use a single lighting source. This source can be located adjacent to one camera to minimize the installation sites. Since the LED illumination is now more expensive than the imager, the cost of the second camera does not add significantly to the system cost. The correlation of features can then be done using pattern recognition systems such as neural networks. Two cameras also provide a significant protection from blockage and one or more additional cameras, with additional illumination, can be added to provide almost complete blockage protection.

Although some implementations of an occupant sensing system has been shown in FIGS. 26 and 26A, naturally, other types of transducers or measurement means could be used without deviating from the teachings of this invention including, for example, laser radar, stereo and other 3D imaging techniques, radar, electric field, capacitance, weight distribution etc. See for example U.S. patent application Ser. No. 10/413,426 filed Apr. 14, 2003, incorporated by reference herein.

In FIG. 27, an occupant position sensor arrangement 241, 242 located in a headrest 240 of an automobile seat is illustrated. Such a sensor arrangement 241, 242 can be used to automatically position the headrest 240 for protection of occupants in rear impacts, as part of a system to automatically adjust the position of the seat based on the morphology of the occupant, and to monitor the position of the head in the event of a frontal impact. In each case, the sensor may interface with the neural network computer system that is used for crash sensing. In the case of rear impact protection, for example, the neural computer, using information from the accelerometers, may determine that a rear impact is in progress and command the headrest to move closer to the occupant's head. If an anticipatory sensor is used for predicting a rear impact, the neural computer can be used to identify the approaching object and decide if positioning the headrest is warranted. In the case where the longitudinal position of the occupant's head is monitored, then the neural crash sensor would take this into account along with other occupant position information, if available, when determining whether to deploy the airbag if the occupant is out-of-position.

Other sensors which can be added to this system include those which measure the position of the seat, position of the seat back, weight of the occupant, height of the occupant, seatbelt spool out, seatbelt buckle engagement etc. The headrest position adjustment can be accomplished in a number of ways including motors and an associated mechanism such as a four-bar or other linkage.

9. Controlling Airbag Inflation

Figure 28:
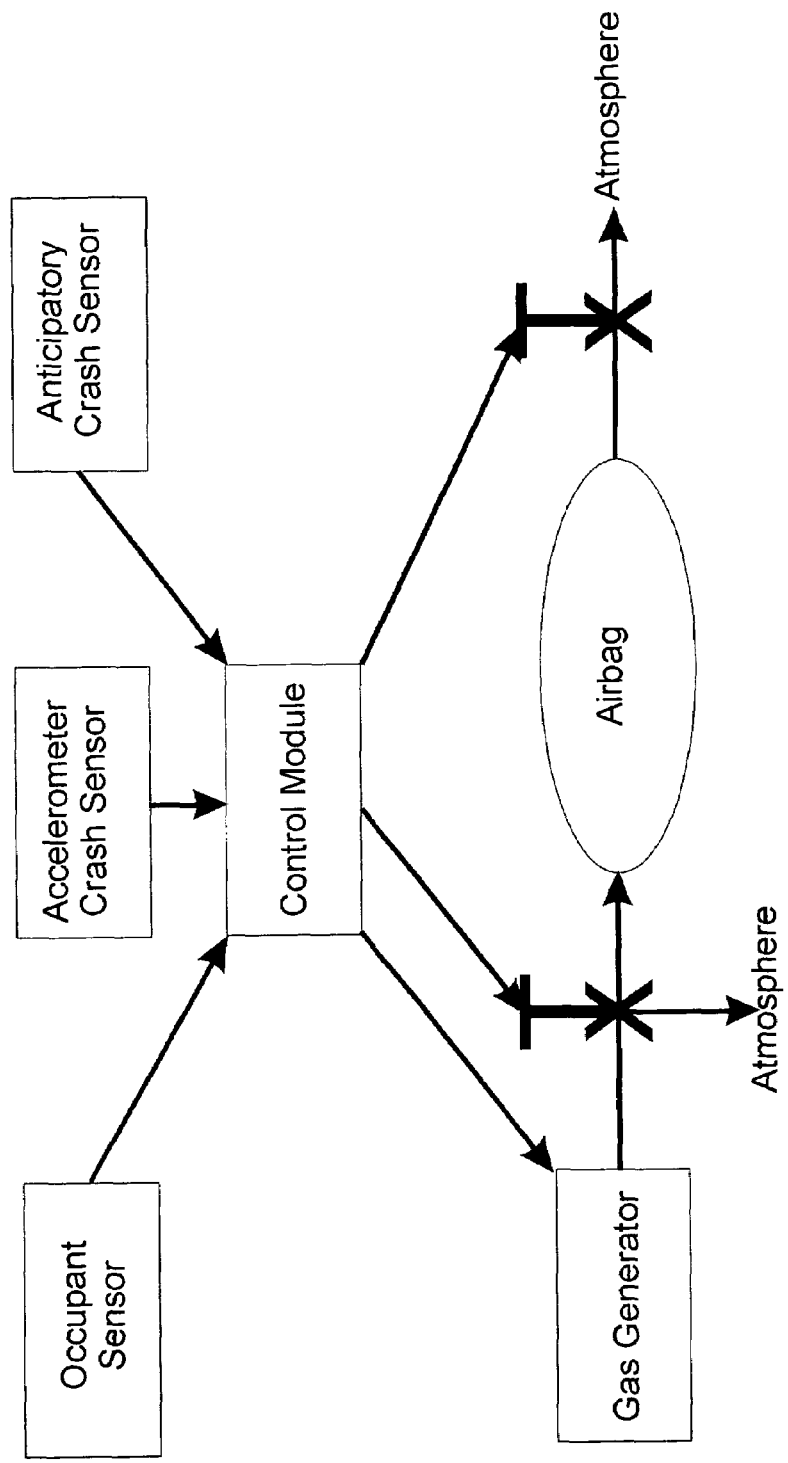
FIG. 28 is a schematic diagram showing a Phase 4 Smart Airbag System.

A schematic of an airbag gas control system in illustrated in FIG. 28 and follows the description presented above. Data from the occupant, accelerometer(s), gyroscope(s), if present, and anticipatory sensor(s) are fed into the control module which controls one or more of: (i) the quantity of gas produced by the gas generator, (ii) the flow of the gas from the gas generator into the airbag or, alternately, the flow of a portion of the gas from the gas generator to the atmosphere before it enters the airbag, and (iii) the flow of the gas out of the airbag into the atmosphere.

One issue that remains to be discussed is the derivation of the relationship between the gas controller setting and the desired volume or quantity of gas in the airbag. Generally, for a low velocity, long duration threshold crash, for a small light weight out-of-position occupant, the airbag should be inflated slowly with a relatively small amount of gas and the outflow of gas from the airbag should be controlled so a minimum value constant pressure is maintained as the occupant just contacts the vehicle interior at the end of the crash.

Similarly, for a high velocity crash with large heavy occupant, positioned far from the airbag before deployment is initiated, but with a significant forward relative velocity due to pre-crash braking, the airbag should be deployed rapidly with a high internal pressure and an out flow control which maintains a high pressure in the airbag as the occupant exhausts the airbag to the point where he almost contacts the interior vehicle surfaces at the end of the crash. These situations are quite different and require significantly different flow rates into and/or out of the airbag. As crash variability is introduced such as where a vehicle impacts a pole in front of a barrier, the gas flow decisions may be changed during the crash.

The neural network crash sensor has the entire history of the crash at each point in time and therefore knows what instructions it gave to the gas controller during previous portions of the crash. It therefore knows what new instructions to give the controller to account for new information. The problem is to determine the controller function when the occupant parameters and the crash forecasted severity are known. This requires the use of an occupant crash simulation program such as Madymo™ from TNO in Delft, The Netherlands, along with a model of the gas control module.

A series of simulations are run with various settings of the controllable parameters such as the gas generation rate, gas inflow and gas outflow restriction until acceptable results are obtained and the results stored for that particular crash and occupant situation. In each case, the goal may be to maintain a constant pressure within the airbag during the crash once the initial deployment has occurred. Those results for each point in time are converted to a number and that number is the desired output of the neural network used during the training. A more automated approach is to couple the simulation model with the neural network training program so that the desired results for the training are generated automatically.

Thus, as a particular case is being prepared as a training vector, the Madymo program is run which automatically determines the settings for the particular gas control module, through a trial and error process, and these settings are converted to a number and normalized, with the normalized number becoming the desired output value of the output node of the neural network. Naturally, the above discussion is for illustration purposes only and there are many ways that the interface between the neural network system and the gas controller can be designed.

The descriptions above have concentrated on the control of the gas flows into and out of an airbag. Naturally, other parts of the occupant restraint system can also be controlled in a similar manner as the gas flows are controlled. In particular, various systems are now in use and others are being developed for controlling the force applied to the occupant by the seatbelt. In this case, it is desired to maintain a constant acceleration to the occupant depending on the crash severity. Such systems can use retractors or pretensioners, others use methods of limiting the maximum force exert by the seatbelt, while still others apply damping or energy absorbing devices to provide a velocity sensitive force to the occupant.

A preferred approach, as disclosed in the current assignee's co-pending U.S. patent application Ser. No. 10/413,426, uses a method of measuring the acceleration of the occupant, or some part such as his or her chest, and a mechanism that controls the spool out of the seatbelt to maintain the chest acceleration, for example, to an appropriate limit such as 40 Gs. To the extent that these systems can be actively controlled by the restraint system based on the pattern recognition techniques described herein, they are contemplated by this invention.

Also, the crash accelerometer(s), gyroscopes and occupant sensors have been the main inputs to the pattern recognition system as described above. This invention also contemplates the use of other available information such as seatbelt use, seat position, seat back position, vehicle velocity etc. as additional inputs into the pattern recognition system for particular applications depending on the availability of such information.

10. Diagnostics and Smart Airbags

A smart airbag system is really part of a general vehicle diagnostic system and many of the components that make up the airbag system and the rest of the vehicle diagnostic system can be shared. Therefore, we will now briefly discuss a general vehicle diagnostic system focusing on the interaction with the occupant restraint system. This description is taken from U.S. Pat. No. 06,484,080.

For the purposes herein the following terms are defined as follows:

The term "component" refers to any part or assembly of parts that is mounted to or a part of a motor vehicle and which is capable of emitting a signal representative of its operating state that can be sensed by any appropriate sensor. The following is a partial list of general automobile and truck components, the list not being exclusive:

Occupant restraints;
engine;
transmission;
brakes and associated brake assembly;
tires;
wheel;
steering wheel and steering column assembly;
water pump;
alternator;
shock absorber;
wheel mounting assembly;
radiator;
battery;
oil pump;
fuel pump;
air conditioner compressor;
differential gear;
exhaust system;
fan belts;
engine valves;
steering assembly;
vehicle suspension including shock absorbers;
vehicle wiring system; and
engine cooling fan assembly.

The term "sensor" refers to any measuring or sensing device mounted on a vehicle or any of its components including new sensors mounted in conjunction with the diagnostic module in accordance with the invention. A partial, non-exclusive list of common sensors mounted on an automobile or truck is as follows:

airbag crash sensor;
accelerometer;
microphone;
camera;
antenna; capacitance sensor or other electromagnetic wave sensor;
stress or strain sensor;

pressure sensor;
weight sensor;
magnetic field or flux sensor;
coolant thermometer;
oil pressure sensor;
oil level sensor;
air flow meter;
voltmeter;
ammeter;
humidity sensor;
engine knock sensor;
oil turbidity sensor;
throttle position sensor;
steering wheel torque sensor;
wheel speed sensor;
tachometer;
speedometer;
other velocity sensors;
other position or displacement sensors;
oxygen sensor;
yaw, pitch and roll angular sensors;
clock;
odometer;
power steering pressure sensor;
pollution sensor;
fuel gauge;
cabin thermometer;
transmission fluid level sensor;
gyroscopes or other angular rate sensors including yaw, pitch and roll rate sensors;
coolant level sensor;
transmission fluid turbidity sensor;
break pressure sensor;
tire pressure sensor;
tire temperature sensor;
tire acceleration sensor;
GPS receiver;
DGPS receiver; and
coolant pressure sensor.

The term "signal" herein refers to any time varying output from a component including electrical, acoustic, thermal, or electromagnetic radiation, or mechanical vibration.

Sensors on a vehicle are generally designed to measure particular parameters of particular vehicle components. However, frequently these sensors also measure outputs from other vehicle components. For example, electronic airbag crash sensors currently in use contain an accelerometer for determining the accelerations of the vehicle structure so that the associated electronic circuitry of the airbag crash sensor can determine whether a vehicle is experiencing a crash of sufficient magnitude so as to require deployment of the airbag.

An IMU using up to three accelerometers and up to three gyroscopes can also be used. This accelerometer continuously monitors the vibrations in the vehicle structure regardless of the source of these vibrations. If a wheel is out-of-balance or delaminating, or if there is extensive wear of the parts of the front wheel mounting assembly, or wear in the shock absorbers, the resulting abnormal vibrations or accelerations can, in many cases, be sensed by the crash sensor accelerometer. There are other cases, however, where the sensitivity or location of the airbag crash sensor accelerometer is not appropriate and one or more additional accelerometers and/or gyroscopes or IMU may be mounted onto a vehicle for the purposes of this invention. Some airbag crash sensors are not sufficiently sensitive accelerometers or have sufficient dynamic range for the purposes herein.

Every component of a vehicle emits various signals during its life. These signals can take the form of electromagnetic radiation, acoustic radiation, thermal radiation, electric or magnetic field variations, vibrations transmitted through the vehicle structure, and voltage or current fluctuations, depending on the particular component. When a component is functioning normally, it may not emit a perceptible signal. In that case, the normal signal is no signal, i.e., the absence of a signal. In most cases, a component will emit signals that change over its life and it is these changes that contain information as to the state of the component, e.g., whether failure of the component is impending. Usually components do not fail without warning. However, most such warnings are either not perceived or if perceived are not understood by the vehicle operator until the component actually fails and, in some cases, a breakdown of the vehicle occurs. In a few years, it is expected that various roadways will have systems for automatically guiding vehicles operating thereon. Such systems have been called "smart highways" and are part of the field of intelligent transportation systems (ITS). If a vehicle operating on such a smart highway were to breakdown, serious disruption of the system could result and the safety of other users of the smart highway could be endangered.

As discussed in detail above, accelerometers are routinely used mounted outside of the crush zone for sensing the failure of the vehicle, that is, a crash of the vehicle. Looking at this in general terms, there is synergy between the requirements of sensing the status of the whole vehicle as well as its components and the same sensors can often be used for multiple purposes. The output of a microphone mounted in the vehicle could be used to help determine the existence and severity of a crash, for example.

In accordance with the invention, each of these signals emitted by the vehicle components is converted into electrical signals and then digitized (i.e., the analog signal is converted into a digital signal) to create numerical time series data that is then entered into a processor. Pattern recognition algorithms are then applied in the processor to attempt to identify and classify patterns in this time series data. For a particular component, such as a tire for example, the algorithm attempts to determine from the relevant digital data whether the tire is functioning properly and/or whether it requires balancing, additional air, or perhaps replacement. Future systems may bypass the A/D conversion and operate directly on the analog signals. Optical correlation systems are now used by the military that create the Fourier transform of an image directly using diffraction gratings and compare the image with a stored image.

Frequently, the data entered into the computer needs to be pre-processed before being analyzed by a pattern recognition algorithm. The data from a wheel speed sensor, for example, might be used as is for determining whether a particular tire is operating abnormally in the event it is unbalanced, whereas the integral of the wheel speed data over a long time period (integration being a pre-processing step), when compared to such sensors on different wheels, might be more useful in determining whether a particular tire is going flat and therefore needs air.

In some cases, the frequencies present in a set of data are a better predictor of component failures than the data itself. For example, when a motor begins to fail due to worn bearings, certain characteristic frequencies began to appear. In most cases, the vibrations arising from rotating components, such as the engine, will be normalized based on the rotational frequency as disclosed in a recent NASA TSP. Moreover, the identification of which component is causing vibrations present in the vehicle structure can frequently be accomplished through a frequency analysis of the data. For these cases, a Fourier transformation of the data is made prior to entry of the data into a pattern recognition algorithm. As mentioned above, optical correlations systems using Fourier transforms can also be applicable.

Other mathematical transformations are also made for particular pattern recognition purposes in practicing the teachings of this invention. Some of these include shifting and combining data to determine phase changes for example, differentiating the data, filtering the data, and sampling the data. Also, there exist certain more sophisticated mathematical operations that attempt to extract or highlight specific features of the data. This invention contemplates the use of a variety of these preprocessing techniques, and combinations thereof, and the choice of which one or ones is left to the skill of the practitioner designing a particular diagnostic module.

Another technique that is contemplated for some implementations of this invention is the use of multiple accelerometers and/or microphones that allow the system to locate the source of any measured vibrations based on the time of flight, or time of arrival of a signal at different locations, and/or triangulation techniques. Once a distributed accelerometer installation has been implemented to permit this source location, the same sensors can be used for smarter crash sensing as it will permit the determination of the location of the impact on the vehicle. Once the impact location is known, a highly tailored algorithm can be used to accurately forecast the crash severity making use of knowledge of the force vs. crush properties of the vehicle at the impact location.

When a vehicle component begins to change its operating behavior, it is not always apparent from the particular sensors, if any, which are monitoring that component. The output from any one of these sensors can be normal even though the component is failing. By analyzing the output of a variety of sensors, however, the pending failure can be diagnosed. For example, the rate of temperature rise in the vehicle coolant, if it were monitored, might appear normal unless it were known that the vehicle was idling and not traveling down a highway at a high speed. Even the level of coolant temperature which is in the normal range could in fact be abnormal in some situations signifying a failing coolant pump, for example, but not detectable from the coolant thermometer alone.

The pending failure of some components is difficult to diagnose and sometimes the design of the component requires modification so that the diagnosis can be more readily made. A fan belt, for example, frequently begins failing by a cracking of the inner surface. The belt can be designed to provide a sonic or electrical signal when this cracking begins in a variety of ways. Similarly, coolant hoses can be designed with an intentional weak spot where failure will occur first in a controlled manner that can also cause a whistle sound as a small amount of steam exits from the hose. This whistle sound can then be sensed by a general purpose microphone, for example.

Figure 29:
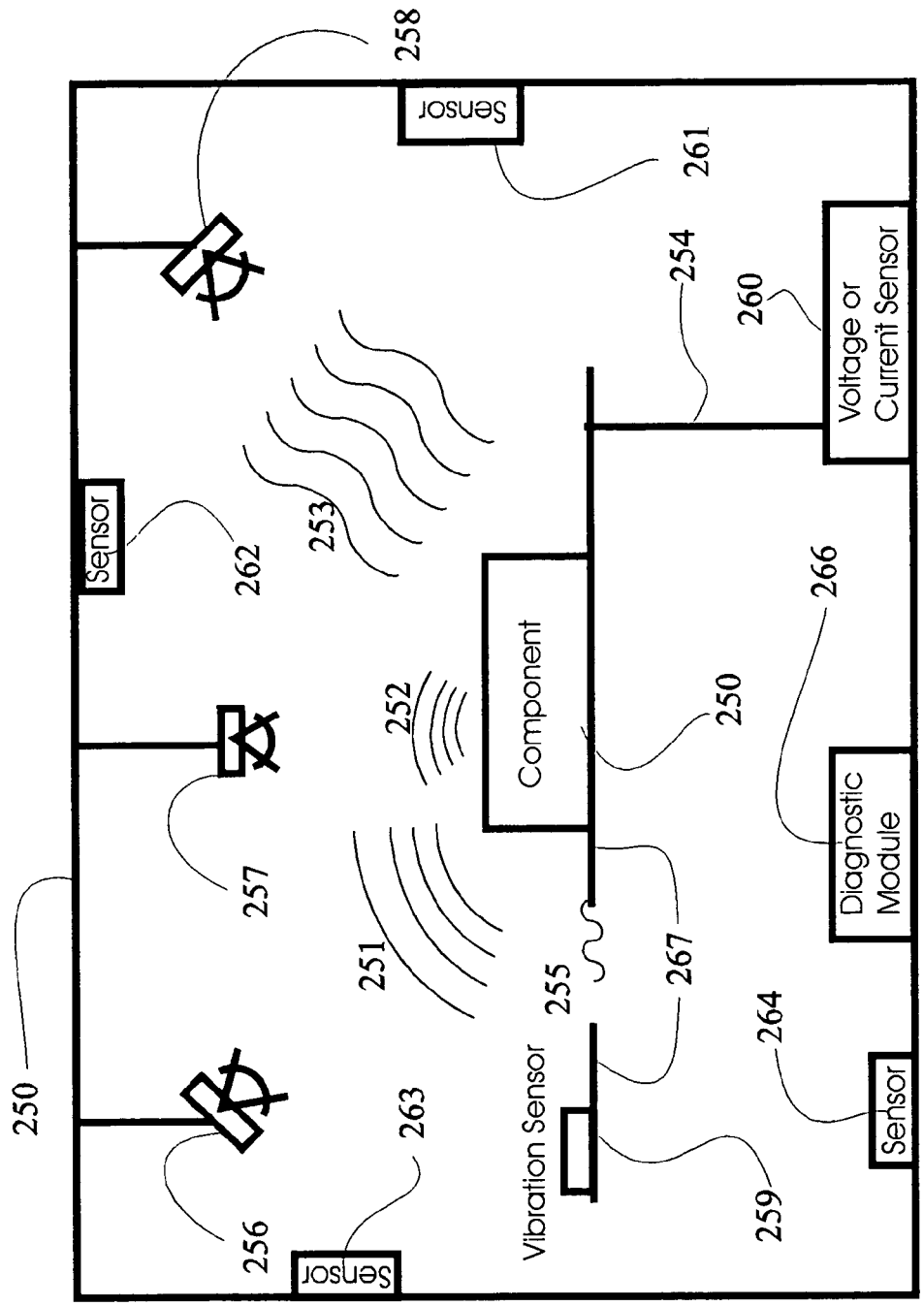
FIG. 29 is a schematic illustration of a generalized component with several signals being emitted and transmitted along a variety of paths, sensed by a variety of sensors and analyzed by the diagnostic module in accordance with the invention and for use in a method in accordance with the invention.

In FIG. 29, a generalized component 250 emitting several signals that are transmitted along a variety of paths, sensed by a variety of sensors and analyzed by the diagnostic device in accordance with the invention is illustrated schematically. Component 250 is mounted to a vehicle and during operation, it emits a variety of signals such as acoustic 251, electromagnetic radiation 252, thermal radiation 253, current and voltage fluctuations in conductor 254 and mechanical vibrations 255. Various sensors are mounted in the vehicle to detect the signals emitted by the component 250. These include one or more vibration sensors (accelerometers) 259, 261 and/or gyroscopes also mounted to the vehicle, one or more acoustic sensors 256, 262, electromagnetic radiation sensor 257, heat radiation sensor 258, and voltage or current sensor 260. In addition, various other sensors 263, 264 measure other parameters of other components that in some manner provide information directly or indirectly on the operation of component 250.

All of the sensors illustrated on FIG. 29 can be connected to a data bus 265 (not designated). A diagnostic module 266, in accordance with the invention, can also be attached to the vehicle data bus 265 and receives the signals generated by the various sensors. The sensors may however be wirelessly connected to the diagnostic module 266 and be integrated into a wireless power and communications system or a combination of wired and wireless connections.

As shown in FIG. 29, the diagnostic module 266 has access to the output data of each of the sensors that have potential information relative to the component 250. This data appears as a series of numerical values each corresponding to a measured value at a specific point in time. The cumulative data from a particular sensor is called a time series of individual data points. The diagnostic module 266 compares the patterns of data received from each sensor individually, or in combination with data from other sensors, with patterns for which the diagnostic module 266 has been trained to determine whether the component 250 is functioning normally or abnormally.

Important to this invention is the manner in which the diagnostic module 266 determines a normal pattern from an abnormal pattern and the manner in which it decides what data to use from the vast amount of data available. This is accomplished using pattern recognition technologies such as artificial neural networks and training. The theory of neural networks including many examples can be found in several books on the subject as discussed above. The neural network pattern recognition technology is one of the most developed of pattern recognition technologies. The neural network will be used here to illustrate one example of a pattern recognition technology but it is emphasized that this invention is not limited to neural networks. Rather, the invention may apply any known pattern recognition technology including sensor fusion and various correlation technologies. A brief description of the neural network pattern recognition technology is set forth below.

To train a neural network, data is provided in the form of one or more time series that represents the condition to be diagnosed as well as normal operation. As an example, the simple case of an out-of-balance tire will be used. Various sensors on the vehicle can be used to extract information from signals emitted by the tire such as an accelerometer, a torque sensor on the steering wheel, the pressure output of the power steering system, a tire pressure monitor or tire temperature monitor. Other sensors that might not have an obvious relationship to an unbalanced tire are also included such as, for example, the vehicle speed or wheel speed. Data is taken from a variety of vehicles where the tires were accurately balanced under a variety of operating conditions also for cases where varying amounts of unbalance was intentionally introduced. Once the data had been collected, some degree of preprocessing or feature extraction is usually performed to reduce the total amount of data fed to the neural network. In the case of the unbalanced tire, the time period between data points might be chosen such that there are at least ten data points per revolution of the wheel. For some other application, the time period might be one minute or one millisecond.

Once the data has been collected, it is processed by a neural network-generating program, for example, if a neural network pattern recognition system is to be used. Such programs are available commercially, e.g., from NeuralWare of Pittsburgh, Pa. The program proceeds in a trial and error manner until it successfully associates the various patterns representative of abnormal behavior, an unbalanced tire, with that condition. The resulting neural network can be tested to determine if some of the input data from some of the sensors, for example, can be eliminated. In this way, the engineer can determine what sensor data is relevant to a particular diagnostic problem. The program then generates an algorithm that is programmed onto a microprocessor, microcontroller, neural processor, or DSP (herein collectively referred to as a microprocessor or processor). Such a microprocessor appears inside the diagnostic module 266 in FIG. 29.

Once trained, the neural network, as represented by the algorithm, will now operationally recognize an unbalanced tire on a vehicle when this event occurs. At that time, when the tire is unbalanced, the diagnostic module 266 will output a signal indicative of the unbalanced tire, such as a signal to be sent to an output device which provides a message to the driver indicating that the tire should be now be balanced as described in more detail below. The message to the driver is provided by output means coupled to or incorporated within the module 266 and may be, e.g., a light on the dashboard, a vocal tone or any other recognizable indication apparatus. The output device could also provide its output signal to a remote facility, such as a dealer or tire shop to enable them to contact the driver to solicit the driver's business.

It is important to note that there may be many neural networks involved in a total vehicle diagnostic system. These can be organized either in parallel, series, as an ensemble, cellular neural network or as a modular neural network system. In one implementation of a modular neural network, a primary neural network identifies that there is an abnormality and tries to identify the likely source. Once a choice has been made as to the likely source of the abnormality, another of a group of neural networks is called upon to determine the exact cause of the abnormality. In this manner, the neural networks are arranged in a tree pattern with each neural network trained to perform a particular pattern recognition task.

Discussions on the operation of a neural network can be found in the above references on the subject and are well understood by those skilled in the art. Neural networks are the most well-known of the pattern recognition technologies based on training, although neural networks have only recently received widespread attention and have been applied to only very limited and specialized problems in motor vehicles. Other non-training based pattern recognition technologies exist, such as fuzzy logic. However, the programming required to use fuzzy logic, where the patterns must be determined by the programmer, render these systems impractical for general vehicle diagnostic problems such as described herein. Therefore, preferably the pattern recognition systems that learn by training are used herein.

The neural network is the first highly successful of what will be a variety of pattern recognition techniques based on training. There is nothing that suggests that it is the only or even the best technology. The characteristics of all of these technologies which render them applicable to this general diagnostic problem include the use of time-based input data and that they are trainable. In all cases, the pattern recognition technology learns from examples of data characteristic of normal and abnormal component operation.

A diagram of one example of a neural network used for diagnosing an unbalanced tire, for example, based on the teachings of this invention is shown in FIG. 2 (discussed above). The process can be programmed to periodically test for an unbalanced tire. Since this need be done only infrequently, the same processor can be used for many such diagnostic problems. When the particular diagnostic test is run, data from the previously determined relevant sensors is preprocessed and analyzed with the neural network algorithm. For the unbalanced tire, using the data from an accelerometer for example, the digital acceleration values from the analog to digital converter in the accelerometer are entered into nodes 1 through n and the neural network algorithm compares the pattern of values on nodes 1 through n with patterns for which it has been trained as follows.

Each of the input nodes is connected to each of the second layer nodes, h-l,h-2, . . . ,h-n, called the hidden layer, either electrically as in the case of a neural computer, or through mathematical functions containing multiplying coefficients called weights, in the manner described in more detail in the above references. At each hidden layer node, a summation occurs of the values from each of the input layer nodes, which have been operated on by functions containing the weights, to create a node value. Similarly, the hidden layer nodes are in like manner connected to the output layer node(s), which in this example is only a single node O representing the decision to notify the driver of the unbalanced tire. During the training phase, an output node value of 1, for example, is assigned to indicate that the driver should be notified and a value of 0 is assigned to not providing an indication to the driver. Once again, the details of this process are described in above-referenced texts and will not be presented in detail here.

In the example above, twenty input nodes were used, five hidden layer nodes and one output layer node. In this example, only one sensor was considered and accelerations from only one direction were used. If other data from other sensors such as accelerations from the vertical or lateral directions were also used, then the number of input layer nodes would increase. Again, the theory for determining the complexity of a neural network for a particular application has been the subject of many technical papers and will not be presented in detail here. Determining the requisite complexity for the example presented here can be accomplished by those skilled in the art of neural network design.

Briefly, the neural network described above defines a method, using a pattern recognition system, of sensing an unbalanced tire and determining whether to notify the driver and comprises the steps of:

(a) obtaining an acceleration signal from an accelerometer mounted on a vehicle;

(b) converting the acceleration signal into a digital time series;

(c) entering the digital time series data into the input nodes of the neural network;

(d) performing a mathematical operation on the data from each of the input nodes and inputting the operated on data into a second series of nodes wherein the operation performed on each of the input node data prior to inputting the operated on value to a second series node is different from that operation performed on some other input node data;

(e) combining the operated on data from all of the input nodes into each second series node to form a value at each second series node;

(f) performing a mathematical operation on each of the values on the second series of nodes and inputting this operated on data into an output series of nodes wherein the operation performed on each of the second series node data prior to inputting the operated on value to an output series node is different from that operation performed on some other second series node data;

(g) combining the operated on data from all of the second series nodes into each output series node to form a value at each output series node; and (h) notifying a driver if the value on one output series node is within a selected range signifying that a tire requires balancing.

This method can be generalized to a method of predicting that a component of a vehicle will fail comprising the steps of:

(a) sensing a signal emitted from the component;

(b) converting the sensed signal into a digital time series;

(c) entering the digital time series data into a pattern recognition algorithm;

(d) executing the pattern recognition algorithm to determine if there exists within the digital time series data a pattern characteristic of abnormal operation of the component; and (e) notifying a driver if the abnormal pattern is recognized.

The particular neural network described and illustrated above contains a single series of hidden layer nodes. In some network designs, more than one hidden layer is used, although only rarely will more than two such layers appear. There are of course many other variations of the neural network architecture illustrated above which appear in the referenced literature. For the purposes herein, therefore, "neural network" will be defined as a system wherein the data to be processed is separated into discrete values which are then operated on and combined in at least a two stage process and where the operation performed on the data at each stage is, in general, different for each discrete value and where the operation performed is at least determined through a training process.

The implementation of neural networks can take on at least two forms, an algorithm programmed on a digital microprocessor, DSP or in a neural computer. In this regard, it is noted that neural computer chips are now becoming available.

In the example above, only a single component failure was discussed using only a single sensor since the data from the single sensor contains a pattern which the neural network was trained to recognize as either normal operation of the component or abnormal operation of the component. The diagnostic module 266 contains preprocessing and neural network algorithms for a number of component failures. The neural network algorithms are generally relatively simple, requiring only a few lines of computer code. A single general neural network program can be used for multiple pattern recognition cases by specifying different coefficients for the various terms, one set for each application. Thus, adding different diagnostic checks has only a small affect on the cost of the system. Also, the system has available to it all of the information available on the data bus. During the training process, the pattern recognition program sorts out from the available vehicle data on the data bus or from other sources, those patterns that predict failure of a particular component. Sometimes more than one data bus are used. For example, is some cases there is a general data bus and one reserved for safety systems. Any number of data buses can of course be monitored.

Figure 30:
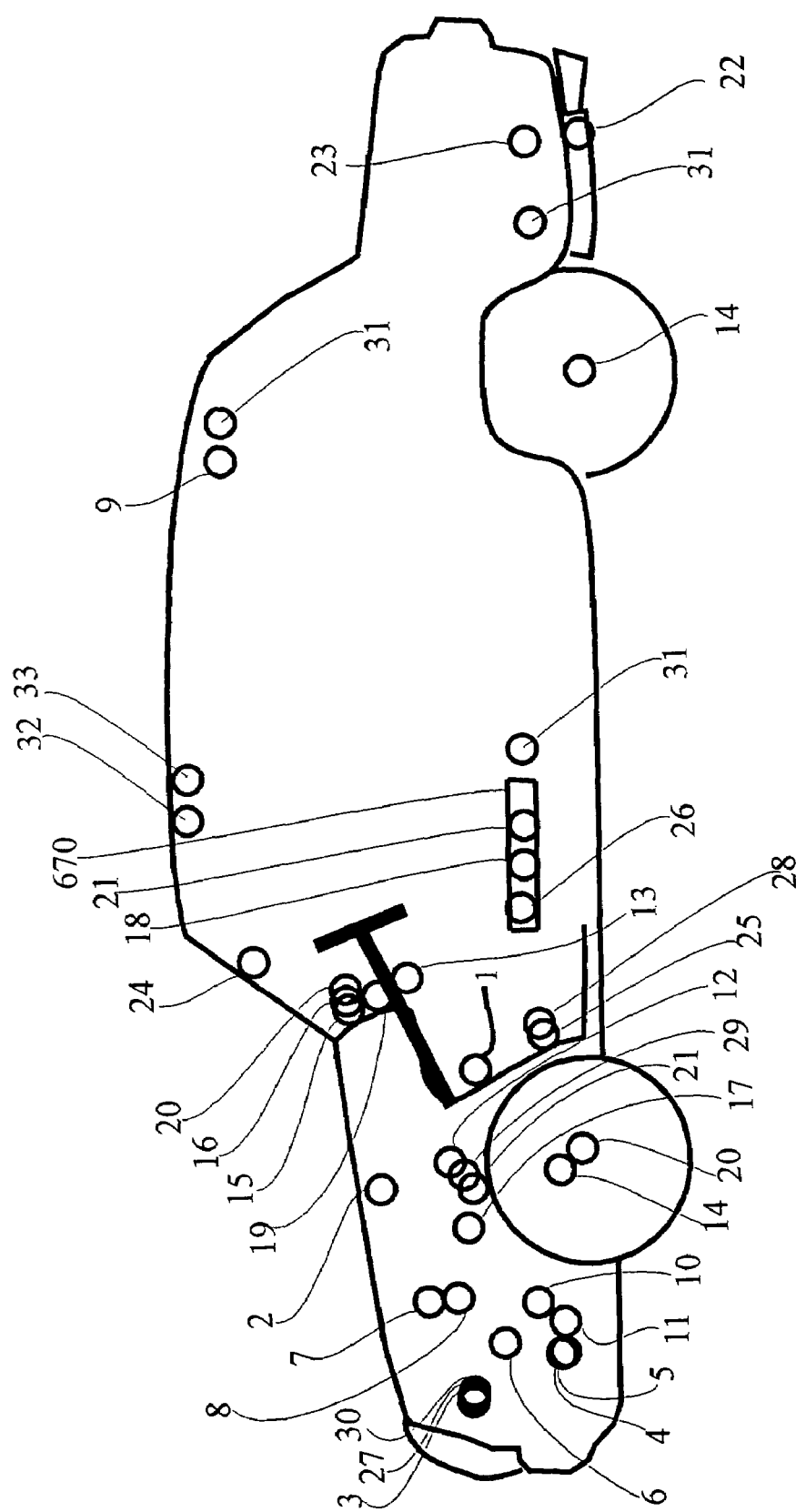
FIG. 30 is a schematic of a vehicle with several components and several sensors and a total vehicle diagnostic system in accordance with the invention utilizing a diagnostic module in accordance with the invention and which may be used in a method in accordance with the invention.

In FIG. 30, a schematic of a vehicle with several components and several sensors are shown in their approximate locations on a vehicle along with a total vehicle diagnostic system in accordance with the invention utilizing a diagnostic module in accordance with the invention. A flow diagram of information passing from the various sensors shown on FIG. 30 onto a vehicle data bus and thereby into the diagnostic device in accordance with the invention is shown in FIG. 31 along with outputs to a display 278 for notifying the driver and to the vehicle cellular phone 279, or other communication device, for notifying the dealer, vehicle manufacturer or other entity concerned with the failure of a component in the vehicle including the vehicle itself such as occurs in a crash. If the vehicle is operating on a smart highway, for example, the pending component failure information may also be communicated to a highway control system and/or to other vehicles in the vicinity so that an orderly exiting of the vehicle from the smart highway can be facilitated. FIG. 31 also contains the names of the sensors shown numbered on FIG. 30.

Sensor 1 is a crash sensor having an accelerometer (alternately one or more dedicated accelerometers can be used), sensor 2 is represents one or more microphones, sensor 3 is a coolant thermometer, sensor 4 is an oil pressure sensor, sensor 5 is an oil level sensor, sensor 6 is an air flow meter, sensor 7 is a voltmeter, sensor 8 is an ammeter sensor 9 is a humidity sensor, sensor 10 is an engine knock sensor, sensor 11 is an oil turbidity sensor, sensor 12 is throttle position sensor, sensor 13 is a steering torque sensor, sensor 14 is a wheel speed sensor, sensor 15 is a tachometer, sensor 16 is a speedometer, sensor 17 is an oxygen sensor, sensor 18 is a pitch/roll sensor, sensor 19 is a clock, sensor 20 is an odometer, sensor 21 is a power steering pressure sensor, sensor 22 is a pollution sensor, sensor 23 is a fuel gauge, sensor 24 is a cabin thermometer, sensor 25 is a transmission fluid level sensor, sensor is a yaw sensor, sensor 27 is a coolant level sensor, sensor 28 is a transmission fluid turbidity sensor, sensor 29 is brake pressure sensor and sensor 30 is a coolant pressure sensor. Other possible sensors include a temperature transducer, a pressure transducer, a liquid level sensor, a flow meter, a position sensor, a velocity sensor, a RPM sensor, a chemical sensor and an angle sensor, angular rate sensor or gyroscope.

If a distributed group of acceleration sensors or accelerometers are used to permit a determination of the location of a vibration source, the same group can, in some cases, also be used to measure the pitch, yaw and/or roll of the vehicle eliminating the need for dedicated angular rate sensors. In addition, as mentioned above, such a suite of sensors can also be used to determine the location and severity of a vehicle crash and additionally to determine that the vehicle is on the verge of rolling over. Thus, the same suite of accelerometers optimally performs a variety of functions including inertial navigation, crash sensing, vehicle diagnostics, roll over sensing etc.

Consider now some examples. The following is a partial list of potential component failures and the sensors from the list on FIG. 31 that might provide information to predict the failure of the component:

| | |
|---|---|
| Vehicle crash | 1, 2, 14, 16, 18, 26, 31, 32, 33 |
| Vehicle Rollover | 1, 2, 14, 16, 18, 26, 31, 32, 33 |
| Out of balance tires | 1, 13, 14, 15, 20, 21 |
| Front end out of alignment | 1, 13, 21, 26 |
| Tune up required | 1, 3, 10, 12, 15, 17, 20, 22 |

-continued

| | |
|---|---|
| Oil change needed | 3, 4, 5, 11 |
| Motor failure | 1, 2, 3, 4, 5, 6, 10, 12, 15, 17, 22 |
| Low tire pressure | 1, 13, 14, 15, 20, 21 |
| Front end looseness | 1, 13, 16, 21, 26 |
| Cooling system failure | 3, 15, 24, 27, 30 |
| Alternator problems | 1, 2, 7, 8, 15, 19, 20 |
| Transmission problems | 1, 3, 12, 15, 16, 20, 25, 28 |
| Differential problems | 1, 12, 14 |
| Brakes | 1, 2, 14, 18, 20, 26, 29 |
| Catalytic converter and muffler | 1, 2, 12, 15, 22 |
| Ignition | 1, 2, 7, 8, 9, 10, 12, 17, 23 |
| Tire wear | 1, 13, 14, 15, 18, 20, 21, 26 |
| Fuel leakage | 20, 23 |
| Fan belt slippage | 1, 2, 3, 7, 8, 12, 15, 19, 20 |
| Alternator deterioration | 1, 2, 7, 8, 15, 19 |
| Coolant pump failure | 1, 2, 3, 24, 27, 30 |
| Coolant hose failure | 1, 2, 3, 27, 30 |
| Starter failure | 1, 2, 7, 8, 9, 12, 15 |
| Dirty air filter | 2, 3, 6, 11, 12, 17, 22 |

Several interesting facts can be deduced from a review of the above list. First, all of the failure modes listed can be at least partially sensed by multiple sensors. In many cases, some of the sensors merely add information to aid in the interpretation of signals received from other sensors. In today's automobile, there are few if any cases where multiple sensors are used to diagnose or predict a problem. In fact, there is virtually no failure prediction undertaken at all. Second, many of the failure modes listed require information from more than one sensor. Third, information for many of the failure modes listed cannot be obtained by observing one data point in time as is now done by most vehicle sensors. Usually an analysis of the variation in a parameter as a function of time is necessary. In fact, the association of data with time to create a temporal pattern for use in diagnosing component failures in automobile is believed to be unique to this invention as is the combination of several such temporal patterns. Fourth, the vibration measuring capability of the airbag crash sensor, or other accelerometer, is useful for most of the cases discussed above yet, at the time of this invention, there was no such use of accelerometers except as non-crush zone mounted crash sensors. The airbag crash sensor is used only to detect crashes of the vehicle. Fifth, the second most-used sensor in the above list, a microphone, does not currently appear on any automobiles yet sound is the signal most often used by vehicle operators and mechanics to diagnose vehicle problems. Another sensor that is listed above which also did not currently appear on automobiles at the time of this invention is a pollution sensor. This is typically a chemical sensor mounted in the exhaust system for detecting emissions from the vehicle. It is expected that this and other chemical sensors will be used more in the future.

In addition, from the foregoing depiction of different sensors which receive signals from a plurality of components, it is possible for a single sensor to receive and output signals from a plurality of components which are then analyzed by the processor to determine if any one of the components for which the received signals were obtained by that sensor is operating in an abnormal state. Likewise, it is also possible to provide for a multiplicity of sensors each receiving a different signal related to a specific component which are then analyzed by the processor to determine if that component is operating in an abnormal state. Note that neural networks can simultaneously analyze data from multiple sensors of the same type or different types.

The discussion above has centered on notifying the vehicle operator of a pending problem with a vehicle component. Today, there is great competition in the automobile marketplace and the manufacturers and dealers who are most responsive to customers are likely to benefit by increased sales both from repeat purchasers and new customers. The diagnostic module disclosed herein benefits the dealer by making him instantly aware, through the cellular telephone system, or other communication link, coupled to the diagnostic module or system in accordance with the invention, when a component is likely to fail.

As envisioned, on some automobiles, when the diagnostic module 266 detects a potential failure it not only notifies the driver through a display 278, but also automatically notifies the dealer through a vehicle cellular phone 279. The dealer can thus contact the vehicle owner and schedule an appointment to undertake the necessary repair at each party's mutual convenience. The customer is pleased since a potential vehicle breakdown has been avoided and the dealer is pleased since he is likely to perform the repair work. The vehicle manufacturer also benefits by early and accurate statistics on the failure rate of vehicle components. This early warning system can reduce the cost of a potential recall for components having design defects. It could even have saved lives if such a system had been in place during the Firestone tire failure problem mentioned above. The vehicle manufacturer will thus be guided toward producing higher quality vehicles thus improving his competitiveness. Finally, experience with this system will actually lead to a reduction in the number of sensors on the vehicle since only those sensors that are successful in predicting failures will be necessary.

For most cases, it is sufficient to notify a driver that a component is about to fail through a warning display. In some critical cases, action beyond warning the driver may be required. If, for example, the diagnostic module detected that the alternator was beginning to fail, in addition to warning the driver of this eventuality, the module could send a signal to another vehicle system to turn off all non-essential devices which use electricity thereby conserving electrical energy and maximizing the time and distance that the vehicle can travel before exhausting the energy in the battery. Additionally, this system can be coupled to a system such as OnStar® or a vehicle route guidance system, and the driver can be guided to the nearest open repair facility or a facility of his or her choice.

In the discussion above, the diagnostic module of this invention assumes that a vehicle data bus exists which is used by all of the relevant sensors on the vehicle. Most vehicles manufactured at the time of this invention did not have a data bus although it was widely believed that most vehicles will have one in the near future. A vehicle safety bus has been considered for several vehicle models. Naturally, the relevant signals can be transmitted to the diagnostic module through a variety of coupling means other than through a data bus and this invention is not limited to vehicles having a data bus. For example, the data can be sent wirelessly to the diagnostic module using the Bluetooth of WiFi specification. In some cases, even the sensors do not have to be wired and can obtain their power via RF from the interrogator as is well known in the RFID (radio frequency identification) field. Alternately, an inductive or capacitive power transfer system can be used.

As can be appreciated from the above discussion, the invention described herein brings several new improvements to automobiles including, but not limited to, the use of pattern recognition technologies to diagnose potential vehicle component failures, the use of trainable systems thereby eliminating the need of complex and extensive programming, the simultaneous use of multiple sensors to monitor a particular component, the use of a single sensor to monitor the operation of many vehicle components, the monitoring of vehicle components which have no dedicated sensors, and the notification of both the driver and possibly an outside entity of a potential component failure in time so that the failure can be averted and vehicle breakdowns substantially eliminated. Additionally, improvements to the vehicle stability, crash avoidance, crash anticipation and occupant protection are available.

To implement a component diagnostic system for diagnosing the component utilizing a plurality of sensors not directly associated with the component, i.e., independent of the component, a series of tests are conducted. For each test, the signals received from the sensors are input into a pattern recognition training algorithm with an indication of whether the component is operating normally or abnormally (the component being intentionally altered to provide for abnormal operation). The data from the test are used to generate the pattern recognition algorithm, e.g., a neural network, so that in use, the data from the sensors is input into the algorithm and the algorithm provides an indication of abnormal or normal operation of the component. Also, to provide a more versatile diagnostic module for use in conjunction with diagnosing abnormal operation of multiple components, tests may be conducted in which each component is operated abnormally while the other components are operating normally, as well as tests in which two or more components are operating abnormally. In this manner, the diagnostic module may be able to determine based on one set of signals from the sensors during use that either a single component or multiple components are operating abnormally. Of course, crash tests are also run to permit crash sensing.

Furthermore, the pattern recognition algorithm may be trained based on patterns within the signals from the sensors. Thus, by means of a single sensor, it would be possible to determine whether one or more components are operating abnormally. To obtain such a pattern recognition algorithm, tests are conducted using a single sensor, such as a microphone, and causing abnormal operation of one or more components, each component operating abnormally while the other components operate normally and multiple components operating abnormally. In this manner, in use, the pattern recognition algorithm may analyze a signal from a single sensor and determine abnormal operation of one or more components. In some cases, simulations can be used to analytically generate the relevant data.

The invention is also particularly useful in light of the foreseeable implementation of smart highways. Smart highways will result in vehicles traveling down highways under partial or complete control of an automatic system, i.e., not being controlled by the driver. The on-board diagnostic system will thus be able to determine failure of a component prior to and/or upon failure thereof and inform the vehicle's guidance system to cause the vehicle to move out of the stream of traffic, i.e., onto a shoulder of the highway, in a safe and orderly manner. Moreover, the diagnostic system may be controlled or programmed to prevent the movement of the disabled vehicle back into the stream of traffic until the repair of the component is satisfactorily completed.

In a method in accordance with this embodiment, the operation of the component would be monitored and if abnormal operation of the component is detected, e.g., by any of the methods and apparatus disclosed herein (although other component failure systems may of course be used in this implementation), the vehicle guidance system which controls the movement of the vehicle would be notified, e.g., via a signal from the diagnostic module to the guidance system, and the guidance system would be programmed to move the vehicle out of the stream of traffic, or off of the restricted roadway, possibly to a service station or dealer, upon reception of the particular signal from the diagnostic module. The automatic guidance systems for vehicles traveling on highways may be any existing system or system being developed, such as one based on satellite positioning techniques or ground-based positioning techniques. Since the guidance system may be programmed to ascertain the vehicle's position on the highway, it can determine the vehicle's current position, the nearest location out of the stream of traffic, or off of the restricted roadway, such as an appropriate shoulder or exit to which the vehicle may be moved, and the path of movement of the vehicle from the current position to the location out of the stream of traffic, or off of the restricted roadway. The vehicle may thus be moved along this path under the control of the automatic guidance system. In the alternative, the path may be displayed to a driver and the driver can follow the path, i.e., manually control the vehicle. The diagnostic module and/or guidance system may be designed to prevent re-entry of the vehicle into the stream of traffic, or off of the restricted roadway, until the abnormal operation of the component is satisfactorily addressed.

Figure 32:
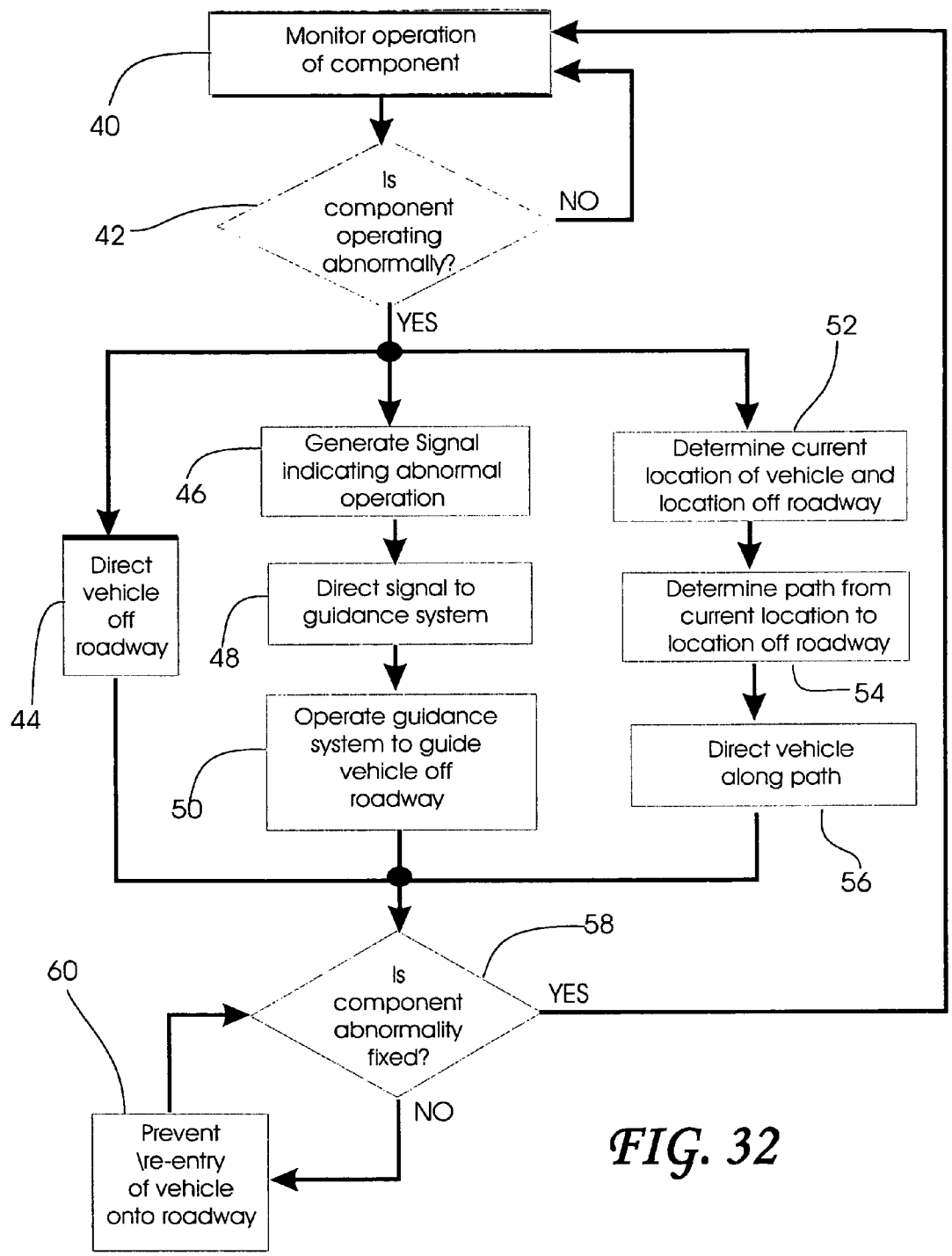
FIG. 32 is a flow chart of the methods for automatically monitoring a vehicular component in accordance with the invention.

FIG. 32 is a flow chart of some of the methods for directing a vehicle off of a roadway if a component is operating abnormally. The component's operation is monitored at 40 and a determination is made at 42 whether its operation is abnormal. If not, the operation of the component is monitored further (at periodic intervals). If the operation of the component is abnormal, the vehicle can be directed off the roadway at 44. More particularly, this can be accomplished by generating a signal indicating the abnormal operation of the component at 46, directing this signal to a guidance system in the vehicle at 48 that guides movement of the vehicle off of the roadway at 50. Also, if the component is operating abnormally, the current position of the vehicle and the location of a site off of the roadway can be determined at 52, e.g., using satellite-based or ground-based location determining techniques, a path from the current location to the off-roadway location determined at 54 and then the vehicle directed along this path at 56. Periodically, a determination is made at 58 whether the component's abnormality has been satisfactorily addressed and/or corrected and if so, the vehicle can re-enter the roadway and operation and monitoring of the component begin again. If not, the re-entry of the vehicle onto the roadway is prevented at 60.

Figure 33:
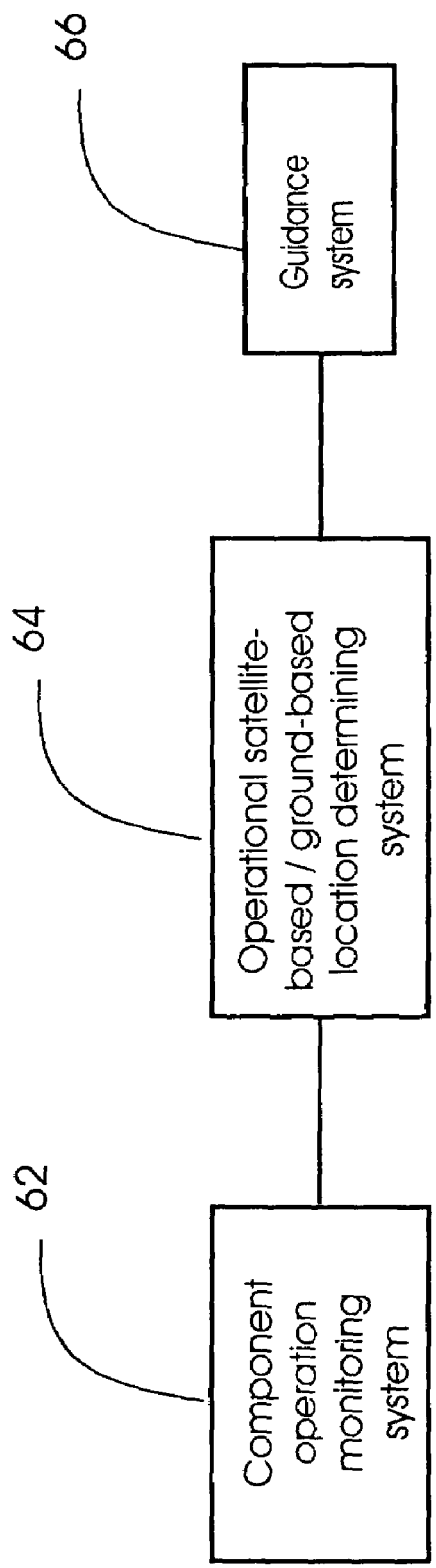
FIG. 33 is a schematic illustration of the components used in the methods for automatically monitoring a vehicular component.

FIG. 33 schematically shows the basic components for performing this method, i.e., a component operation monitoring system 62 (such as described above), an optional satellite-based or ground-based positioning system 64 and a vehicle guidance system 66.

Figure 34:
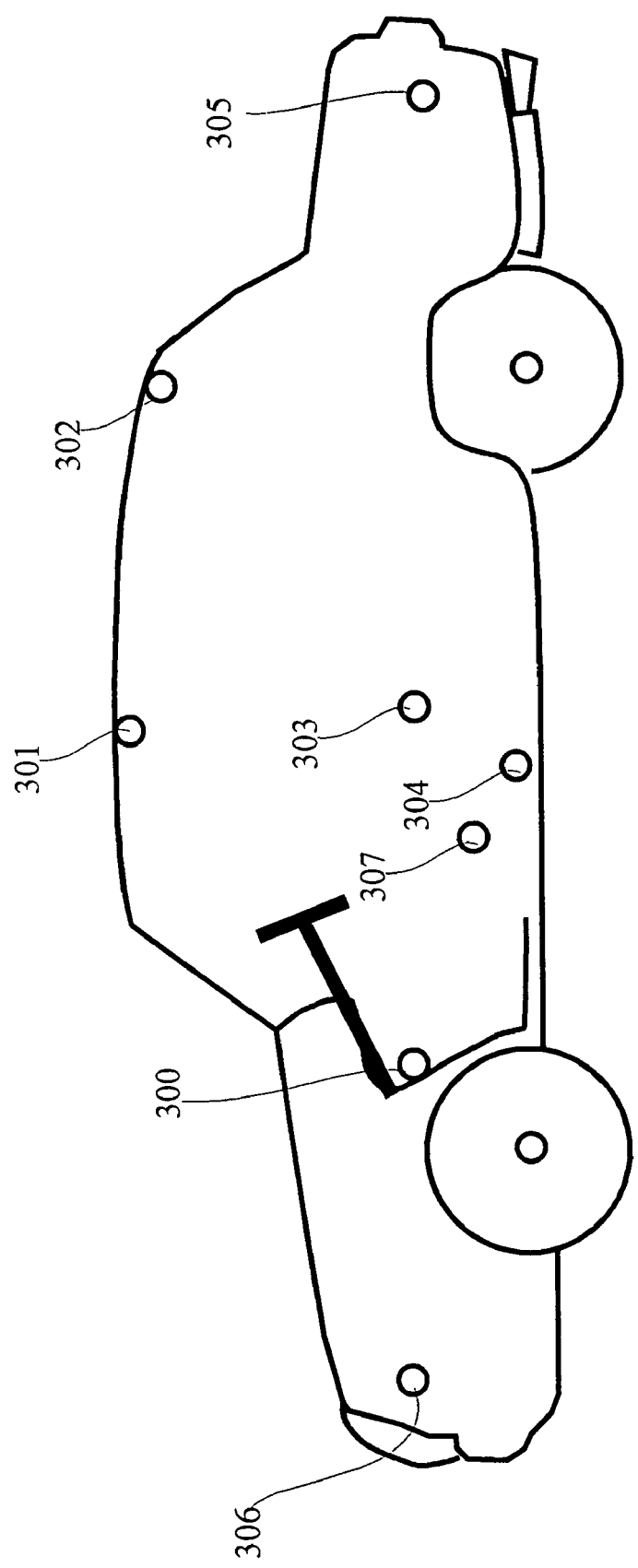
FIG. 34 is a schematic of a vehicle with several accelerometers and/or gyroscopes at preferred locations in the vehicle.

FIG. 34 illustrates the placement of a variety of sensors, primarily accelerometers and/or gyroscopes, which can be used to diagnose the state of the vehicle itself. Sensor 300 can measure the acceleration of the firewall or instrument panel and is located thereon generally midway between the two sides of the vehicle. Sensor 301 can be located in the headliner or attached to the vehicle roof above the side door. Typically, there will be two such sensors, one on either side of the vehicle. Sensor 302 is shown in a typical mounting location midway between the sides of the vehicle attached to or near the vehicle roof above the rear window. Sensor 305 is shown in a typical mounting location in the vehicle trunk adjacent the rear of the vehicle. One, two or three such sensors can be used depending on the application. If three such sensors are used, one would be adjacent each side of vehicle and one in the center. Sensor 303 is shown in a typical mounting location in the vehicle door and sensor 304 is shown in a typical mounting location on the sill or floor below the door. Finally, sensor 306, which can be also multiple sensors, is shown in a typical mounting location forward in a forward crush zone of the vehicle. If three such sensors are used, one would be adjacent each vehicle side and one in the center.

In general, sensors 300-306 provide a measurement of the state of the sensor, such as its velocity, acceleration, angular orientation or temperature, or a state of the location at which the sensor is mounted. Thus, measurements related to the state of the sensor 300-306 would include measurements of the acceleration of the sensor, measurements of the temperature of the mounting location as well as changes in the state of the sensor and rates of changes of the state of the sensor. As such, any described use or function of the sensors 300-306 above is merely exemplary and is not intended to limit the form of the sensor or its function.

Each of the sensors 300-306 may be single axis, double axis or triaxial accelerometers and/or gyroscopes typically of the MEMS type. MEMS stands for microelectromechanical system and is a term known to those skilled in the art. These sensors 300-306 can either be wired to the central control module or processor directly wherein they would receive power and transmit information, or they could be connected onto the vehicle bus or, in some cases, using RFID technology, the sensors can be wireless and would receive their power through RF from one or more interrogators located in the vehicle. RFID stands for radio frequency identification wherein sensors are each provided with an identification code and designed to be powered by the energy in a radio frequency wave containing that code which is emitted by the interrogator. In this case, the interrogators can be connected either to the vehicle bus or directly to control module. Alternately, an inductive or capacitive power and information transfer system can be used.

One particular implementation will now be described. In this case, each of the sensors 301-307 is a single or dual axis accelerometer. They are made using silicon micromachined technology such as disclosed in U.S. Pat. Nos. 05,121,180 and 05,894,090. These are only representative patents of these devices and there exist more than 100 other relevant U.S. patents describing this technology. Commercially available MEMS gyroscopes such as from Systron Doner have accuracies of approximately one degree per second. In contrast, optical gyroscopes typically have accuracies of approximately one degree per hour. Unfortunately, the optical gyroscopes are prohibitively expensive for automotive applications. On the other hand, typical MEMS gyroscopes are not sufficiently accurate for many control applications.

Figure 35:
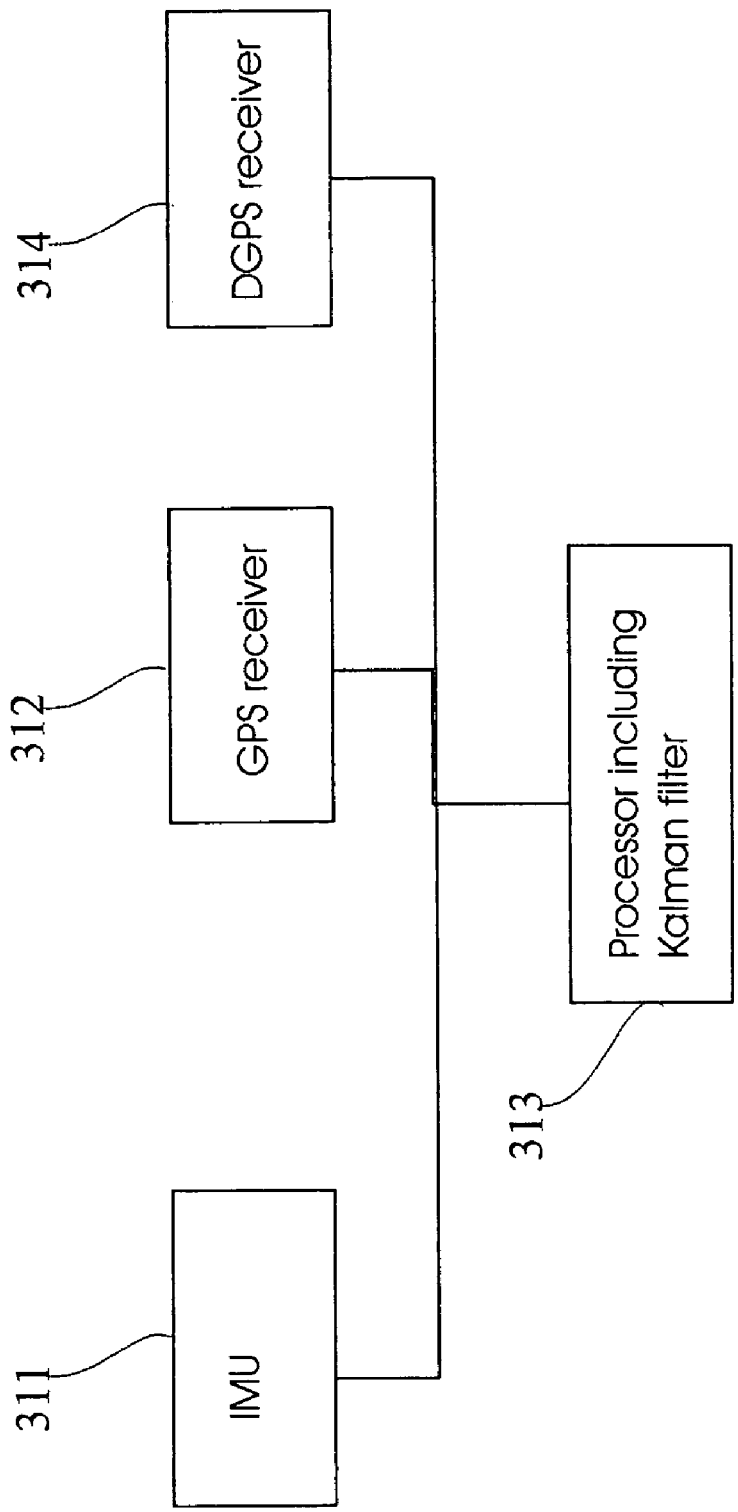
FIG. 35 is a block diagram of an inertial measurement unit calibrated with a GPS and/or DGPS system using a Kalman filter.

Referring now to FIG. 35, one solution is to use an inertial measurement unit (IMU) 311 that can contain up to three accelerometers and three gyroscopes all produced as MEMS devices. If the devices are assembled into a single unit and carefully calibrated to remove all predictable errors, and then coupled with a GPS 312 and/or DGPS system 314 using a Kalman filter embodied in a processor or other control unit 313, the IMU 311 can be made to have accuracies comparable with military grade IMU containing precision accelerometers and fiber optic gyroscopes at a small fraction of the cost of the military IMU.

Thus, in connection with the control of parts of the vehicle, location information may be obtained from the GPS receiver 312 and input to a pattern recognition system for consideration when determining a control signal for the part of the vehicle. Position information from the IMU 311 could alternatively or additionally be provided to the pattern recognition system. The location determination by the GPS receiver 312 and IMU 311 may be improved using the Kalman filter embodied in processor 313 in conjunction with the pattern recognition system to diagnose, for example, the state of the vehicle.

Another way to use the IMU 311, GPS receiver 312 and Kalman filter embodied in processor 313 would be to use the GPS receiver 312 and Kalman filter in processor 313 to periodically calibrate the location of the vehicle as determined by the IMU 311 using data from the GPS receiver 312 and the Kalman filter embodied in processor 313. A DGPS receiver 314 could also be coupled to the processor 313 in which case, the processor 313 would receive information from the DGPS receiver 314 and correct the determination of the location of the vehicle as determined by the GPS receiver 312 or the IMU 311.

The angular rate function can be obtained through placing accelerometers at two separated, non-co-located points in a vehicle and using the differential acceleration to obtain an indication of angular motion and angular acceleration. From the variety of accelerometers shown on FIG. 34, it can be readily appreciated that not only will all accelerations of key parts of the vehicle be determined, but the pitch, yaw and roll angular rates can also be determined based on the accuracy of the accelerometers. By this method, low cost systems can be developed which, although not as accurate as the optical gyroscopes, are considerably more accurate than conventional MEMS gyroscopes. The pitch, yaw and roll of a vehicle can also be accurately determined using GPS and three antennas by comparing the phase of the carrier frequency from a satellite.

Instead of using two accelerometers at separate locations on the vehicle, a single conformal MEMS-IDT gyroscope may be used. A MEMS-IDT gyroscope is a microelectromechanical system-interdigital transducer gyroscope. Such a conformal MEMS-IDT gyroscope is described in a paper by V. K. Karadan, Conformal MEMS-IDT Gyroscopes and Their Comparison With Fiber Optic Gyro, incorporated in its entirety herein. The MEMS-IDT gyroscope is based on the principle of surface acoustic wave (SAW) standing waves on a piezoelectric substrate. A surface acoustic wave resonator is used to create standing waves inside a cavity and the particles at the anti-nodes of the standing waves experience large amplitude of vibrations, which serves as the reference vibrating motion for the gyroscope. Arrays of metallic dots are positioned at the anti-node locations so that the effect of Coriolis force due to rotation will acoustically amplify the magnitude of the waves. Unlike other MEMS gyroscopes, the MEMS-IDT gyroscope has a planar configuration with no suspended resonating mechanical structures.

The system of FIG. 34 preferably uses dual axis accelerometers, and therefore provides a complete diagnostic system of the vehicle itself and its dynamic motion. Such a system is believed to be far more accurate than any system currently available in the automotive market. This system provides very accurate crash discrimination since the exact location of the crash can be determined and, coupled with knowledge of the force deflection characteristics of the vehicle at the accident impact site, an accurate determination of the crash severity and thus the need for occupant restraint deployment can be made. Similarly, the tendency of a vehicle to roll-over can be predicted in advance and signals sent to the vehicle steering, braking and throttle systems to attempt to ameliorate the rollover situation or prevent it. In the event that it cannot be prevented, the deployment side curtain airbags can be initiated in a timely manner.

Similarly, the tendency of the vehicle to slide or skid can be considerably more accurately determined and again the steering, braking and throttle systems commanded to minimize the unstable vehicle behavior.

Thus, through the sample deployment of inexpensive accelerometers at a variety of locations in the vehicle, significant improvements are many in the areas of vehicle stability control, crash sensing, rollover sensing, and resulting occupant protection technologies.

Finally, as mentioned above, the combination of the outputs from these accelerometer sensors and the output of strain gage weight sensors in a vehicle seat, or in/on a support structure of the seat, can be used to make an accurate assessment of the occupancy of the seat and differentiate between animate and inanimate occupants as well as determining where in the seat the occupants are sitting. This can be done by observing the acceleration signals from the sensors of FIG. 34 and simultaneously the dynamic strain gage measurements from seat mounted strain gages. The accelerometers provide the input function to the seat and the strain gages measure the reaction of the occupying item to the vehicle acceleration and thereby provide a method for dynamically determining the mass of the occupying item and its location. This is particularly important for occupant position sensing during a crash event. By combining the outputs of the accelerometers and the strain gages and appropriately processing the same, the mass and weight of an object occupying the seat can be determined as well as the gross motion of such an object so that an assessment can be made as to whether the object is a life form such as a human being.

For this embodiment, sensor 308 in FIG. 34 (not shown) represents one or more strain gage or bladder weight sensors mounted on the seat or in connection with the seat or its support structure. Suitable mounting locations and forms of weight sensors are discussed in the current assignee's U.S. Pat. Nos. 06,242,701 and 06,442,504 and contemplated for use in this invention as well. The mass or weight of the occupying item of the seat can thus be measured based on the dynamic measurement of the strain gages with optional consideration of the measurements of accelerometers on the vehicle, which are represented by any of sensors 300-307.

Thus, discussed above is an embodiment of a component diagnostic system for diagnosing the component in accordance with the invention which comprises a plurality of sensors not directly associated with the component, i.e., independent therefrom, such that the component does not directly affect the sensors, each sensor detecting a signal containing information as to whether the component is operating normally or abnormally and outputting a corresponding electrical signal, processor means coupled to the sensors for receiving and processing the electrical signals and for determining if the component is operating abnormally based on the electrical signals, and output means coupled to the processor means for affecting another system within the vehicle if the component is operating abnormally. The processor means preferably comprise pattern recognition means such as a trained pattern recognition algorithm such as a neural network, modular neural network or an ensemble of neural networks, cellular neural networks, support vector machines or the like. In some cases, fuzzy logic will be used which can be combined with a neural network to form a neural fuzzy algorithm.

The second system may be a display for indicating the abnormal state of operation of the component arranged in a position in the vehicle to enable a driver of the vehicle to view the display and thus the indicated abnormal operation of the component. At least one source of additional information, e.g., the time and date, may be provided and input means coupled to the vehicle for inputting the additional information into the processor means. The second system may also be a warning device including transmission means for transmitting information related to the component abnormal operating state to a site remote from the vehicle, e.g., a vehicle repair facility.

In another embodiment of the component diagnostic system discussed above, at least one sensor detects a signal containing information as to whether the component is operating normally or abnormally and outputs a corresponding electrical signal. Processor means are coupled to the sensor(s) for receiving and processing the electrical signal(s) and for determining if the component is operating abnormally based thereon. The processor means preferably comprise a pattern recognition algorithm for analyzing a pattern within the signal detected by each sensor. Output means are coupled to the processor means for affecting another system within the vehicle if the component is operating abnormally. The second system may be a display as mentioned above or a warning device.

A method for automatically monitoring one or more components of a vehicle during operation of the vehicle on a roadway entails, as discussed above, the steps of monitoring operation of the component in order to detect abnormal operation of the component, e.g., in one or the ways described above, and if abnormal operation of the component is detected, automatically directing the vehicle off of the restricted roadway. For example, in order to automatically direct the vehicle off of the restricted roadway, a signal representative of the abnormal operation of the component may be generated and directed to a guidance system of the vehicle that guides the movement of the vehicle. Possibly the directing the vehicle off of the restricted roadway may entail applying satellite positioning techniques or ground-based positioning techniques to enable the current position of the vehicle to be determined and a location off of the restricted highway to be determined and thus a path for the movement of the vehicle. Re-entry of the vehicle onto the restricted roadway may be prevented until the abnormal operation of the component is satisfactorily addressed.

Accordingly, in one embodiment of the invention, the state of the entire vehicle is diagnosed whereby two or more sensors, preferably acceleration sensors and gyroscopes, detect the state of the vehicle and if the state is abnormal, output means are coupled to the processor means for affecting another system in the vehicle. The second system may be the steering control system, the brake system, the accelerator or the frontal or side occupant protection system.

An exemplifying control system for controlling a part of the vehicle in accordance with the invention thus comprises a plurality of sensors or systems mounted at different locations on the vehicle, each sensor system providing a measurement related to a state of the sensor system or a measurement related to a state of the mounting location, and a processor coupled to the sensors or sensor systems and arranged to diagnose the state of the vehicle based on the measurements of the sensor system, e.g., by the application of a pattern recognition technique. The processor controls the part based at least in part on the diagnosed state of the vehicle.

At least one of the sensors or sensor systems may be a high dynamic range accelerometer or a sensor selected from a group consisting of a single axis acceleration sensor, a double axis acceleration sensor, a triaxial acceleration sensor and a gyroscope, and may optionally include an RFID (radio frequency identification) response unit. The gyroscope may be a MEMS-IDT (microelectromechanical system-interdigital transducer) gyroscope including a surface acoustic wave resonator which applies standing waves on a piezoelectric substrate. If an RFID response unit is present, the control system would then comprise an RFID interrogator device which causes the RFID response unit(s) to transmit a signal representative of the measurement of the sensor system associated therewith to the processor.

The state of the vehicle diagnosed by the processor may be the vehicle's angular motion, angular acceleration and/or angular velocity. As such, the steering system, braking system or throttle system may be controlled by the processor in order to maintain the stability of the vehicle. The processor can also be arranged to control an occupant restraint or protection device in an attempt to minimize injury to an occupant.

The state of the vehicle diagnosed by the processor may also be a determination of a location of an impact between the vehicle and another object. In this case, the processor can forecast the severity of the impact using the force/crush properties of the vehicle at the impact location and control an occupant restraint or protection device based at least in part on the severity of the impact.

The system can also include a weight sensing system coupled to a seat in the vehicle for sensing the weight of an occupying item of the seat. The weight sensing system is coupled to the processor whereby the processor controls deployment or actuation of the occupant restraint or protection device based on the state of the vehicle and the weight of the occupying item of the seat sensed by the weight sensing system.

A display may be coupled to the processor for displaying an indication of the state of the vehicle as diagnosed by the processor. A warning device may be coupled to the processor for relaying a warning to an occupant of the vehicle relating to the state of the vehicle as diagnosed by the processor. Further, a transmission device may be coupled to the processor for transmitting a signal to a remote site relating to the state of the vehicle as diagnosed by the processor.

The state of the vehicle diagnosed by the processor may include angular acceleration of the vehicle whereby angular velocity and angular position or orientation are derivable from the angular acceleration. The processor can then be arranged to control the vehicle's navigation system based on the angular acceleration of the vehicle.

A method for controlling a part of the vehicle in accordance with the invention comprises the step of mounting a plurality of sensors or sensor systems at different locations on the vehicle, measuring a state of the sensor system or a state of the respective mounting location of the sensor system, diagnosing the state of the vehicle based on the measurements of the state of the sensors or sensor systems or the state of the mounting locations of the sensors or sensor systems, and controlling the part based at least in part on the diagnosed state of the vehicle. The state of the sensor system may be any one or more of the acceleration, angular acceleration, angular velocity or angular orientation of the sensor system. Diagnosis of the state of the vehicle may entail determining whether the vehicle is stable or is about to rollover or skid and/or determining a location of an impact between the vehicle and another object. Diagnosis of the state of the vehicle may also entail determining angular acceleration of the vehicle based on the acceleration measured by accelerometers if multiple accelerometers are present as the sensors or sensor systems.

Another control system for controlling a part of the vehicle in accordance with the invention comprises a plurality of sensors or sensor systems mounted on the vehicle, each providing a measurement of a state of the sensor system or a state of the mounting location of the sensor system and generating a signal representative of the measurement, and a pattern recognition system for receiving the signals from the sensors or sensor systems and diagnosing the state of the vehicle based on the measurements of the sensors or sensor systems. The pattern recognition system generates a control signal for controlling the part based at least in part on the diagnosed state of the vehicle. The pattern recognition system may comprise one or more neural networks. The features of the control system described above may also be incorporated into this control system to the extent feasible.

The state of the vehicle diagnosed by the pattern recognition system may include a state of an abnormally operating component whereby the pattern recognition system is designed to identify a potentially malfunctioning component based on the state of the component measured by the sensors or sensor systems and determine whether the identified component is operating abnormally based on the state of the component measured by the sensors or sensor systems.

In one preferred embodiment, the pattern recognition system may comprise a neural network system and the state of the vehicle diagnosed by the neural network system includes a state of an abnormally operating component. The neural network system includes a first neural network for identifying a potentially malfunctioning component based on the state of the component measured by the sensors or sensor systems and a second neural network for determining whether the identified component is operating abnormally based on the state of the component measured by the sensors or sensor systems.

Modular neural networks can also be used whereby the neural network system includes a first neural network arranged to identify a potentially malfunctioning component based on the state of the component measured by the sensors or sensor systems and a plurality of additional neural networks. Each of the additional neural networks is trained to determine whether a specific component is operating abnormally so that the measurements of the state of the component from the sensors or sensor systems are input into that one of the additional neural networks trained on a component which is substantially identical to the identified component.

Another method for controlling a part of the vehicle comprises the steps of mounting a plurality of sensors or sensor systems on the vehicle, measuring a state of the sensor system or a state of the respective mounting location of the sensor system, generating signals representative of the measurements of the sensors or sensor systems, inputting the signals into a pattern recognition system to obtain a diagnosis of the state of the vehicle and controlling the part based at least in part on the diagnosis of the state of the vehicle.

In one notable embodiment, a potentially malfunctioning component is identified by the pattern recognition system based on the states measured by the sensors or sensor systems and the pattern recognition system determine whether the identified component is operating abnormally based on the states measured by the sensors or sensor systems. If the pattern recognition system comprises a neural network system, identification of the component entails inputting the states measured by the sensors or sensor systems into a first neural network of the neural network system and the determination of whether the indentified component is operating abnormally entails inputting the state measured by the sensors or sensor systems into a second neural network of the neural network system. A modular neural network system can also be applied in which the states measured by the sensors or sensor systems are input into a first neural network and a plurality of additional neural networks are provided, each being trained to determine whether a specific component is operating abnormally, whereby the states measured by the sensors or sensor systems are input into that one of the additional neural networks trained on a component which is substantially identical to the identified component.

Another control system for controlling a part of the vehicle based on occupancy of the seat in accordance with the invention comprises a plurality of strain gages mounted in connection with the seat, each measuring strain of a respective mounting location caused by occupancy of the seat, and a processor coupled to the strain gages and arranged to determine the weight of an occupying item based on the strain measurements from the strain gages over a period of time, i.e., dynamic measurements. The processor controls the part based at least in part on the determined weight of the occupying item of the seat. The processor can also determine motion of the occupying item of the seat based on the strain measurements from the strain gages over the period of time. One or more accelerometers may be mounted on the vehicle for measuring acceleration in which case, the processor may control the part based at least in part on the determined weight of the occupying item of the seat and the acceleration measured by the accelerometer(s).

By comparing the output of various sensors in the vehicle, it is possible to determine activities that are affecting parts of the vehicle while not affecting other parts. For example, by monitoring the vertical accelerations of various parts of the vehicle and comparing these accelerations with the output of strain gage load cells placed on the seat support structure, a characterization can be made of the occupancy of the seat. Not only can the weight of an object occupying the seat be determined, but also the gross motion of such an object can be ascertained and thereby an assessment can be made as to whether the object is a life form such as a human being. Strain gage weight sensors are disclosed in U.S. Pat. No. 06,242,701. In particular, the inventors contemplate the combination of all of the ideas expressed in this patent application with those expressed in the current invention.

11. Smart Airbags

Figure 36:
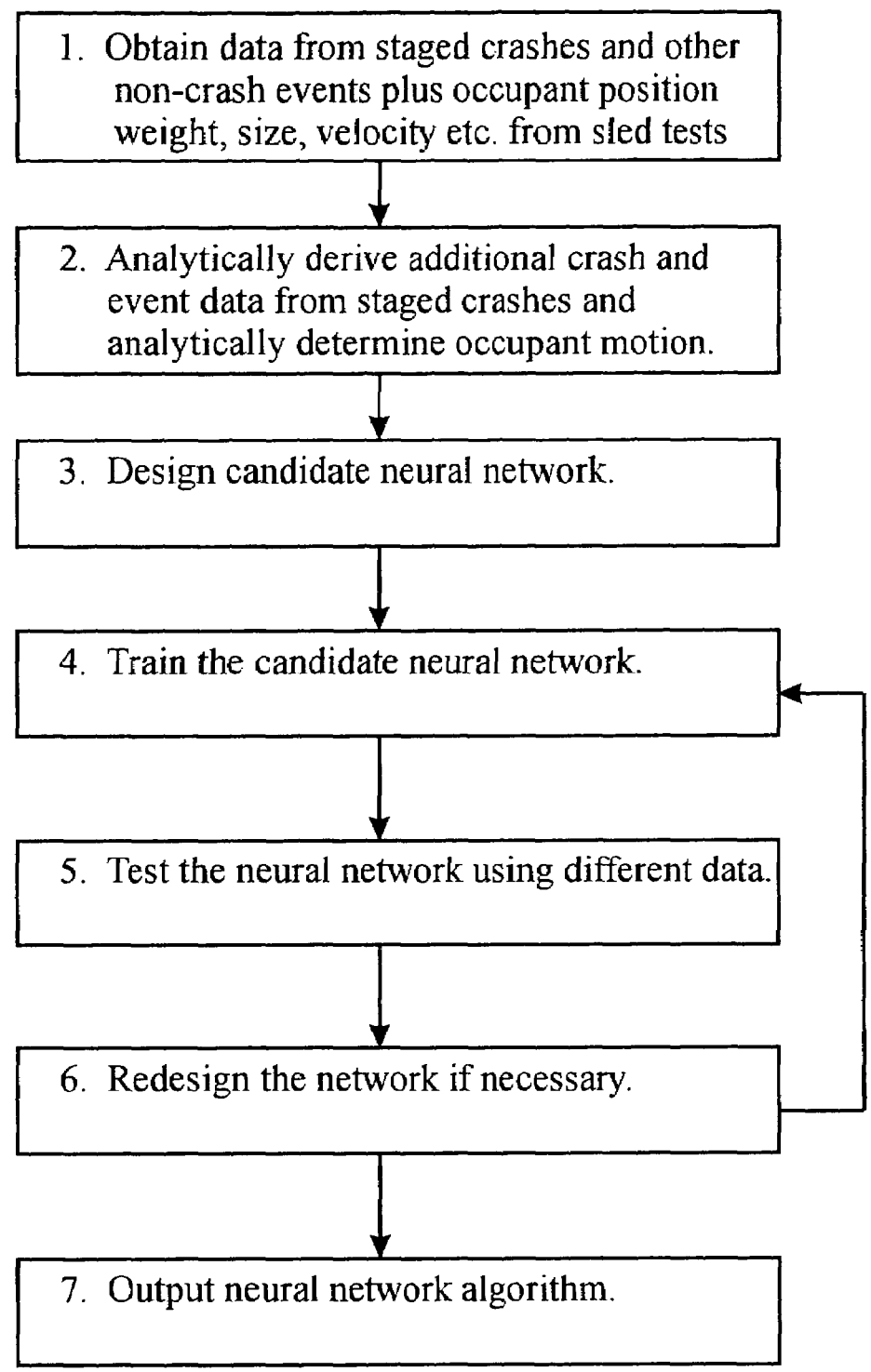
FIG. 36 is a block diagram illustrating a method of obtaining a sensor and prediction algorithm using a neural network.

A block diagram of the neural network computer method of obtaining a smart airbag algorithm is illustrated in FIG. 36. In the first step, one or more vehicle models are crashed under controlled conditions where the vehicle and crash dummies are fully instrumented so that the severity of the crash, and thus the need for an airbag, can be determined. An occupant sensor is also present and in use so that key occupant motion data can be obtained. The occupant data will be insufficient for the full neural network algorithm development but will provide important verification data. The acceleration during the crash is measured at all potential locations for mounting the crash sensors. Normally, any position which is rigidly attached to the main structural members of the vehicle is a good mounting location for the non-crush zone sensors.

The following crash event types, at various velocities, are representative of those that should be considered in establishing crash sensor designs and calibrations for frontal impacts, a similar set also exists for side and rear impacts:
  Frontal Barrier Impact
  Right Angle Barrier Impact
  Left Angle Barrier Impact
  Frontal Offset Barrier Impact
  Frontal Far Offset (Outside of Rails) Barrier Impact
  High Pole on Center Impact
  High Pole off Center Impact
  Low Pole (below bumper)lmpact
  Frontal Car-to-Car Impact
  Partial Frontal Car-to-Car Impact
  Angle car-to-car Impact
  Front to Rear car-to-car Impact
  Front to Side Car-to-Car Impact, Both Cars Moving
  Bumper Underride Impact
  Animal Impact—Simulated Deer
  Undercarriage Impact (hangup on railroad track type of object)
  Impact Into Highway Energy Absorbing Device (Yellow Barrels, etc.)
  Impact Into Guardrail
  Curb Impacts The following non-crash event types are representative of those considered in establishing crash sensor designs and calibrations:
  Hammer Abuse (shop abuse)
  Rough Road (rough driving conditions)

Normally, a vehicle manufacturer will only be concerned with a particular vehicle model and instruct the crash sensor designer to design a sensor system for that particular vehicle model. This is in general not necessary when using the techniques described herein and vehicle crash data from a variety of different vehicle models can be included in the training data.

Since the system is typically being designed for a particular vehicle model, static occupant data needs to be obtained for that particular model and still maintain approximately 100% accuracy. As vision systems improve, the ability to move systems from vehicle to vehicle will also improve and eventually all of the occupant portion of the training will be done by simulation and through use of databases on a computer. Although crash data from one vehicle can frequently be used for the training purposes, occupant data cannot in general be interchanged from one vehicle model to another vehicle model. Dynamic position data for an occupant will, in general, be analytically derived based on the initial position and rules as to how the body translates and rotates which will be determined from sled and crash tests. This is not as complicated as might first appear since for most practical purposes, an unbelted occupant will just translate forward as a free mass and thus the initial position plus the acceleration of the vehicle allows a reasonably accurate determination of position over time. The problem is more complicated for the belted occupant and the rules governing occupant motion must be learned from modeling and verified by sled and crash tests. Fortunately, belted occupants are unlikely to move significantly during the critical part of the crash and thus, the initial position plus some belt payout and stretch at least for the chest is a good approximation.

The vehicle manufacturer will be loath to conduct all of the crashes listed above for a particular vehicle since crash tests are very expensive. If, on the other hand, a particular crash type that occurs in the real world is omitted from the library, there is a chance that the system will not perform optimally when the event occurs later and one or more people will unfortunately be killed or injured. One way to partially solve this dilemma is to use crash data from other vehicles as discussed above. Another method is to create data using the data obtained from the staged crash tests and operating on the data using various mathematical techniques that permits the creation of data that is representative of crashes not run. One method of accomplishing this is to use velocity and crash scaling as described in detail in the above referenced papers and particularly in reference (1) at page 8 and reference (2) at pages 37-49. This is the second step in the process illustrated in FIG. 36. Also included in the second step is the analytical determination of the occupant motion discussed above.

The third step is to assume a candidate neural network architecture. A choice that is moderately complex is suggested such as one with 100 input nodes and 6 hidden layer nodes. If the network is too simple, there will be cases for which the system cannot be trained and, if these are important crashes, the network will have to be revised by adding more nodes. If the initial choice is too complex, this will usually show up after the training with one or more of the weights having a near zero value. In any event, the network can be tested later by removing one node at a time to see if the accuracy of the network degrades. Alternately, genetic algorithms are used to search for the optimum network architecture. Naturally, a similar set of steps apply to other pattern recognition technologies.

Usually a combination neural network is used and tools are now available of generating and training such a network. This is described in some detail for occupant sensing in U.S. Pat. No. 06,445,988.

The training data must now be organized in a fashion similar to the way it will be seen on a vehicle during a crash. Although data from a previously staged crash is available for the full time period of the crash, the vehicle mounted system will only see the data one value at a time. Thus, the training data must be fed to the pattern recognition computer, or computer program, in that manner. This can be accomplished by taking each crash data file and creating 100 cases from it, assuming that the time period chosen for a crash is 200 milliseconds and that each data point is the pre-processed acceleration over two milliseconds. This data must also be combined with the occupant data derived as discussed above. The first training case contains the first crash data point and the remaining 99 points are zero, or random small values for the crash data nodes, and the segmented occupant position data as described in U.S Pat. No. Re. 37260 for the occupant nodes.

Since the handling of the occupant data is described in the '260 patent, the remaining description here will be limited to the handling of the crash data. The second crash data case contains the first two data points with the remaining 98 points set to zero or random low values etc. For the tenth data file, data point one will contain the 2 ms average acceleration at twenty milliseconds into the crash, data point two the average acceleration at eighteen milliseconds into the crash, and data point ten will contain the data from the first two milliseconds of the crash. This process is continued until the one hundred data cases are created for the crash. Each case is represented as a line of data in the training file. This same process must be done for each of the crashes and non-crash events for which there is data. A typical training set will finally contain on the order of 50,000 crash data cases and 500,000 occupant static data cases. The addition of other data such as from multiple accelerometers and gyroscopes can result in a significant increase in the dataset. One variable that has not been considered is pre crash braking. This can influence the initial crash data points prior to the start of the crash, those that were set to small random values. One alternative to eliminate this influence, since pre crash braking may or may not be present, is to set all acceleration values less than 1 G to zero. On the other hand there can be significant information in the pre-crash braking data and therefore it may be desirable to present this as additional information for the smart airbag system to consider.

In the pure neural network crash sensor case as described in U.S. Pat. No. 05,684,701, it was possible to substantially trim the data set to exclude all those cases for which there is no definite requirement to deploy the restraint and the same is true here. For a particular 30 mph frontal barrier crash, for example, analysis of the crash has determined that the sensor must trigger the deployment of the airbag by 20 milliseconds for a 50% male with the seat in the mid seating position. For data greater than 20 milliseconds, the data is of little value from the point of view of a neural network crash sensor that only needs to determine whether to deploy the airbag since that would represent a late deployment, such is not the case here since, for some gas control modules, the inflation/deflation rate can be controlled after the decision to deploy. Also, the 20 millisecond triggering requirement is no longer applicable since it depends on the initial seating position and perhaps the size of the occupant.

For cases where the airbag should not trigger, on the other hand, the entire data set of 200 data files must be used. Finally, the training set must be balanced so that there are about as many no-trigger cases as trigger cases so that the output will not be biased toward one or the other decision. This then is the fourth step in the process as depicted in FIG. 36.

In the fifth step, the pattern recognition program is run with the training set. The program, if it is a neural network program, uses a variety of techniques such as the "back propagation" technique to assign weights to the connections from the input layer nodes to the hidden layer nodes and from the hidden layer nodes to the output layer nodes to try to minimize the error at the output nodes between the value calculated and the value desired. For example, for a particular crash such as a 30 mph frontal barrier impact, an analysis of the crash and the particular occupant has yielded the fact that the sensor must trigger in 20 milliseconds and the data file representing the first 20 milliseconds of the crash would have a desired output node value which would instruct the gas module to inject a particular amount of gas into the airbag.

For another crash such as an 8 mph barrier crash where airbag deployment is not desired, the desired output value for all of the data vectors which are used to represent this crash (100 vectors) would have associated with them a desired output node value of 0 which corresponds to a command to the gas control module not to inject or direct gas into the airbag. The network program then assigns different weights to the nodes until all of the airbag-deployment-not-desired cases have an output node value nearly equal to 0 and similarly, all of the airbag-deployment-desired cases have an output value close to that which is required for the gas control module to inject the proper amount of gas into the airbag. The program finds those weights that minimize the error between the desired output values and the calculated output values.

Since a neural network may have a problem with the discontinuity between zero gas flow and a substantial flow needed even for a marginal airbag deployment, a continuous function may be used and then interpreted such that all flows below a certain value are set to zero at postprocessing.

The term weight is a general term in the art used to describe the mathematical operation that is performed on each datum at each node at one layer before it is inputted into a node at a higher layer. The data at input layer node 1, for example, will be operated on by a function that contains at least one factor that is determined by the training process. In general this factor, or weight, is different for each combination of an input node and hidden layer node. Thus, in the example above where there were 100 input nodes, 12 hidden layer nodes and 1 output node, there will in general be 1,212 weights which are determined by the neural network program during the training period. An example of a function used to operate on the data from one node before it is input to a higher level node is the sigmoid function:

In the usual back propagation trained network, let
$O_{ij}$ be the output of node j in layer i, then the input to node k in layer i+1 is $$1_{i+1,k} = \Sigma_j W_{kj}^{(i)} O_{ij}$$

where $W_{kj}^{(i)}$ is the weight applied to the connection between node j in layer i and node k in layer i+1.

Then the output of node k in layer i+1 is found by transforming its input, for example, with the sigmoid function:

$$O_{i+1,k} = 1/(1+e^{-1_{i+1,k}})$$

and this is used in the input to the next, i+2, layer.

If the neural network is sufficiently complex, that is if it has many hidden layer nodes, and if the training set is small, the network may "memorize" the training set with the result that it can fail to respond properly on a slightly different case from those presented. This is one of the problems associated with neural networks which is now being solved by more advanced pattern recognition systems including genetic algorithms which permits the determination of the minimum complexity network to solve a particular problem. Memorizing generally occurs only when the number of vectors in the training set is not sufficiently large compared to the number of weights. The goal is to have a network that generalizes from the data presented and therefore will respond properly to a new case that is similar to but only slightly different from one of the cases presented.

The network can also effectively memorize the input data if many cases are nearly the same. It is sometimes difficult to determine this by looking at the network so it is important that the network not be trained on all available data but that some significant representative sample of the data is held out of the training set to be used to test the network. It is also important to have a training set which is very large (one hundred to one thousand times the number of weights or more is desirable). This is the function of step five, to test the network using data that it has not seen before, i.e., which did not constitute part of the training data.

Step six involves redesigning the network and then repeating steps three through five until the results are satisfactory. This step is automatically accomplished by some of the neural network software products available on the market.

The final step is to output the computer code for the algorithm and to program a microprocessor, FPGA or design an ASIC with a neural computer, with this code. One important feature of this invention is that the neural network system chosen is very simple and yet, because of the way that the data is fed to the network, all relevant calculations are made with a single network. There is no need, for example, to use an additional network to translate a prediction of a vehicle velocity change, and thus the crash severity, into a time to trigger airbag deployment or the setting for the gas controller. In fact, to do this would be difficult since the entire time history would need to be considered. The output from the network is the setting of the gas controller in the preferred implementation. Naturally, there may be cases where some intermediate step might be desirable.

The steps described above and illustrated in FIG. 36 are for the case where a neural computer program is used to generate code that will be then used to program a standard microprocessor. Similar steps apply also to the case where a neural computer is used. Finally, smart seatbelts are under development wherein the seatbelt induced deceleration to the occupant is another controllable parameter and when available they can also be incorporated in the above smart airbag development process.

Although several preferred embodiments are illustrated and described above, there are possible combinations using other geometries, materials and different dimensions for the components and different forms of the neural network implementation that perform the same functions. Also, the neural network has been described as an example of one means of pattern recognition. Other pattern recognition means exist and still others are under development and will be available in the future. Such a system can be used to identify crashes requiring the deployment of an occupant restraint system and then, optionally coupled with additional information related to the occupant, for example, create a system that satisfies the requirements of one of the Smart Airbag Phases. Also, with the neural network system described above, the input data to the network may be data which has been pre-processed rather than the raw acceleration data either through a process called "feature extraction", as described in Green (U.S. Pat. No. 04,906,940) for example, or by integrating the data and inputting the velocity data to the system, for example. This invention is not limited to the above embodiments and should be determined by the following claims.

I claim:

1. A vehicle with an occupant safety system for use in a crash involving the vehicle, comprising:
    an inflatable occupant protection device;
    an inertial measurement unit (IMU) arranged to measure acceleration of the vehicle in three orthogonal directions and angular velocity of the vehicle about three orthogonal axes, the accelerations and angular velocities being measured at a substantially common location; and
    a processor coupled to said IMU for receiving the measured acceleration of the vehicle and the measured angular velocity of the vehicle and determining whether inflation of said occupant protection device is beneficial, and when inflation of said occupant protection device is determined to be beneficial, said processor generating a signal to initiate inflation of said occupant protection device.

2. The apparatus of claim 1, wherein said IMU comprises a tri-axial accelerometer.

3. The apparatus of claim 1, wherein said processor embodies a pattern recognition technique for analyzing the measured acceleration of the vehicle in the three directions and the measured angular velocity of the vehicle about the three axes and determining whether inflation of said occupant protection device is beneficial.

4. The apparatus of claim 3, wherein said pattern recognition technique is a neural network trained to determine whether the vehicle is experiencing a crash based on the measured acceleration of the vehicle and the measured angular velocity of the vehicle.

5. The apparatus of claim 1, further comprising an occupant position sensor for monitoring position of an occupant to be protected by said occupant protection device, said processor being coupled to said occupant position sensor and being arranged to determine whether inflation of said occupant protection device is beneficial based on the measured acceleration of the vehicle, the measured angular velocity of the vehicle and the position of the occupant.

6. The apparatus of claim 1, further comprising an occupant weight sensor for measuring weight of an occupant to be protected by said occupant protection device, said processor being coupled to said occupant weight sensor and being arranged to determine whether inflation of said occupant protection device is beneficial based on the measured acceleration of the vehicle, the measured angular velocity of the vehicle and the measured weight of the occupant.

7. The apparatus of claim 1, further comprising a wheel speed sensor arranged to measure the speed of a wheel of the vehicle, said processor being coupled to said wheel speed sensor and being arranged to determine whether inflation of said occupant protection device is beneficial based on the measured acceleration of the vehicle, the measured angular velocity of the vehicle and the measured speed of the wheel.

8. The apparatus of claim 1, further comprising an engine speed sensor arranged to measure the speed of an engine of the vehicle, said processor being coupled to said engine speed sensor and being arranged to determine whether inflation of the occupant protection device is beneficial based on the measured acceleration of the vehicle, the measured angular velocity of the vehicle and the measured engine speed.

9. The apparatus of claim 1, wherein said occupant protection device is selected from a group consisting of a frontal airbag and a side airbag.

10. The apparatus of claim 1, wherein said occupant protection device is an airbag inflatable with a gas, further comprising a control module affanged to control at least one of how much gas is to be generated for inflation of said airbag, how fast the gas is to be generated, how much gas should be directed into said airbag, how much gas should be directed to an atmosphere and how much gas should be permitted to exhaust from said airbag, said control module being coupled to said processor and said processor determining settings for said control module based on the measured acceleration of the vehicle and the measured angular velocity of the vehicle.

11. The apparatus of claim 1, wherein said IMU comprises three gyroscopes, each affanged to measure angular velocity about a respective one of the three orthogonal axes.

12. The apparatus of claim 1, wherein said IMU comprises three accelerometers each arranged to measure acceleration in one of the three orthogonal directions and three gyroscopes each affanged to measure angular velocity about a respective one of the three orthogonal axes.

13. A method for controlling inflation of an inflatable occupant protection device in a vehicle, comprising:
arranging an inertial measurement unit (IMU) on the vehicle;
measuring acceleration of the vehicle in three orthogonal directions via the IMU;
measuring angular velocity of the vehicle about three orthogonal axes via the IMU, the accelerations and angular velocities being measured at a substantially common location; and
determining whether inflation of the occupant protection device is beneficial based on the measured acceleration and angular velocity of the vehicle; and
when inflation of the occupant protection device is determined to be beneficial, generating a signal to initiate inflation of the occupant protection device.

14. The method of claim 13, wherein the step of determining whether inflation of the occupant protection device is beneficial based on the measured acceleration and angular velocity of the vehicle comprises inputting the measured acceleration in the three directions and angular velocity about the three axes into a pattern recognition algorithm.

15. The method of claim 13, wherein the step of determining whether inflation of the occupant protection device is beneficial based on the measured acceleration and angular velocity of the vehicle comprises inputting the measured acceleration in the three directions and angular velocity about the three axes into a trained neural network.

16. The method of claim 13, further comprising:
monitoring position of an occupant to be protected by the occupant protection device,
the step of determining whether inflation of the occupant protection device is beneficial being based on the measured acceleration and angular velocity of the vehicle and the position of the occupant.

17. The method of claim 13, further comprising:
measuring weight of an occupant to be protected by the occupant protection device,
the step of determining whether inflation of the occupant protection device is beneficial being based on the measured acceleration and angular velocity of the vehicle and the measured weight of the occupant.

18. The method of claim 13, further comprising:
measuring speed of a wheel of the vehicle,
the step of determining whether inflation of the occupant protection device is beneficial being based on the measured acceleration and angular velocity of the vehicle and the measured wheel speed.

19. The method of claim 13, further comprising:
measuring speed of an engine of the vehicle,
the step of determining whether inflation of the occupant protection device is beneficial being based on the measured acceleration and angular velocity of the vehicle and the measured engine speed.

20. The method of claim 13, wherein the occupant protection device is an airbag inflatable with a gas, further comprising:
controlling at least one of the amount of gas to be generated for inflation of the airbag, the velocity of the gas to be generated, the amount of gas to be directed into the airbag, the amount of gas to be directed to an atmosphere and the amount of gas to exhaust from the airbag based on the measured acceleration and angular velocity of the vehicle.

21. A vehicle with an occupant safety system for use in a crash involving the vehicle, comprising:
a seat;
an inflatable occupant protection device for protecting an occupant of said seat;

an inertial measurement unit (IMU) arranged to measure acceleration of the vehicle in three orthogonal directions and measure angular velocity of the vehicle about three orthogonal axes, the accelerations and angular velocities being measured at a substantially common location;

an occupant weight sensor for measuring pressure applied by the occupant to said seat and providing a value representative of the measured pressure applied by the occupant to said seat; and a processor coupled to said IMU, said occupant weight sensor and said occupant protection device for receiving the measured angular velocity and the value representative of the measured pressure applied by the occupant to said seat and determining whether the measured angular velocity is indicative of a crash involving the vehicle, said processor also being arranged to determine whether inflation of said occupant protection device is beneficial based on the measured angular velocity of the vehicle and the value representative of the measured pressure applied by the occupant to said seat, and when inflation of said occupant protection device is determined to be beneficial, said processor generating a signal to initiate inflation of said occupant protection device.

22. The apparatus of claim 21, wherein said IMU comprises three accelerometers each arranged to measure acceleration in one of the three orthogonal directions and three gyroscopes each affanged to measure angular velocity about a respective one of the three orthogonal axes.

23. The apparatus of claim 21, wherein said processor embodies a pattern recognition technique for analyzing the measured angular velocity of the vehicle about the three orthogonal axes and determining whether the angular velocity is indicative of a crash involving the vehicle and whether inflation of said occupant protection device is beneficial.

24. The apparatus of claim 23, wherein said pattern recognition technique is a neural network trained to determine whether the vehicle is involved in a crash based on the measured angular velocity of the vehicle.

25. The apparatus of claim 21, further comprising an occupant position sensor for monitoring position of the occupant, said processor being coupled to said occupant position sensor and being affanged to determine whether inflation of said occupant protection device is beneficial based on the measured angular velocity of the vehicle and the position of the occupant.

26. The apparatus of claim 21, further comprising a wheel speed sensor arranged to measure the speed of a wheel of the vehicle, said processor being coupled to said wheel speed sensor and being arranged to determine whether inflation of said occupant protection device is beneficial based on the measured angular velocity of the vehicle and the measured speed of the wheel.

27. The apparatus of claim 21, further comprising an engine speed sensor arranged to measure the speed of an engine of the vehicle, said processor being coupled to said engine speed sensor and being arranged to determine whether inflation of said occupant protection device is beneficial based on the measured angular velocity of the vehicle and the measured engine speed.

28. The apparatus of claim 21, wherein said occupant protection device is selected from a group consisting of a frontal airbag and a side airbag.

29. The apparatus of claim 21, wherein said occupant protection device is an airbag inflatable with a gas, further comprising a control module affanged to control at least one of how much gas is to be generated for inflation of said airbag, how fast the gas is to be generated, how much gas should be directed into said airbag, how much gas should be directed to an atmosphere and how much gas should be permitted to exhaust from said airbag, said control module being coupled to said processor and said processor determining settings for said control module based on the measured angular velocity of the vehicle.

30. A method for controlling inflation of an inflatable occupant protection device in a vehicle, comprising:

arranging an inertial measurement unit (IMU) on the vehicle;

measuring acceleration of the vehicle in three orthogonal directions via the IMU;

measuring angular velocity of the vehicle about three orthogonal axes via the IMU, the accelerations and angular velocities being measured at a substantially common location;

measuring pressure applied by an occupant to be protected by the occupant protection device to a seat on which the occupant is present and providing a value representative of the measured pressure applied by the occupant to the seat, determining whether the measured angular velocity is indicative of an accident involving the vehicle;

if it is determined that the measured angular velocity is indicative of an accident, determining whether inflation of the occupant protection device is beneficial based on the measured angular velocity of the vehicle and the value representative of the measured pressure applied by the occupant to the seat; and when inflation of the occupant protection device is determined to be beneficial, generating a signal to initiate inflation of the occupant protection device.

31. The method of claim 30, wherein the step of determining whether inflation of the occupant protection device is beneficial based on the measured angular velocity of the vehicle comprises inputting the measured angular velocity about the three axes into a pattern recognition algorithm.

32. The method of claim 30, wherein the step of determining whether inflation of the occupant protection device is beneficial based on the measured angular velocity of the vehicle comprises inputting the measured angular velocity about the three axes into a trained neural network.

33. The method of claim 30, further comprising:

monitoring position of the occupant to be protected by the occupant protection device, the step of determining whether inflation of the occupant protection device is beneficial being based on the measured angular velocity of the vehicle and the position of the occupant.

34. The method of claim 30, further comprising:

measuring speed of a wheel of the vehicle, the step of determining whether inflation of the occupant protection device is beneficial being based on the measured angular velocity of the vehicle and the measured wheel speed.

35. The method of claim 30, further comprising:

measuring speed of an engine of the vehicle, the step of determining whether inflation of the occupant protection device is beneficial being based on the measured angular velocity of the vehicle and the measured engine speed.

36. The method of claim 30, wherein the occupant protection device is an airbag inflatable with a gas, further comprising:
controlling at least one of the amount of gas to be generated for inflation of the airbag, the velocity of the gas to be generated, the amount of gas to be directed into the airbag, the amount of gas to be directed to an atmosphere and the amount of gas to exhaust from the airbag based on the generated signal.

37. A vehicle with an occupant safety system for use in a crash involving the vehicle, comprising:
an inflatable occupant protection device;
an inertial measurement unit (IMU) arranged to measure acceleration of the vehicle in three orthogonal directions and measure angular velocity of the vehicle about three orthogonal axes, the accelerations and angular velocities being measured at a substantially common location; and
a processor coupled to said IMU and said occupant protection device for receiving the measured angular velocity about the three axes and determining whether the angular velocity about any single axis or the angular velocity about a combination of any of the three axes is indicative of a crash involving the vehicle and whether inflation of said occupant protection device is beneficial based on the measured angular velocity, and when deployment of said occupant protection device is determined to be beneficial, said processor generating a signal to initiate inflation of said occupant protection device,
said processor embodying a pattern recognition technique which analyzes the measured angular velocity of the vehicle and determines whether the angular velocity is indicative of a crash involving the vehicle and whether inflation of said occupant protection device is beneficial based therein.

38. A vehicle with an occupant safety system for use in a crash involving the vehicle, comprising:
an inflatable occupant protection device;
an occupant position sensor for monitoring position of an occupant to be protected by said occupant protection device;
an inertial measurement unit (IMU) arranged to measure acceleration of the vehicle in three orthogonal directions and measure angular velocity of the vehicle about three orthogonal axes, the accelerations and angular velocities being measured at a substantially common location; and
a processor coupled to said IMU, said occupant position sensor and said occupant protection device and arranged to receive the measured angular velocity about the three axes, determine whether the measured angular velocity about any single axis or the angular velocity about a combination of any of the three axes is indicative of a crash involving the vehicle and determine whether inflation of said occupant protection device is beneficial based on the measured angular velocity of the vehicle and the position of the occupant, and when inflation of said occupant protection device is determined to be beneficial, said processor generating a signal to initiate inflation of said occupant protection device.

39. A vehicle with an occupant safety system for use in a crash involving the vehicle, comprising:
an inflatable occupant protection device;
an inertial measurement unit (IMU) arranged to measure acceleration of the vehicle in three orthogonal directions and measure angular velocity of the vehicle about three orthogonal axes, the accelerations and angular velocities being measured at a substantially common location;
a sensor for providing data about the vehicle and being selected from a group consisting of a wheel speed sensor arranged to measure the speed of a wheel of the vehicle and an engine speed sensor arranged to measure the speed of an engine of the vehicle; and
a processor coupled to said IMU, said sensor and said occupant protection device and arranged to receive the measured angular velocity about the three axes, determine whether the angular velocity about any single axis or the angular velocity about a combination of any of the three axes is indicative of a crash involving the vehicle and determine whether inflation of said occupant protection device is beneficial based on the measured angular velocity of the vehicle and the data about the vehicle obtained by said sensor, and when inflation of said occupant protection device is determined to be beneficial, said processor generating a signal to initiate inflation of said occupant protection device.

40. A method for controlling inflation of an inflatable occupant protection device in a vehicle, comprising:
arranging an inertial measurement unit (IMU) on the vehicle;
measuring acceleration of the vehicle in three orthogonal directions via the IMU;
measuring angular velocity of the vehicle about three orthogonal axes via the IMU, the accelerations and angular velocities being measured at a substantially common location;
determining whether the measured angular velocity about any single axis or the angular velocity about a combination of any of the three axes is indicative of an accident involving the vehicle;
if it is determined that the measured angular velocity about any single axis or the angular velocity about a combination of any of the three axes is indicative of an accident, determining whether inflation of the occupant protection device is beneficial based on the measured angular velocity of the vehicle; and
when inflation of the occupant protection device is determined to be beneficial, generating a signal to initiate inflation of the occupant protection device,
the step of determining whether inflation of the occupant protection device is beneficial based on the measured angular velocity of the vehicle comprising inputting the measured angular velocity into a pattern recognition algorithm or a trained neural network.

41. A method for controlling inflation of an inflatable occupant protection device in a vehicle, comprising:
arranging an inertial measurement unit (IMU) on the vehicle;
measuring acceleration of the vehicle in three orthogonal directions via the IMU;
measuring angular velocity of the vehicle about three orthogonal axes via the IMU, the accelerations and angular velocities being measured at a substantially common location;
monitoring position of an occupant to be protected by the occupant protection device;
determining whether the measured angular velocity about any single axis or the angular velocity about a combination of any of the three axes is indicative of an accident involving the vehicle;

if it is determined that the measured angular velocity about any single axis or the angular velocity about a combination of any of the three axes is indicative of an accident, determining whether inflation of the occupant protection device is beneficial based on the measured angular velocity of the vehicle and the position of the occupant; and when inflation of the occupant protection device is determined to be beneficial, generating a signal to initiate inflation of the occupant protection device.

42. A method for controlling inflation of an inflatable occupant protection device in a vehicle, comprising:

arranging an inertial measurement unit (IMU) on the vehicle;

measuring acceleration of the vehicle in three orthogonal directions via the IMU;

measuring angular velocity of the vehicle about three orthogonal axes via the IMU, the accelerations and angular velocities being measured at a substantially common location;

measuring speed of a wheel or an engine of the vehicle;

determining whether the measured angular velocity about any single axis or the angular velocity about a combination of any of the three axes is indicative of an accident involving the vehicle;

if it is determined that the measured angular velocity about any single axis or the angular velocity about a combination of any of the three axes is indicative of an accident, determining whether inflation of the occupant protection device is beneficial based on the measured angular velocity of the vehicle and the measured speed of the wheel or engine; and when inflation of the occupant protection device is determined to be beneficial, generating a signal to initiate inflation of the occupant protection device.

* * * * *

UNITED STATES PATENT AND TRADEMARK OFFICE
CERTIFICATE OF CORRECTION

PATENT NO. : 7,284,769 B2
APPLICATION NO. : 10/638743
DATED : October 23, 2007
INVENTOR(S) : David S. Breed It is certified that error appears in the above-identified patent and that said Letters Patent is hereby corrected as shown below:

Col. 2, line 4, insert --the-- after "of".

Col. 101, line 59, change "affanged" to --arranged--.

Col. 101, line 64, change "affanged" to --arranged--.

Col. 103, line 29, change "affanged" to --arranged--.

Col. 103, line 44, change "affanged" to --arranged--.

Col. 103, line 67, change "affanged" to --arranged--.

Col. 105, line 51, change "affanged" to --arranged--.

Signed and Sealed this

Twenty-fifth Day of December, 2007

JON W. DUDAS
*Director of the United States Patent and Trademark Office*